(12) United States Patent
Nakatani et al.

(10) Patent No.: US 6,330,392 B1
(45) Date of Patent: Dec. 11, 2001

(54) VIDEO DATA EDITING APPARATUS AND COMPUTER-READABLE RECORDING MEDIUM STORING AN EDITING PROGRAM

(75) Inventors: Tokuo Nakatani, Ibaraki; Shinichi Saeki, Sennan-gun; Mitsuaki Morita, Ibaraki; Nobuyuki Enoki, Hirakata, all of (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/154,880

(22) Filed: Sep. 17, 1998

(30) Foreign Application Priority Data

Sep. 17, 1997 (JP) ................................. 9-251990
Jun. 17, 1998 (JP) ................................. 10-169616

(51) Int. Cl.[7] ..................................... H04N 5/93
(52) U.S. Cl. ..................... 386/52; 386/126; 360/60; 369/83
(58) Field of Search .................. 386/4, 45, 52, 386/102, 125, 126; 369/32, 58, 83; 360/13, 72.2; 348/222, 207, 232, 239, 722; 707/206

(56) References Cited

U.S. PATENT DOCUMENTS

| | | |
|---|---|---|
| 5,107,481 | 4/1992 | Miki et al. . |
| 5,819,290 | 6/1998 | Fujita . |
| 5,905,845 | 5/1999 | Okada et al. . |
| 5,919,047 * | 7/1999 | Sone ................................. 386/102 |
| 5,920,535 * | 7/1999 | Hisamatsu et al. ................ 360/13 |
| 5,923,869 | 7/1999 | Kashiwagi et al. . |
| 5,937,138 | 8/1999 | Fukuda et al. . |
| 5,966,122 * | 10/1999 | Itoh ................................... 348/222 |
| 6,091,407 * | 7/2000 | Boetje et al. ..................... 348/722 |
| 6,115,799 * | 9/2000 | Ogawa ............................. 707/206 |

FOREIGN PATENT DOCUMENTS

| | | |
|---|---|---|
| 0346979A2 | 12/1989 | (EP) . |
| 0847196A1 | 6/1998 | (EP) . |
| 0866456A1 | 9/1998 | (EP) . |
| 0877377A1 | 11/1998 | (EP) . |
| 2294173A | 4/1996 | (GB) . |
| 0724264A2 | 7/1996 | (GB) . |
| 08339318 | 12/1996 | (JP) . |
| 97/03443 | 1/1997 | (WO) . |
| 97/13363 | 4/1997 | (WO) . |
| 98/14938 | 4/1998 | (WO) . |
| 98/21722 | 5/1998 | (WO) . |

OTHER PUBLICATIONS

Uesaka et al., "DVD Authoring System", National Technical Report, vol. 42, No. 5, Oct. 1996, pp. 90–96.
R. Hedtke et al., "Schnittbearbeitung Von MPEG–2–Codierten Videosequenzen" Fernseh Und Kinotechnik, vol. 50, No. 7, Jul. 1, 1996, pp. 367–373.
"Hard Disk Cache Alterations for Digital Versatile/Video Disks", IBM Technical Disclosure Bulletin, vol. 40, No. 3, Mar. 1997, pp. 165–166.

* cited by examiner

*Primary Examiner*—Wendy R. Garber
*Assistant Examiner*—Christopher Onuaku
(74) *Attorney, Agent, or Firm*—Wenderoth, Lind & Ponack, L.L.P.

(57) ABSTRACT

During video editing, video data is recorded in continuous areas of at least a predetermined length on an optical disc to ensure that the display of video images is uninterrupted. A first segment, out of a plurality of segments recorded on an optical disc, whose consecutive area on the optical disc is shorter than the predetermined length is detected. Re-encoded data that is to be reproduced either immediately before or immediately after the detected first segment is recorded next to the first segment. If the combined continuous area of the first segment and the re-encoded data is still below a predetermined length, the segment that is to be reproduced on the other side of the re-encoded data to the first segment is recorded on the optical disc so as to be positioned on the other side of the re-encoded data, thereby increasing the continuous length of the recording area beyond the predetermined length.

13 Claims, 94 Drawing Sheets

FIG. 1A BACKGROUND ART
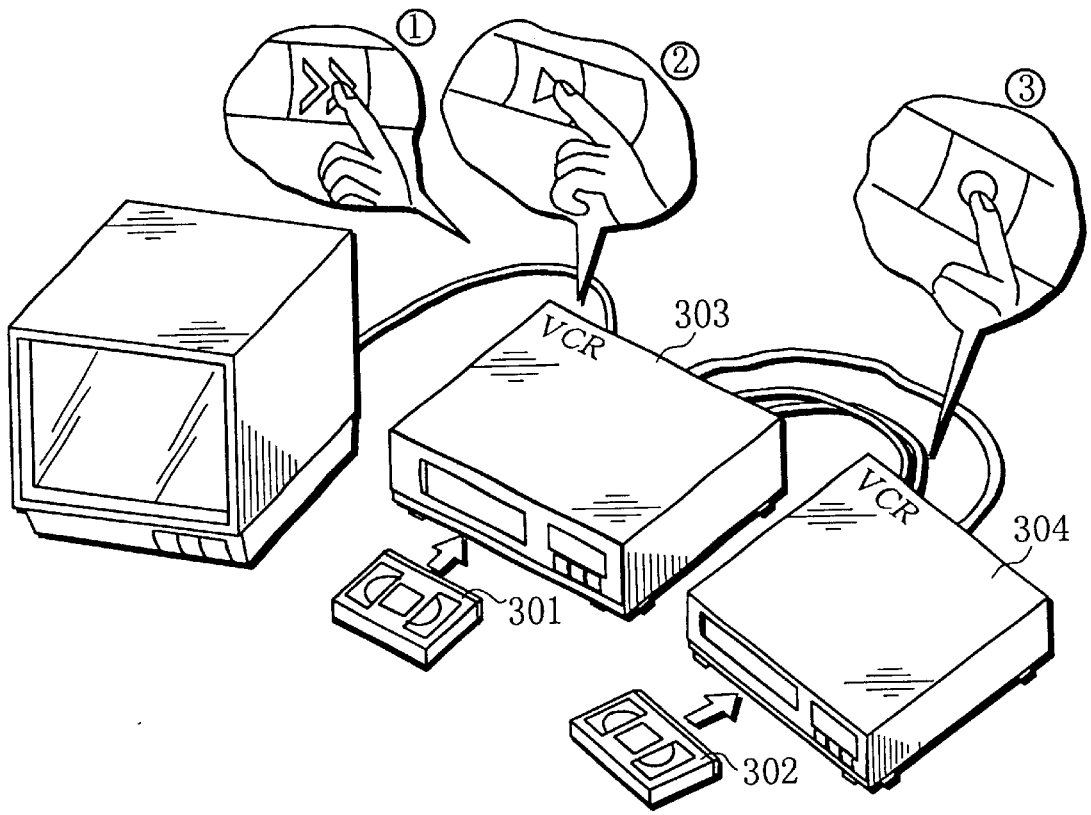
FIG. 1B BACKGROUND ART
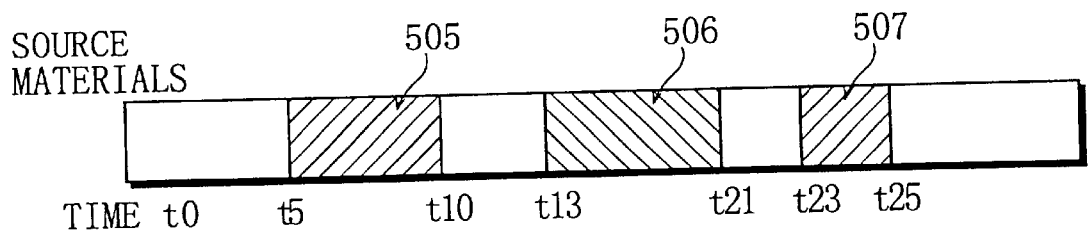
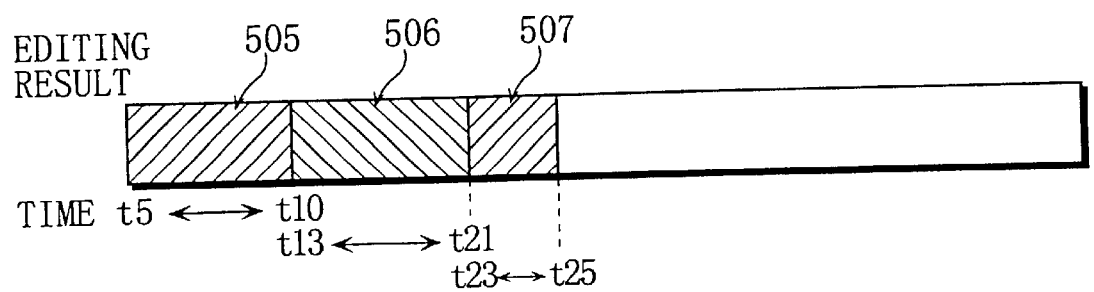

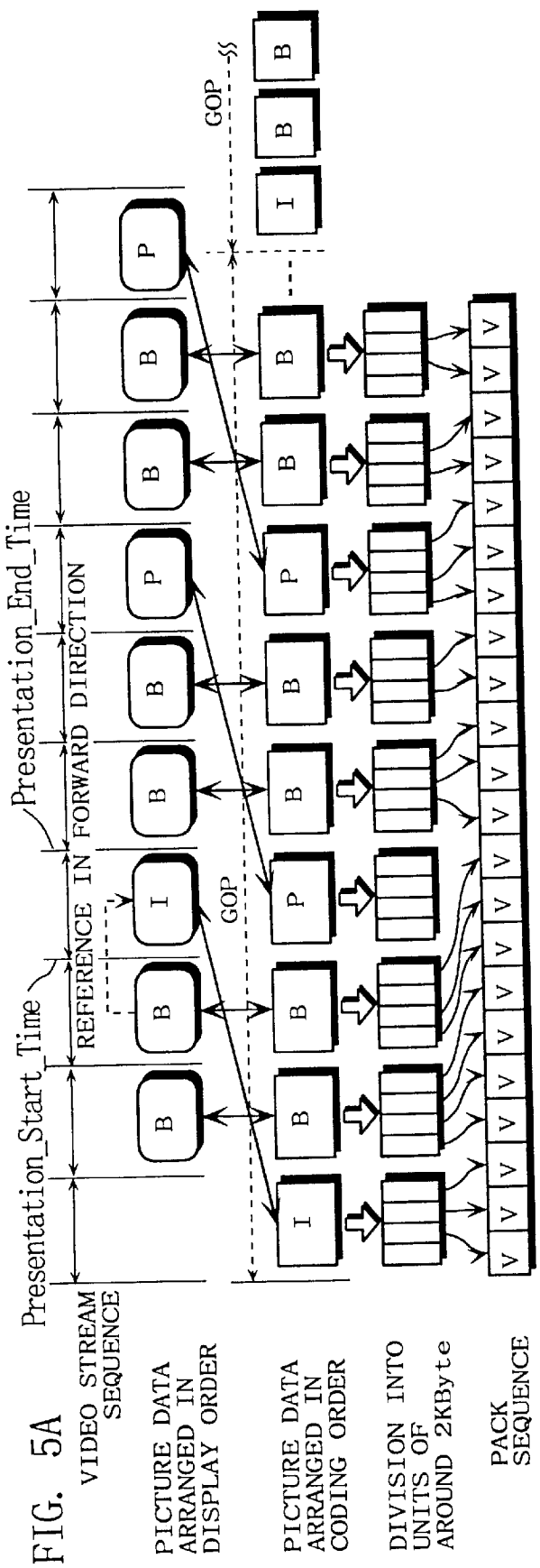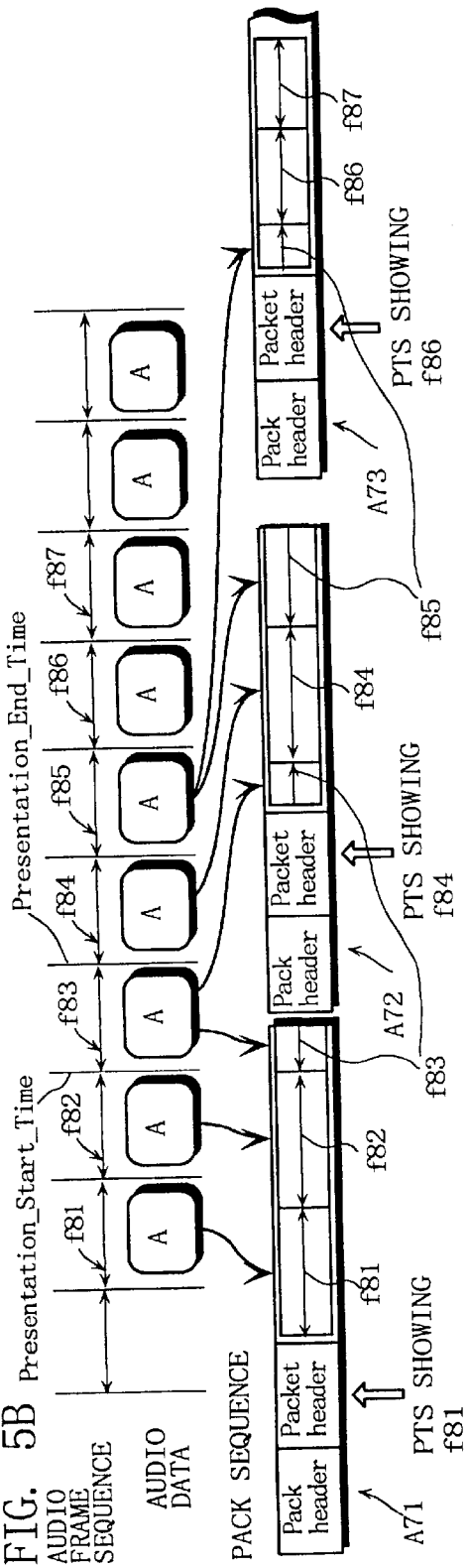

FIG. 6A
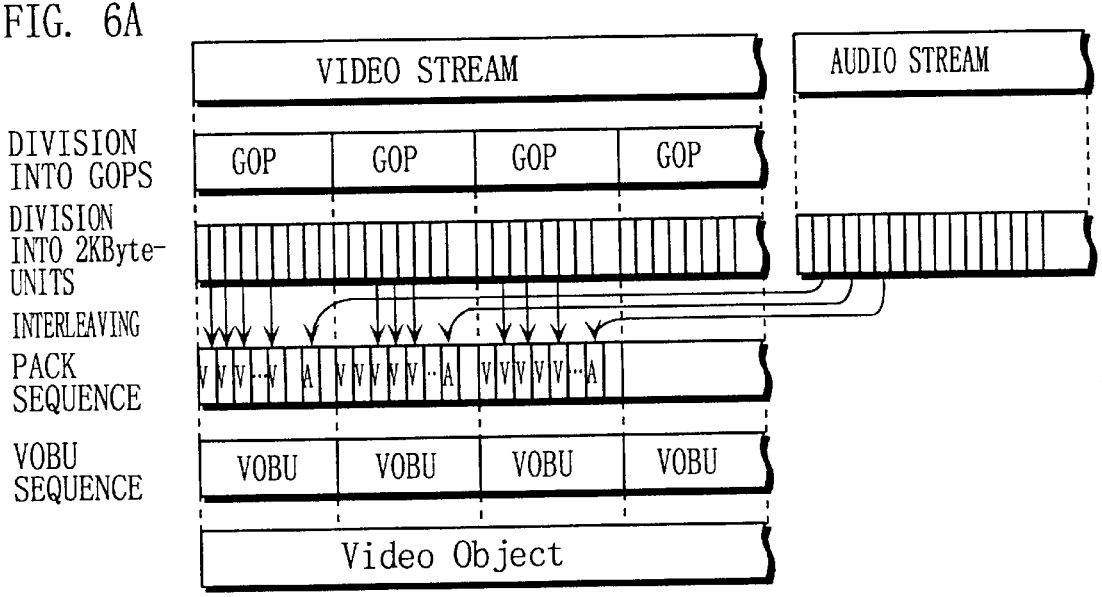
FIG. 6B
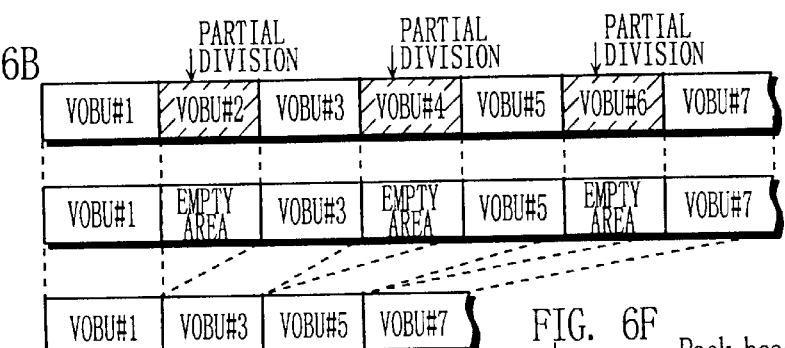
FIG. 6C
—the first V_PCK in each VOBU
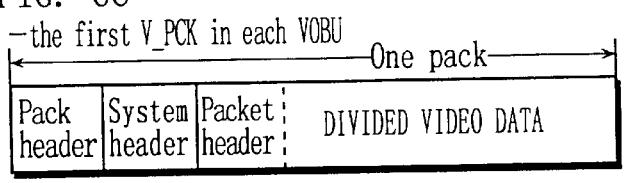
FIG. 6F
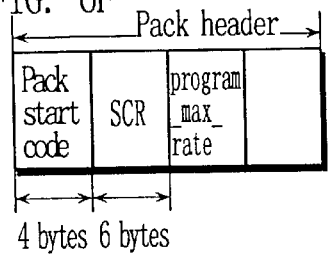
FIG. 6D
—V_PCKs other than the first V_PCK in each VOBU
FIG. 6G
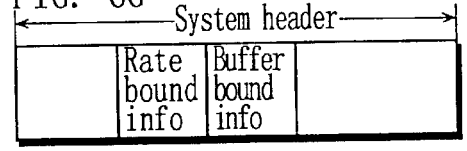
FIG. 6E
FIG. 6H
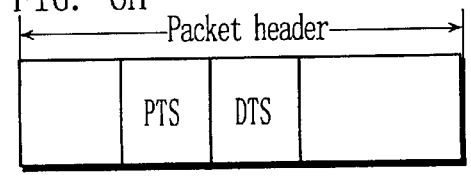

FIG. 7A  IDEAL BUFFER STATE
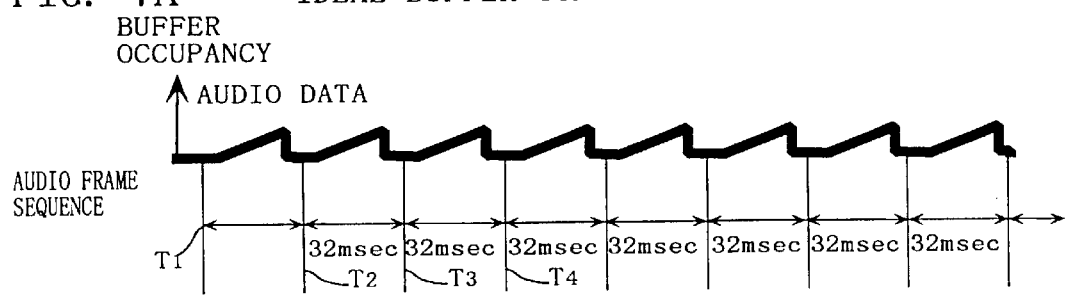
FIG. 7B  ACTUAL BUFFER STATE
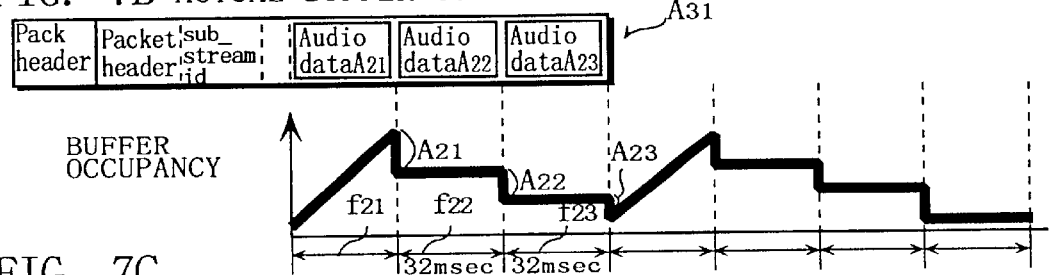
FIG. 7C
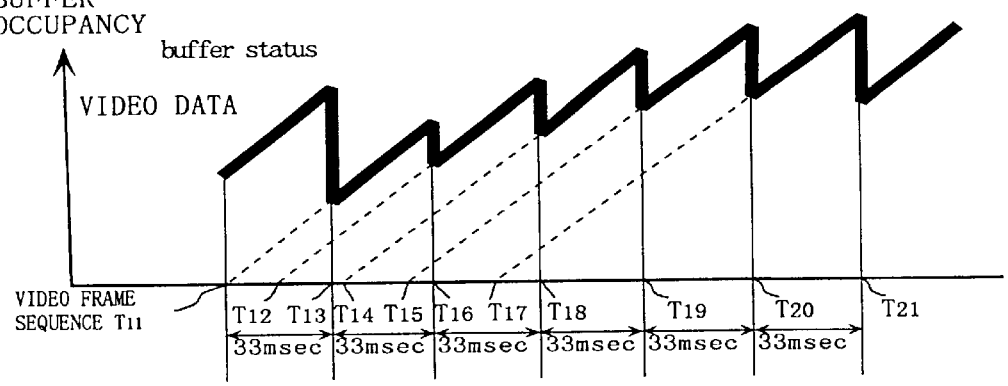
FIG. 7D
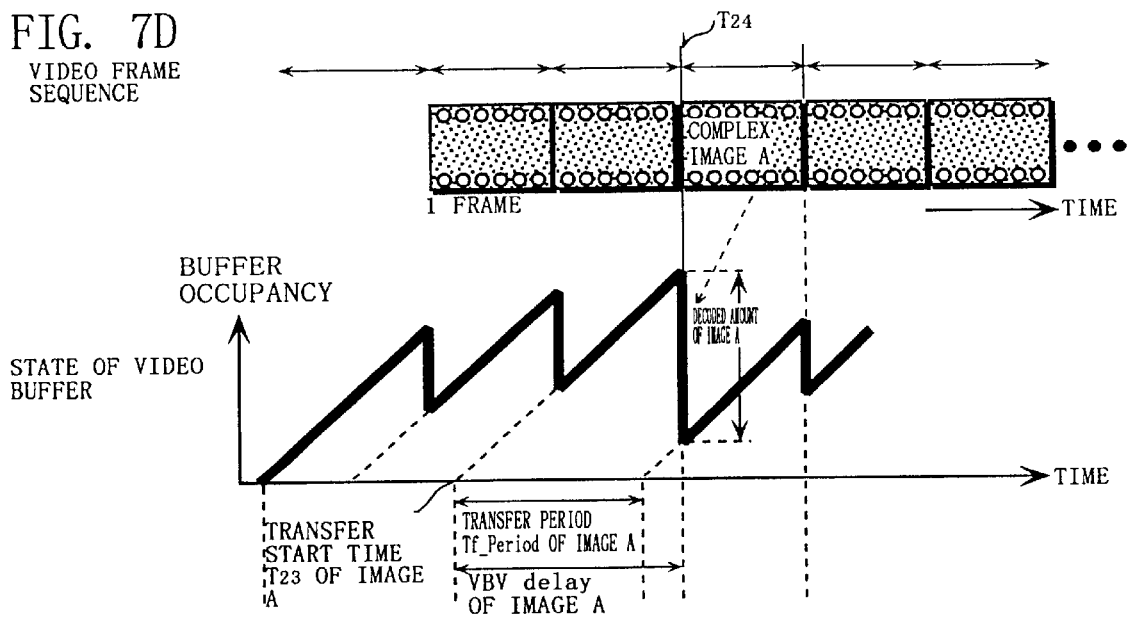

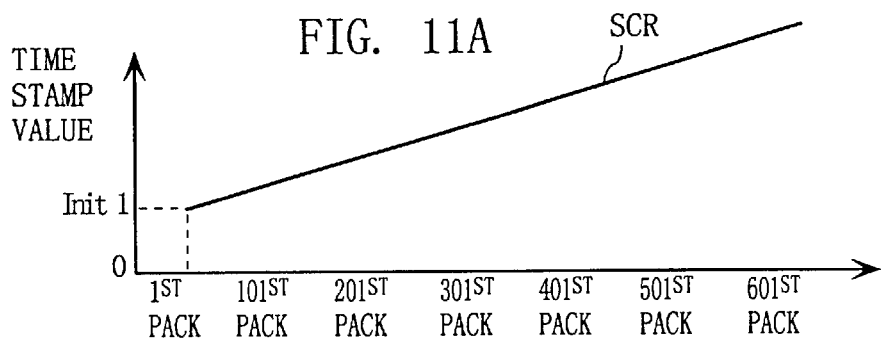
FIG. 11A
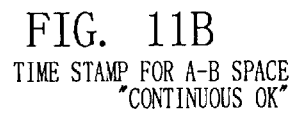
FIG. 11B
TIME STAMP FOR A-B SPACE "CONTINUOUS OK"
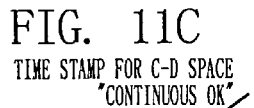
FIG. 11C
TIME STAMP FOR C-D SPACE "CONTINUOUS OK"
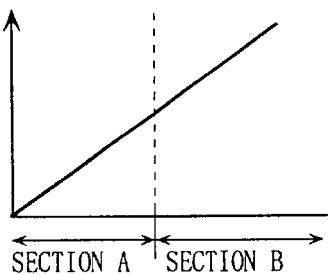
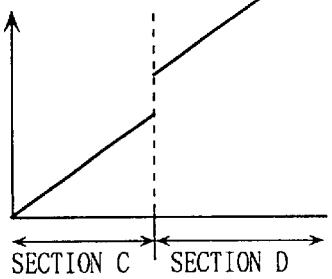
FIG. 11D
TIME STAMP FOR E-F SPACE "CONTINUITY NG"
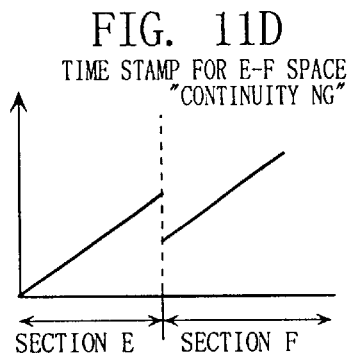
FIG. 11E
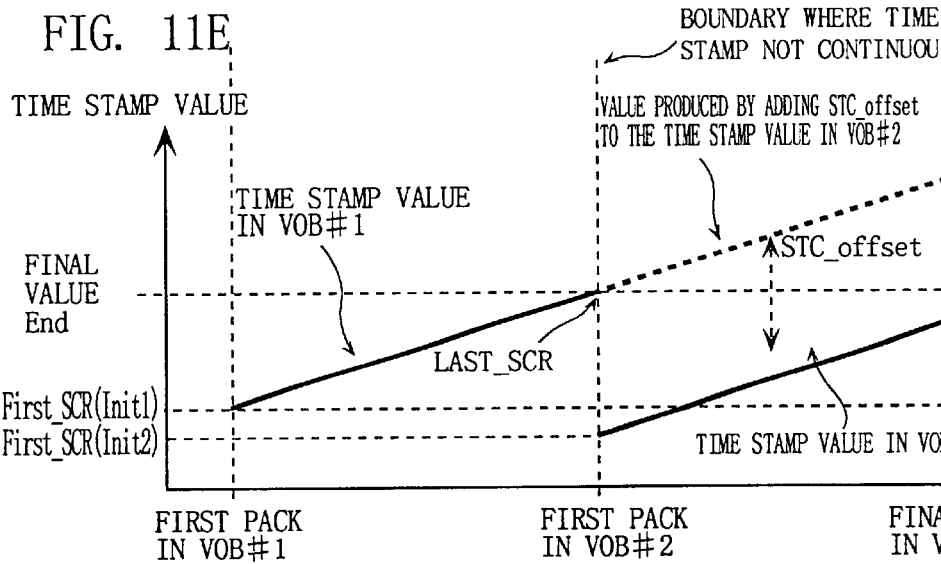

PTM FORMAT

AUDIO GAP LOCATION INFORMATION  A_GAP_LOC

1bit 2bit 3bit

1: AUDIO GAP PRESENT IN VOBU#1    0: NOT PRESENT
2: AUDIO GAP PRESENT IN VOBU#2
3: AUDIO GAP PRESENT IN VOBU#3

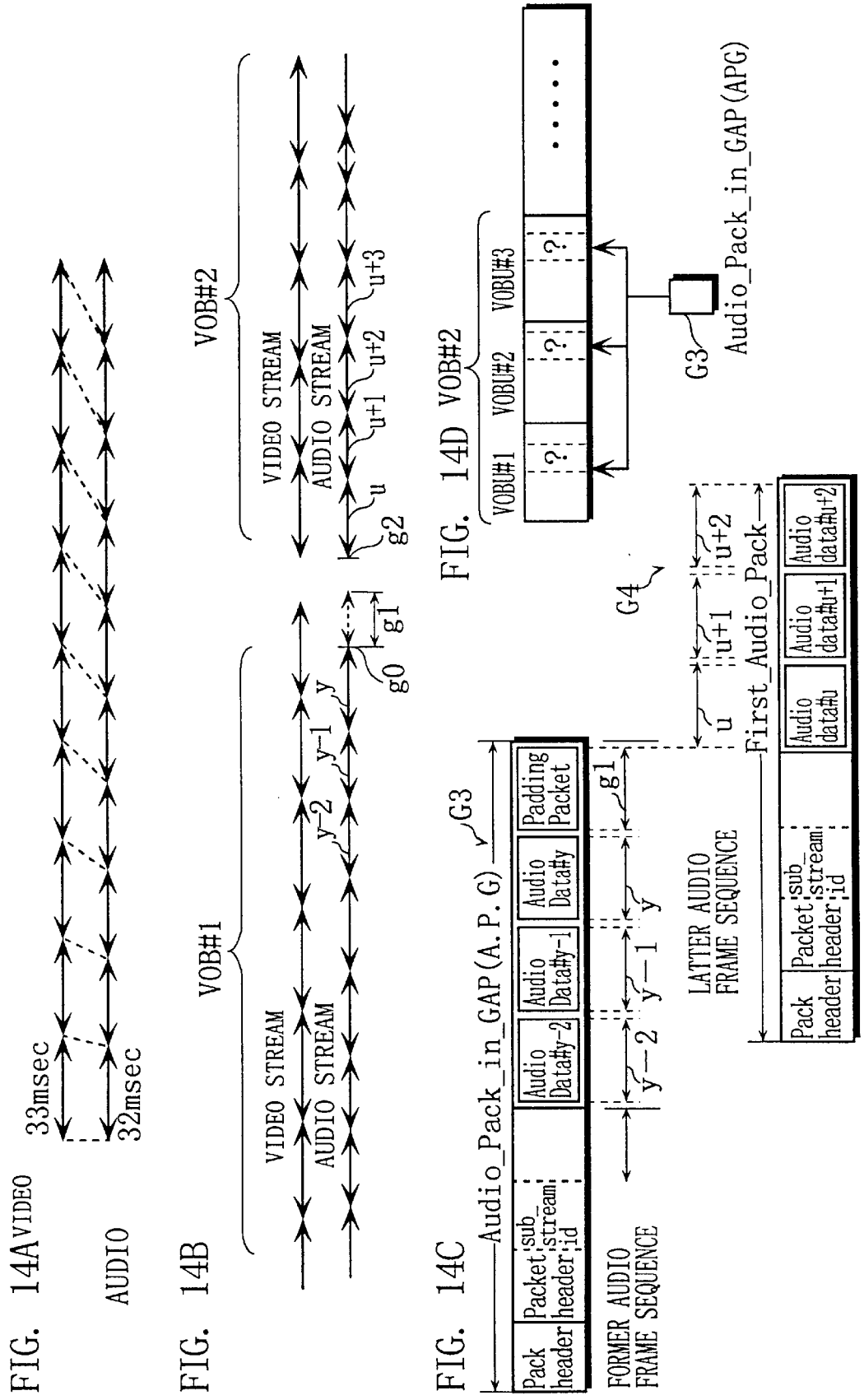

FIG. 15A
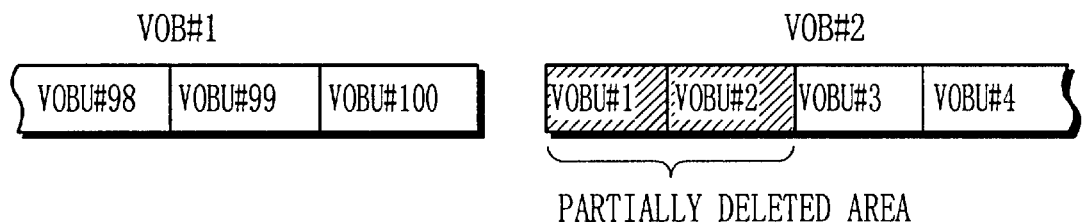
FIG. 15B
AUDIO GAP LOCATION INFORMATION   A_GAP_LOC     |0|1|1|
FIG. 15C
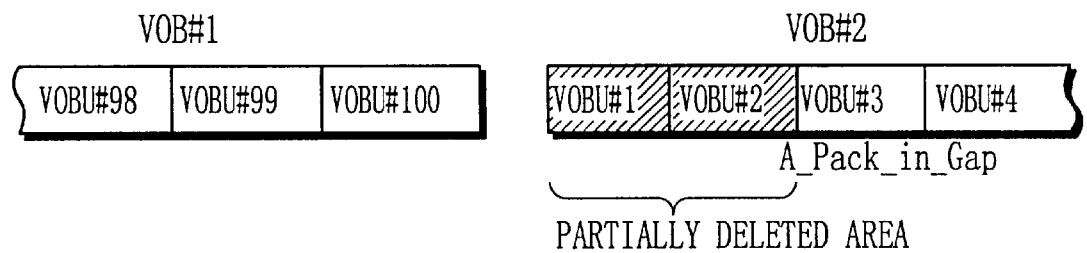
FIG. 15D
AUDIO GAP LOCATION INFORMATION     |0|0|1|

FIG. 23A
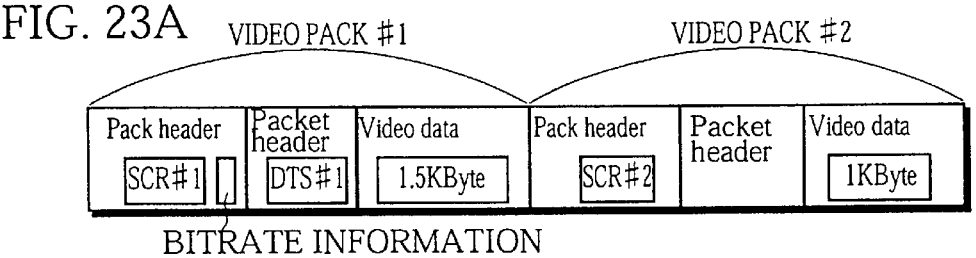
BITRATE INFORMATION
FIG. 23B
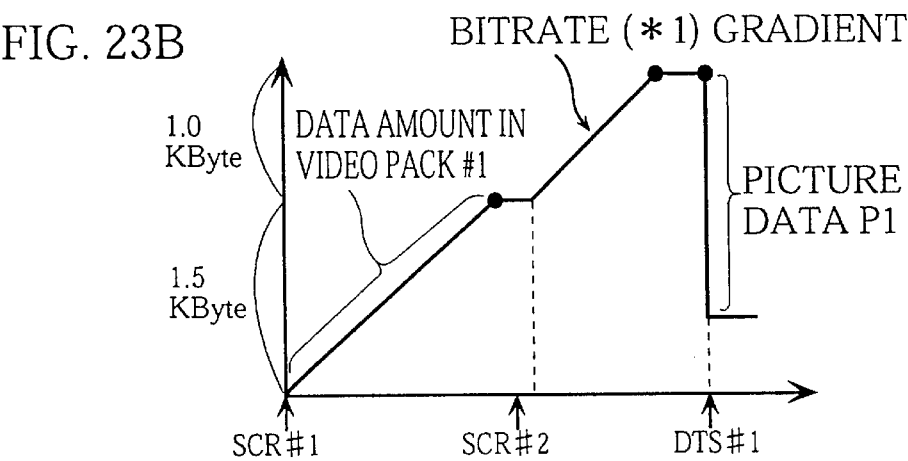
FIG. 23C  AUDIO TO BE REPRODUCED AT THE SAME TIME AS Vend SOMEWHERE IN THIS PACK SEQUENCE (ONE SECOND RULE)
FIG. 23D  AUDIO TO BE REPRODUCED AT THE SAME TIME AS Vtop SOMEWHERE IN THIS PACK SEQUENCE (ONE SECOND RULE)
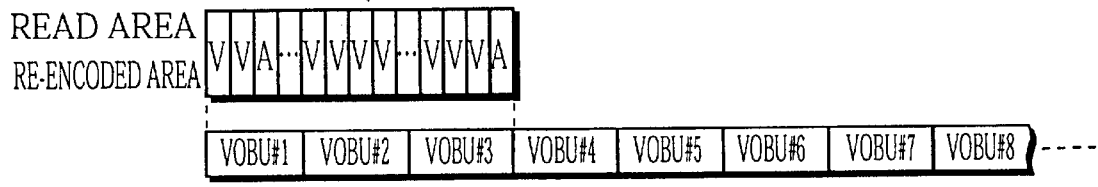

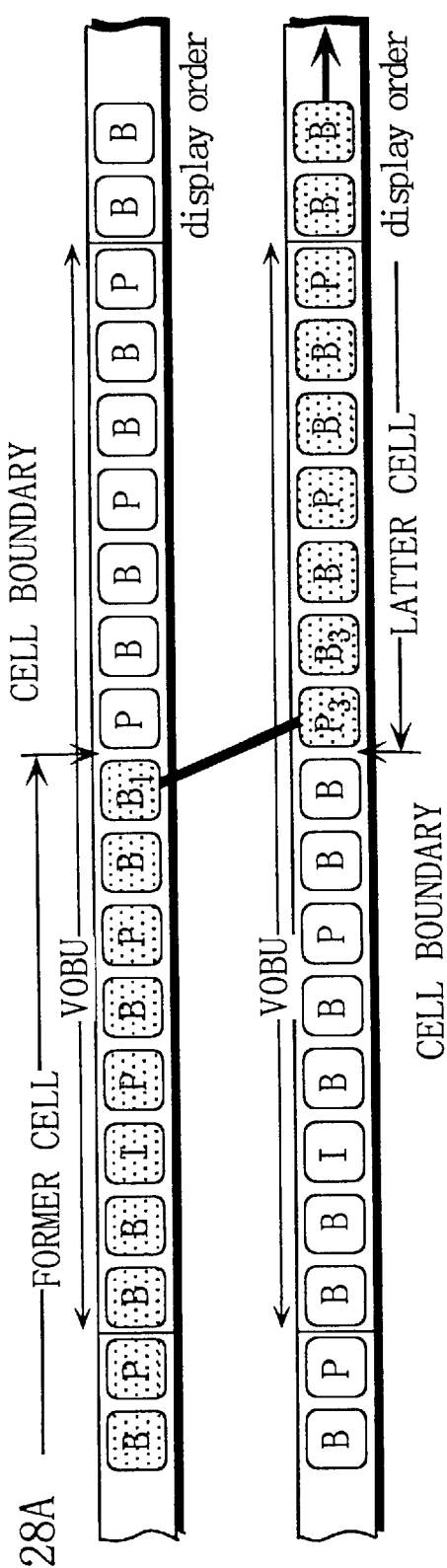
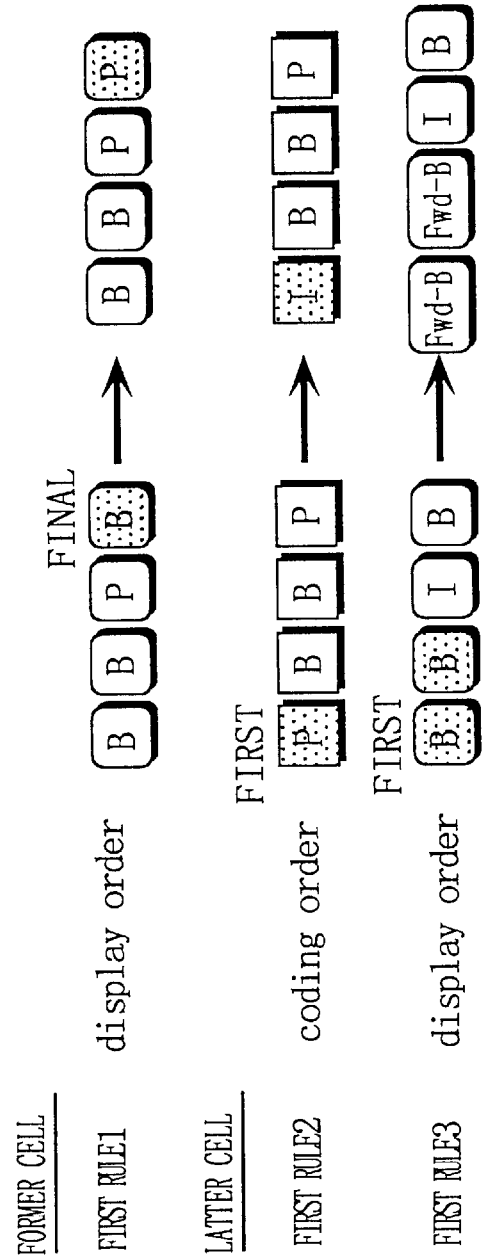
FIG. 28A
FIG. 28B

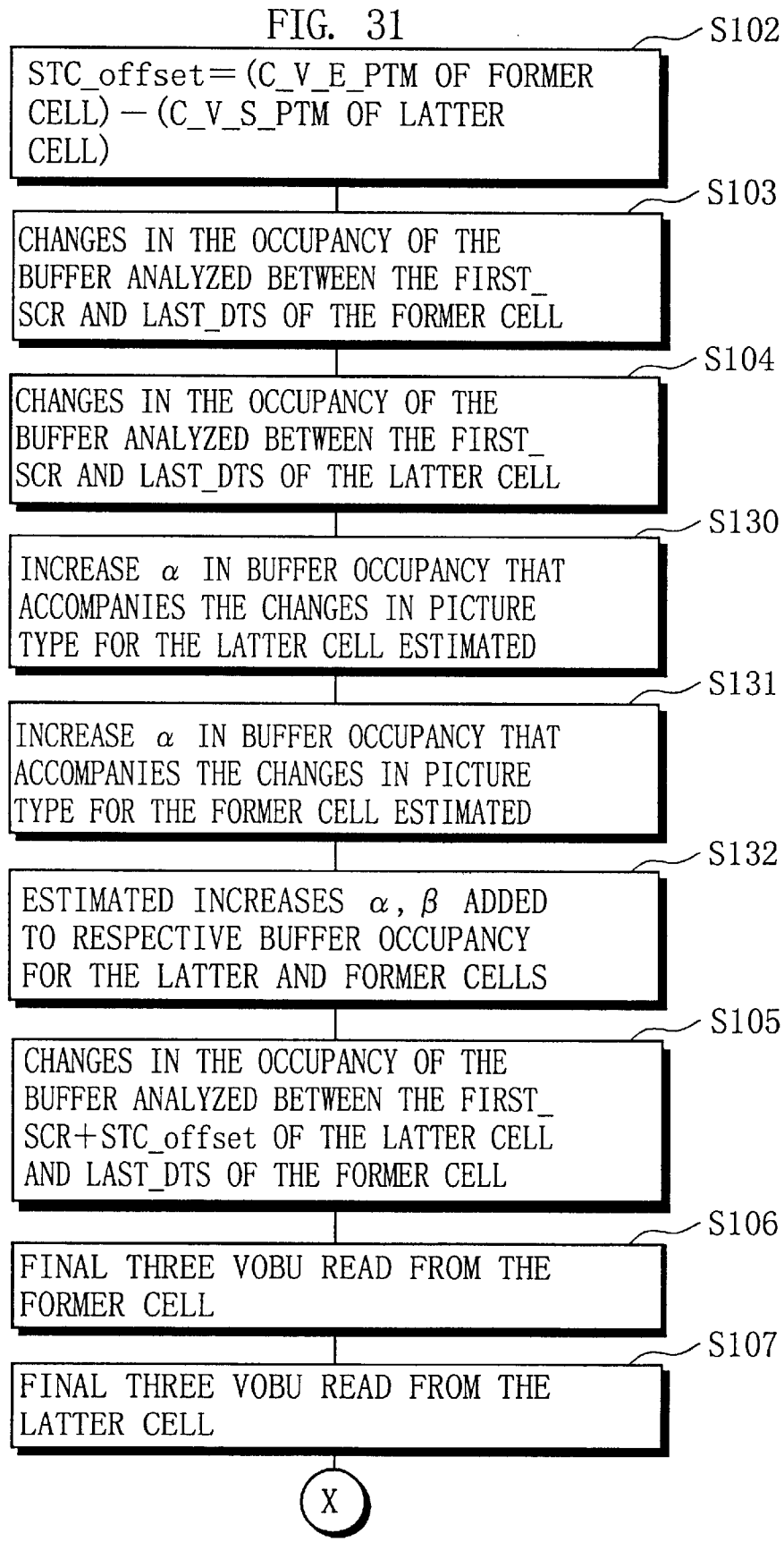

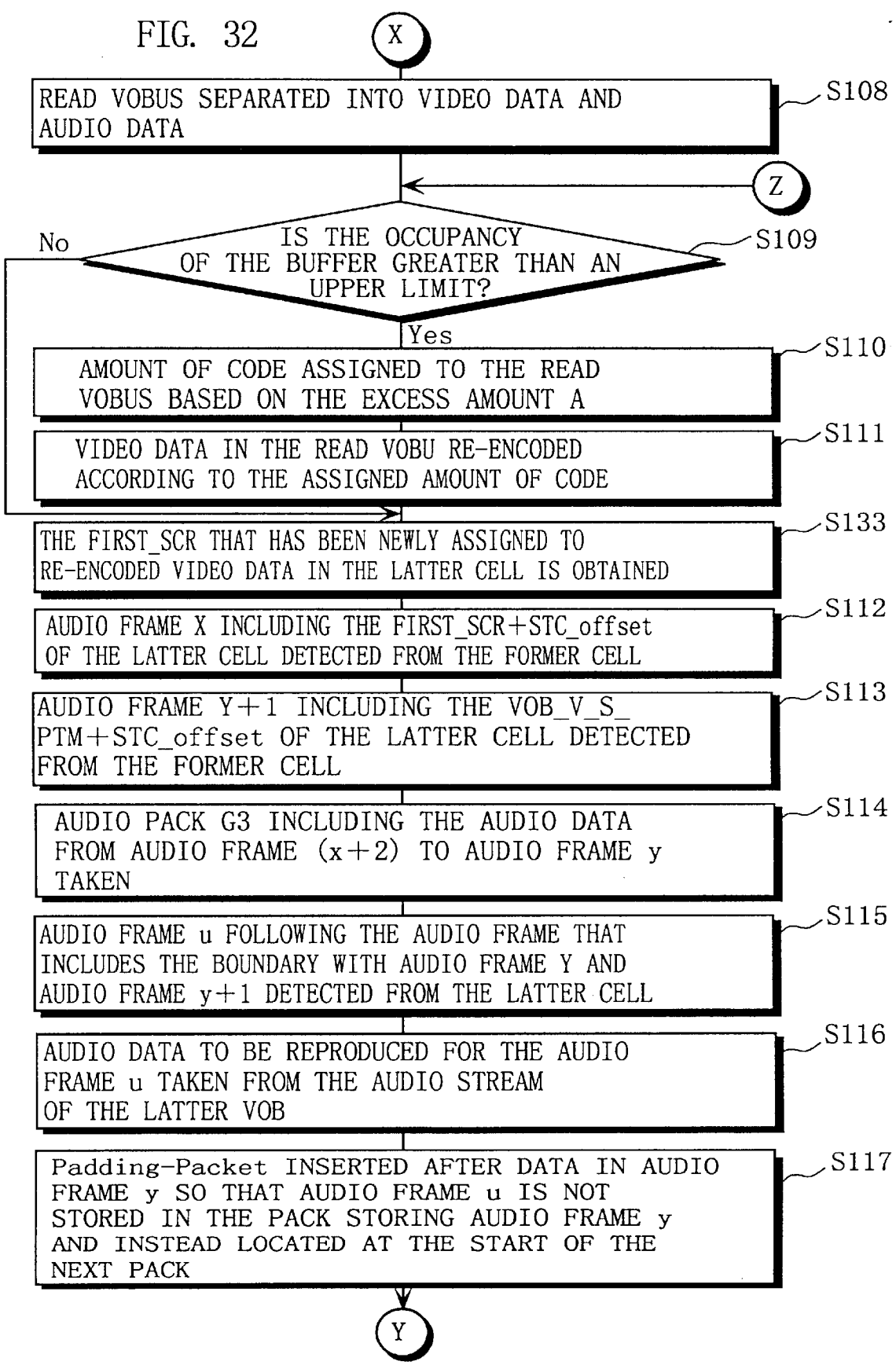

FIG. 38A  FILE ENTRY

| BP | LENGTH | FIELD NAME | CONTENT |
|---|---|---|---|
| 0 | 16 | DESCRIPTOR TAG | tag |
| 16 | 20 | ICB TAG | icbtag |
| ... | ... | ... | ... |
| 172 | 4 | ALLOCATION DESCRIPTOR LENGTH | Unit32 |
| 176 | L-EA | EXPANDED ATTRIBUTES | BYTE |
| a | L-AD | ALLOCATION DESCRIPTOR | BYTE |

ALLOCATION DESCRIPTOR LENGTH=L-AD, EXPANDED ATTRIBUTE LENGTH=L-EA, a=L-EA+176

ALLOCATION DESCRIPTOR FIELD OF FILE ENTRY

| RBP | LENGTH | CONTENT |
|---|---|---|
| 0 | 8 | ALLOCATION DESCRIPTOR : EXTENT A |
| 16 | 8 | ALLOCATION DESCRIPTOR : EXTENT B |
| 24 | 8 | ALLOCATION DESCRIPTOR : EXTENT C |
| 32 | 8 | ALLOCATION DESCRIPTOR : EXTENT D |

FIG. 38B  allocation descriptor

| RBP | LENGTH | FIELD NAME | CONTENT |
|---|---|---|---|
| 0 | 4 | EXTENT LENGTH | Unit32 |
| 4 | 4 | STORAGE POSITION OF EXTENT | Unit32 |

FIG. 38C  MEANINGS OF TOP TWO BITS OF DATA INDICATING EXTENT LENGTH OF ALLOCATION DESCRIPTOR

| VALUE | MEANING |
|---|---|
| 0 | EXTENT ALREADY ASSIGNED AND STORED |
| 1 | EXTENT ALREADY ASSIGNED AND YET TO BE STORED |
| 2 | SPARE |
| 3 | EXTENT FOLLOWING THE ALLOCATION DESCRIPTOR |

FILE IDENTIFICATION DESCRIPTOR FOR DIRECTORY

FILE IDENTIFICATION DESCRIPTOR FOR FILE

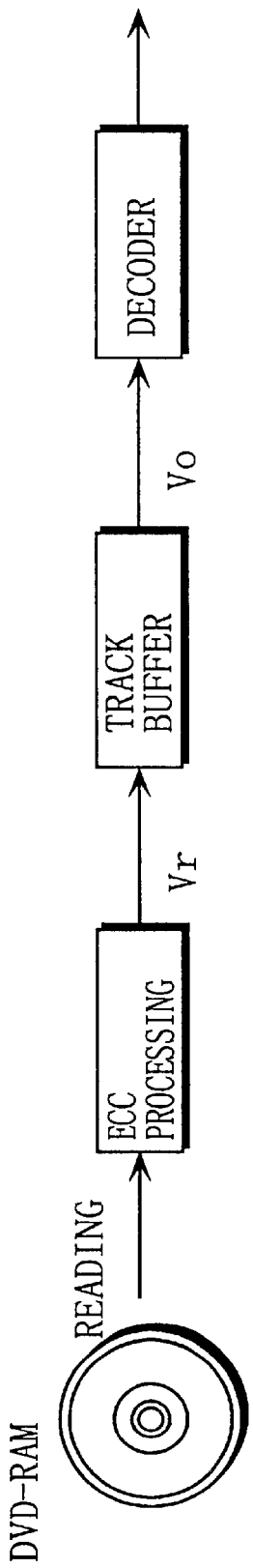
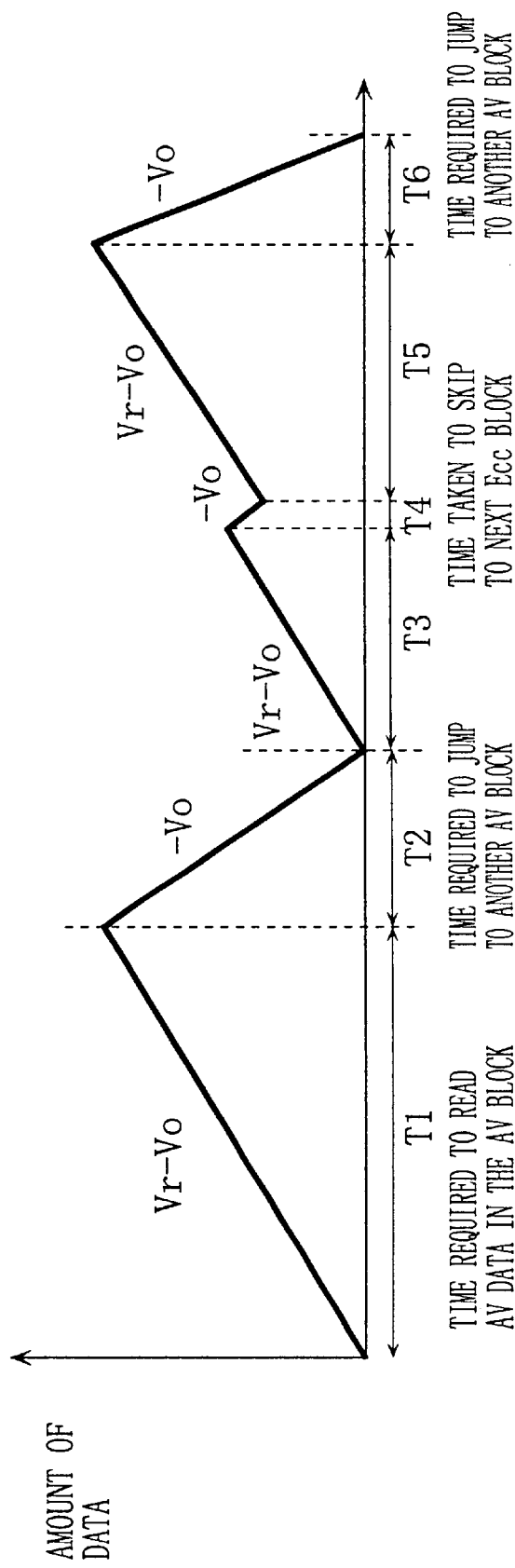
FIG. 40

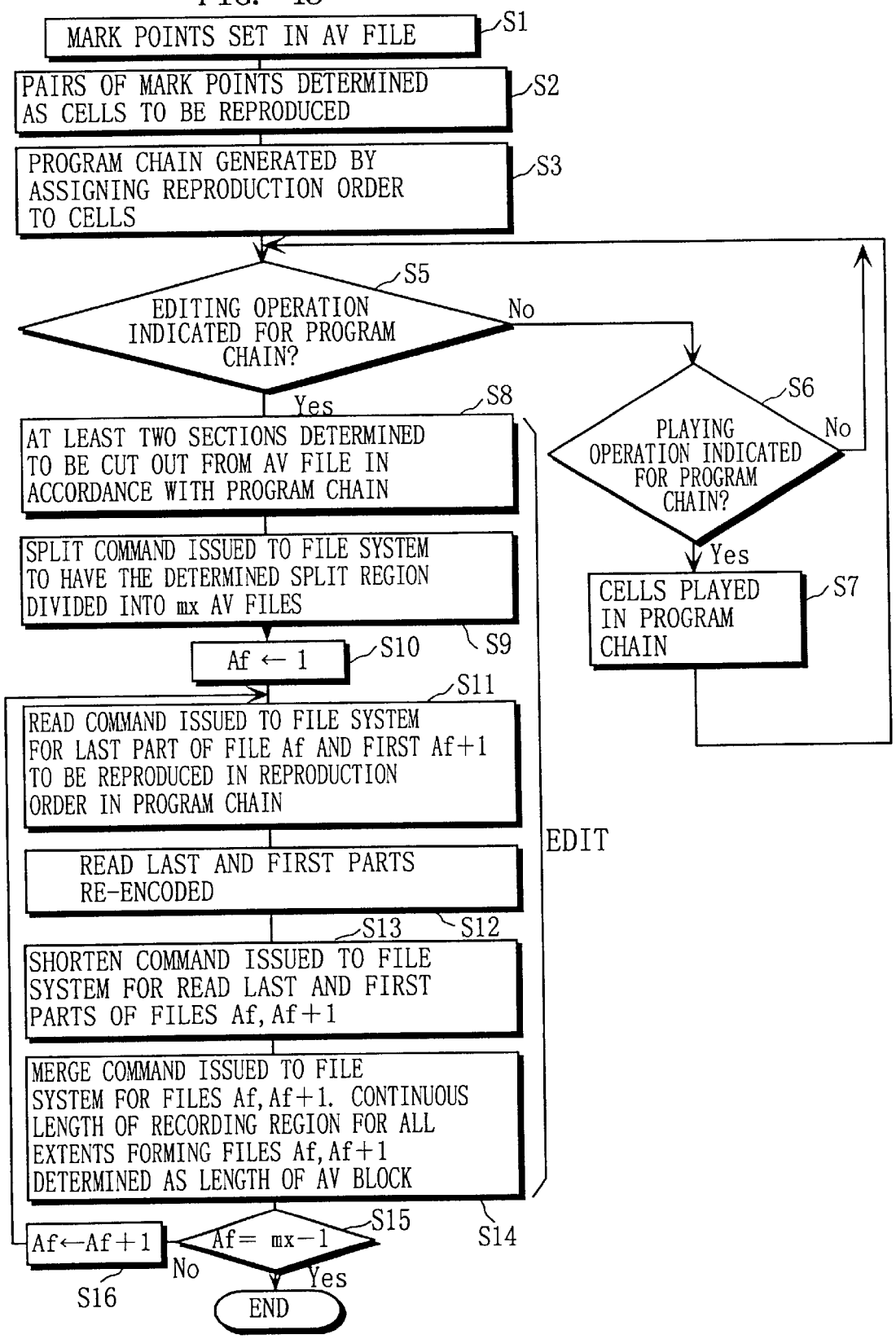

FIG. 44A
STORED AV FILE
FIG. 44B
REPRODUCTION TIME SETTING MARK POINTS
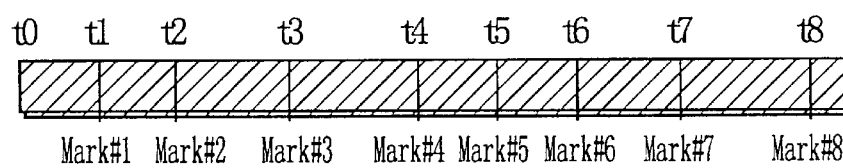
FIG. 44C
SETTING CELLS
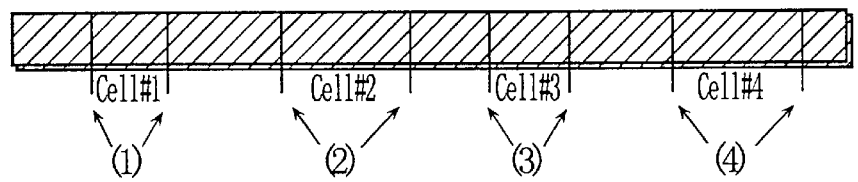
FIG. 44D
SETTING PROGRAM CHAIN
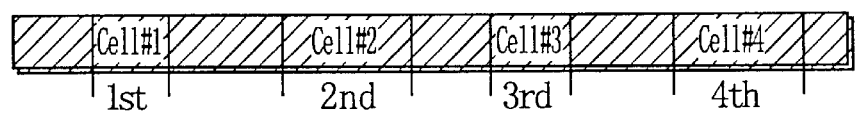
FIG. 44E
REPRODUCTION IN PROGRAM CHAIN
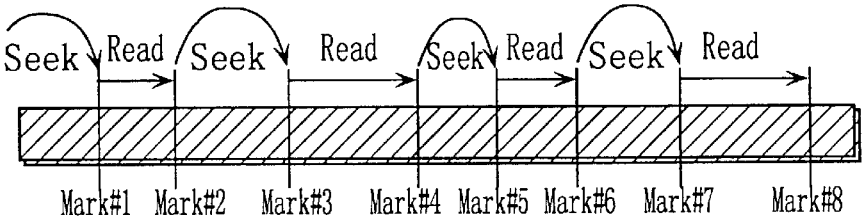
FIG. 44F
IMAGE CONTENT FOR EACH REPRODUCTION TIME
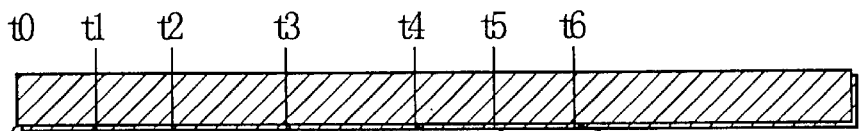
V1
V2
V3
V4

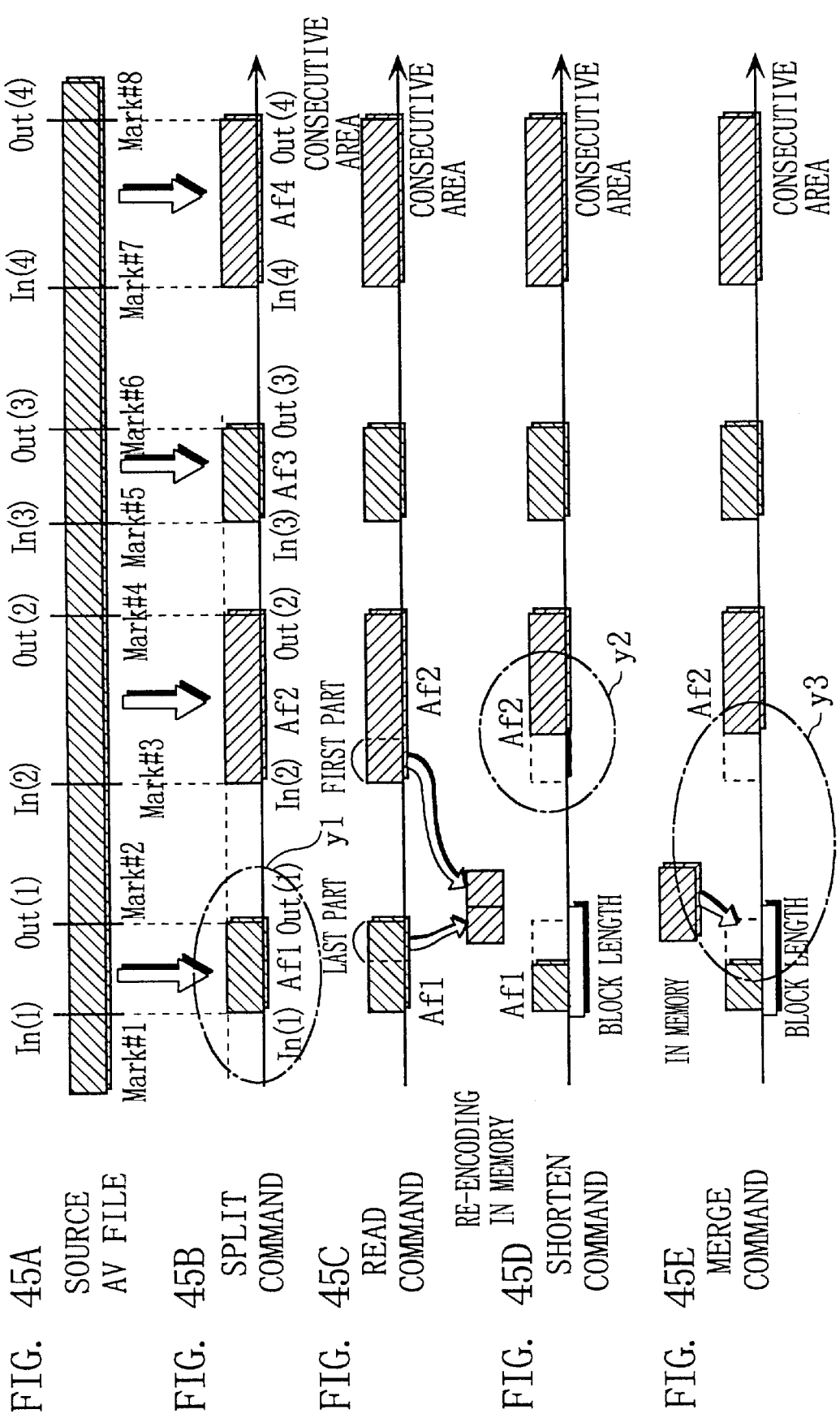

FIG. 46A MERGE RESULT
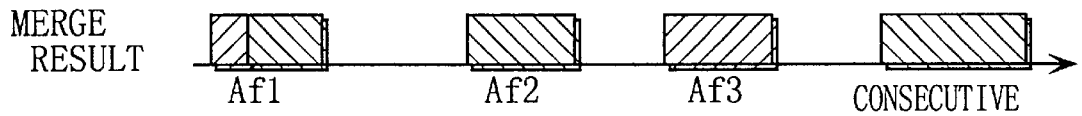
FIG. 46B READ COMMAND
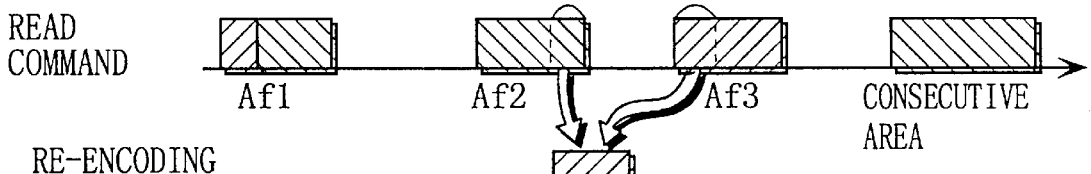
RE-ENCODING IN MEMORY
FIG. 46C SHORTEN
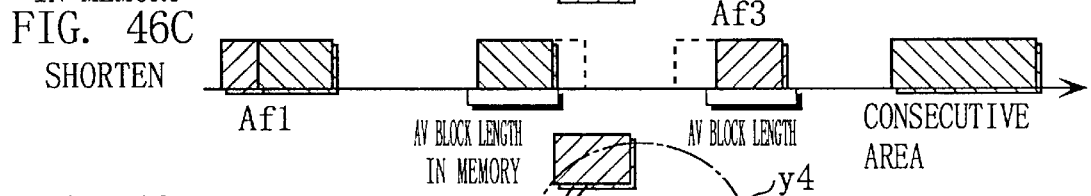
FIG. 46D MERGE
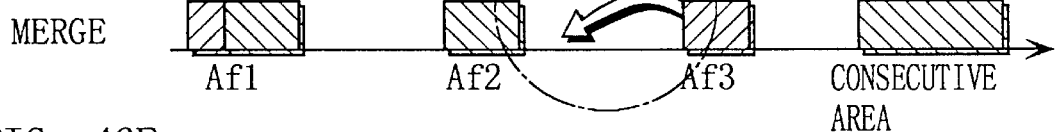
FIG. 46E MERGE
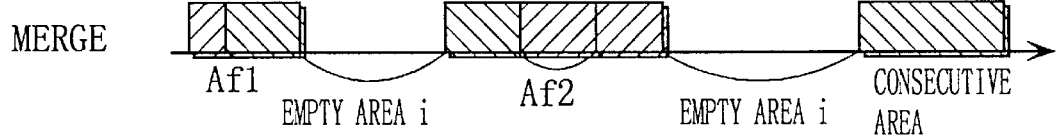
FIG. 46F MERGE
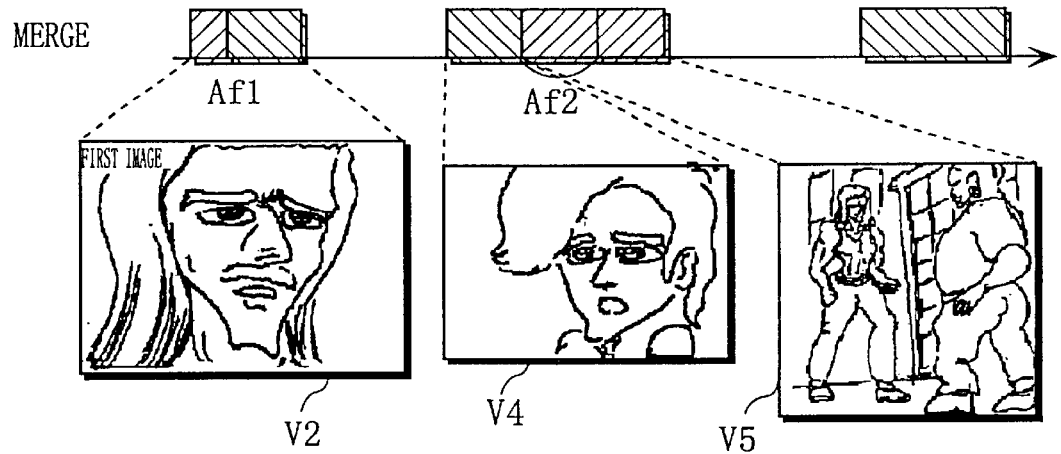

IMAGE ON THE DISC

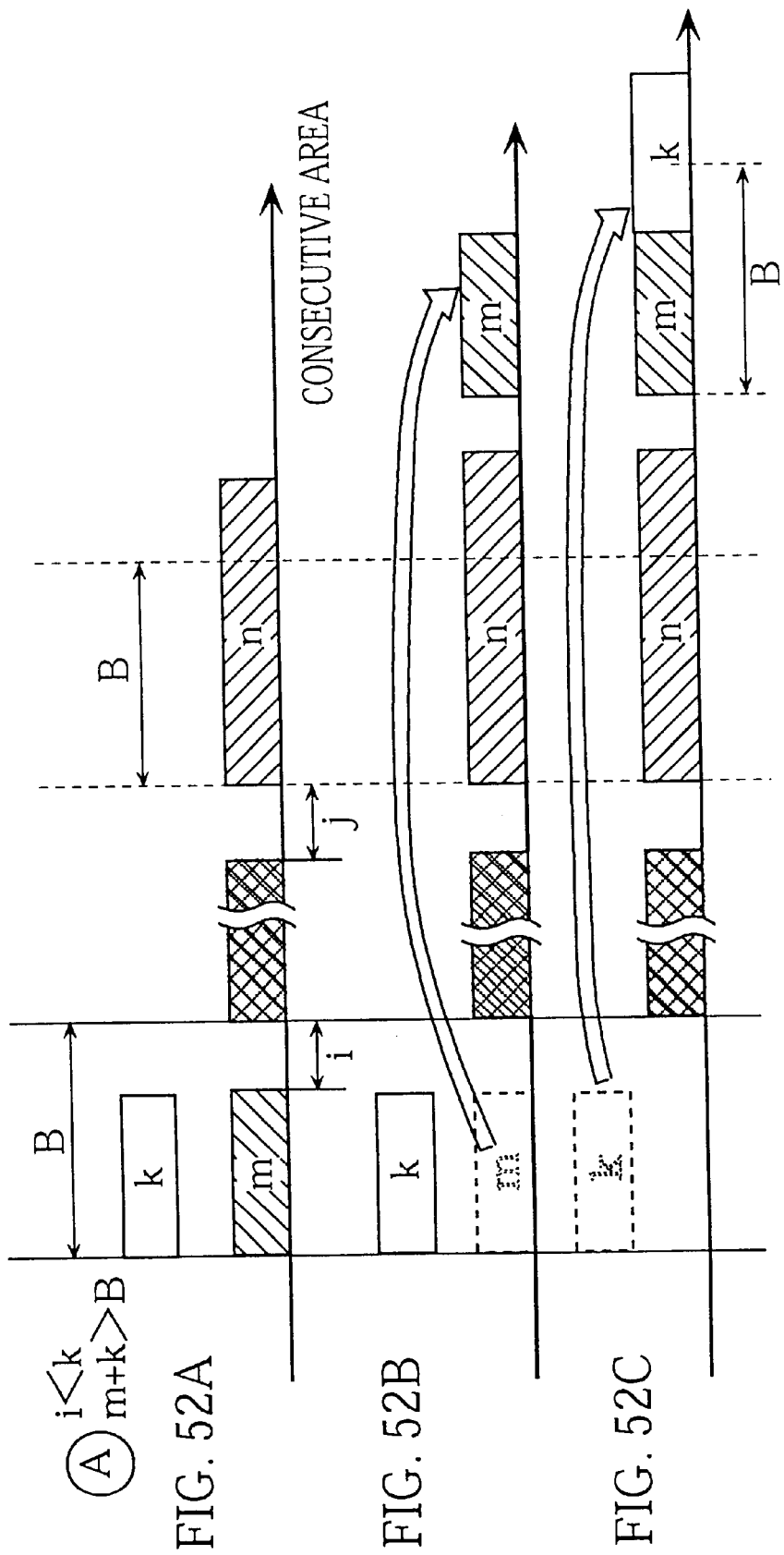

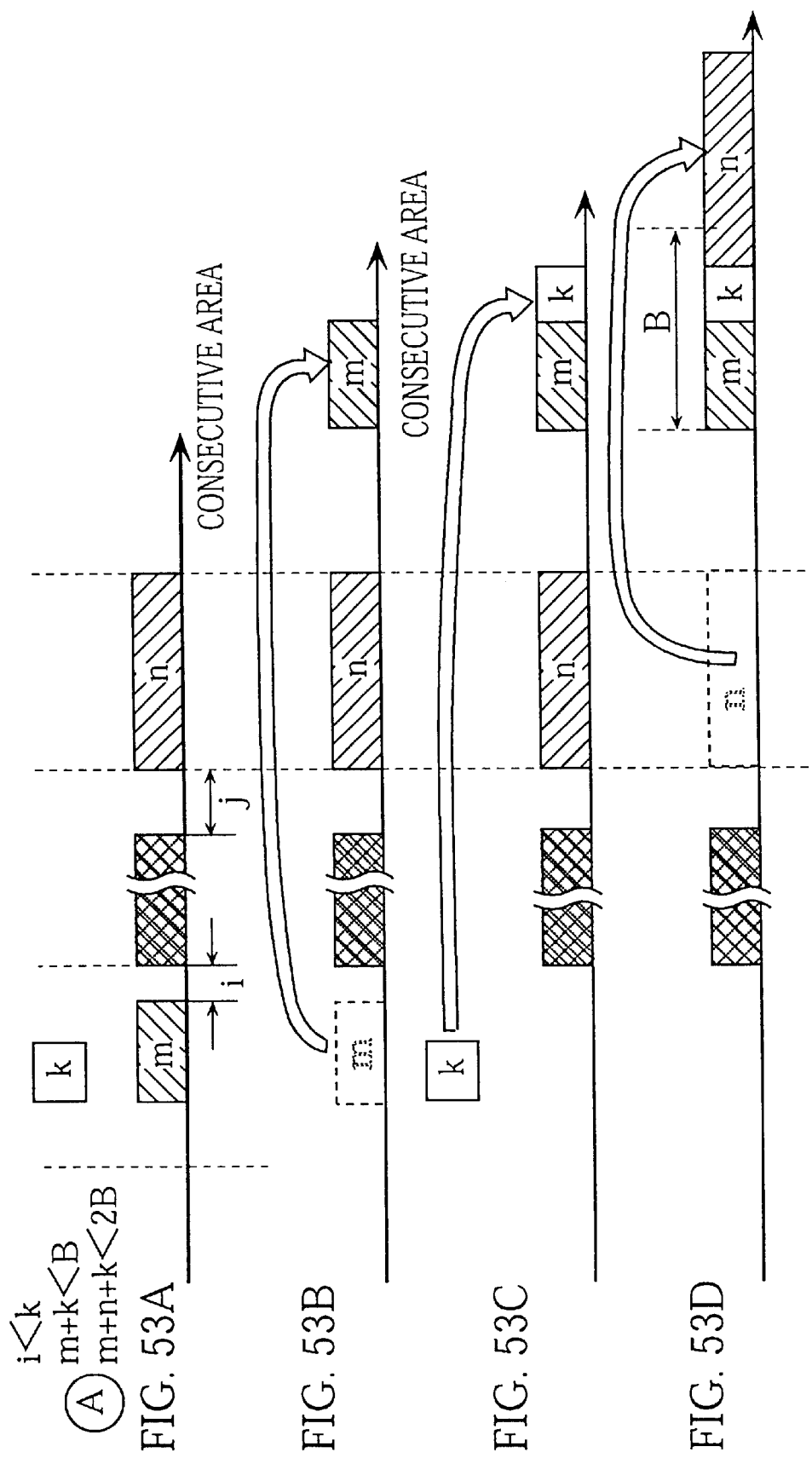

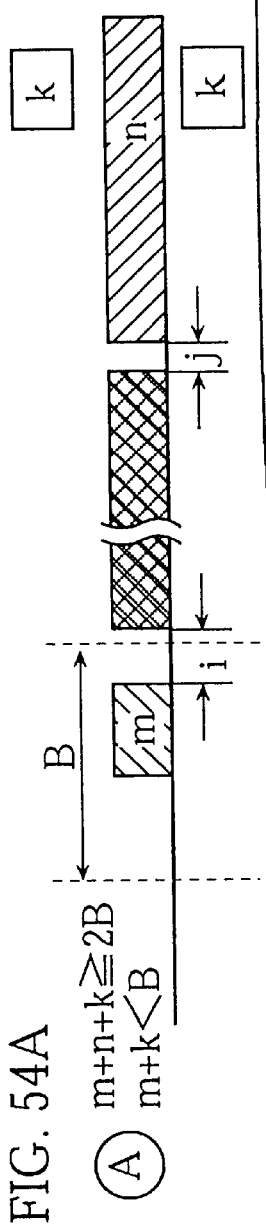
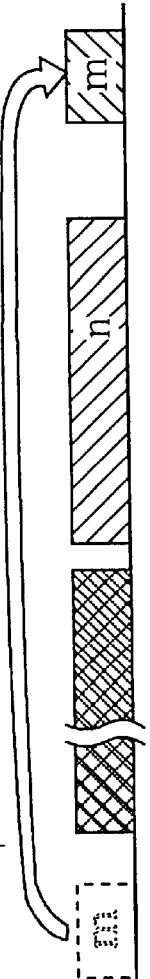
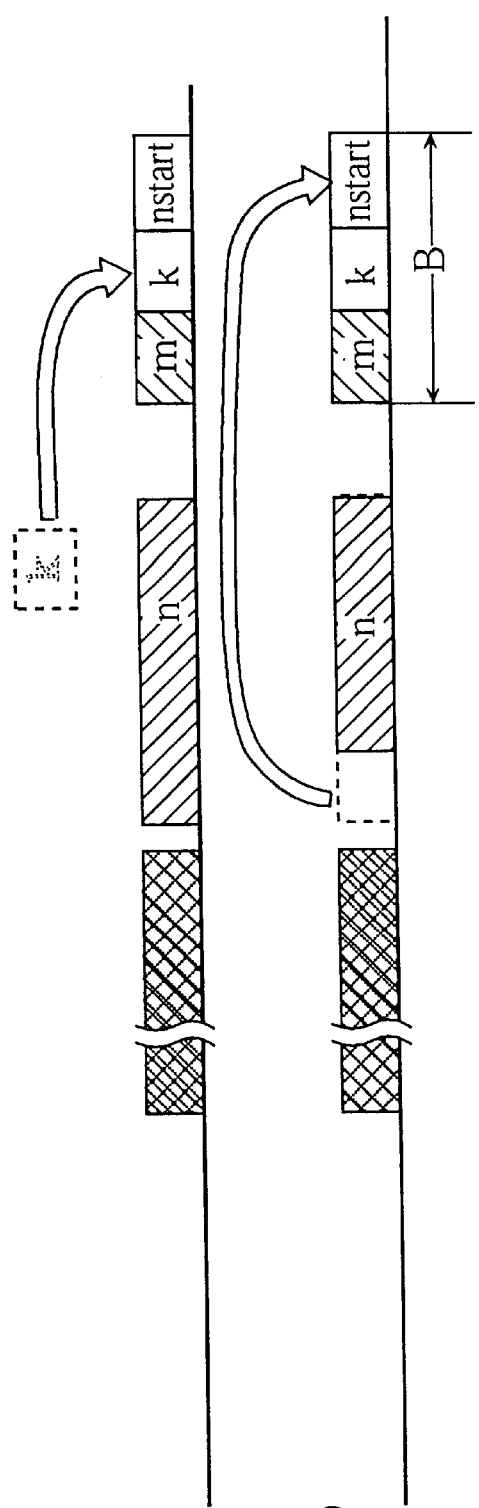
FIG. 54A Ⓐ m+n+k≧2B
       m+k<B
FIG. 54B
FIG. 54C
FIG. 54D

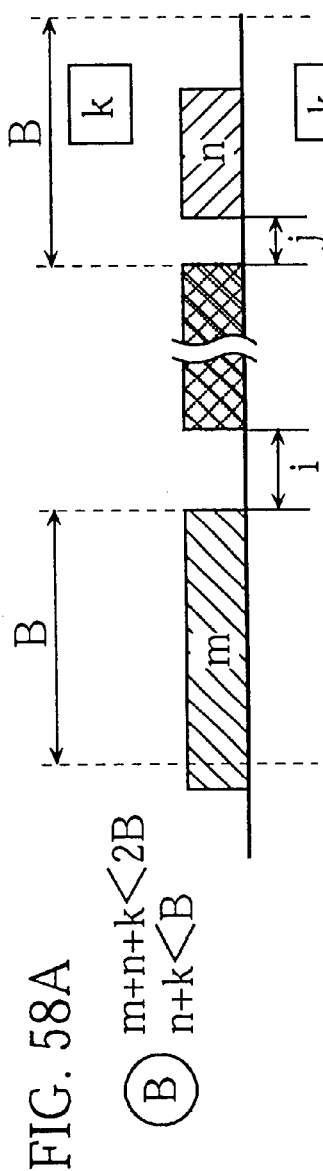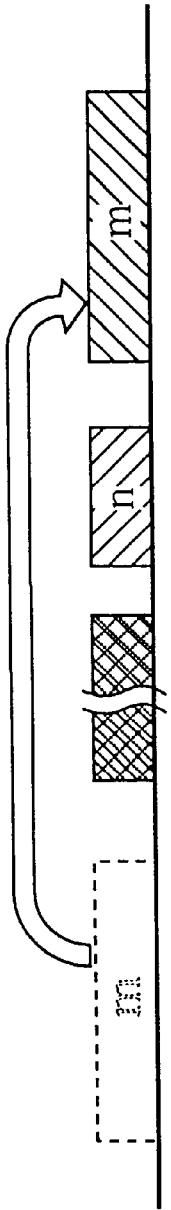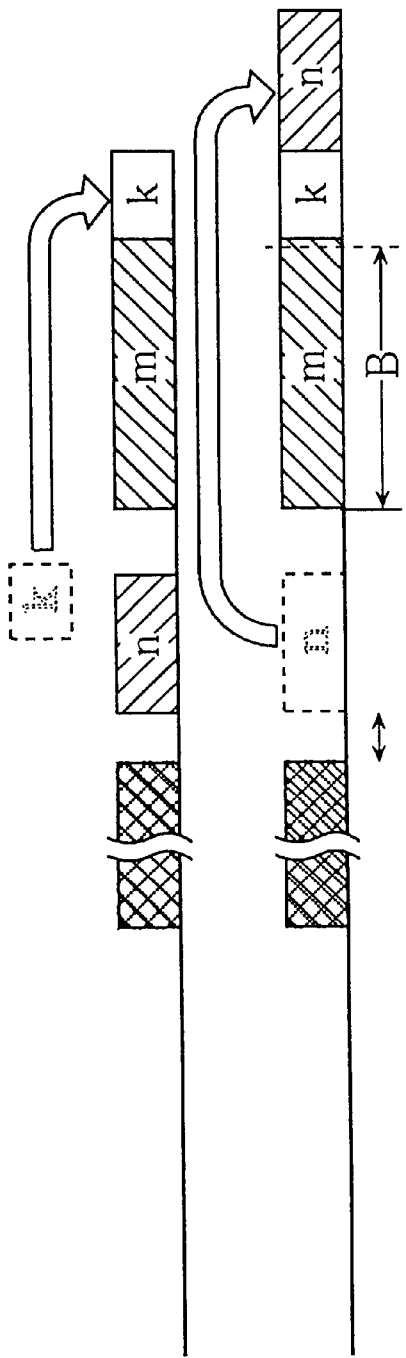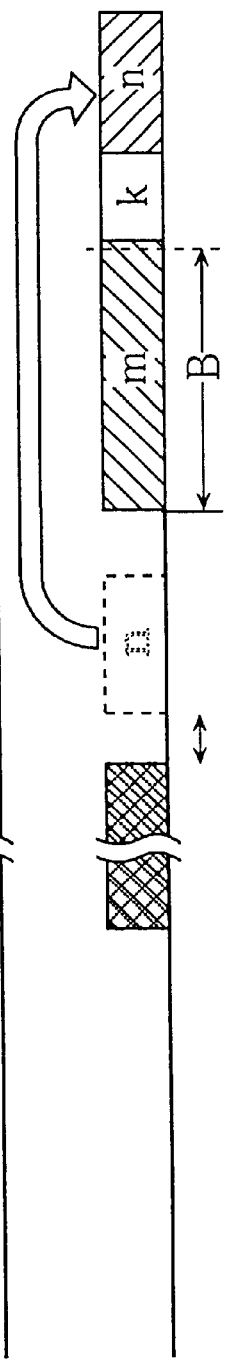
FIG. 58A  $m+n+k < 2B$  $n+k < B$
FIG. 58B
FIG. 58C
FIG. 58D

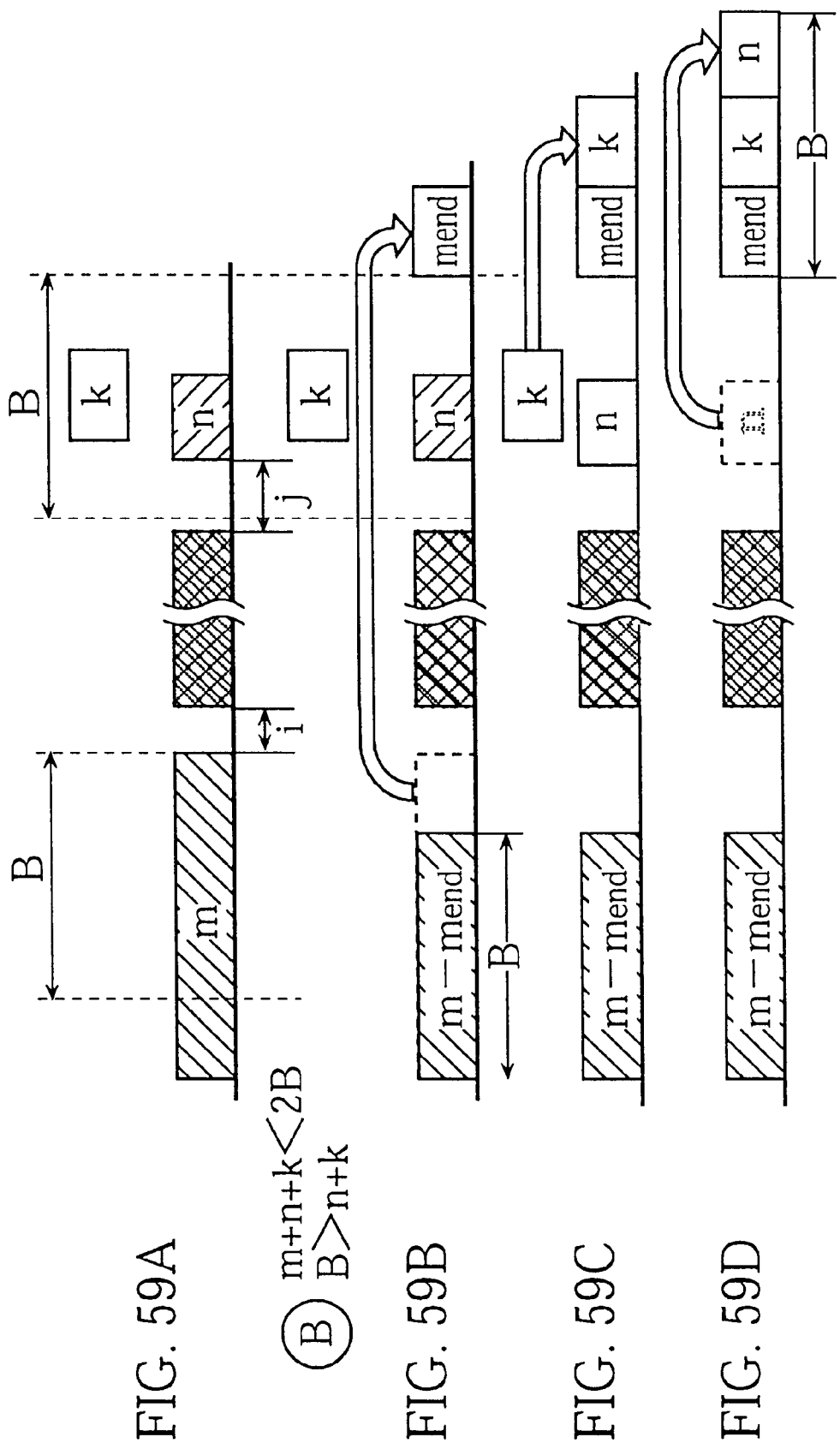

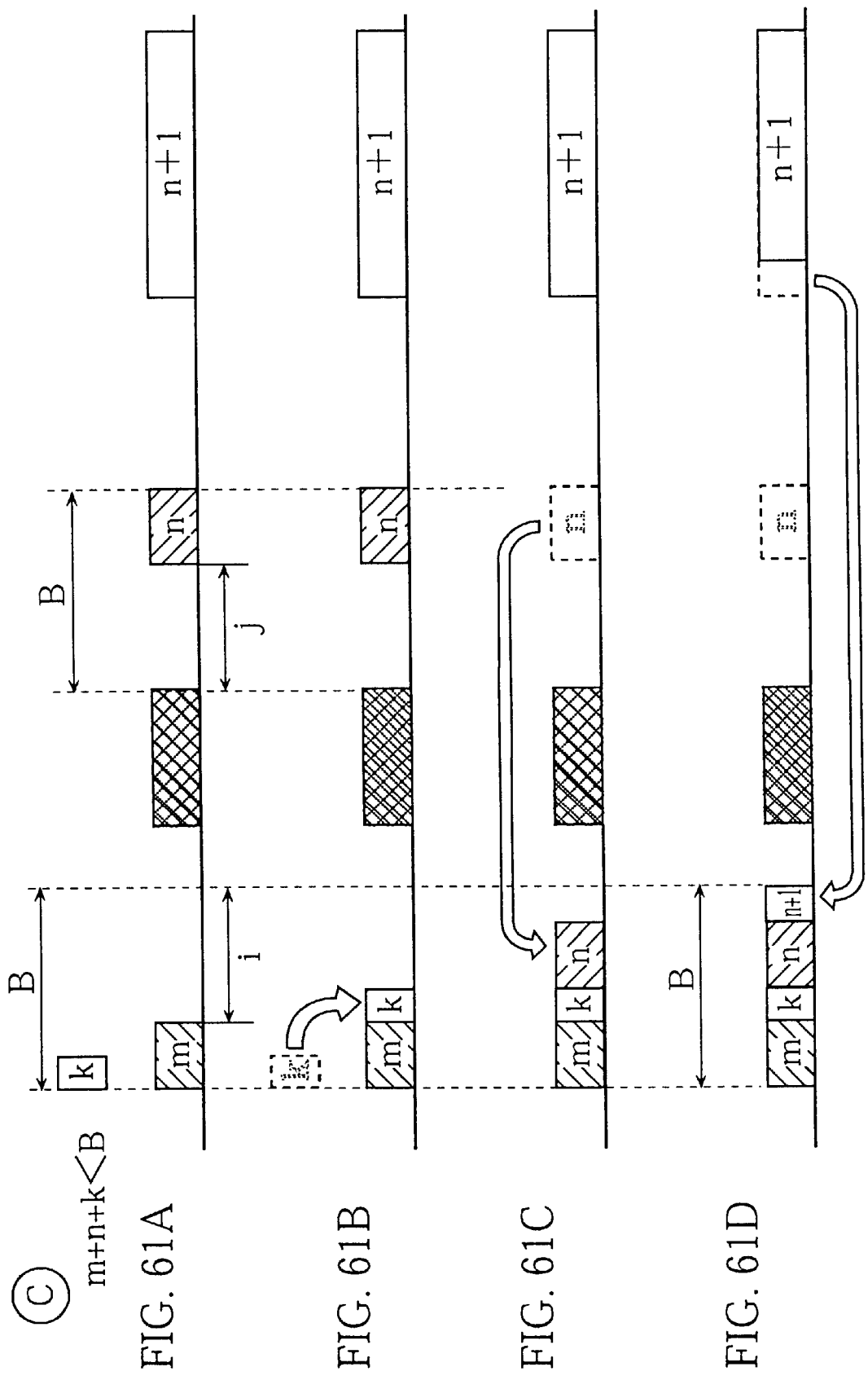

©
$i \geqq n+k$
$m+n+k \geqq B$

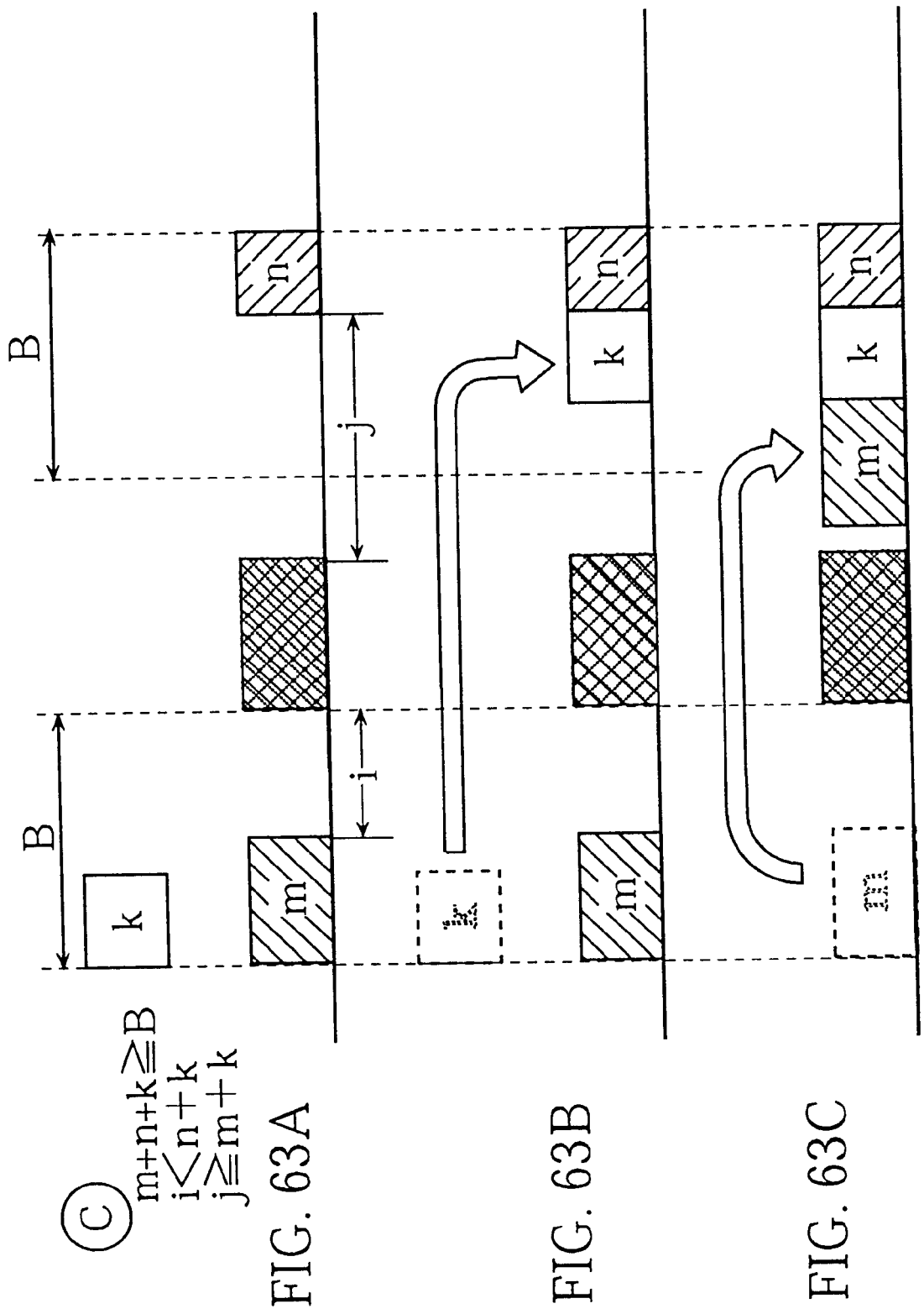

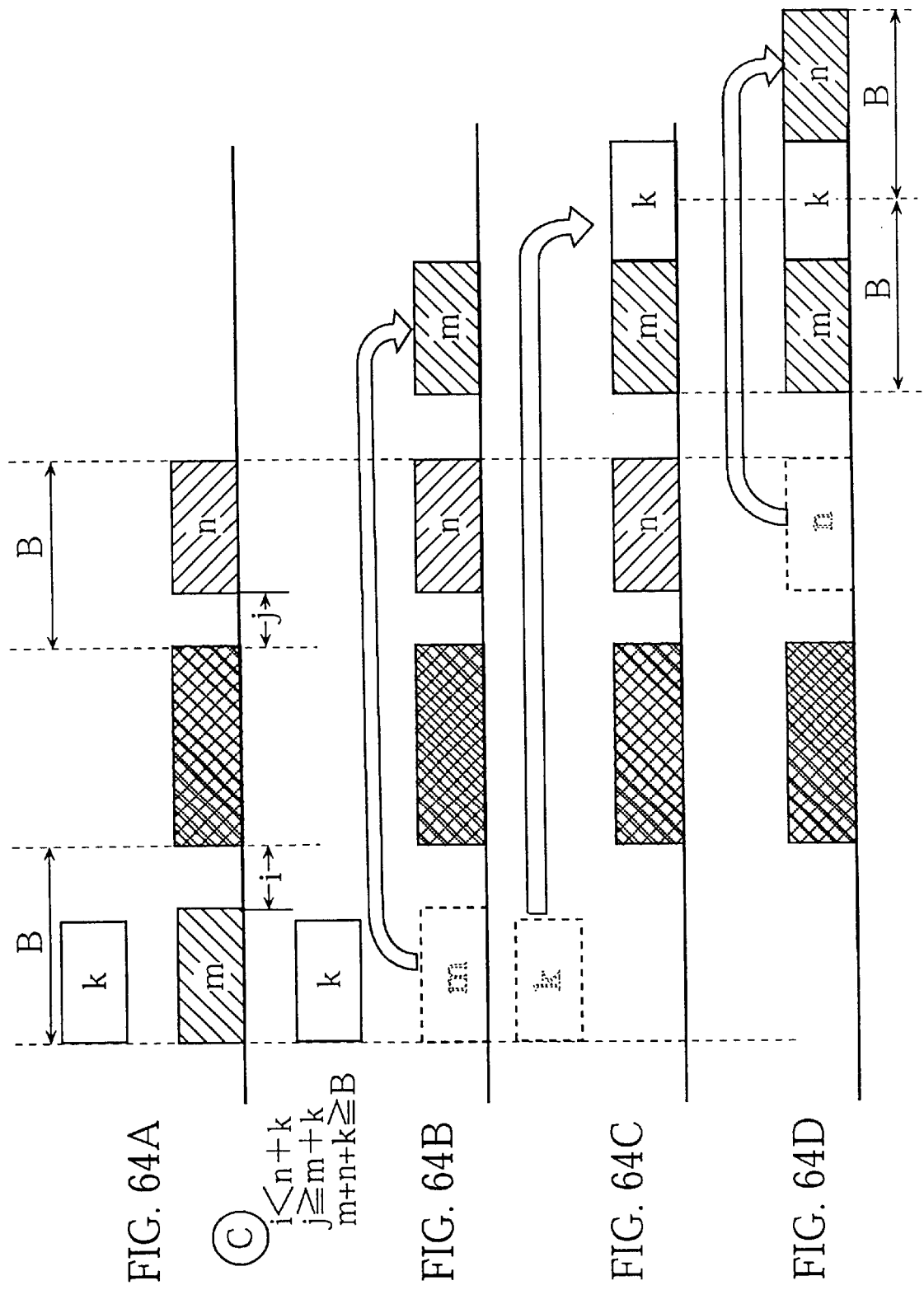

$m+k \geq 2B$ $n+k \geq 2B$ $n+k < 2B$
$m > n$ $n+k < 2B$
$m \leq n$

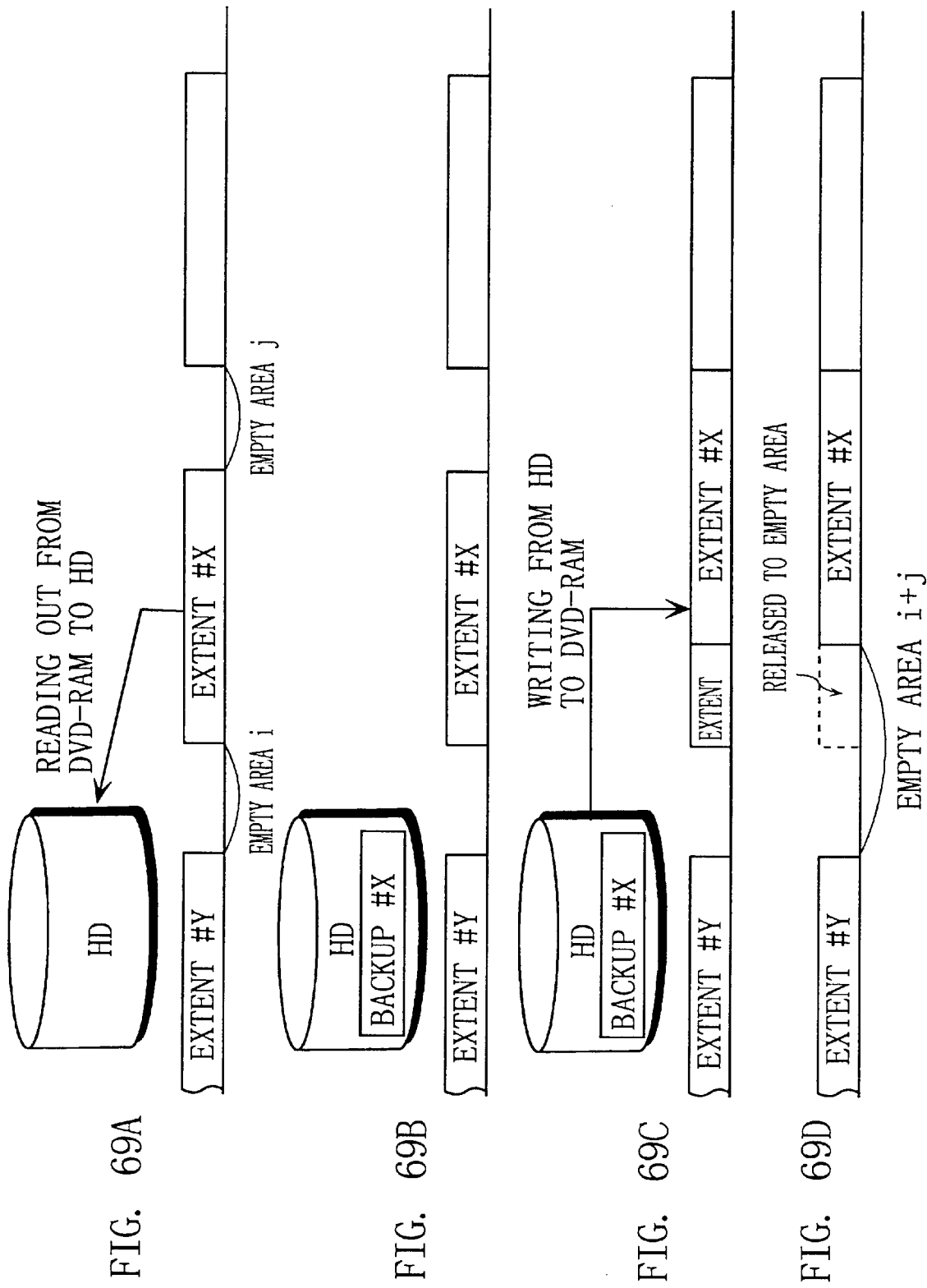

FIG. 70A

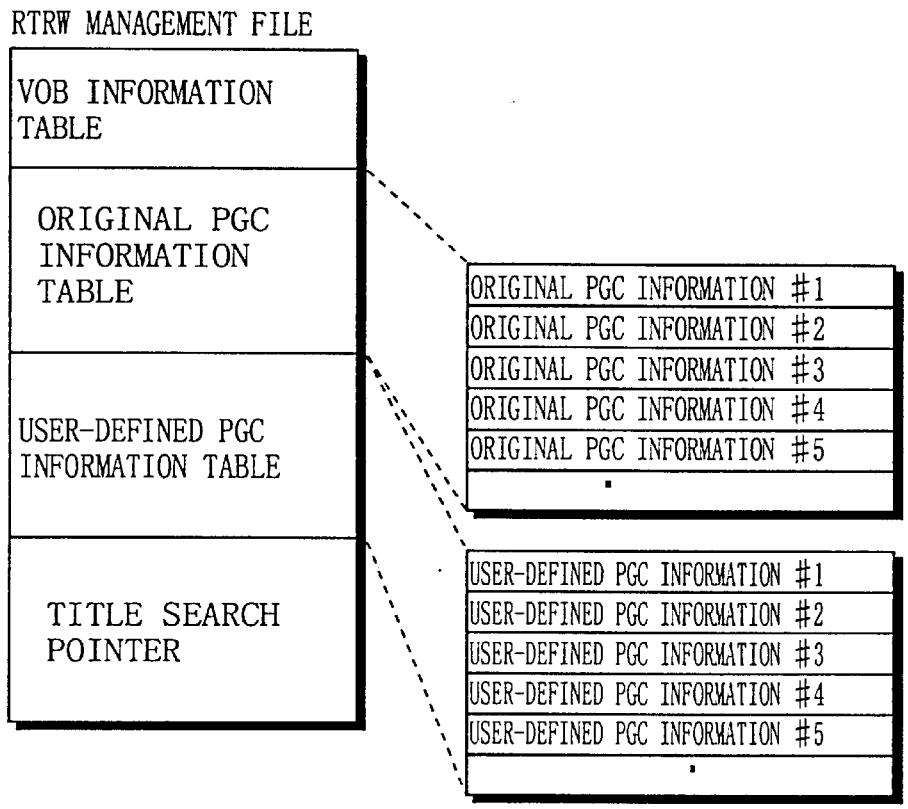

FIG. 70B
ORIGINAL PGC INFORMATION

| CELL#1 | AVF_ID | VOB_ID | C_V_S_PTM | C_V_E_PTM |
|---|---|---|---|---|
| CELL#2 | AVF_ID | VOB_ID | C_V_S_PTM | C_V_E_PTM |
| CELL#3 | AVF_ID | VOB_ID | C_V_S_PTM | C_V_E_PTM |
| CELL#4 | AVF_ID | VOB_ID | C_V_S_PTM | C_V_E_PTM |
| CELL#5 | AVF_ID | VOB_ID | C_V_S_PTM | C_V_E_PTM |
| . | | | | |

FIG. 70C
USER-DEFINED PGC INFORMATION

| CELL#1 | AVF_ID | VOB_ID | C_V_S_PTM | C_V_E_PTM |
|---|---|---|---|---|
| CELL#2 | AVF_ID | VOB_ID | C_V_S_PTM | C_V_E_PTM |
| CELL#3 | AVF_ID | VOB_ID | C_V_S_PTM | C_V_E_PTM |
| CELL#4 | AVF_ID | VOB_ID | C_V_S_PTM | C_V_E_PTM |
| CELL#5 | AVF_ID | VOB_ID | C_V_S_PTM | C_V_E_PTM |
| . | | | | |

FIG. 70D
TITLE SEARCH POINTER

| PGC #1 | TITLE TYPE | TITLE RECORDING HISTORY |
|---|---|---|
| PGC #2 | TITLE TYPE | TITLE RECORDING HISTORY |
| PGC #3 | TITLE TYPE | TITLE RECORDING HISTORY |
| PGC #4 | TITLE TYPE | TITLE RECORDING HISTORY |
| PGC #5 | TITLE TYPE | TITLE RECORDING HISTORY |
| . | | |

FIG. 76

INITIALSTATE

| | | | | | |
|---|---|---|---|---|---|
| CELL #1 | AVF_ID=1 | VOB_ID=1 | C_V_S_PTM=t0 | C_V_E_PTM=t1 | Original PGC INFORMATION #1 |
| CELL #2 | AVF_ID=1 | VOB_ID=1 | C_V_S_PTM=t1 | C_V_E_PTM=t2 | |
| CELL #3 | AVF_ID=1 | VOB_ID=1 | C_V_S_PTM=t2 | C_V_E_PTM=t3 | |
| CELL #4 | AVF_ID=1 | VOB_ID=1 | C_V_S_PTM=t3 | C_V_E_PTM=t4 | |
| CELL #5 | AVF_ID=1 | VOB_ID=2 | C_V_S_PTM=t0' | C_V_E_PTM=t1' | Original PGC INFORMATION #2 |
| CELL #6 | AVF_ID=1 | VOB_ID=2 | C_V_S_PTM=t1' | C_V_E_PTM=t2' | |
| CELL #7 | AVF_ID=1 | VOB_ID=2 | C_V_S_PTM=t2' | C_V_E_PTM=t3' | |
| CELL #8 | AVF_ID=1 | VOB_ID=2 | C_V_S_PTM=t3' | C_V_E_PTM=t4' | |
| CELL #9 | AVF_ID=2 | VOB_ID=3 | C_V_S_PTM=t0" | C_V_E_PTM=t1" | Original PGC INFORMATION #3 |
| CELL #10 | AVF_ID=2 | VOB_ID=3 | C_V_S_PTM=t1" | C_V_E_PTM=t2" | |
| CELL #11 | AVF_ID=2 | VOB_ID=3 | C_V_S_PTM=t2" | C_V_E_PTM=t3" | |
| CELL #12 | AVF_ID=2 | VOB_ID=3 | C_V_S_PTM=t3" | C_V_E_PTM=t4" | |

} ORIGINAL PGC INFORMATION TABLE

*NULL*  } USER DEFINED PGC INFORMATION TABLE

| | TITLE TYPE | PGC NUMBER | TITLE RECORD HISTORY | |
|---|---|---|---|---|
| POINTER #1 | Original | #1 | 1998_5_23 | 20:30:00 |
| POINTER #2 | Original | #2 | 1998_6_17 | 18:10:30 |
| POINTER #3 | Original | #3 | 1998_6_21 | 17:30:00 |

} TITLE SEARCH POINTER

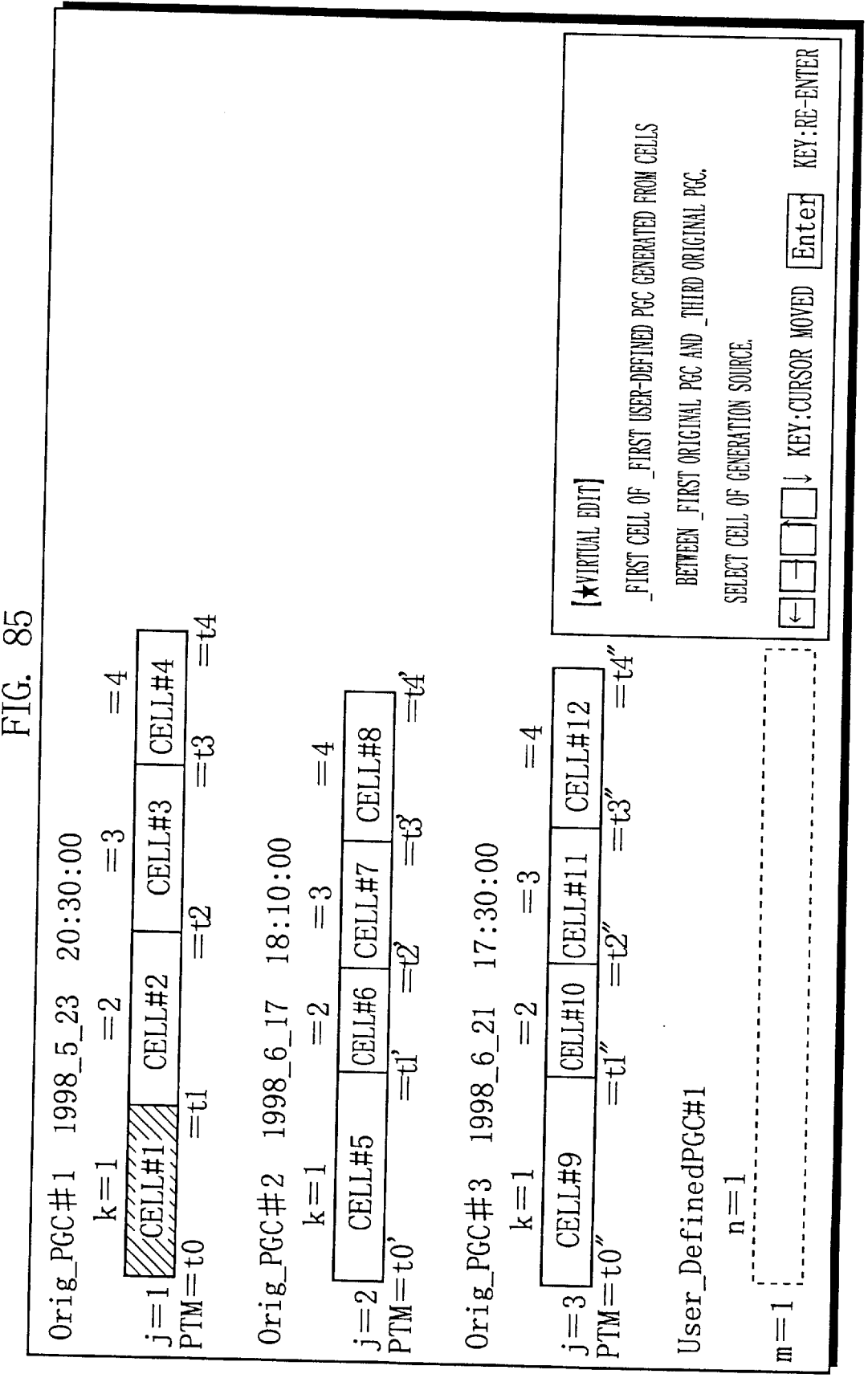

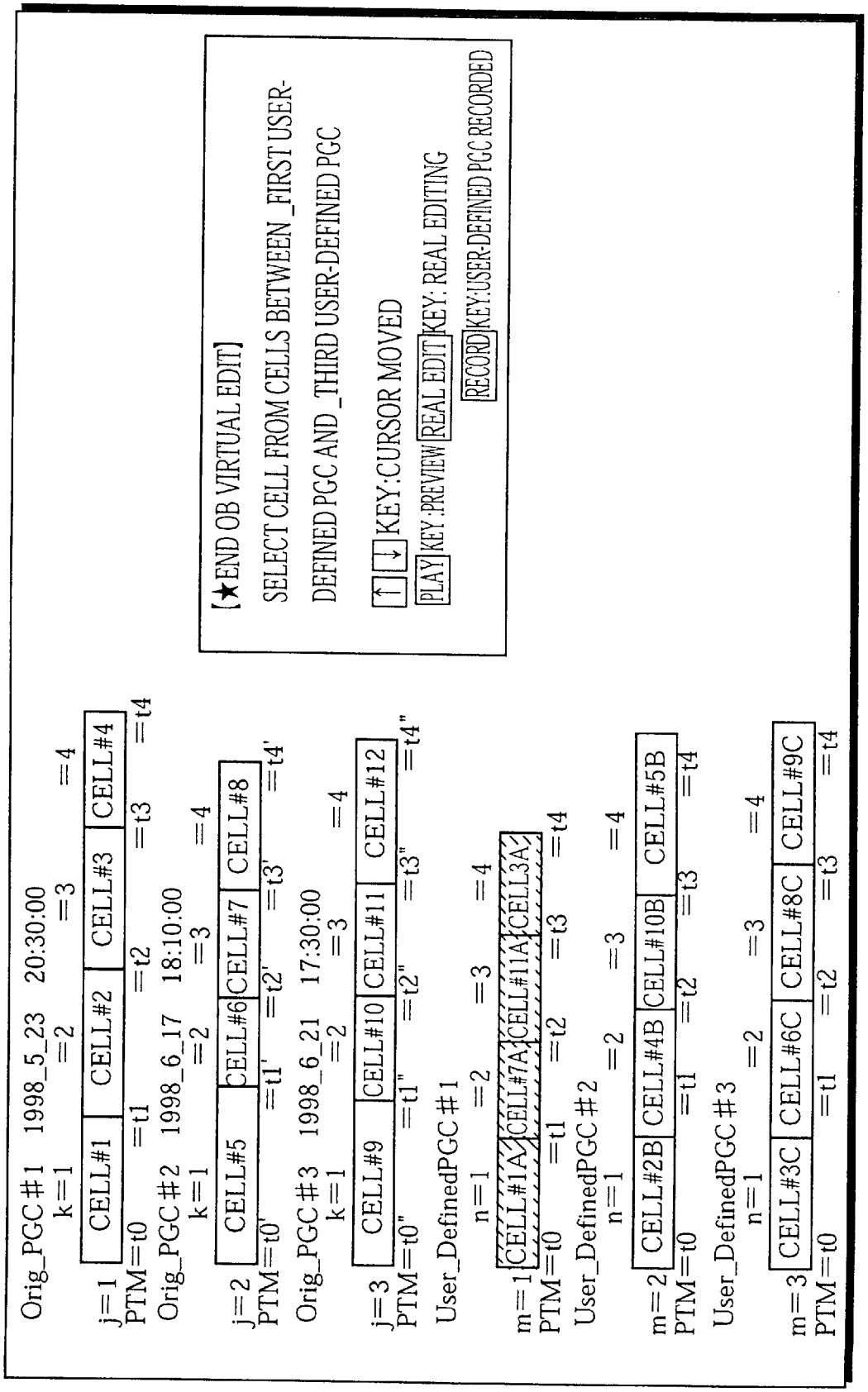

FIG. 91

MID-STATE(END OF VIRTUAL EDIT)

| | | | | | |
|---|---|---|---|---|---|
| CELL#1 | AVF_ID=1 | VOB_ID=1 | C_V_S_PTM=t0 | C_V_E_PTM=t1 | Original PGC INFORMATION #1 |
| CELL#2 | AVF_ID=1 | VOB_ID=1 | C_V_S_PTM=t1 | C_V_E_PTM=t2 | |
| CELL#3 | AVF_ID=1 | VOB_ID=1 | C_V_S_PTM=t2 | C_V_E_PTM=t3 | |
| CELL#4 | AVF_ID=1 | VOB_ID=1 | C_V_S_PTM=t3 | C_V_E_PTM=t4 | |
| CELL#5 | AVF_ID=1 | VOB_ID=2 | C_V_S_PTM=t0' | C_V_E_PTM=t1' | Original PGC INFORMATION #2 |
| CELL#6 | AVF_ID=1 | VOB_ID=2 | C_V_S_PTM=t1' | C_V_E_PTM=t2' | |
| CELL#7 | AVF_ID=1 | VOB_ID=2 | C_V_S_PTM=t2' | C_V_E_PTM=t3' | |
| CELL#8 | AVF_ID=1 | VOB_ID=2 | C_V_S_PTM=t3' | C_V_E_PTM=t4' | |
| CELL#9 | AVF_ID=2 | VOB_ID=3 | C_V_S_PTM=t0'' | C_V_E_PTM=t1'' | Original PGC INFORMATION #3 |
| CELL#10 | AVF_ID=2 | VOB_ID=3 | C_V_S_PTM=t1'' | C_V_E_PTM=t2'' | |
| CELL#11 | AVF_ID=2 | VOB_ID=3 | C_V_S_PTM=t2'' | C_V_E_PTM=t3'' | |
| CELL#12 | AVF_ID=2 | VOB_ID=3 | C_V_S_PTM=t3'' | C_V_E_PTM=t4'' | |
| CELL#1A | AVF_ID=1 | VOB_ID=1 | C_V_S_PTM=t0 | C_V_E_PTM=t1 | USER_DEF PGC INFORMATION #1 |
| CELL#7A | AVF_ID=1 | VOB_ID=2 | C_V_S_PTM=t2' | C_V_E_PTM=t3' | |
| CELL#11A | AVF_ID=2 | VOB_ID=3 | C_V_S_PTM=t2'' | C_V_E_PTM=t3'' | |
| CELL#3A | AVF_ID=1 | VOB_ID=1 | C_V_S_PTM=t2 | C_V_E_PTM=t3 | |
| CELL#2B | AVF_ID=1 | VOB_ID=1 | C_V_S_PTM=t1 | C_V_E_PTM=t2 | USER_DEF PGC INFORMATION #2 |
| CELL#4B | AVF_ID=1 | VOB_ID=1 | C_V_S_PTM=t3 | C_V_E_PTM=t4 | |
| CELL#10B | AVF_ID=2 | VOB_ID=3 | C_V_S_PTM=t1'' | C_V_E_PTM=t2'' | |
| CELL#5B | AVF_ID=1 | VOB_ID=2 | C_V_S_PTM=t0' | C_V_E_PTM=t1' | |
| CELL#3C | AVF_ID=1 | VOB_ID=1 | C_V_S_PTM=t2 | C_V_E_PTM=t3 | USER_DEF PGC INFORMATION #3 |
| CELL#6C | AVF_ID=1 | VOB_ID=2 | C_V_S_PTM=t1' | C_V_E_PTM=t2' | |
| CELL#8C | AVF_ID=1 | VOB_ID=2 | C_V_S_PTM=t3' | C_V_E_PTM=t4' | |
| CELL#9C | AVF_ID=2 | VOB_ID=3 | C_V_S_PTM=t0'' | C_V_E_PTM=t1'' | |

- ORIGINAL PGC INFORMATION TABLE
- USER-DEFINED PGC INFORMATION TABLE

| | TITLE TYPE | PGC NUMBER | TITLE RECORD HISTORY |
|---|---|---|---|
| POINTER#1 | Original | #1 | 1998_5_23 20:30:00 |
| POINTER#2 | Original | #2 | 1998_6_17 18:10:30 |
| POINTER#3 | Original | #3 | 1998_6_21 17:30:00 |
| POINTER#1 | USER_DEF | #1 | 1998_7_3 21:00:00 |
| POINTER#2 | USER_DEF | #2 | 1998_7_3 21:10:30 |
| POINTER#3 | USER_DEF | #3 | 1998_7_3 21:30:00 |

TITLE SEARCH POINTER

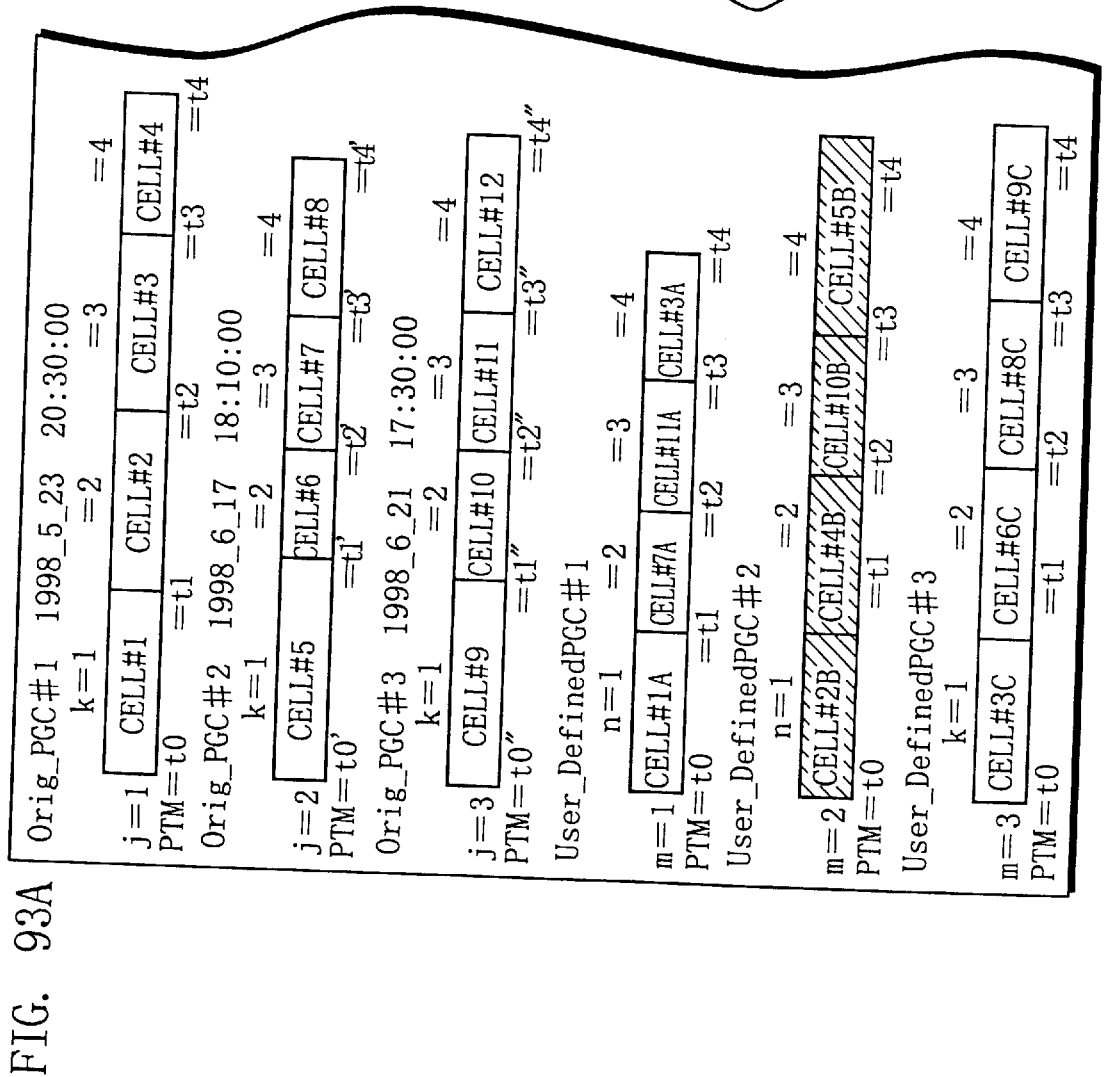

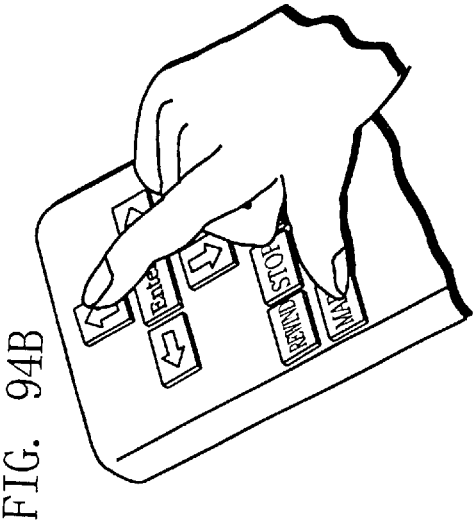
FIG. 94B
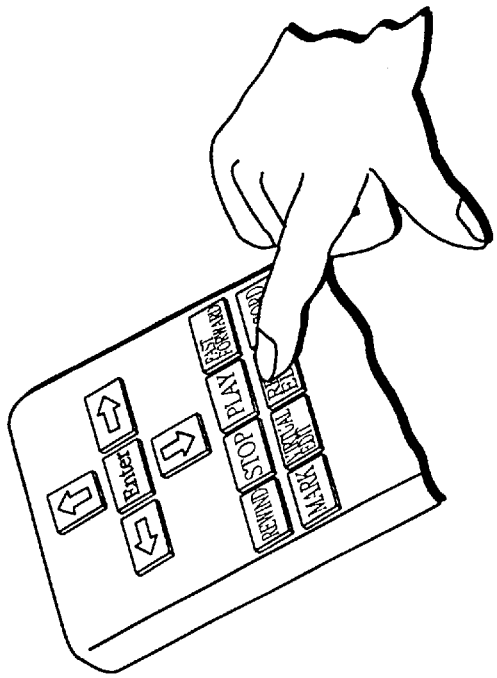
FIG. 94C
FIG. 94A

FINAL STATE (END OF REAL EDIT)

VIDEO DATA EDITING APPARATUS AND COMPUTER-READABLE RECORDING MEDIUM STORING AN EDITING PROGRAM

BACKGROUND OF THE INVENTION

1. Field of the Invention

The present invention relates to a video data editing apparatus on the other side of the re-encoded data that edits an optical disc that records video data files, and to a computer-readable recording medium that stores an editing program.

2. Description of the Background Art

Video editors in the film and broadcasting industries make full use of their skill and experience when editing the great variety of video productions that reach the market. While movie fans and home video makers may not possess such skill or experience, many are still inspired by professional editing to try video editing for themselves. This creates a demand for a domestic video editing apparatus that can perform advanced video editing while still being easy to use.

While video editing generally involves a variety of operations, domestic video editing apparatuses that are likely to appear on the market in the near future will especially require an advanced scene linking function. Such function links a number of scenes to form a single work.

When linking scenes using conventional domestic equipment, the user connects two video cassette recorders to form a dubbing system. The operations performed when linking scenes using this kind of dubbing system are described below.

FIG. 1A shows a video editing setup using video cassette recorders that are respectively capable of recording and playing back video signals. The setup of FIG. 1A includes the video cassette 301 that records the source video, the video cassette 302 for recording the editing result, and two video cassette recorders 303 and 304 for playing back and recording video images on the video cassettes 301 and 302. In this example, the user attempts to perform the editing operation shown in FIG. 1B using the setup of FIG. 1A.

FIG. 1B show the relationship between the material to be edited and the editing result. In this example, the user plays back scene 505 that is located between time t5 and time t10 of the source material, scene 506 that is located between time t13 and t21, and scene 507 that is located between time t23 and t25 and attempts to produce an editing result that is only composed of these scenes.

With the setup of FIG. 1A, the user sets the video cassette 301 including the source material into the video cassette recorder 303 and the video cassette 302 for recording the editing result into the video cassette recorder 304.

After setting the video cassettes 301 and 302, the user presses the fast-forward button on the operation panel of the video cassette recorder 303 (as shown by ① in FIG. 1A) to search for the start of scene 505. Next, the user presses the play button on the operation panel of the video cassette recorder 303 (as shown by ② in FIG. 1A) to reproduce scene 505. At the same time, the user presses the record button on the operation panel of the video cassette recorder 304 (as shown by ③ in FIG. 1A) to commence recording When scene 505 has finished, the user stops the operation of both video cassette recorders 303 and 304. The user then fast-forwards the video cassette to the start of scene 506, and then simultaneously commences the playback by video cassette recorder 303 and the recording by video cassette recorder 304. After completing the above process for scenes 506 and 507, the user has the video cassette recorders 303 and 304 respectively rewind the video cassettes 301 and 302 to complete the editing operation.

If the scene linking operation described above could be performed with ease at the home, users would then be able to easily manage programs that have been recorded on a large number of magnetic tape cassettes. However, when the user wishes to perform a scene linking operation, the user has to repeat the processes of locating the start of the desired scene in the source material and reproducing all of the video images from the beginning to the end of the scene for each scene to be linked. Accordingly, video editing is a burdensome process.

Exceeding the potential of video cassettes, file systems that treat audio video data (AV data), that is produced by multiplexing video data and audio data, in the same way as computer files have been subject to increasing attention for their ability to facilitate video editing.

The file systems referred to here are data constructions for managing areas on a recording medium, like a hard disc or optical disc, that allows random access. A file system divides the entire disc area into data blocks that are several dozen KB in size, with the data blocks that do not contain valid data being managed as an empty areas. When a file is deleted, the data blocks that stored the file are registered as empty areas.

Data is generated by an application program operating within the file system, and when the user gives an indication to have this data recorded as a file on a recordable disc, the file system calculates the size of the file, and judges whether there is a continuous empty area on the disc whose size is equal to or greater than the size of the file.

If such an area is present on the disc, the file system will record the file in this area, though if there is no empty area as long as the file on the disc, the file system will look for fragmented empty areas on the disc. The file system then divides data to be recorded and stores the different sets of divided data in different empty areas on the disc. The file system then generates management information for managing the sets of divided data as different sets of data, and has the management information written onto the recordable disc to complete the recording of the file on the optical disc.

Since the data that is recorded by the file system is divided into a plurality of sets of data and stored as fragments in different areas on the disc, it is not necessary for the recordable optical disc to include an continuous empty area that is as large as the file. Even if the data to be recorded is AV data, this data can still be efficiently recorded on the optical disc.

However, when a plurality of sets of AV data are recorded on a recordable optical disc under the control of a file system, if the continuous length of an area storing the AV data is too short, when the AV data in this area is reproduced, there is the risk that the display of video images will be interrupted while the optical pickup is jumping from the data to the recording position of the following AV data.

In more detail, the reproduction apparatus reads the video images stored on the recordable optical disc into temporary buffer and the AV decoder of the reproduction apparatus decodes the AV data read into the buffer When the area recording AV has a long continuous length, a sufficient amount of AV data can be accumulated in the buffer. When the optical pickup then jumps to a different recording position, there will be sufficient data in the buffer for the decoder to continue its decoding process, meaning that the display of video images can be continued without interruption.

On the other hand, when video editing is performed and operations that take one part of the existing AV data and use it to create a new file are repeated a large number of times, many short sets of data will end up on the recordable disc. Since the continuous length of the recording areas that record these sets of AV data are short, an insufficient amount of data will be accumulated in the buffer when such data is reproduced. If the optical pickup jumps to another recording position with only a small amount of data in the buffer, an underflow will occur in the buffer, so that the continuity of the decoding of AV data by the buffer cannot be maintained. This will result in an interruption in the video display.

SUMMARY OF THE INVENTION

It is a primary object of the present invention to provide a video data editing apparatus and a computer-readable optical disc storing an editing program that allow easy video editing and can quickly deal with sections of audio video (AV) data of an insufficient length, no matter how often such sections appear.

The stated primary object can be achieved by a video data editing apparatus for an optical disc, the optical disc recording at least one file of video data split into a plurality of segments, each segment being recorded in a consecutive area within one zone on the optical disc, the video data editing apparatus including: a detection unit for detecting a first segment, out of the plurality of segments, where a length of the consecutive area is below a predetermined length; and a linking unit for linking the detected first segment with at least part of a second segment, and, to make a total continuous length of the first segment and a linked part of the second segment at least equal to the predetermined length, moving at least one of the first segment and the linked part of the second segment to a different area on the optical disc, the second segment including video data that is reproduced one of immediately before and immediately after reproduction of video data in the first segment, the different position being entirely located within one zone on the optical disc.

With the stated construction, fragmentation of AV files can be avoided, and the uninterrupted reproduction of AV data in the AV files can be performed.

Here, the linking unit may include: a first measuring unit for measuring a continuous length of an empty area on the optical disc on at least one side of a recording area of the first segment detected by the detecting unit; a second measuring unit for measuring a continuous length of an empty area on the optical disc on at least one side of a recording area of the second segment; a first judgement unit for judging whether a continuous length of any empty area measured by the first measuring unit is greater than a data size of the second segment; a first moving unit for moving, when a judgement of the first judgement unit is affirmative, the second segment to the empty area judged to be larger than the data size of the second segment so that the first segment and second segment are recorded on the disc in reproduction order; a second judgement unit for judging, when the judgement of the first judgement unit is negative, whether a continuous length of any empty area measured by the second measuring unit is greater than a data size of the first segment; a second moving unit for moving, when a judgement of the second judgement unit is affirmative, the first segment to the empty area judged to be larger than the data size of the first segment so that the first segment and second segment are recorded on the disc in reproduction order.

With the stated construction, the first and second judgement units judge the continuous lengths of the empty areas adjacent to the first and second segments against the lengths of the first and second segment. Based on the judgement results, one of the segments is moved to a position adjacent the other segment, so that AV data to be consecutively reproduced is recorded in consecutive areas on a recordable optical disc whenever possible. This increases the efficiency with which the recording areas of the optical disc are used.

Here, the linking unit may further include: a search unit for searching, when the judgements of both the first judgement unit and the second judgement unit are negative, the optical disc for an empty area whose continuous length is greater than a length L, where the length L is a total length of the first segment and the second segment; and a third moving unit for moving, when the search unit has found an empty area with a continuous length greater than the length L, the first segment and the second segment to the empty area found by the search unit.

With the stated construction, the first and second segment can be moved to a different recording position when movement of either of the first and second segments to a position adjacent the other segment is not possible. As a result, potential underflows can be avoided for the first segment.

Here, the video data editing apparatus may further include; a third judgement unit for judging, when the search unit has found an empty area with continuous length greater than the length L, whether the length L is below a maximum length S, the maximum length S being at least twice the predetermined length, wherein the third movement unit moves the first segment and the second segment to the empty area only when the length L is below the maximum length S, the linking unit further including: a fourth movement unit for moving, when the length L is not below the maximum length S, all of the first segment and only the linked part of the second segment to the empty area found by the search unit.

With the stated construction, the third judgement unit judges whether the total length L of the first segment and the second segment is below a maximum length S that is at least twice the predetermined length. When L exceeds S, the fourth movement unit restricts the moved amount of data As a result, it can be ensured that the total size of the data that needs to be written will be within a given size, meaning that the defragmentation of the data can be completed in a short time.

Here, the video data editing apparatus may further include: a storage unit for storing re-encoded data obtained by re-encoding a section of video data read by the video data editing apparatus during an editing operation; a fourth judgement unit for judging, when a judgement of the first judgement unit is affirmative, whether the first segment is a remaining part of a segment that was originally recorded on the optical disc but has had a section of data read out by the video data editing apparatus during the editing operation; and a first recording unit for recording, when a judgement of the fourth judgement unit is affirmative, the re-encoded data that is stored by the storage unit into the empty area, the first moving unit moving the second segment to a position on the optical disc that follows immediately after a recording position of the re-encoded data.

With the stated construction, when it is necessary to produce re-encoded data with a short continuous length as a result of an editing operation freely performed by the user, the re-encoded data will be recorded at a position adjacent to AV data that is reproduced before or after the re-encoded data. As a result, the fragmentary recording of re-encoded data can be prevented from the outset, so that uninterrupted reproduction of AV data in the AV files can be performed.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1A shows a convention video editing setup using video cassette recorders that are capable of playing back and recording video signals;

FIG. 1B shows the relationship between the source materials and the editing result;

FIG. 5A shows a plurality of sets of picture data arranged in display order and a plurality of sets of picture data arranged in coding order;

FIG. 5B shows the correspondence between audio frames and audio data;

FIG. 6A shows a detailed hierarchy of the logical formats in the data construction of a VOB (Video Object);

FIG. 6B shows the partial deletion of a VOB;

FIG. 6C shows the logical format of a video pack arranged at the start of a VOB;

FIG. 6D shows logical format of other video packs arranged in a VOB;

FIG. 6E shows the logical format of an audio pack;

FIG. 6F shows the logical format of a pack header;

FIG. 6G shows the logical format of a system header;

FIG. 6H shows the logical format of a packet header;

FIG. 7A shows a video frame and the occupancy of the video buffer;

FIG. 7B shows an audio frame and an ideal transition in the buffer state of the audio buffer;

FIG. 7C shows an audio frame and the actual transition in the buffer state of the audio buffer;

FIG. 7D shows the detailed transfer period of each set of picture data;

FIG. 11A is a graph where the SCRs of video packs included in a VOB are plotted in the order in which the video packs are arranged;

FIG. 11B shows an example where the first SCR in section B matches the last SCR in section A;

FIG. 11C shows an example where the first SCR in section D is higher than the last SCR in section C;

FIG. 11D shows an example where the last SCR in section E is higher than the first SCR in section F;

FIG. 11E shows the graph for the continuity of VOBs of FIG. 11A for two specific VOBs;

FIG. 14A shows examples of audio frames and video frames;

FIG. 14B shows the time difference g1 that appears at the end of the audio data and picture data when the reproduction time of picture data and the reproduction time of audio data are aligned at the start of a VOB;

FIG. 14C shows the audio pack G3 including the audio gap and the audio pack G4, audio pack G3 including (i) the sets of audio data y−2, y−1, and y, which are located at the end of VOB#1, and (ii) the Padding_Packet, and audio pack G4 including the sets of audio data u, u+1, and u+2, which are located at the start of VOB#2;

FIG. 14D shows into which of VOBU#1, VOBU#2, and VOBU#3 at the start of the VOB#2 the audio pack G3 including the audio gap is arranged;

FIGS. 15A to 15D show the procedure for the regeneration of the audio gap when the VOBUs located at the start of VOB#2, out of the VOBs #1 and #2 that are to be reproduced seamlessly, are deleted;

FIGS. 23A and 23B show the analysis of transition in the buffer state for audio packs;

FIG. 23C shows the area that is to be read from the former VOB in step S106;

FIG. 23D shows the area that is to be read from the latter VOB in step S107;

FIG. 28A shows an example of the linking of sets of cell information that are specified as the editing boundaries in a VOBU;

FIG. 28B shows the processing for the three rules for reconstructing GOPs when correcting the display order and coding order;

FIG. 31 is a flowchart showing the procedure for the seamless processing;

FIG. 32 is also a flowchart showing the procedure for the seamless processing;

FIG. 38A shows the data construction of file entries in greater detail;

FIG. 38B shows the data construction of the allocation descriptors;

FIG. 38C shows the recorded state of the upper 2 bits in the data indicating the extent length;

FIG. 40 is a model showing the buffering in the track buffer of AV data read from the DVD-RAM;

FIG. 43 is a flowchart showing the processing by the recording-editing-reproduction control unit 12 for a virtual edit and for a real edit;

FIGS. 44A to 44F show a supplementary example to illustrate the processing of the AV data editing unit 15 in the flowchart of FIG. 43;

FIGS. 45A to 45E show a supplementary example to illustrate the processing of the AV data editing unit 15 in the flowchart of FIG. 43;

FIGS. 46A to 46F show a supplementary example to illustrate the processing of the AV data editing unit 15 in the flowchart of FIG. 43;

FIGS. 52A to 52C are a supplementary example showing the processing of the AV file system unit 11 in the flowchart of FIG. 50;

FIGS. 53A to 53D are a supplementary example showing the processing of the AV file system unit 11 in the flowchart of FIG. 50;

FIGS. 54A–54D are a supplementary example showing the processing of the AV file system unit 11 in the flowchart of FIG. 50;

FIGS. 58A–58D are a supplementary example showing the processing of the AV file system unit 11 in the flowchart of FIG. 55;

FIGS. 59A–59D are a supplementary example showing the processing of the AV file system unit 11 in the flowchart of FIG. 55;

FIGS. 61A–61D are a supplementary example showing the processing of the AV file system unit 11 in the flowchart of FIG. 60;

FIGS. 63A–63C are a supplementary example showing the processing of the AV file system unit 11 in the flowchart of FIG. 60;

FIGS. 64A–64D are a supplementary example showing the processing of the AV file system unit 11 in the flowchart of FIG. 60;

FIGS. 69A–69D are a supplementary example showing the processing of the defragmentation unit 16;

FIG. 70A shows the detailed hierarchical content of the RTRW management file in the fourth embodiment;

FIG. 70B is a flowchart showing the logical format of the original PGC information in the fourth embodiment;

FIG. 70C is a flowchart showing the logical format of the user-defined PGC information in the fourth embodiment;

FIG. 70D shows the logical format of the title search pointer;

FIG. 72 shows an example of a user-defined PGC and an original PGC;

FIG. 73 shows the part that corresponds to the cell to be deleted using diagonal shading;

FIG. 74A shows which ECC blocks are freed into empty areas by a real edit using the user-defined PGC information #2;

FIG. 74B shows examples of VOBs, VOB information, and PGC information after a real edit;

FIG. 75 is a functional block diagram showing the construction of the DVD recorder 70 divided according to function;

FIG. 76 shows an example of original PGC information that has been generated by the user-defined PGC information generator 25 when recording an AV file;

FIG. 77A shows an example of graphics data that is displayed on the TV monitor 72 under the control of the recording-editing-reproduction control unit 12:

FIG. 77B shows an example of the PGC information and cell information that are displayed as a list of operation targets;

FIG. 78A is a flowchart showing the processing during partial reproduction of a title;

FIG. 78B shows how only the section between the presentation start time C_V_S_PTM and the presentation end time C_V_E_PTM is reproduced, out of the VOBUs between the VOBU (START) and the VOBU (END);

FIGS. 79A, 79B show the user pressing the mark key while viewing video images on the TV monitor 72;

FIGS. 80A, 80B show how data is inputted and outputted between the components shown in FIG. 75 when a marking operation is performed;

Figure 81:
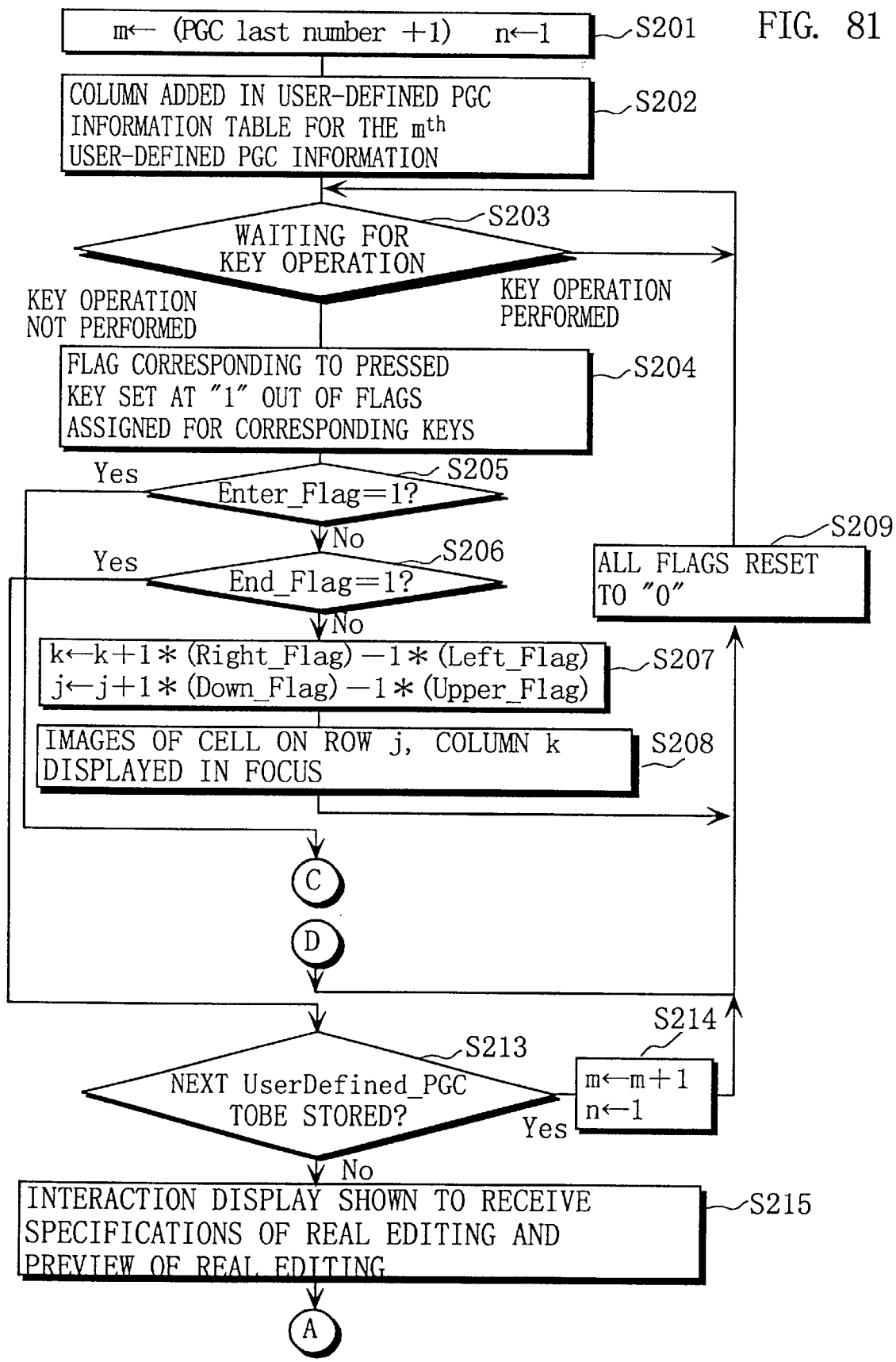
Figure 82:
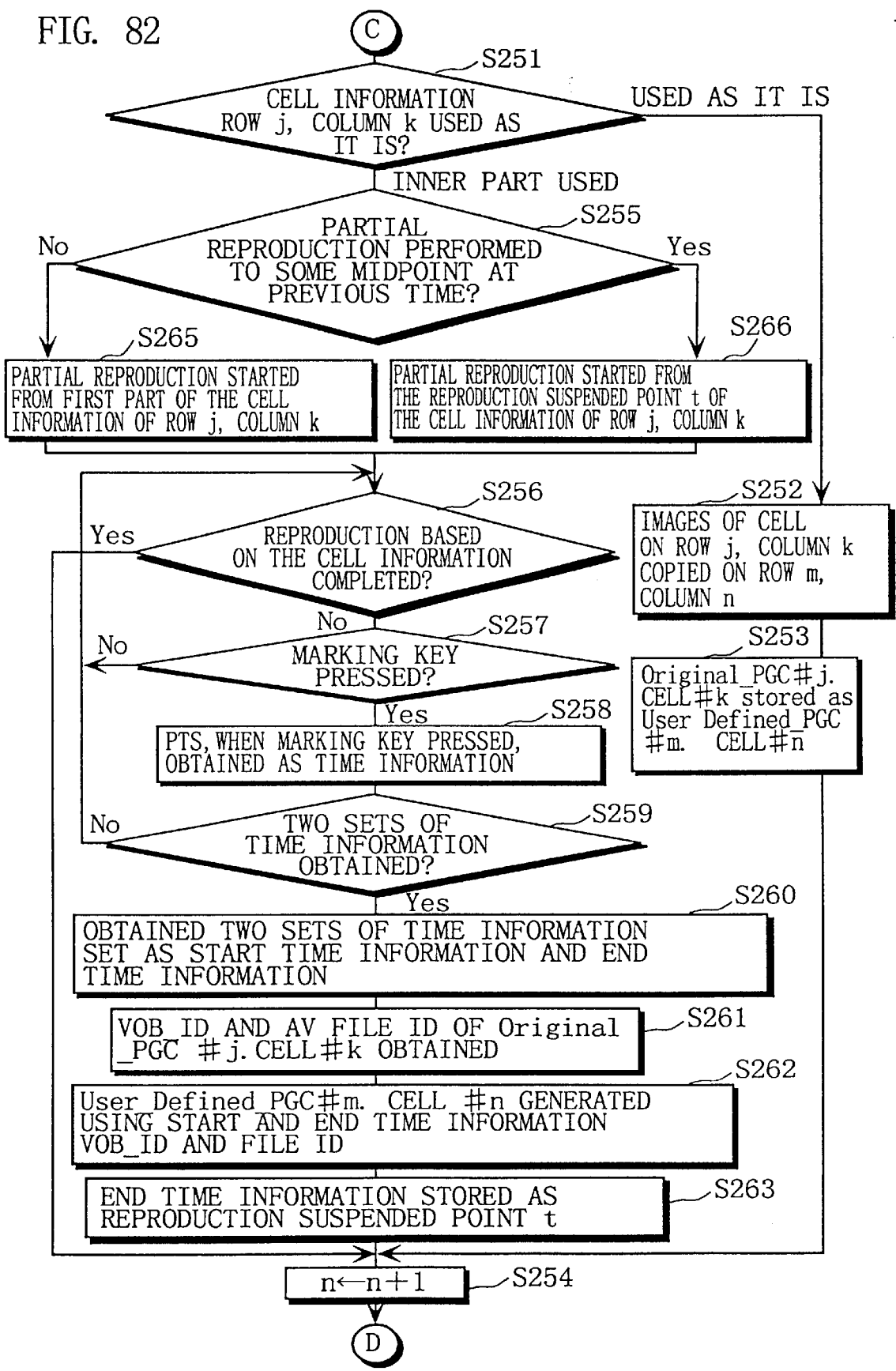
Figure 83:
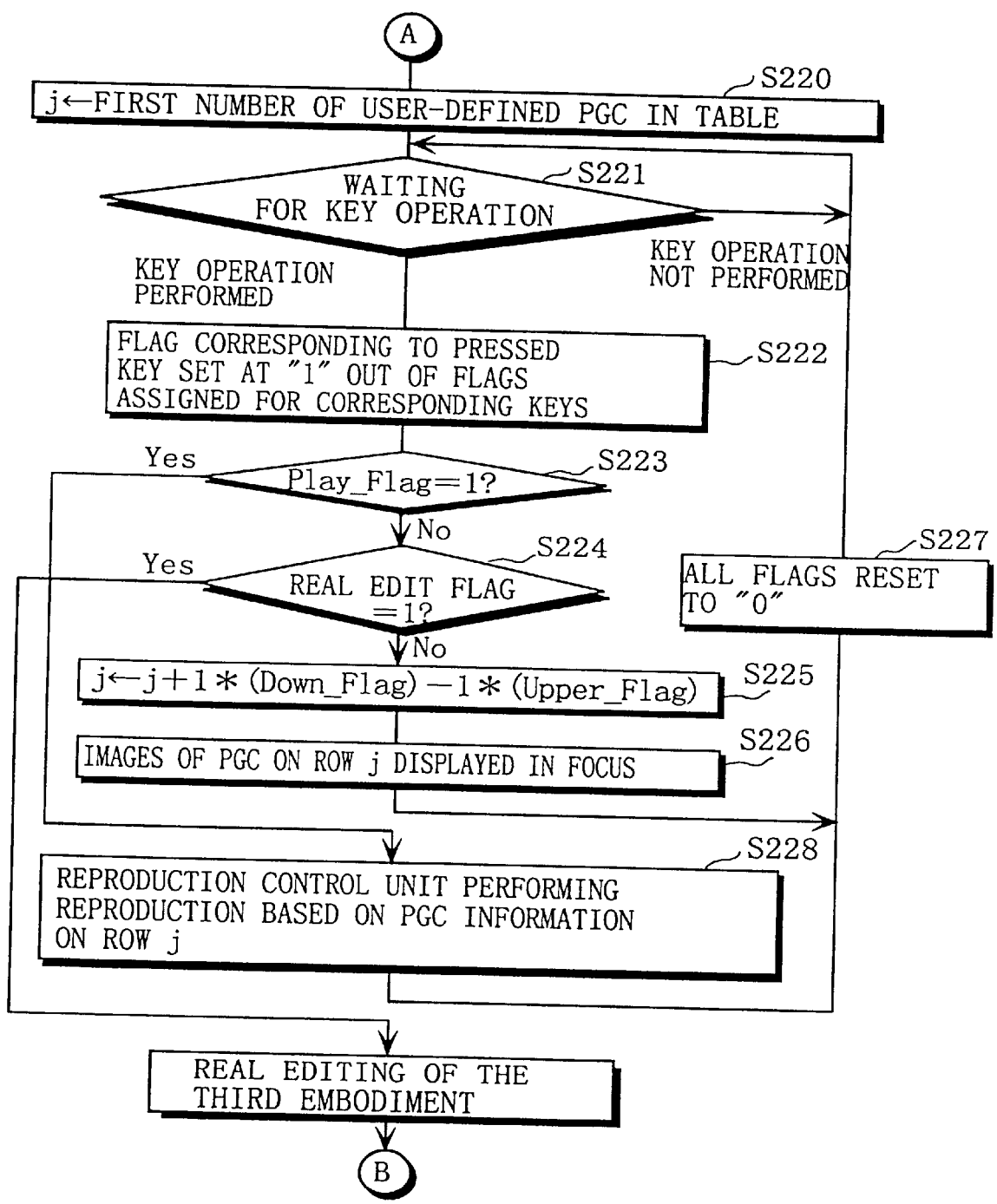
Figure 84:
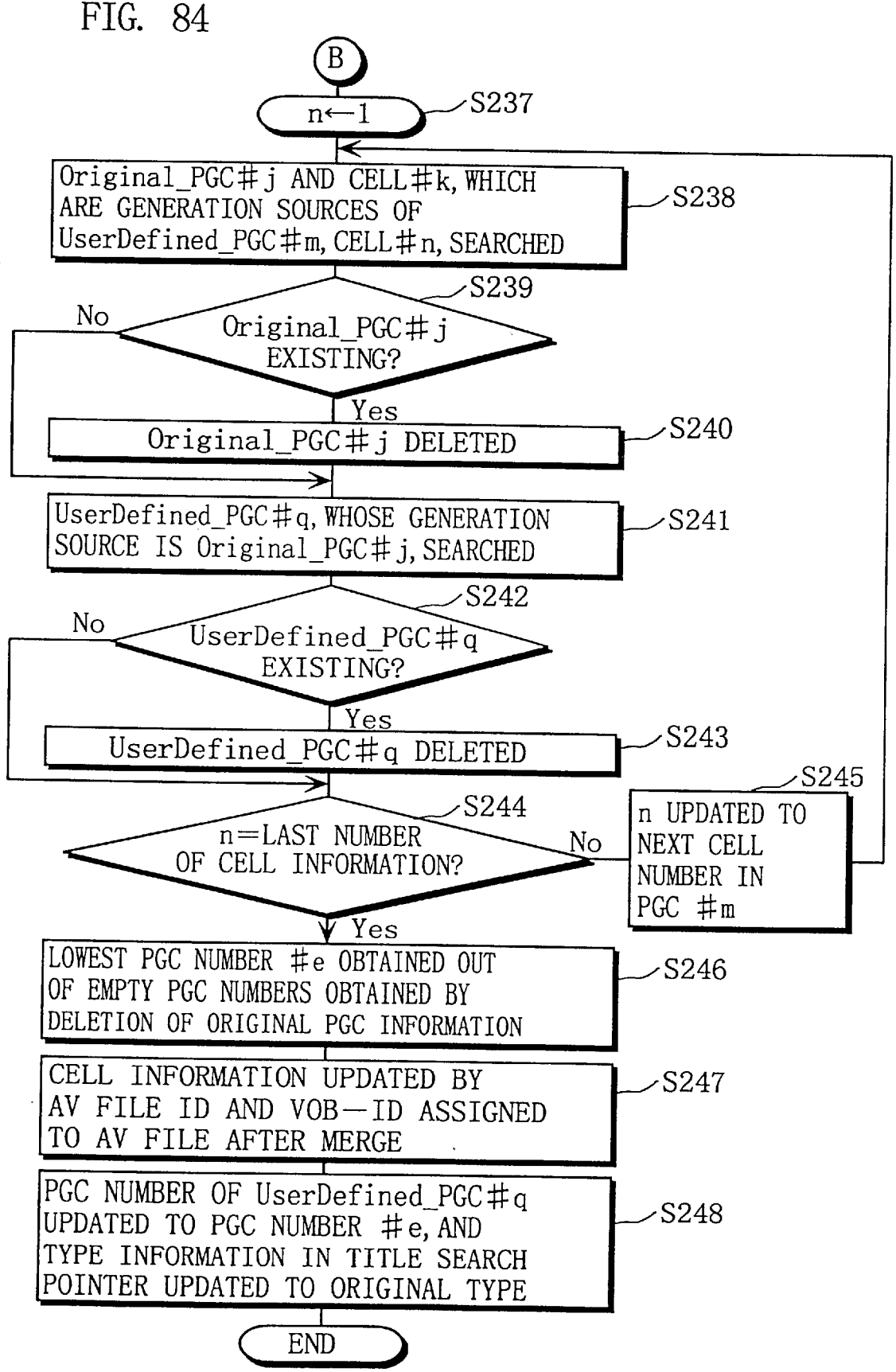
Figure 86B:
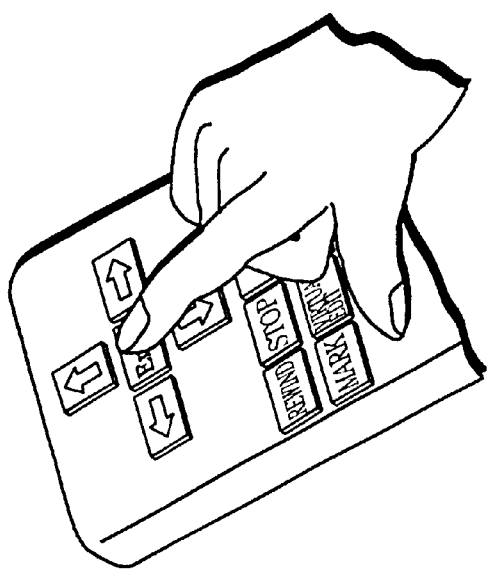
Figure 86A:
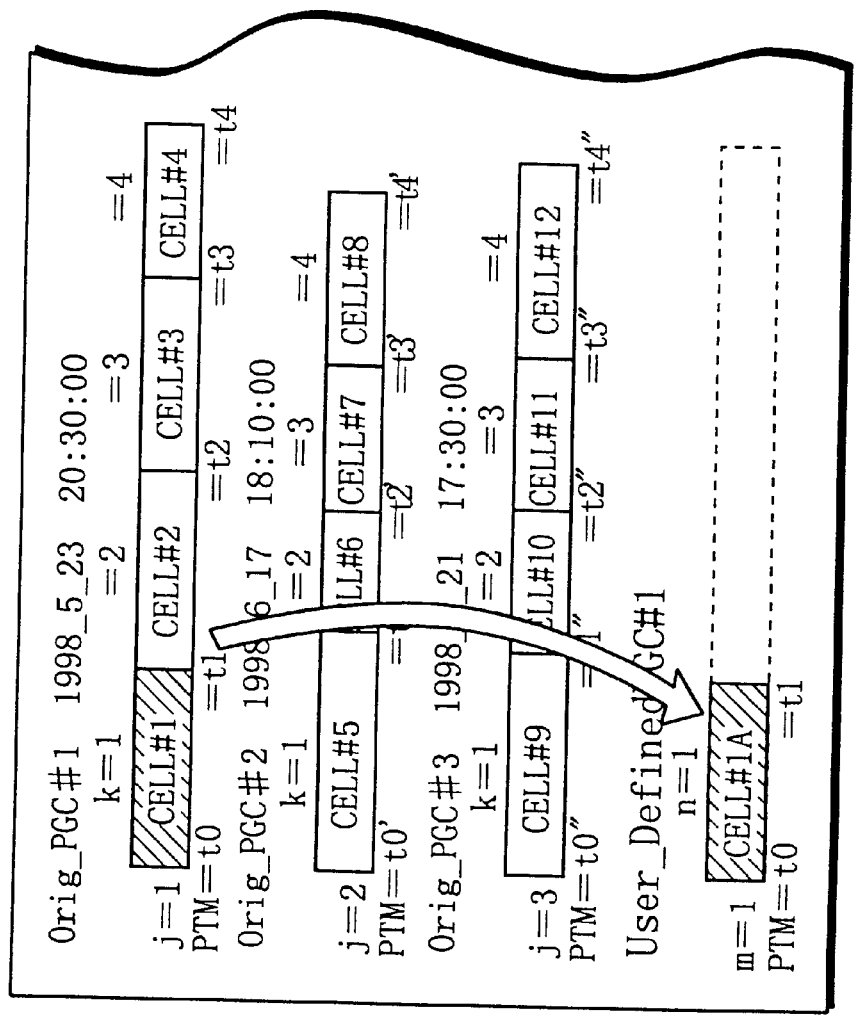
Figure 88B:
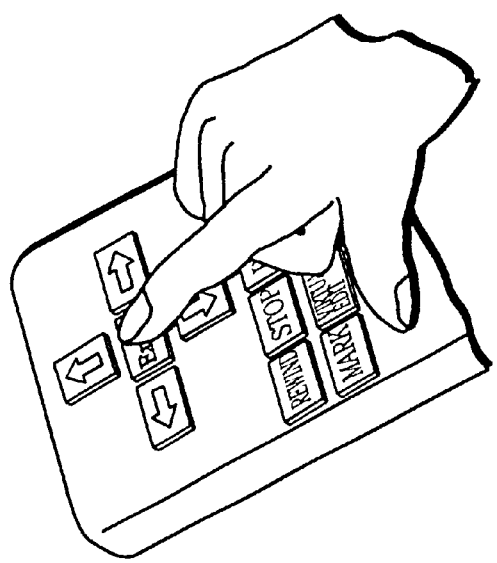
Figure 88A:
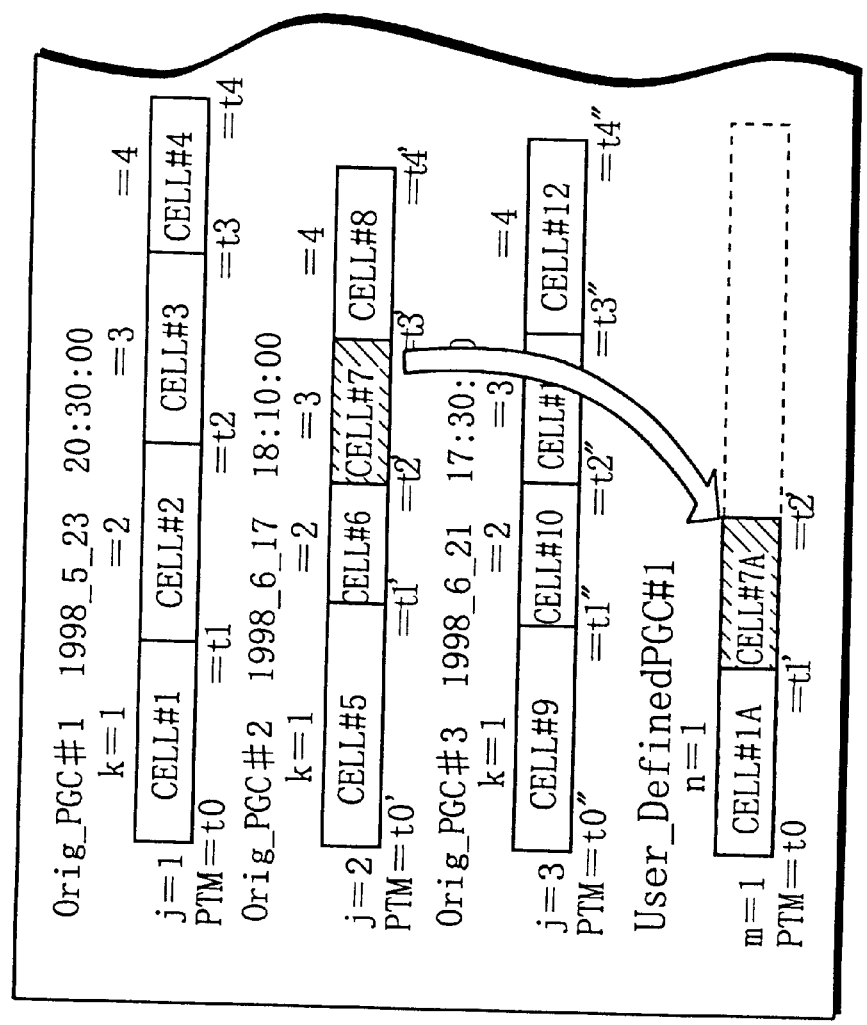
Figure 89B:
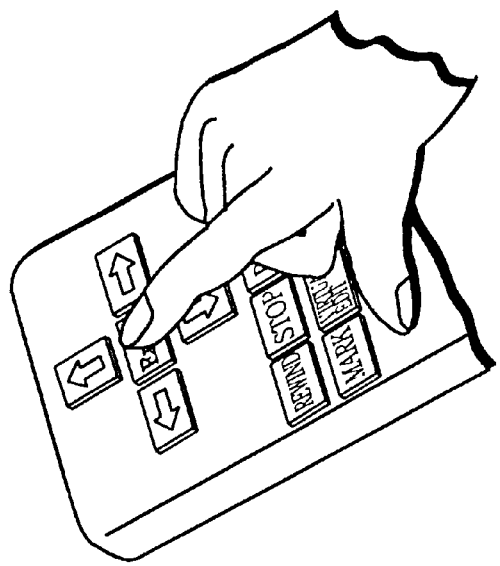
Figure 89A:
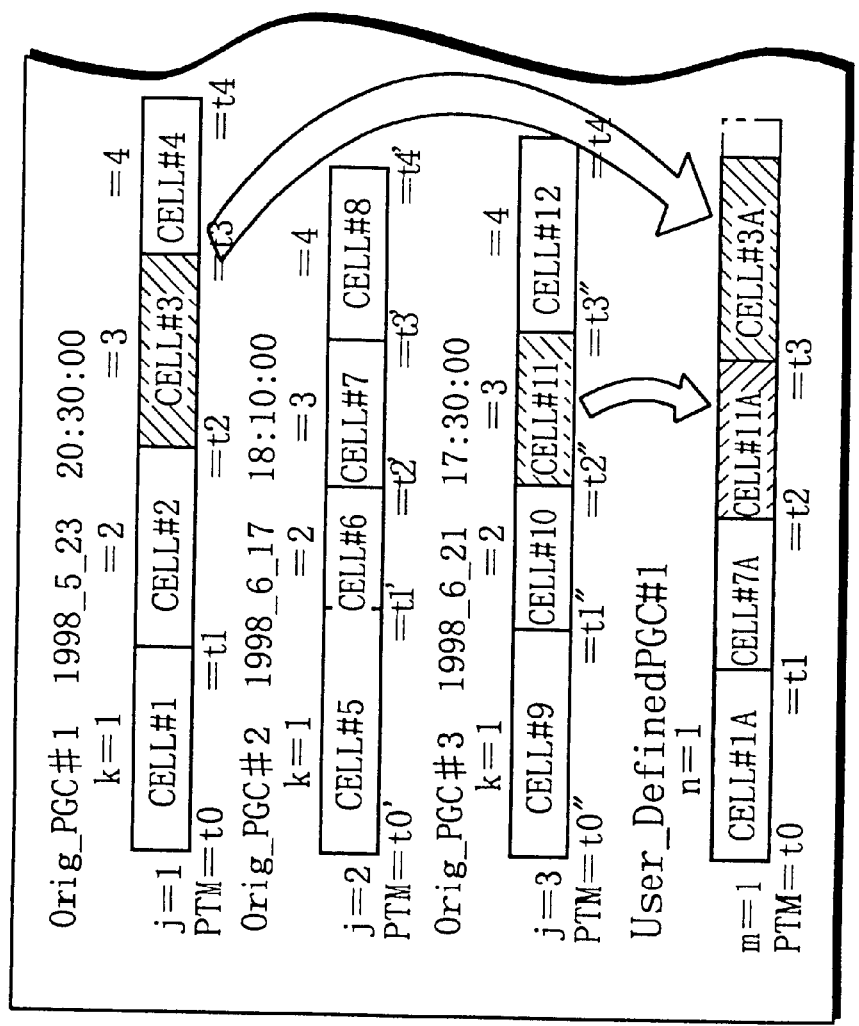
Figures 92A, 92B:
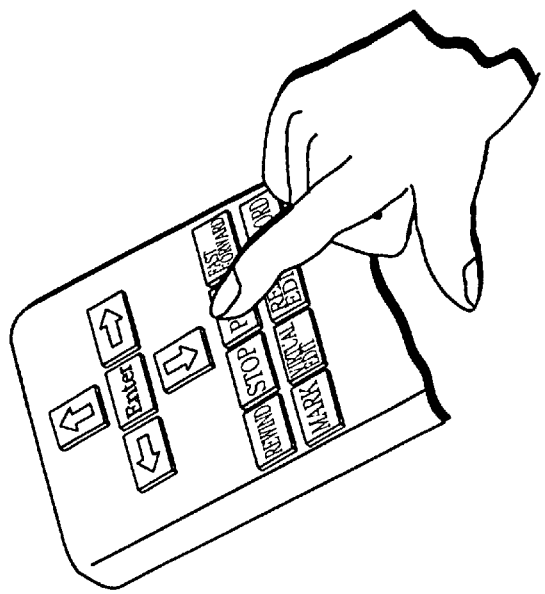
Figure 95:
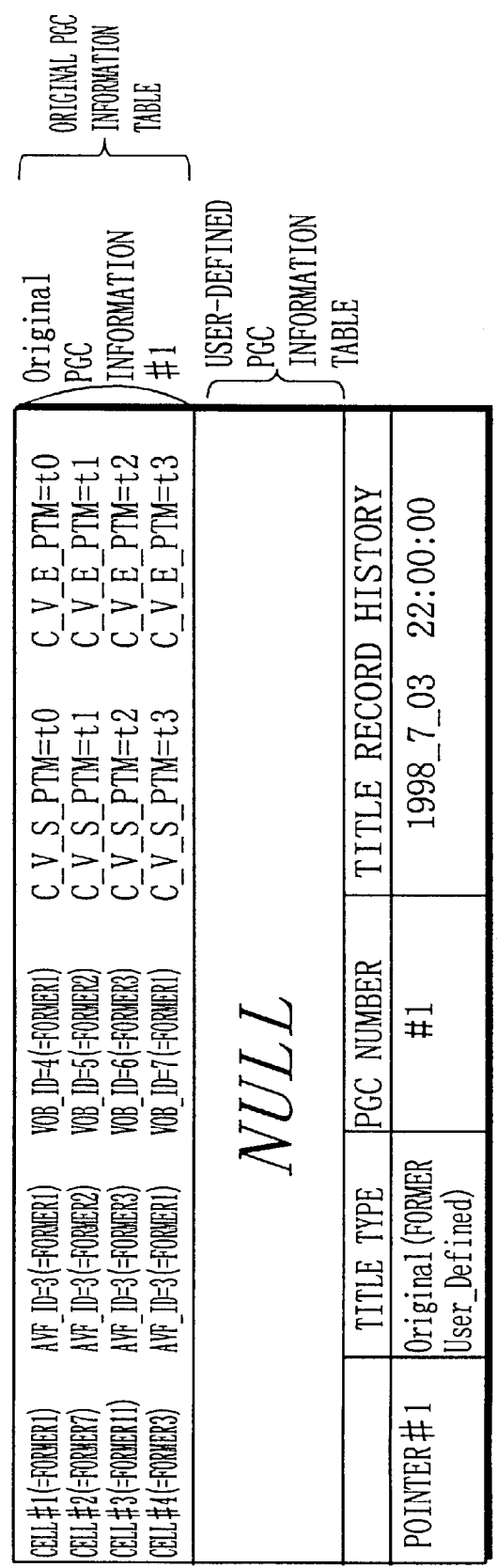

FIG. 81 is a flowchart showing the processing of the editing multi-stage control unit 26 when defining user-defined PGC information;

FIG. 82 is a flowchart showing the processing of the editing multi-stage control unit 26 when defining user-defined PGC information;

FIG. 83 is a flowchart showing the processing of the recording-editing-reproduction control unit 12 during a preview and a real edit;

FIG. 84 is a flowchart showing the update processing for the PGC information after a real edit;

FIG. 85 shows an example of the interactive screen that is displayed on the TV monitor 72 to have the user make a selection of cell information as a element in a set of user-defined PGC information during a virtual edit;

FIGS. 86A, 86B show the relationship between the user operation of the remote controller 71 and the display processing that accompanies the user operation;

FIGS. 87A to 87D show the relationship between the user operation of the remote controller 71 and the display processing that accompanies the user operation;

FIGS. 88A, 88B show the relationship between the user operation of the remote controller 71 and the display processing that accompanies the user operation;

FIGS. 89A, 89B show the relationship between the user operation of the remote controller 71 and the display processing that accompanies the user operation;

FIG. 90 shows an example of the interactive screen that has the user select a set of user-defined PGC information or a preview (using the play key) or a real edit (using the real edit key);

FIG. 91 shows an example of the original PGC information table and user-defined PGC information table, when the user-defined PGC information #2 composed of CELL#2B, CELL#4B, CELL#10B, and CELL#5B and the user-defined PGC information #3 composed of CELL#3C, CELL#6C, CELL#8C, CELL#9C have been defined;

FIGS. 92A–92B show the relationship between the user operation of the remote controller 71 and the display processing that accompanies the user operation;

FIGS. 93A–93C show the relationship between the user operation of the remote controller 71 and the display processing that accompanies the user operation;

FIGS. 94A–94C show the relationship between the user operation of the remote controller 71 and the display processing that accompanies the user operation; and FIG. 95 shows the original PGC information table and the user-defined PGC information table after the processing of VOBs in a real edit.

DESCRIPTION OF THE PREFERRED EMBODIMENTS

The following embodiments describe a video data editing apparatus and the optical disc which the video data editing apparatus uses as recording medium. For ease of explanation, the explanation is divided into four embodiments that deal with the physical structure of the optical disc, the logical structure, the hardware structure of the video data editing apparatus, and the functional construction of the video data editing apparatus.

The first embodiment explains the physical structure of the optical disc and the hardware structure of the video data editing apparatus, as well as the seamless linking of video objects as the first basic example of video editing.

The second embodiment explains seamless linking of partial sections of video objects as the second basic example. The third embodiment deals with the functional construction of the video data editing apparatus and the procedure for realizing video editing within a file system.

The fourth embodiment describes the data structures and procedure of the video data editing apparatus when performing a two-stage editing process composed of virtual editing and real editing of two types of program chain called a user-defined PGC and an original PGC.

(1-1) Physical Structure of a Recordable Optical Disc

Figure 2A:
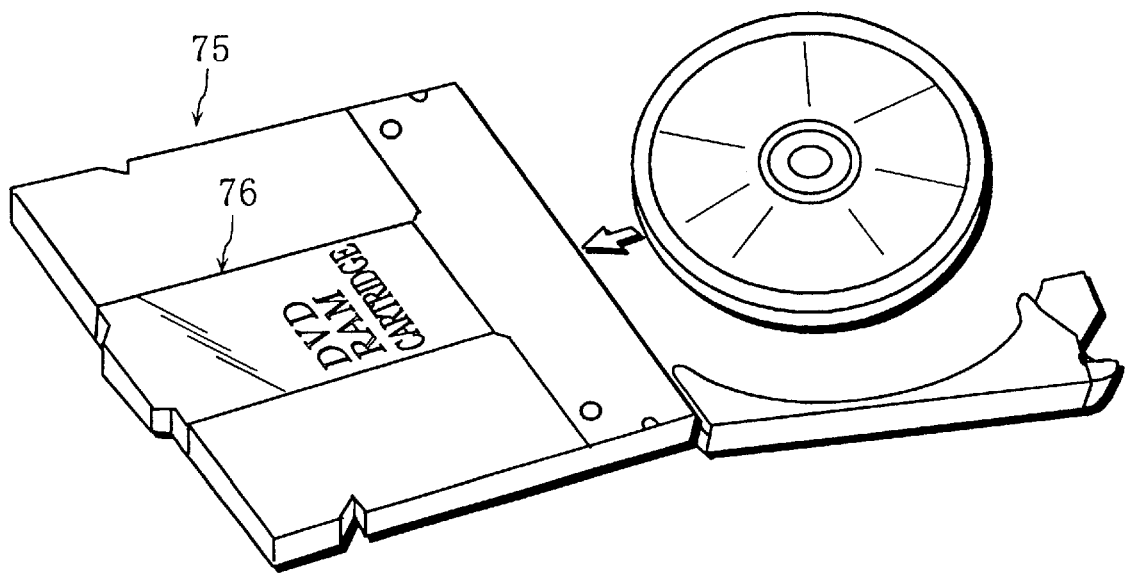
FIG. 2A shows the outward appearance of a DVD-RAM disc that is the recordable optical disc used in the embodiments of the present invention.

FIG. 2A shows the external appearance of a DVD-RAM disc that is a recordable optical disc. As shown in this drawing, the DVD-RAM is loaded into a video data editing apparatus having been placed into a cartridge 75. This cartridge 75 protects the recording surface of the DVD-RAM, and has a shutter 76 which opens and closes to allow access to the DVD-RAM enclosed inside.

Figure 2B:
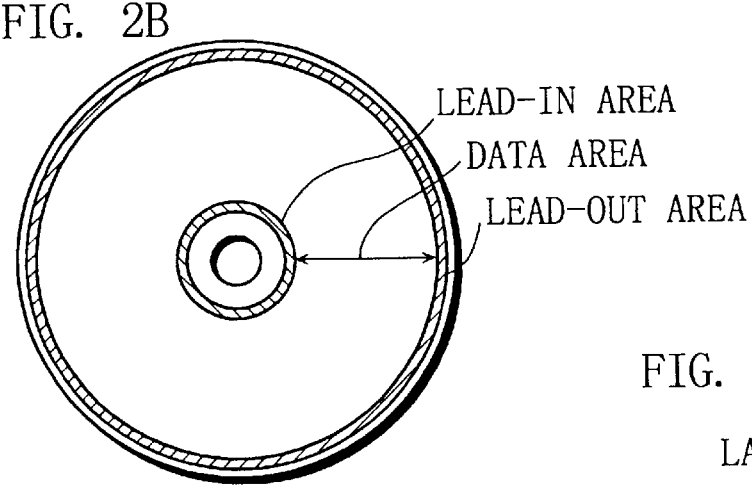
FIG. 2B shows the recording areas on a DVD-RAM.

FIG. 2B shows the recording area of DVD-RAM disc which is a recordable optical disc. As shown in the figure, the DVD-RAM has a lead-in area at its innermost periphery and a lead-out area at its outermost periphery, with the data area in between. The lead-in area records the necessary reference signals for the stabilization of a servo during access by an optical pickup, and identification signals to prevent confusion with other media. The lead-out area records the same type of reference signals as the lead-in area. The data area, meanwhile, is divided into sectors which are the smallest unit by which the DVD-RAM can be accessed. Here, the size of each sector is set at 2KB.

Figure 2C:
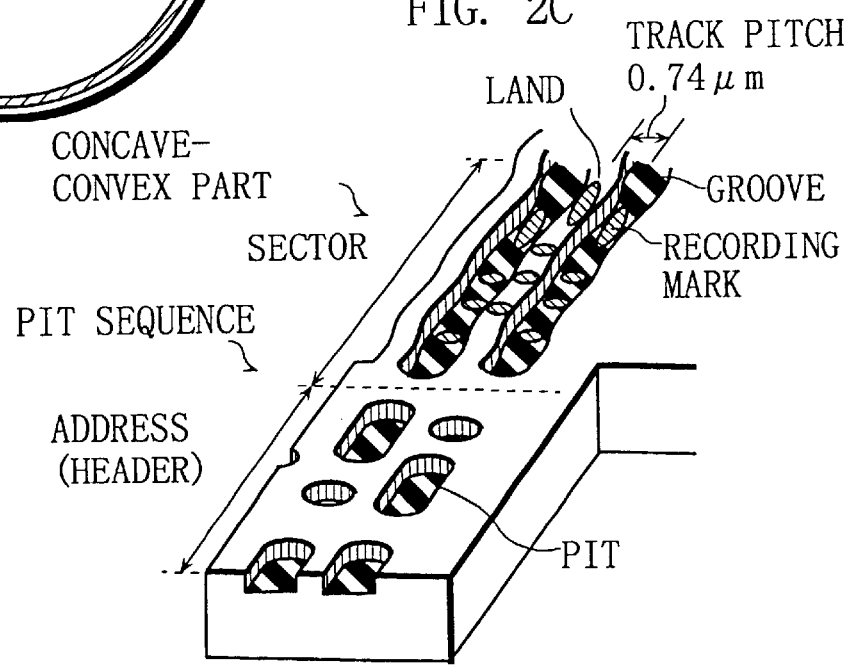
FIG. 2C shows the cross-section and surface of a DVD-RAM cut at a sector header.

FIG. 2C shows the cross-section and surface of a DVD-RAM cut at the header of a sector. As shown in the figure, each sector is composed of a pit sequence that is formed in the surface of a reflective film, such as a metal film, and a concave-convex part.

The pit sequence is composed of 0.4 μm~1.87 μm pits that are carved into the surface of the DVD-RAM to show the sector address.

The concave-convex part is composed of a concave part called a "groove" and a convex part called a "land". Each groove and land has a recording mark composed of a metal film capable of phase change attached to its surface. Here, the expression "capable of phase change" means that the recording mark can be in a crystalline state or a non-crystalline state depending on whether the metal film has been exposed to a light beam. Using this phase change characteristic, data can be recorded into this concave-convex part. While it is only possible to record data onto the land part of an MO (Magnetic-Optical) disc, data can be recorded onto both the land and the groove parts of a DVD-RAM, meaning that the recording density of a DVD-RAM exceeds that of an MO disc. Error correction information is provided on a DVD-RAM for each group of 16 sectors. In this specification, each group of 16 sectors that is given an ECC (Error Correcting Code) is called an ECC block.

On a DVD-RAM, the data area is divided to several zones to realize rotation control called Z-CLV (Zone-Constant Linear Velocity) during recording and reproduction.

Figure 3A:
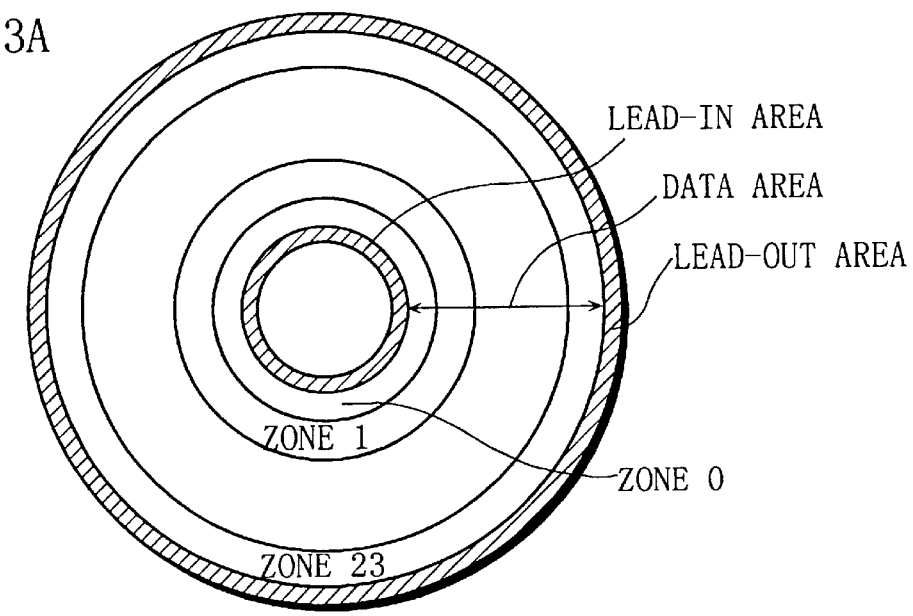
FIG. 3A shows the zones 0 to 23 on a DVD-RAM.

FIG. 3A shows the plurality of zones provided on a DVD-RAM. As shown in the figure, a DVD-RAM is divided to 24 zones numbered zone 0~zone 23. Each zone is a group of tracks that are accessed using the same angular velocity. In this embodiment, each zone includes 1888 tracks The rotational angular velocity of the DVD-RAM is set separately for each zone, with this velocity being higher the closer a zone is located to the inner periphery of the disc. Division of the data area into zones ensures that the optical pickup can move at a constant velocity while performing access within a single zone. By doing so, the recording density of DVD-RAM is raised, and rotation control during recording and reproduction is made easier.

Figure 3B:
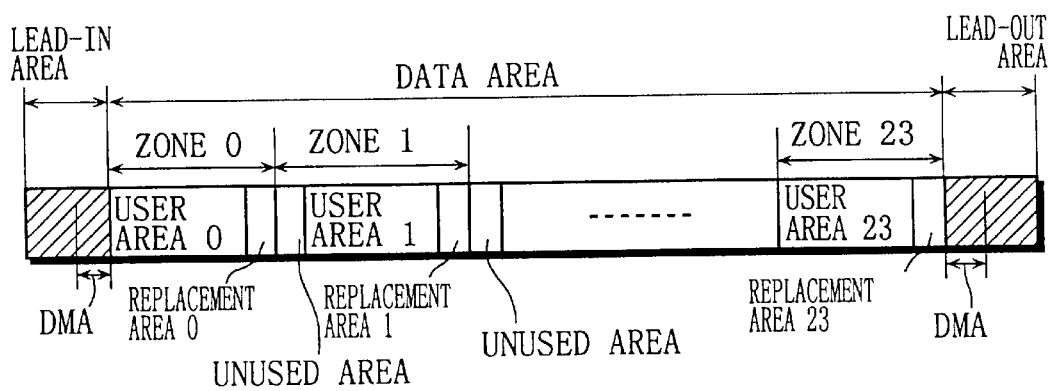
FIG. 3B shows the zones 0 to 23 arranged into a horizontal sequence.

FIG. 3B shows a horizontal arrangement of the lead-in area, the lead-out area, and the zones 0–23 that are shown in FIG. 3A.

The lead-in area and lead-out area each include a defect management area (DMA: Defect Management Area). This defect management area records position information showing the positions of sectors found to include defects and replacement position information showing whether the sectors used for replacing defective sectors are located in any of the replacement areas.

Each zone has a user area, in addition to a replacement area and an unused area that are provided at the boundary with the next zone. A user area is an area that the file system can use as a recording area. The replacement area is used to replace defective sectors when such detective sectors are found The unused area is an area that is not used for recording data. Only two tracks are used as the unused area, with such unused area being provided to prevent mistaken identification of sector addresses. The reason for this is that while sector addresses are recorded at a same position in adjacent tracks within the same zone, for Z-CLV the recording positions of sector addresses are different for adjacent tracks at the boundaries between zones.

Figure 3C:
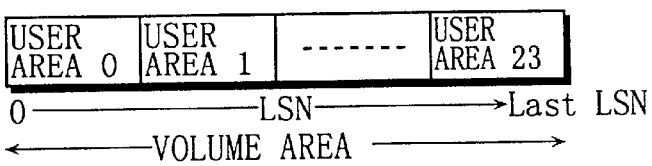
FIG. 3C shows the logical sector numbers (LSN) in the volume area.

In this way, sectors which are not used for data recording exist at the boundaries between zones. On a DVD-RAM, logical sector numbers (LSN: Logical Sector Number) are assigned to physical sectors of the user area in order starting from the inner periphery to consecutively show only the sectors used for recording data. As shown in FIG. 3C, the area that records user data and is composed of sectors that have been assigned an LSN is called the volume area.

The volume area is used for recording AV files that are each composed of a plurality of VOBs and an RTRW (RealTime ReWritable) management file that is the management information for the AV files. These AV files and RTRW management file are in fact recorded in a file system according to ISO/IEC 13346, although this will not be explained in the present embodiment. The file system is dealt with in detail in the third embodiment below.

(1-2) Data recorded in the Volume Area

Figures 4A, 4B:
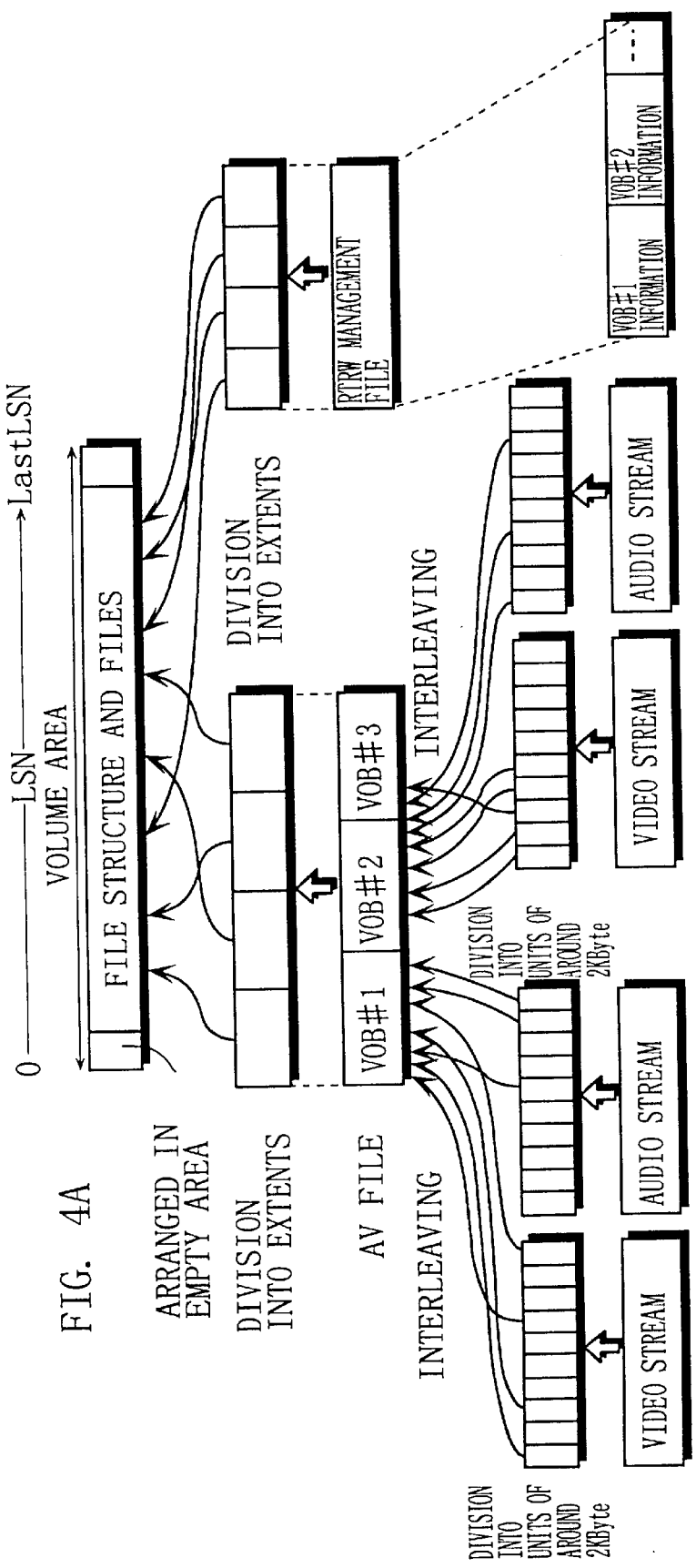
FIG. 4A shows the contents of the data recorded in the volume area.
FIG. 4B shows the hierarchical structure of the data definitions used in MPEG standard.

FIG. 4A shows the content of the data recorded in the volume area of a DVD-RAM.

The video stream and audio stream shown on the fifth level of FIG. 4A are divided into units of around 2KB, as shown on the fourth level. The units obtained through this division are interleaved into VOB#1 and VOB#2 in the AV file shown on the third level as video packs and audio packs in compliance with MPEG standard. The AV file is split into a plurality of extents as shown on the second level, in compliance with ISO/IEC 13346, and these extents each being stored in an empty area within one zone in the volume area, as shown on the first level of FIG. 4A.

Information for VOB#1~VOB#3 is recorded in an RTRW management file as the VOB#1 information, VOB#2 information, and VOB#3 information shown on the fifth level. In the same way as an AV file, this RTRW file is divided into a plurality of extents that are recorded in empty areas in the volume area.

The following explanation will deal with video streams, audio streams, and VOBs separately, having first explained the hierarchical structure of MPEG standard and DVD-RAM standard which define the data structures of these elements.

FIG. 4B shows the hierarchical structure of the data definitions used under MPEG standard. The data structure for MPEG standard is composed of an elementary stream layer and a system layer.

The elementary stream layer shown in FIG. 4B includes a video layer that defines the data structure of video streams, an MPEG-Audio layer that defines the data structure of an MPEG-Audio stream, an AC3 layer that defines the data structure of an audio stream under Dolby-AC3 methods, and a Linear-PCM layer that defines the data structure of an audio stream under Linear-PCM methods. The presentation start time (Presentation_Start_Time) and presentation end time (Presentation_End_Time) are defined within the elementary stream layer, though, as shown by the separate boxes used for the video layer, MPEG-Audio layer, AC-3 layer, and Linear-PCM layer, the data structures of the video stream and the audio stream are independent of each other. The presentation start time and presentation end time of a video frame and the presentation start time and presentation end time of an audio frame are similarly not synchronized.

The system layer shown in FIG. 4B defines the packs, packets, DTS and PTS that are described later. In FIG. 4B, the system layer is shown in a separate box to the video layer and audio layer, showing that the packs, packets, DTS and PTS are independent of the data structures of the video streams and audio streams.

While the above layer structure is used for MPEG standard, DVD-RAM standard includes the system layer under MPEG standard shown in FIG. 4B and an elementary stream layer. In addition to the packs, packets, DTS, and PTS described above, DVD standard defines the data structures of the VOBs shown in FIG. 4A.

(1-2-1) Video Stream

The video stream shown in FIG. 5A has a data structure that is defined by the video layer shown in FIG. 4B. Each video stream is composed of an arrangement of a plurality of sets of picture data that each correspond to one frame of video images. This picture data is a video signal according to NTSC (National Television Standards Committee) or PAL (Phase-Alternation Line) standard that has been compressed using MPEG techniques. Sets of picture data produced by compressing a video signal under NTSC standard are displayed by video frames that have a frame interval of around 33 msec (1/29.97 seconds to be precise), while sets of picture data produced by compressing a video signal under PAL standard are displayed by video frames that have a frame interval of 40 msec. The top level of FIG. 5A shows examples of video frames. In FIG. 5A, the sections indicated between the "<" and ">" symbols are each a video frame, with the "<" symbol showing the presentation start time (Presentation_Start_Time) for each video frame and the ">" symbol showing the presentation end time (Presentation_End_Time) for each video frame. This notation for video frames is also used in the following drawings. The sections which are enclosed by these symbols each include a plurality of video fields.

As shown in FIG. 5A, the picture data that should be displayed for a video frame is inputted into a decoder before the Presentation_Start_Time of the video frame and must be taken from the buffer by the decoder at the Presentation_Start_Time.

When compression is performed in accordance with MPEG standards, the spatial frequency characteristics within the image of one frame and the time-related correlation with images that are displayed before or after the one frame are used. By doing so, each set of picture data is converted into one of a Bidirectionally Predicative (B) Picture, a Predicative (P) Picture, or an Intra (I) Picture. A B picture is used where compression is performed using the time-related correlation with images that are reproduced both before and after the present image. A P picture is used where compression is performed using the time-related correlation with images that are reproduced before the present image. An I picture is used where compression is performed using the spatial frequency characteristics within one frame without using time-related correlation with other images. FIG. 5A shows B pictures, P pictures, and I pictures as all having the same size, although it should be noted that there is in fact great variation in their sizes.

When decoding a B picture or a P picture that use the time-related correlation between frames, it is necessary to refer to the images that are to be reproduced before or after the picture being decoded. For example, when decoding a B picture, the decoder has to wait until the decoding of the following image has been completed.

As a result, an MPEG video stream defines the coding order of each picture in addition to defining the display order of the pictures. In FIG. 5A, the second and third levels respectively show the sets of picture data arranged in display order and in coding order.

In FIG. 5A, the reference target of one of the B pictures is shown by the broken line to be the following I picture. In the display order, this I picture follows the B picture, though since the B picture is compressed using time-related correlation with the I picture, the decoding of the B picture has to wait for the decoding of the I picture to be completed. As a result, the coding order defines that the I picture comes before the B picture. This rearranging of the display order of pictures when generating the coding order is called "reordering".

As shown on the third level of FIG. 5A, each set of picture data is divided into 2 KB units after being arranged into the coding order. The resulting 2 KB units are stored as a video pack sequence, as shown on the bottom level of FIG. 5A.

When a sequence of B pictures and P pictures is used, problems can be caused, such as by special reproduction features that perform decoding starting midway through the video stream. To prevent such problems, an I picture is inserted into the video data at 0.5s intervals. Each sequence of picture data starting from an I picture and continuing as far as the next I picture is called a GOP (Group Of Pictures), with GOPs being defined in the system layer of MPEG standard as the unit for MPEG compression. On the third level of FIG. 5A, the dotted vertical line shows the boundary between the present GOP and the following GOP. In each GOP, the picture type of the picture data that is arranged last in the display order is a P picture, while the picture type of the picture data that is arranged first in the coding order must be an I picture.

(1-2-2) Audio Stream

The audio stream is data that has been compressed according to one of Dolby-AC3 method, MPEG method, and Linear-PCM. Like a video stream, an audio stream is generated using audio frames that have a fixed frame interval. FIG. 5B shows the correspondence between the audio frames and audio data. In detail, the reproduction period of an audio frame is 32 msec for Dolby-AC3, 24 msec for MPEG, and around 1.67 msec (1/600 sec to be precise) for Linear-PCM.

The top level of FIG. 5B shows example audio frames. In FIG. 5B, each section indicated between the "<" and ">" symbols is an audio frame, with the "<" symbol showing the presentation start time and the ">" symbol showing the presentation end time. This notation for video frames is also used in the following drawings. The audio data that should be displayed for an audio frame is inputted into a decoder before the presentation start time of the audio frame and should be taken out of the buffer by the decoder at the presentation start time.

The bottom level of FIG. 5B shows an example of how the audio data to be reproduced in each frame is stored in audio packs. In this figure, the audio data to be reproduced for audio frames f81, f82 is stored in audio pack A71, the audio data to be reproduced for audio frame f84 is stored in audio pack A72, and the audio data to be reproduced for audio frames f86, f87 is stored in audio pack A73. The audio data to be reproduced for audio frame f83 is divided between the audio pack A71 that comes first and the audio pack A72 which comes later In the same way, the audio data to be reproduced for audio frame f86 is divided between the audio pack A72 that comes first and the audio pack A73 which comes later. The reason the audio data to be reproduced for one audio frame is stored divided between two audio packs is that the boundaries between audio frames and video frames do not match the boundaries between packs. The reason that such boundaries do not match is that the data structure of packs under MPEG standard is independent of the data structure of video streams and audio streams.

1-2-3 Data Structure of VOBs

The VOBs (Video Objects) #1, #2, #3 . . . shown in FIG. 4A are program streams under ISO/IEC 13818-1 that are obtained by multiplexing a video stream and audio stream, although these VOBs do not have a program_end_code at the end.

FIG. 6A shows the detailed hierarchy for the logical construction of VOBs. This means that the logical format located on the highest level of FIG. 6A is shown in more detail in the lower levels.

The video stream that is located on the highest level in FIG. 6A is shown divided into a plurality of GOPs on the second level, with these GOPs having been shown in FIG. 5A. As in FIG. 5A, the picture data in GOP units is divided into a large number of 2 KB units. On the other hand, the audio stream shown on the left of the highest level in FIG. 6A is divided into a large number of approximately 2 KB units on the third level in the same way as in FIG. 5B. The picture data for a GOP unit that is divided into 2 KB units is interleaved with the audio stream that is similarly divided into approximately 2 KB units. This produces the pack sequence on the fourth level of FIG. 6A. This pack sequence forms a plurality of VOBUs (Video Object Units) that are shown on the fifth level, with the VOB (Video Object) shown on the sixth level being composed of a plurality of these VOBUs arranged in a time series. In FIG. 6A, the guidelines drawn using broken lines show the relations between the data in the data structures on adjacent levels. By referring to the guidelines in FIG. 6A, it can be seen that the VOBUs on the fifth level correspond to the pack sequence on the fourth level and the picture data in GOP units shown on the second level.

As can be seen by tracing the guidelines, each VOBU is a unit that includes at least one GOP composed of picture data with a reproduction period of around 0.4 to 1.0 second and audio data that has been interleaved with this picture data. At the same time, each VOBU is composed of an arrangement of video packs and audio packs under MPEG standard. The unit called a GOP under MPEG standard is defined by the system layer, although when only video data is specified by a GOP, as shown on the second level of FIG. 6A, the audio data and other data (such as sub-picture data and control data) that is multiplexed with the video data is not indicated by the GOP. Under DVD-RAM standard, the expression "VOBU" is used for a unit that corresponds to a GOP, with this unit being a general name for at least one GOP composed of picture data with a reproduction period of around 0.4 to 1.0 second and the audio data that has been interleaved with this picture data.

Here, it is possible for parts of a VOB to be deleted, with the minimum unit being one VOBU. As one example, the video stream recorded on a DVD-RAM as a VOB may contain images for a commercial that are not wanted by the user. The VOBUs in this VOB include at least one GOP that composes the commercial and audio data that is interleaved with this picture data, so that if only the VOBUs in the VOB that correspond to the commercial can be deleted, the user will then be able to watch the video stream without having to watch the commercial. Here, even if one VOBU is deleted, for example, the VOBUs on either side of the deleted VOBU will include a part of the video stream in GOP units that each have an I picture located at their front. This means that a normal decode and reproduction process are possible, even after the deletion of the VOBU.

FIG. 6B shows an example where part of a VOB is deleted. This VOB originally includes VOBU#1, VOBU#2, VOBU#3, VOBU#4 . . . VOBU#7. When the deletion of VOBU#2, VOBU#4, and VOBU#6 is indicated, the areas that were originally occupied by these VOBUs are freed and so are shown as empty areas on the second level of FIG. 6B. When the VOB is reproduced thereafter, the reproduction order is VOBU#1, VOBU#3, VOBU#5, and VOBU#7.

The video packs and audio packs included in a VOBU each have data length of 2 KB. This 2 KB size matches the sector size of a DVD-RAM, so that each video pack and audio pack is recorded in a separate sector.

The arrangement of video packs and audio packs corresponds to the arrangement of an equal number of consecutive logical sectors, and the data held within these packs is read from the DVD-RAM. This is to say, the arrangement of video packs and audio packs refers to the order in which these packs are read from the DVD-RAM. Since each video pack is approximately 2 KB in size, if the data size of the video stream for one VOBU is several hundred KB, for example, the video stream will be stored having been divided into several hundred video packs.

(1-2-3-1) Data Structure of Video Packs and Audio Packs

FIGS. 6C to 6E show the logical format of the video packs and audio packs stored in a VOBU. Normally, a plurality of packets are inserted into one pack in an MPEG system stream, although under DVD-RAM standard, the number of packets that may be inserted into one pack is restricted to one. FIG. 6C shows the logical format of a video pack arranged at the start of a VOBU. As shown in FIG. 6C, the first video pack in a VOBU is composed of a pack header, a system header, a packet header, and video data that is part of the video stream.

FIG. 6D shows the logical format of the video packs that do not come first in the VOBU. As shown in FIG. 6D, these video packs are each composed of a pack header, a packet header, and video data, with no system header.

FIG. 6E shows the logical format of the audio packs. As shown in FIG. 6E, each audio pack is composed of a pack header, a packet header, a sub_stream_id showing whether the compression method used for the audio stream included in the present pack is Linear-PCM or Dolby-AC3, and audio data that is part of the audio stream and has been compressed according to the indicated method.

(1-2-3-2-1) Buffer Control within a VOB

The video stream and audio stream are stored in video packs and audio packs as described above. However, in order to seamlessly reproduce VOBs, it is not sufficient to store the video stream and audio stream in video packs and audio packs, with it being necessary to suitably arrange of video packs and audio packs to ensure that buffer control will be uninterrupted. The buffers referred to here are input buffers for temporarily storing the video stream and the audio stream before input into a decoder. Hereinafter, the separate buffers are referred to as the video buffer and the audio buffer, with specific examples being shown as the video buffer 4b and the audio buffer 4d in FIG. 19. Uninterrupted buffer control refers to input control for the buffer that ensures that overflow or underflow do not occur for either input buffer. This is described in more detail later, but is fundamentally achieved by assigning time stamps (showing the correct times for the input, output, and display of data) that are standardized for an MPEG stream to the pack header and packet header shown in FIG. 6D and FIG. 6E. If no underflows or overflows occur for the video buffer and audio buffer, no interruptions will occur in the reproduction of the video streams and audio streams. As will be clear from this specification, it is very important that buffer control is uninterrupted.

There is a time limitation whereby each set of audio data needs to be transferred to the audio buffer and decoded by the presentation start time of the audio frame to be reproduced by such data, but since audio streams are encoded using fixed-length encoding with a relatively small amount of data, the data that is required for the reproduction of each audio frame can be stored in audio packs. These audio packs are transferred to the audio buffer during reproduction, meaning that the time limitation described above can be easily managed.

FIG. 7A is a figure showing the ideal buffer operation for the audio buffer. This figure shows how the buffer occupancy changes for a sequence of audio frames In this specification, the term "buffer occupancy" refers to the extent to which the capacity of a buffer is being used to store data. The vertical axis of FIG. 7A shows the occupancy of the audio buffer, while the horizontal axis represents time. This time axis is split into 32 msec sections, which matches the reproduction period of each audio frame in the Dolby-AC3 method. By referring to this graph, it can be seen that the occupancy of the buffer changes over time to exhibit a sawtooth pattern.

The height of each triangular tooth that composes the sawtooth pattern represents the amount of data in the part of the audio stream to be reproduced in each audio frame.

The gradient of each triangular tooth represents the transfer rate of the audio stream. This transfer rate is the same for all audio frames.

During the period corresponding to one triangular tooth, audio data is accumulated with a constant transfer rate during the display period (32 msec) of the audio frame preceding the audio frame that is reproduced by this audio data. At the presentation end time of the preceding audio frame (this time representing the decode time for the present frame), the audio data for the present frame is instantly outputted from the audio buffer. The reason a sawtooth pattern is achieved is that the processing from the storage in the buffer to output from the buffer is continually repeated.

As one example, assume that transfer of an audio stream to the audio buffer begins at time T1. This audio data should be reproduced at time T2, so that amount of data stored in the audio buffer will gradually increase between time T1 to time T2 due to the transfer of this audio data. However, because this transferred audio data is output at the presentation end time of the preceding audio frame, the audio buffer will be cleared of audio data at that point, so that the occupancy of the audio buffer returns to 0. In FIG. 7A, the same pattern is repeated between time T2 and time T3, between time T3 and time T4, and so on.

The buffer operation shown in FIG. 7A is the ideal buffer operation state for the premise where the audio data to be reproduced in each audio frame is stored in one audio pack. In reality, however, it is normal for audio data that will be reproduced in several different audio frames to be stored in one audio pack, as shown in FIG. 5B. FIG. 7B shows a more realistic operation for the audio buffer. In this figure, audio pack A31 stores audio data A21, A22, and A23 which should respectively be decoded by the presentation end times of audio frame f21, f22, and f23. As shown in FIG. 7B, only the decoding of audio data A21 will be completed at the presentation end time of audio frame f21, with the decoding of the other sets of audio data f22 and f23 being respectively completed by the presentation end times of the following audio frames f22 and f23. Of the audio frames included in this audio pack, audio data A21 should be decoded first, with the decoding of this audio data needing to be completed by the presentation end time of audio frame f21. Accordingly, this audio pack should be read from the DVD-RAM during the reproduction period of the audio frame f21.

Video streams are encoded with variable code length due to the large differences in code size between the different types of pictures (I pictures, P pictures, and B pictures) used in compression methods that use time-related correlation. Video streams also include a significant amount of data, so that it is difficult to complete the transfer of the picture data for a video frame, especially the picture data for an I picture, by the presentation end time of the preceding video frame.

FIG. 7C is a graph showing video frames and the occupancy of the video buffer. In FIG. 7C, the vertical axis represents the occupancy in the video buffer, while the horizontal axis represents time. This horizontal axis is split into 33 msec sections which each match the reproduction period of a video frame under NTSC standard. By referring to this graph, it can be seen that the changes in the occupancy of the video buffer changes over time to exhibit a sawtooth pattern.

The height of each triangular tooth that composes the sawtooth pattern represents the amount of data in the part of the video stream to be reproduced in each video frame. As mentioned before, the amount of data in each video frame is not equal, since the amount of code for each video frame is dynamically assigned according to the complexity of the frame.

The gradient of each triangular tooth shows the transfer rate of the video stream. The approximate transfer rate of the video stream is calculated by subtracting the output rate of the audio stream from the output rate of the track buffer. This transfer rate is the same during each frame period.

During the period corresponding to one triangular tooth in FIG. 7C, picture data is accumulated with a constant transfer rate during the display period (33 msec) of the video frame preceding the video frame that is reproduced by this picture data. At the presentation end time of the preceding video frame (this time representing the decode time for the present picture data), the picture data for the present frame is instantly outputted from the video buffer. The reason a sawtooth pattern is achieved is that the processing from the storage in the video buffer to output from the video buffer is continually repeated.

When the image to be displayed in a given video frame is complex, a larger amount of code needs to be assigned to this frame. When a larger amount of code is assigned, this means that the pre-storage of data in the video buffer needs to be commenced well in advance.

Normally, the period from the transfer start time, at which the transfer of picture data into the video buffer is commenced, to the decode time for the picture data is called the VBV (Video Buffer Verify) delay. In general, the more complex the image, the larger the amount of assigned code and the longer the VBV delay.

As can be seen from FIG. 7C, the transfer of the picture data that is decoded at the presentation end time T16 of the preceding video frame is commenced at time T11. The transfer of picture data that is decoded at the presentation end time T18 of the preceding video frame, meanwhile, is commenced at time T12. The transfer of the picture data for other video frames can be seen to be commenced at times T14, T15, T17, T19, T20, and T21.

FIG. 7D shows the transfer of sets of picture data in more detail. When considering the situation in FIG. 7C, the transfer of the picture data to be decoded at time T2 4 in FIG. 7D needs to be completed in the "Tf_Period" between the start time T23 of the "VBV delay" and the start of the transfer of the picture data for the next video frame to be reproduced The increase in the occupancy of the buffer that occurs from this Tf_Period onwards is caused by the transfer of the picture data for the image to be displayed in the next video frame.

The picture data accumulated in the video buffer waits for the time T24 at which the picture data is to be decoded. At the decode time T24, the image A is decoded, which clears part of the picture data stored in the video buffer, thereby reducing the total occupancy of the video buffer.

When considering the above situation, it can be seen that while it is sufficient for the transfer of audio data to be reproduced in a certain audio frame to be commenced around one frame in advance, the transfer of picture data for a certain video frame needs to be commenced well before the decode time of such picture data. In other words, the audio data which should be reproduced in a certain audio frame should be inputted into the audio buffer at around the same time as picture data for a video frame that is well in advance of the audio frame. This means that when the audio stream and video stream are multiplexed into an MPEG stream, audio data needs to multiplexed well before the corresponding picture data. As a result, the video data and audio data in a VOBU are in fact composed of video data that will be reproduced later and audio data.

The arrangement of the plurality of video packs and audio packs has been described as reflecting the transfer order of the data included in the packs. Accordingly, to have the audio data to be reproduced in an audio frame read at approximately the same time as the picture data to be reproduced in a video frame that is well ahead of the audio frame, the audio packs and video packs that store the audio data and picture data in question need to be arranged into a same part of the VOB.

Figure 8A:
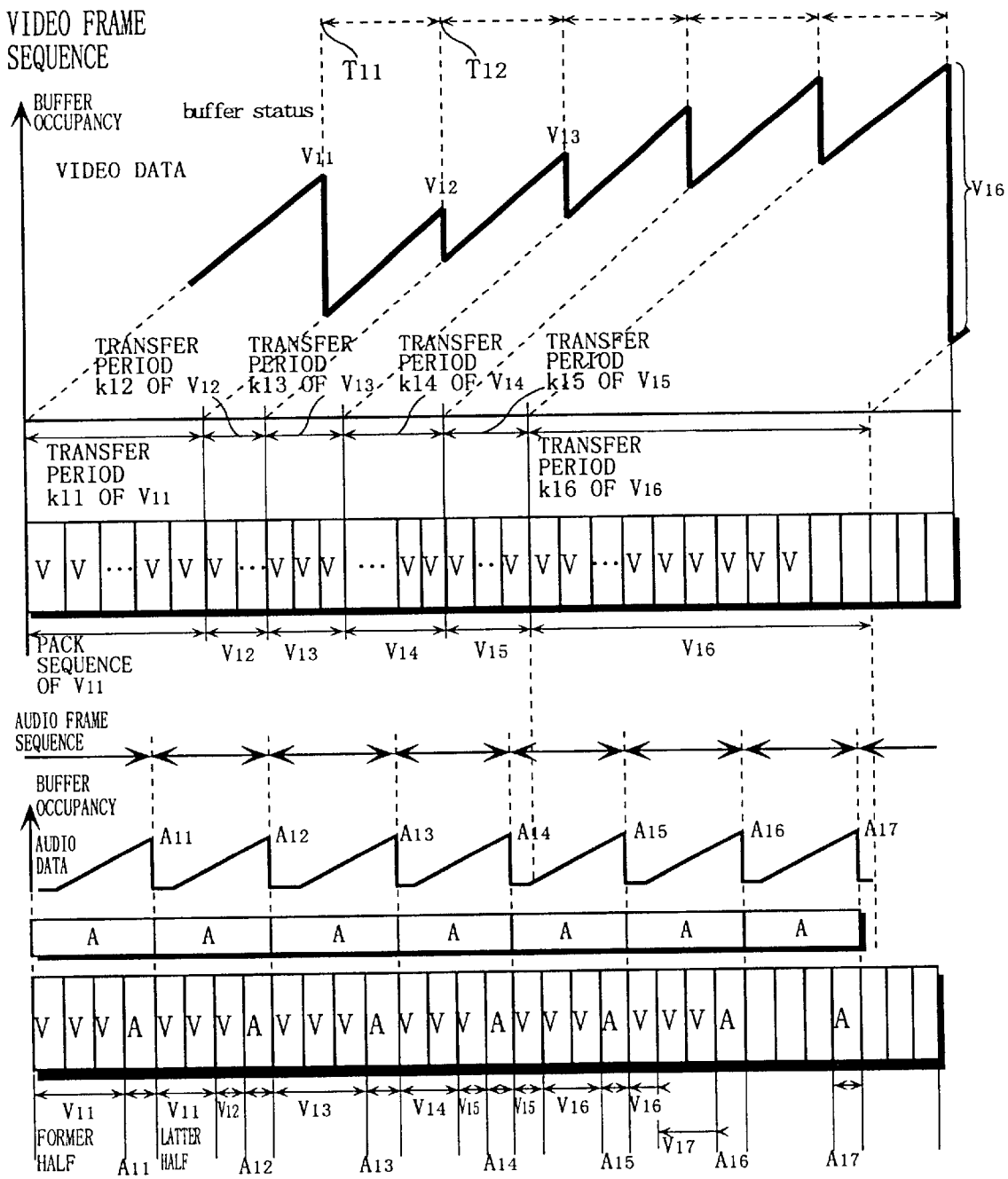
FIG. 8A shows how audio packs, which store the audio data to be reproduced in a plurality of audio frames, and video packs, which store the picture data that is to be reproduced in a plurality of video frames, may be recorded.

FIG. 8A shows how the audio packs, which store audio data to be reproduced in each audio frame, and the video packs, which show the picture data to be reproduced in each video frame, should be stored.

Figure 8B:
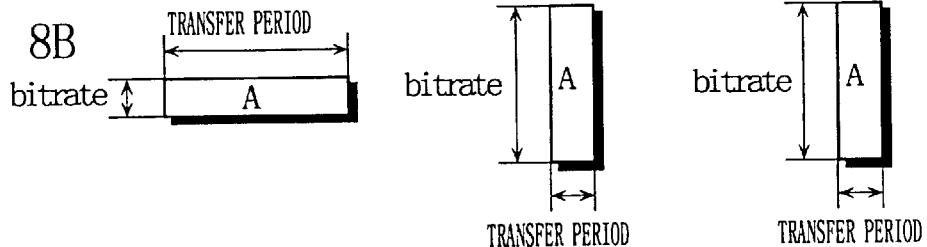
FIG. 8B shows a key to the notation used in FIG. 8A.

In FIG. 8A, the rectangles marked with "V" and "A" show each video pack and audio pack. FIG. 8B shows the meaning of the width and height of each of these rectangles. As shown in FIG. 8B, the height of each rectangle shows the bitrate used to transfer the pack. As a result, packs that have a tall height are transferred with a high bitrate, which means that the pack can be inputted into a buffer relatively quickly. Packs that are not tall, however, are transferred with a low bitrate, and so take a relatively long time to be transferred into the buffer.

The picture data V11 that is decoded at time T11 in FIG. 8B is transferred during the period k11. Since the transfer and decoding of the audio data A11 are performed during this period k11, the video packs that store the video data V11 and the audio pack that stores the audio data A11 are arranged into a similar position, as shown in the lower part of FIG. 8A.

The picture data V12 that is decoded at time T12 in FIG. 8A is transferred during the period k12. Since the transfer and decoding of the audio data A12 are performed during this period k12, the video packs that store the video data V12 and the audio pack that stores the audio data A12 are arranged into a similar position, as shown in the lower part of FIG. 8A.

In the same way, the audio data A13, A14, and A15 are arranged into similar positions as the picture data V13 and V14 whose transfer is commenced at the output time of these sets of audio data.

Note that when picture data with a large amount of assigned code, such as picture data V16, is accumulated in the buffer, a plurality of audio data A15, A16, and A17 are multiplexed during k16 which is the transfer period of the picture data V16.

Figure 9:
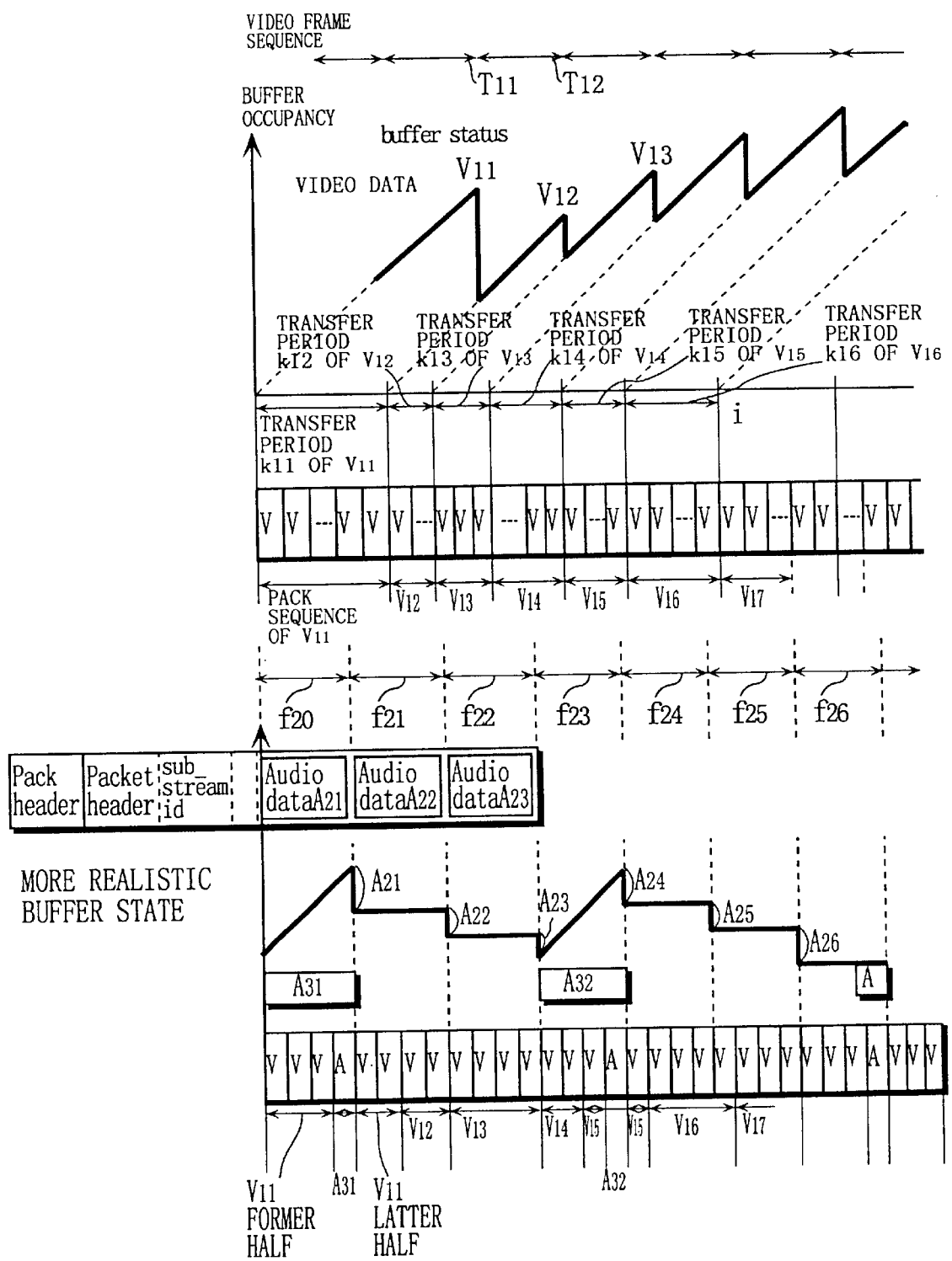
FIG. 9 shows how audio packs, which store the audio data to be reproduced in a plurality of audio frames, and video packs, which store the picture data that is to be reproduced in a plurality of video frames, may be recorded.

FIG. 9 shows how audio packs that store a plurality of sets of audio data to be reproduced in a plurality of audio frames and video packs that store picture data to be reproduced in each video frame may be stored. In FIG. 9, audio pack A31 stores the audio data A21, A22, and A23 that is to be reproduced for audio frames f21, f22, and f23. Of the audio data that is stored in the audio pack A31, the first audio data to be decoded is the audio data A21. Since the audio data A21 needs to be decoded at the presentation end time of the audio frame f20, this audio data A21 needs to be read from the DVD-RAM together with the picture data V11 whose transfer is performed during the same period (period k11) as the audio frame f20. As a result, the audio pack A31 is arranged near the video packs that store the picture data V11.

When considering that an audio pack can store audio data which should be decoded for several audio frames, and that audio packs are arranged in similar positions to video packs that are composed of picture data which should be decoded in the future, it may seem that the audio data and picture data to be decoded at the same time should be stored in audio packs and video packs that are at distant positions within a VOB. However, there will be no cases where video packs which store picture data that will be decoded one second or more later are stored alongside audio data that should be decoded at the same time. This is because MPEG standard defines the upper limit for the time data can be accumulated in the buffer, with all data having to be outputted from the buffer within one second of being inputted into the buffer. This restriction is called the "one-second rule" for MPEG standard. Because of the one-second rule, even if audio data and picture data that are to be decoded at the same time are arranged into distant positions, the audio pack that stores the audio data to be decoded at a given time will definitely be stored within a range of 3 VOBUs from the VOBU that stores the picture data to be decoded at the same given time.

(1-2-3-2-2) Buffer Control Between VOBs

Figure 10A:
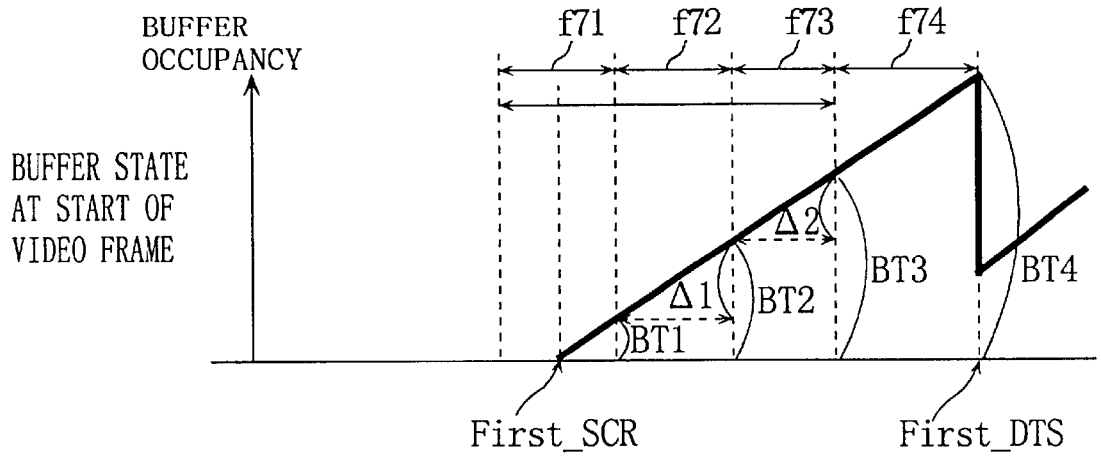
FIG. 10A shows the transition in the buffer state during the first part of a video stream.

The following explanation deals with the buffer control that is performed when reproducing two or more VOBs successively. FIG. 10A shows the buffer state for the first part of a video stream. In FIG. 10A, the input of the pack that includes the picture data is commenced at the point indicated as First_SCR during the video frame f71, with the amount of data shown as BT2 being transferred by the presentation end time of the video frame f72. Similarly, the amount of data BT3 has been accumulated in the buffer by the presentation end time of the video frame f73. This data is read from the video buffer by the video decoder at the presentation end time of the video frame f74, with this time being indicated hereafter by the notation First_DTS. In this way, the state of the buffer changes as shown in FIG. 10A, with no data for a preceding video stream at the start and the accumulated amount of data gradually increasing to trace a triangular shape. Note here that FIG. 10A is drawn with the premise that the video pack is inputted at the time First_SCR, although when the pack positioned at the front of a VOB is a different pack, the start of the increase in the amount of buffered data will not match the time First_SCR. Also, the reason Last_SCR is positioned midway through a video frame is that the data structure of the pack is unrelated to the data structure of the video data.

Figure 10B:
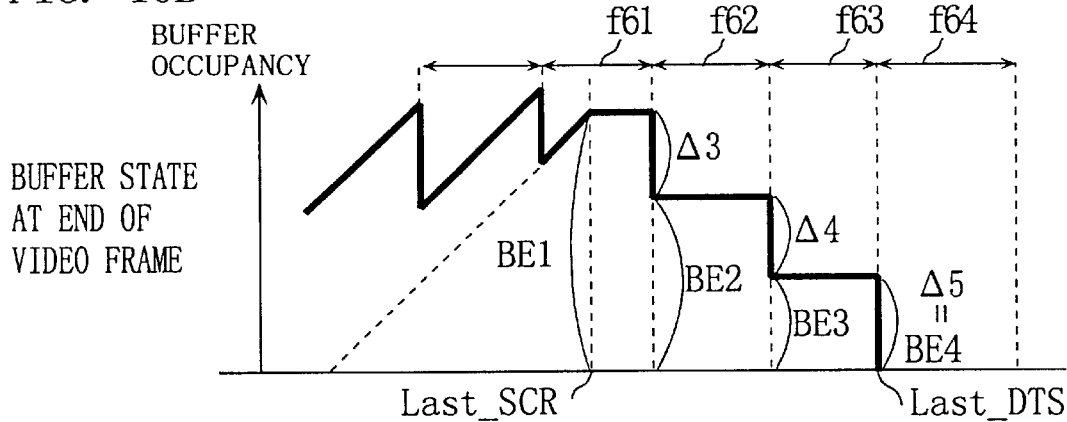
FIG. 10B shows the transition in the buffer state during the last part of a video stream.

FIG. 10B shows the buffer state during the latter part of a video stream. In this drawing, the input of data into the video buffer is completed at the time Last_SCR that is located midway through video frame f61. After this, only the data amount Δ3 of the accumulated video data is taken from video buffer at the presentation end time of video frame f61. Following this, it can be seen that only the data amount Δ4 is taken from video buffer at the presentation end time of video frame f62, and only the data amount Δ5 is taken at the presentation end time of video frame f63, this latter time also being called the Last_DTS.

For the latter part of a VOB, the input of video packs and audio packs is completed by the time shown as Last_SCR in FIG. 10B, so that the amount of data stored in the video buffer will thereafter decrease in steps at the decoding of video frames f61, f62, f63 and f64. As a result, the occupancy of the buffer decreases in steps at the end of a video stream, as shown in FIG. 10B.

Figure 10C:
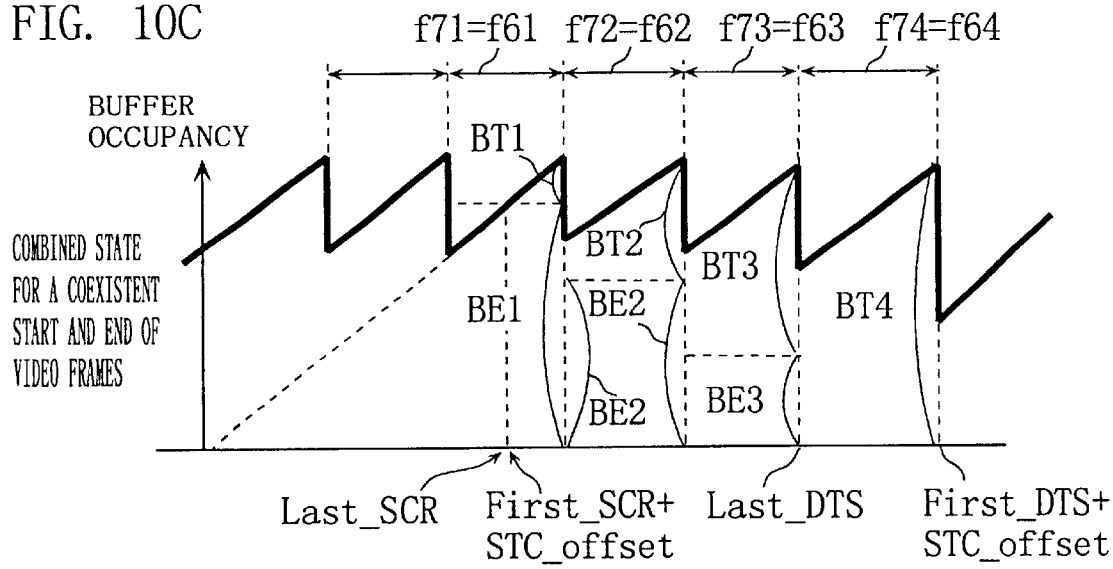
FIG. 10C shows the transition in the buffer state across two VOBs, when the video stream whose last part causes the buffer state shown in FIG. 10B is seamlessly linked to the video stream whose former part causes the buffer state shown in FIG. 10A.

FIG. 10C shows the buffer state across VOBs. In more detail, this drawing shows the case where the latter part of a video stream that causes the buffer state shown in FIG. 10B is seamlessly linked to the former part of another video stream that causes the buffer state shown in FIG. 10A.

When these two video streams are seamlessly linked, the First_DTS of the former part of the second video stream to be reproduced needs to follow after the video frame with the Last_DTS of the latter part of the first video stream. In other words, the decoding of the first video frame in the second video stream needs to be performed after the decoding of the video frame with the final decode time in the first video stream. If the interval between the Last_DTS of the latter part of the first video stream and the First_DTS of the former part of the second video stream is equivalent to one video frame, the picture data of the latter part of the first video stream will coexist in the video buffer with the picture data of the former part of the second video stream, as shown in FIG. 10C.

In FIG. 10C, it is assumed that the video frames f71, f72, and f73 shown in FIG. 10A match the video frames f61, f62, and f63 shown in FIG. 10B. In such conditions, at the presentation end time of video frame f71, the picture data BE1 of the latter part of the first video stream and the picture data BT1 of the former part of the second video stream are present in the video buffer. At the presentation end time of the video frame f72, the picture data BE2 of the latter part of the first video stream and the picture data BT2 of the former part of the second video stream are present in the video buffer. At the presentation end time of the video frame f73, the picture data BE3 of the latter part of the first video stream and the picture data BT3 of the former part of the second video stream are present in the video buffer. As the decoding of video frames progresses, the picture data of the latter part of the first video stream decreases in steps, while the picture data of the former part of the second video stream gradually increases These decreases and increases occur concurrently, so that the buffer state shown in FIG. 10C exhibits a sawtooth pattern which closely resembles the buffer state shown for VOBs in FIG. 7C.

It should be noted here that each of total BT1+BE1 of the data amount BT1 and the data amount BE1, total BT2+BE2 of the data amount BT2 and the data amount BE2, and total BT3+BE3 of the data amount BT3 and the data amount BE3 is below the capacity of the video buffer. Here, if any of these totals BT1+BE1, BT2+BE2 or BT3+BE3 exceeds the capacity of the video buffer, an overflow will occur in the video buffer. If the highest of these totals is expressed as Bv1+Bv2, this value Bv1+Bv2 must be within the capacity of the video buffer.

(1-2-3-3) Pack Header System Header, Packet Header

The information for the buffer control described above is written as time stamps in the pack header, the system header, and the packet header shown in FIGS. 6F~6H. FIGS. 6F~6H show the logical formats of the pack header, the system header, and the packet header. As shown in FIG. 6F, the pack header includes a Pack_Start_Code, an SCR (System Clock Reference) showing the time at which the data stored in the present pack should be inputted into the video buffer and audio buffer, and a Program_max_rate In a VOB, the first SCR is set as the initial value of the STC (System Time Clock) that is provided as a standard feature in a decoder under MPEG standard.

The system header shown in FIG. 6G is only appended to the video pack that is located at the start of a VOBU. This system header includes maximum rate information (shown as the "Rate.bound.info" in FIG. 6G) showing the transfer rate to be requested of the reproduction apparatus when inputting the data, and buffer size information (shown as "Buffer.bound.into" in FIG. 6G) showing the highest buffer size to be requested of the reproduction apparatus when inputting the data in the VOBU.

The packet header shown in FIG. 6H includes a DTS (Decoding Time Stamp) showing the decoding time and, for a video stream, a PTS (Presentation Time Stamp) shown the time at which data should be outputted after reordering the decoded video stream. The PTS and DTS are set based on the presentation start time of a video frame or audio frame. In the data construction, a PTS and a DTS can be set for all packs, although it is rare for such information for picture data that should be displayed for all the video frames. It is common for such information to be assigned once in a GOP, which is to say once every 0.5 seconds of reproduction time. Every video pack and audio pack is assigned an SCR, however.

For a video stream, it is common for a PTS to be assigned to each video frame in a GOP, though for an audio stream, it is common for a PTS to be assigned every one or two audio frames. For an audio stream, there will be no difference between the display order and the coding order, so that no DTS is required. When one audio pack stores all of the audio data that is to be reproduced for two or more audio frames, a PTS is written at the start of the audio pack.

As one example, the audio pack A71 shown in FIG. 5B may be given the presentation start time of the audio frame f81 as the PTS. On the other hand, the audio pack A72 that stores the divided audio frame f83 must be given the presentation start time of the audio frame f84, not the presentation start time of the audio frame f83, as the PTS. This is also the case for the audio pack A73, which must be given the presentation start time of the audio frame f86, not the presentation start time of the audio frame f85, as the PTS.

(1-2-3-4) Continuity of Time Stamps

The following is an explanation of the values that are set as the PTS, DTS, and SCR for video packs and audio packs, as shown in FIGS. 6F to 6H.

FIG. 11A is a graph showing the values of the SCR of packs included in a VOB in the order that packs are arranged in the VOB. The horizontal axis shows the order of the video packs, with the vertical axis showing the value of the SCR which is assigned to each pack.

The first value of the SCR in FIG. 11A is not zero, and is instead a predetermined value shown as Init1. The reason the first value of the SCR is not zero is that the VOBs that are processed by a video editing apparatus are subjected to many editing operations, so that there are many cases where the first part of a VOB will have already been deleted It should be obvious that the initial value of the SCR of a VOB that has just been encoded will be zero, although the present embodiment assumes that the initial value of the SCR for a VOB is not zero, as shown in FIG. 11A.

In FIG. 11A, the closer a video pack is to the start of the VOB, the lower the value of the SCR of that video pack, and the further a video pack is from the start of the VOB, the higher the value of the SCR of that video pack. This characteristic is referred to as the "continuity of time stamps", with the same continuity being exhibited by the DTS. Though the coding order of video packs is such that a latter video pack may in fact be displayed before a former video pack, meaning that the PTS of the latter pack has a lower value than the former pack, the PTS will still exhibit a rough continuity in the same way as the SCR and the DTS.

The SCR of audio packs exhibits continuity in the same way as for video packs.

The continuity of the SCR, DTS, and PTS is a prerequisite for the proper decoding of VOBs. The following is an explanation of the values used for SCR to maintain this continuity.

In FIG. 11B, the straight line showing the values of SCR in the section B is an extension of the straight line showing the values of SCR in the section A. This means that there is continuity between the values of SCR between section A and section B.

In FIG. 11C, the first value of SCR in the period D is higher than the largest value on the straight line showing the values of SCR in the section C. However, in this case also, the closer a pack is to the start of the VOB, the lower the value of SCR, and the further a video pack is from the start of the VOB, the higher the value of SCR. This means that there is continuity of the time stamps between section C and section D.

Here, when the difference in time stamps is large, these stamps are naturally non-continuous. Under MPEG standard, the difference between pairs of time stamps, such as SCRs, must not exceed 0.7 seconds, so that areas in the data where this value is exceeded are treated as being non-continuous.

In FIG. 11D, the last value of SCR in section E is higher than the first value on the straight line showing the values of SCR in section F. In this case, the continuity wherein the closer a pack is to the start of the VOB, the lower the value of SCR, and the further a video pack is from the start of the VOB, the higher the value of SCR is no longer valid, so that there is no continuity in the time stamps between section E and section F.

When there is no continuity in the time stamps, as the example of section E and section F, the former and latter sections are managed as separate VOBs.

It should be noted that the details of buffer control between VOBs and the multiplexing method are described in detail in the PCT publications "WO 97/13367" and "WO 97/13363".

(1-2-4) AV Files

An AV file is a file that records at least one VOB that is to be reproduced consecutively. When a plurality of VOBs are held within one AV file, these VOBs are reproduced in the order they are stored in the AV file. For the example in FIG. 4, the three VOBs, VOB#1, VOB#2, and VOB#3, are stored in one AV file, with these VOBs being reproduced in the order VOB#1→VOB#2→VOB#3. When VOBs are stored in this way, the buffer state for the video stream positioned at the end of the first VOB to be reproduced and the video stream positioned at the start of the next VOB to be reproduced will be as shown in FIG. 10C. Here, if the highest amount data Bv1+Bv2 to be stored in the buffer exceeds the capacity of the buffer, or if the first time stamp in the VOB to be reproduced second is not continuous with the last time stamp in the VOB to be reproduced first, there is the danger that seamless reproduction will not be possible for the first and second VOBs.

(1-3) Logical Construction of the RTRW Management File

The following is an explanation of the RTRW management file The RTRW management file is information showing attributes for each VOB stored in an AV file.

Figure 12A:
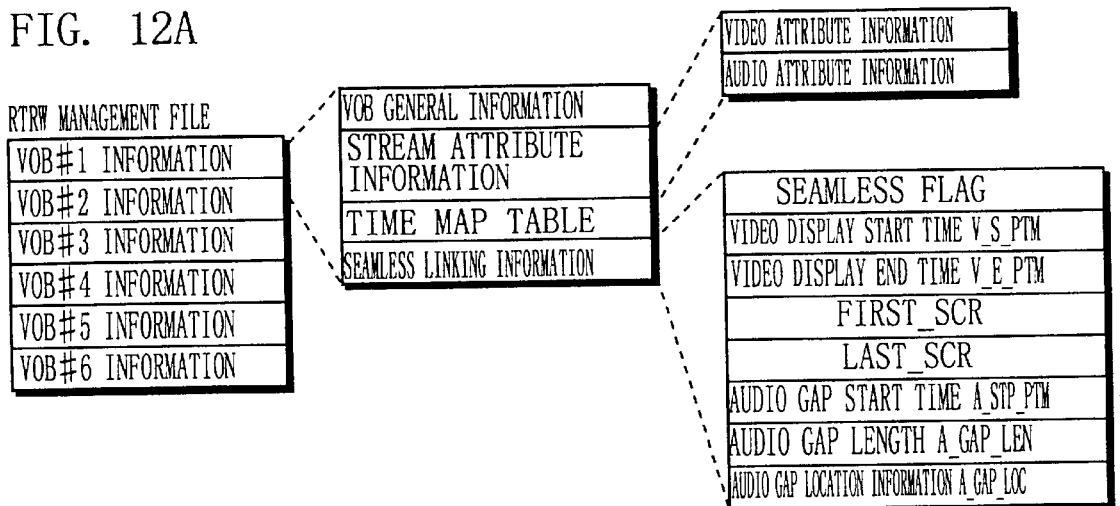
FIG. 12A shows a detailed expansion of the data hierarchy in the RTRW management file.

FIG. 12A shows the detailed hierarchical structure in which data is stored in the RTRW management file. The logical format shown on the right of FIG. 12A is a detailed expansion of the data shown on the left, with the broken lines serving as guidelines to clarify which parts of the data structure are being expanded.

Figure 12B:
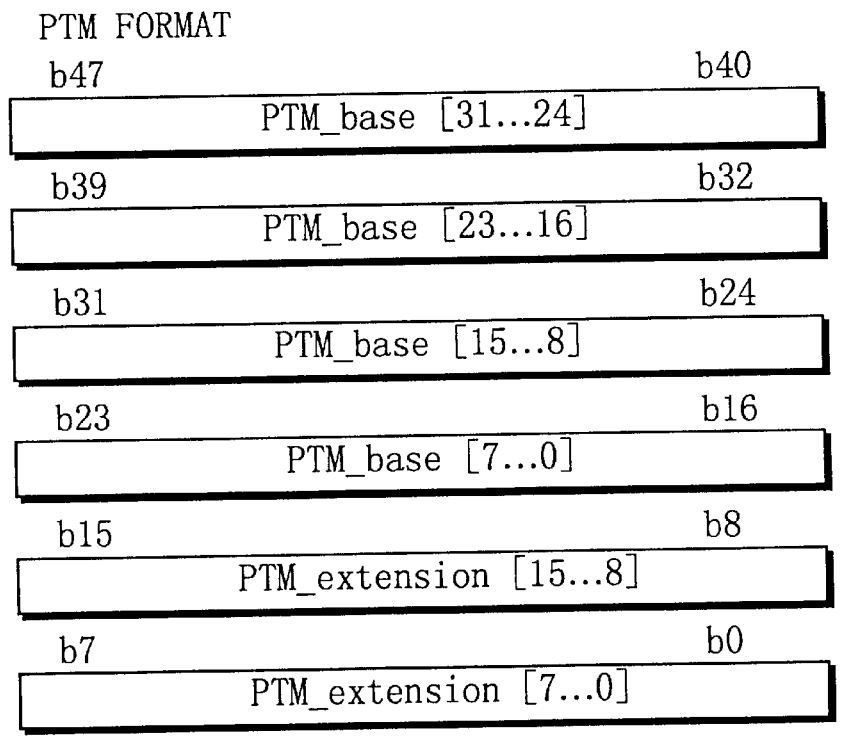
FIG. 12B shows the PTM descriptor format.
Figure 12C:
FIG. 12C shows the data construction of the audio gap location information.

By referring to the data structure in FIG. 12B, it can be seen that the RTRW management file records VOB information for VOB#1, VOB#2, VOB#3, . . . VOB#6, and that this VOB information is composed of VOB general information, stream attribute information, a time map table, and seamless linking information.

(1-3-1) VOB General Information

The "VOB general information" refers to the VOB-ID that is uniquely assigned to each VOB in an AV file and to the VOB reproduction period information of each VOB.

(1-3-2) Steam Attribute Information

The stream attribute information is composed of video attribute information and audio attribute information.

The video attribute information includes video format information that indicates one of MPEG2 and MPEG1, and a display method that indicates one of NTSC and PAL/SECAM. When the video attribute information indicates NTSC, an indication such as "720×480" or "352×240" may be given as the display resolution, and an indication such as "4:3" or "16:9" may be given as the aspect ratio. The presence/absence of copy prevention control for an analog video signal may also be indicated, as may the presence/absence of a copy guard for a video cassette recorder which damages the AGC circuit of a VTR by changing the signal amplitude during the blank period of a video signal.

The audio attribute information shows the encoding method which may be one of MPEG2, Dolby Digital, or Linear-PCM, the sampling frequency (such as 48 kHz), a bitrate when a fixed bitrate is used, or a bitrate marked with "VBR" when a variable bitrate is used.

The time map table shows the size of each VOBU that composes the VOB and the reproduction period of each VOBU. To improve accessing capabilities, representative VOBUs are selected at a predetermined interval, such as a multiple of ten seconds, and the addresses and reproduction times of these representative VOBUs are given relative to the start of the VOR.

(1-3-3) Seamless Linking Information

The seamless linking information is information which enables the consecutive reproduction of the plurality of VOBs in the AV file to be performed seamlessly. This seamless linking information includes the seamless flag, the video presentation start time VOB_V_S_PTM, the video presentation end time VOB_V_E_PTM, the First_SCR, the Last_SCR, the audio gap start time A_STP_PTM, the audio gap length A_GAP_LEN, and the audio gap location information A_GAP_LOC.

(1-3-3-1) Seamless Flag

The seamless flag is a flag showing whether the VOB corresponding the present seamless linking information is reproduced seamlessly following the end of reproduction of the VOB positioned immediately before the present VOB in the AV file. When this flag is set at "01", the reproduction of the present VOB (the latter VOB) is performed seamlessly, while when the flag is set at "00", the reproduction of the present VOB is not produced seamlessly.

In order to perform the reproduction of a plurality of VOBs seamlessly, the relationship between the former VOB and the latter VOB must be as follows.

(1) Both VOBs must use the same display method (NTSC, PAL, etc.) for the video stream as given in the video attribute information.

(2) Both VOBs must use the same encoding method (AC-3, MPEG, Linear-PCM) for the audio stream as given in the audio attribute information.

Failure to comply with the above conditions prevents seamless reproduction from being performed. When a different display method is used for a video stream or a different encoding method is used for an audio stream, the video encoder and audio encoder will have to stop their respective operations to switch the display method, decoding method, and/or bit rate.

As one example, when two audio streams that are to be reproduced consecutively are such that the former audio stream has been encoded according to AC-3 methods and the latter according to MPEG methods, an audio decoder will have to stop decoding to switch the stream attributes when the stream switches from AC-3 to MPEG. A similar situation also occurs for a video decoder when the video stream changes.

The seamless flag is only set to "01" when both of the above conditions (1) and (2) are satisfied. If any one of the above conditions (1) and (2) is not satisfied, the seamless flag is set at "00".

(1-3-3-2) Video Presentation Start Time VOB_V_S_PTM

The video presentation start time VOB_V_S_PTM shows the time at which reproduction of the first video field in the video streams composing a VOB is to start. This time is given in PTM descriptor format.

PTM descriptor format is a format whereby the time is expressed with an accuracy of $1/27,000,000$ seconds or $1/90,000$ seconds (=$300/27,000,000$ seconds). This accuracy of $1/90,000$ seconds is set considering the common multiples of the frame frequencies of NTSC signals, PAL signals, Dolby AC-3, and MPEG Audio, while the accuracy of $1/27,000,000$ seconds is set considering the frequency of the STC.

FIG. 12B shows the PTM descriptor format. In this drawing, the PTM descriptor format is composed of a base element (PTM_base) that shows the quotient when the presentation start time is divided by $1/90,000$ seconds and an extension element (PTM_extension) that shows the remainder when the same presentation start time is divided by the base element to an accuracy of $1/27,000,000$ seconds.

(1-3-3-3) Video Presentation End Time VOB_V_E_PTM

The video presentation end time VOB_V_E_PTM shows the time at which reproduction of the last video field in the video streams composing a VOB ends. This time is also given in PTM descriptor format.

(1-3-3-4) Relation between Video Presentation Start Time VOB_V_S_PTM and Video Presentation End Time VOB_V_E_PTM The following is an explanation of the relation between the VOB_V_E_PTM of a former VOB and the VOB_V_S_PTM of a latter VOB, when the former VOB and latter VOB are to be seamlessly reproduced.

Since the latter VOB is fundamentally to be reproduced after all of the video packs included in the former VOB, so that if the VOB_V_S_PTM of the latter VOB is not equal to the VOB_V_E_PTM of the former VOB, the time stamps will not be continuous, meaning that the former VOB and latter VOB cannot be reproduced seamlessly. However, when the two VOBs have been encoded completely separately, the encoder will have assigned a unique time stamp to each video pack and audio pack during encoding, so that the condition for the VOB_V_S_PTM of the latter VOB to be equal to the VOB_V_E_PTM of the former VOB becomes problematic.

Figure 13:
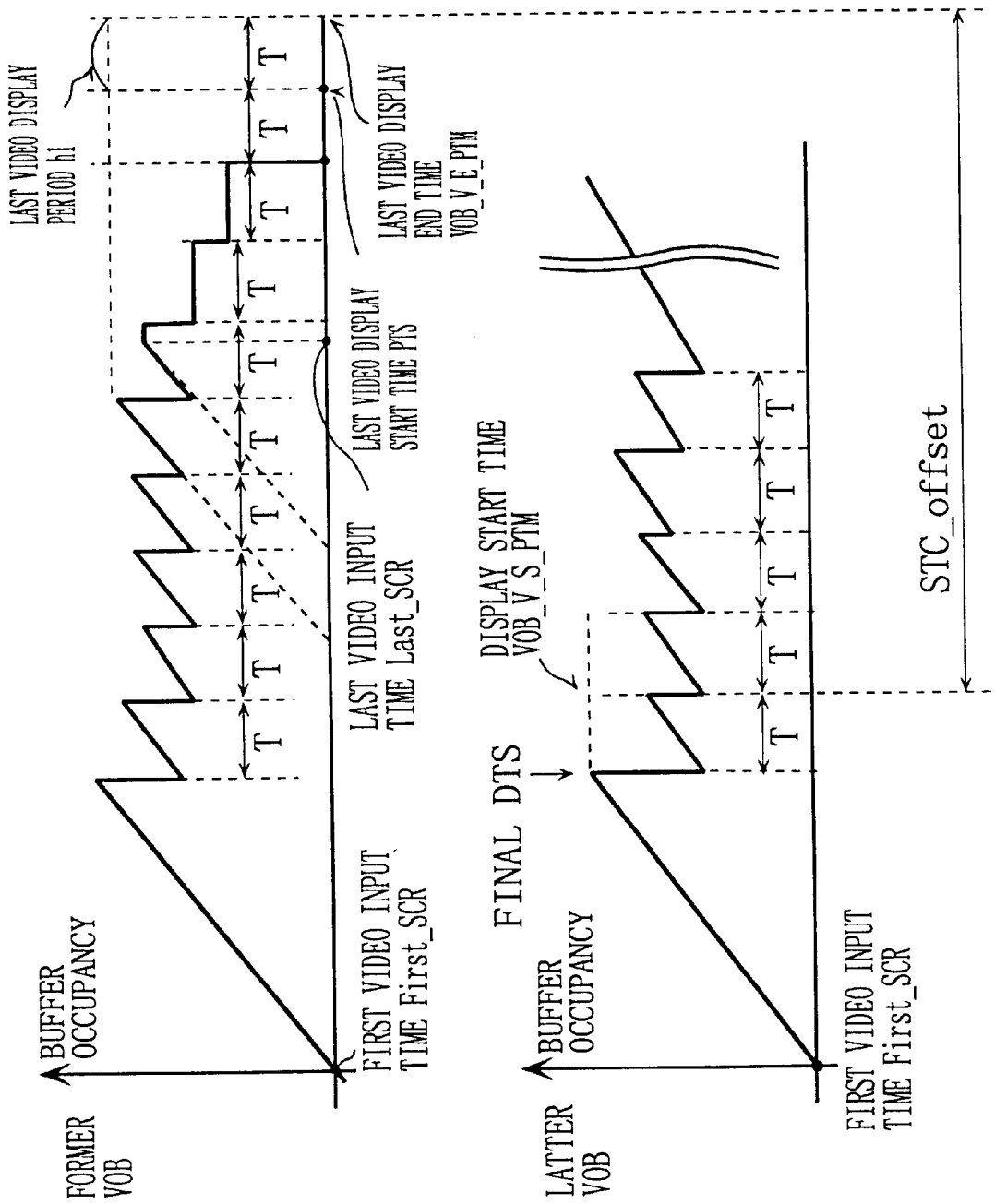
FIG. 13 shows the buffer occupancy for each of a former VOB and a latter VOB.

FIG. 13 shows the state of the buffer for the former VOB and the latter VOB. In the graphs in FIG. 13, the vertical axis shows the occupancy of the buffer while the horizontal axis represents time. The times representing the SCR, PTS, video presentation end time VOB_V_E_PTM, and video presentation start time VOB_V_S_PTM have been plotted. In FIG. 13, the picture data that is reproduced last in the former VOB is inputted into the video buffer by the time indicated as Last_SCR of the video pack composed by this picture data, with the reproduction processing of this data waiting until the PTS that is the presentation start time is reached (if the last pack inputted into an MPEG decoder is an audio or other pack, this condition is not valid). Here, video_presentation_end_time VOB_V_E_PTM shows the point where the display period h1 of this final video has expired starting from this PTS. This display period h1 is the period taken to draw an image from the first field that composes one screen-sized image to the final field.

In the lower part of FIG. 13, the picture data that should be displayed first in the latter VOB is inputted into the video buffer at the time First_SCR, with the reproduction of this data waiting until the PTS indicating the presentation start time. In this drawing, the video packs of the former and latter VOBs are respectively assigned an SCR with the first value "0", a video presentation end time VOB_V_E_PTM, and a video presentation start time VOB_V_S_PTM. For this example, it can be seen that VOB_V_S_PTM of latter VOB<VOB_V_E_PTM of former VOB.

Figure 19:
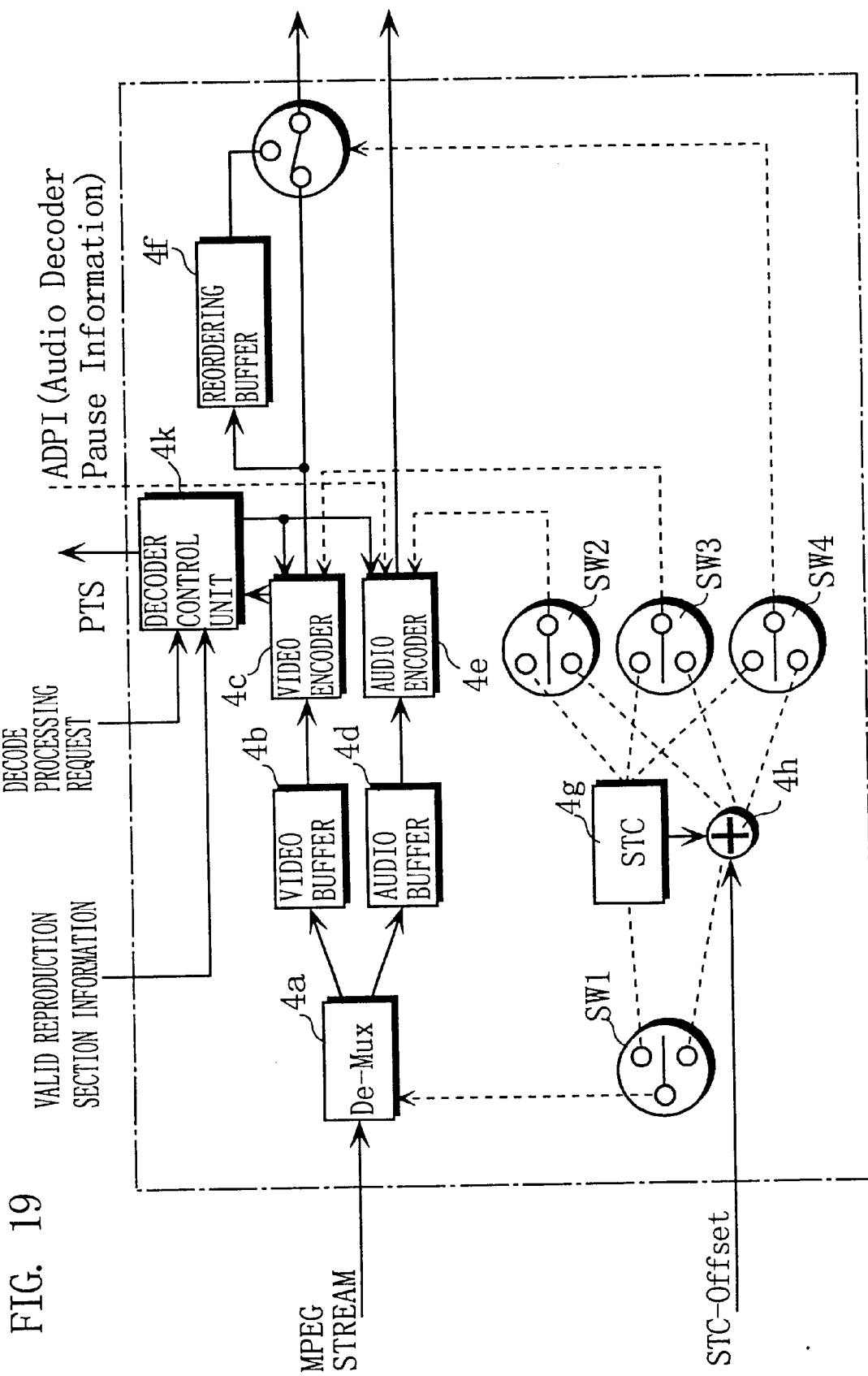
FIG. 19 shows the construction of the MPEG decoder 4.

The following is an explanation of why seamless reproduction is possible even for the condition VOB_V_S_PTM of latter VOB<VOB_V_E_PTM of former VOB. Under DVD-RAM standard, an extended STD model (hereinafter "E-STD") is defined as the standard model for the reproduction apparatus, as shown in FIG. 19. In general, an MPEG decoder has an STC (System Time Clock) for measuring a standard time, with the video decoder and audio decoder referring to the standard time shown by the STC to perform decode processing and reproduction processing. In addition to the STC, however, E-STD has an adder for adding an offset to the standard time outputted by the STC, so that either of the standard time outputted by the STC and the addition result of the adder may be selected and outputted to the video decoder and the audio decoder. With this construction, even if the time stamps for different VOBs are not continuous, the output of the adder may be supplied to the decoder to have the decoder behave as if the time stamps of the VOBs were continuous. As a result, seamless reproduction is still possible even when the VOB_V_E_PTM of former VOB and the VOB_V_S_PTM of latter VOB are not continuous, as in the above example.

The difference between the VOB_V_S_PTM of latter VOB and the VOB_V_E_PTM of former VOB can be used as the offset to be added by the adder. This is normally referred to as the "STC_offset". As a result, a reproduction apparatus of the E-STD model finds the STC_offset according to the formula shown below which uses the VOB_V_S_PTM of latter VOB and the VOB_V_E_PTM of former VOB. After finding the STC_offset, the reproduction apparatus then sets the result in the adder.

STC_offset=VOB_V_E_PTM of former VOB−VOB_V_S_PTM of latter VOB

The reason the VOB_V_S_PTM of latter VOB and the VOB_V_E_PTM of former VOB are written in the seamless linking information is to enable the decoder to perform the above calculation and set the STC_set in the adder.

FIG. 11E is a graph that has been plotted for two VOBs in each of which the time stamps are continuous, as shown in FIG. 11A. The time stamp of the first pack in VOB#1 includes the initial value Init1, with the packs following thereafter having increasingly higher values as their time stamps. In the same way, the time stamp of the first pack in VOB#2 includes the initial value Init2, with the packs following thereafter having increasingly higher values as their time stamps. In FIG. 11E, the final value of the time stamps in VOB#1 is higher than the first value of the time stamps in VOB#2, so that it can be seen that the time stamps are not continuous across the two VOBs. When the decoding of the first pack in VOB#2 is desired following the final pack of VOB#1 regardless of the non-continuity of time stamps, an STC_offset can be added to the time stamps in VOB#2, thereby shifting the time stamps in VOB#2 from the solid line shown in FIG. 11E to the broken line that continues as an extension of the time stamps in VOB#1. As a result, the shifted time stamps in VOB#2 can be seen to be continuous with the time stamps in VOB#1.

(1-3-3-5) First_SCR

The First_SCR shows the SCR of the first pack in a VOB, written in PTM descriptor format.

(1-3-3-6) Last_SCR

The Last_SCR shows the SCR of the last pack in a VOB, written in PTM descriptor format.

(1-3-3-7) Relationship between the First_SCR and Last_SCR

As described above, since the reproduction of VOB is performed by a decoder of E-STD type, the Last_SCR of the former VOB and the First_SCR of the latter VOB do not need to satisfy the condition that Last_SCR of former VOE=First_SCR of latter VOB. However when using an STC_offset, the following relationship must be satisfied.

Last_SCR of former VOB+time required by 1 pack transfer≦STC_offset+First_SCR of latter VOB Here, if the Last_SCR of former VOB and the First_SCR of latter VOB do not satisfy the above equation, this means that the packs that compose the former VOB are transferred into the video buffer and audio buffer at the same time as the packs that compose the latter VOB. This violates MPEG standard and the decoder model of E-STD where packs are transferred one at a time in the order of the pack sequence. By referring to FIG. 10C, it can be seen that the Last_SCR of former VOB matches the First_SCR of latter VOB+STC_offset, so that the above relationship is satisfied.

When VOB is reproduced using decoder of E-STD type, of particular note Is the time at which switching is performed between outputting the standard time outputted by the STC and outputting the standard time with the offset added by the adder. Since no information for this switching is given in the time stamps of a VOR, there is the risk that the improper timing will be used for switching to the output value of the adder.

First_SCR and Last_SCR are effective for informing the decoder of the correct timing to switch to the output value of the adder. While the STC is counting, the decoder compares the standard time outputted by the STC with the First_SCR and Last_SCR. When the standard time outputted by the STC matches the First_SCR or Last_SCR, the decode switches from the standard time outputted by the STC to the output value of the adder.

When reproducing a VOB, standard reproduction reproduces the latter VOB after reproducing the former VOB, while "rewind reproduction" (backward picture search) reproduces the former VOB after the latter VOB. Accordingly, the Last_SCR is used for switching the value used by the decoder during standard reproduction, and First_SCR is used for switching the value used by the decoder during rewind reproduction. During rewind reproduction, the latter VOB is decoded starting from the last VOBU to the first VOBU, and when the first video pack in the latter VOB has been decoded, the former VOB is decoded starting from the last VOBU to the first VOBU. In other words, during rewind reproduction, the time at which the decoding of the first video pack in the latter VOB is complete is the time at which the value used by the decoder needs to be switched. To inform a video data editing apparatus of E-STD type of this time, the First_SCR of each VOB is provided in the RTRW management file.

A more detailed explanation of the techniques used for E-STD and the STC_offset is given in the PCT Publication WO97/13364.

(1-3-3-8Audio Gap Start Time "A_STP_PTM"

When an audio reproduction gap exists in a VOB, the audio gap start time "A_STP_PTM" shows the halt start time at which the audio decoder should halt its operation. This audio gap start time is given in PTM descriptor format. One audio gap start time A_STP_PTM is indicated for one VOB.

(1-3-3-9) Audio Gap Length "A_GAP_LEN"

The audio gap length A_GAP_LEN" shows how long the audio decoder should stop its operation starting from the halt start time indicated as the audio gap start time "A_STP_PTM". The length of this audio gap length A_GAP_LEN is restricted to being less than the length of one audio frame.

(1-3-3-10) Inevitability of Audio Gap

The following is an explanation of why a period where an audio gap occurs needs to be specified by the audio gap start time A_STP_PTM and audio gap length A_GAP_LEN.

Since video streams and audio streams are reproduced with different cycles, the total reproduction time of a video stream contained in a VOB does not match the total reproduction time of the audio stream. For example, if the video stream is for NTSC standard and the audio stream is for Dolby-AC3, the total reproduction time of the video stream will be an integer multiple of 33 msec and the total reproduction time of the audio stream will be an integer multiple of 32 msec, as shown in FIG. 14A.

If seamless reproduction of two VOBs is performed without regard to these differences in total reproduction time, it will be necessary to align the reproduction time of one set of the picture data and the reproduction time of the audio data to synchronize the reproduction of the picture data with the audio data. In order to align such reproduction times, a difference in total time appears at one of the start or the end of the picture data or audio data.

In FIG. 14B, the reproduction time of the picture data is aligned with the reproduction time of the audio data at the start of a VOB, so that the time difference g1 is present at the end of the picture data and audio data.

Since the time difference g1 is present at the end of VOB#1, when seamless reproduction VOB#1 and VOB#2 is attempted, the reproduction of the audio stream in VOB#2 is performed to fill in the time difference g1, meaning that the reproduction of the audio stream in VOB#2 starts at time g0 The audio decoder uses a fixed frame rate when reproducing an audio stream, so that the decoding of audio streams is continuously performed with a fixed cycle. When VOB#2 that is to be reproduced following VOB#1 has already been read from the DVD-RAM, the audio decoder can commence the decoding of VOB#2 as soon as it has completed the decoding of the audio stream in VOB#1.

To prevent the audio stream in the next VOB from being reproduced too early during seamless reproduction, the audio gap information in the stream is managed on the host side of a reproduction apparatus, so that during audio gap period, the host needs to halt the operation of the audio decoder. This reproduction halt period is the audio gap, and starts from the audio gap start time A_STP_PTM and continues for the period indicated as A_GAP_LEN.

Processing to specify audio gaps is also performed within a stream. More specifically, the PTS of an audio frame immediately after an audio gap is written in the packet header of an audio packet, so that it is possible to specify when the audio gap ends. However, problems arise with the specifying method when several sets of audio data that should be reproduced for several audio frames are stored in a single audio packet. In more detail, when several sets of audio data to be reproduced for several audio frames are stored in a single audio packet, it is only possible to provide a PTS for the first out of the plurality of audio frames in this packet. In other words, a PTS cannot be provided for the remaining audio frames in the packet. If the audio data that is to be reproduced for the audio frames located both before and after an audio gap is arranged into the sane packet, it will not be possible to provide a PTS for the audio frame located immediately after the audio gap. As a result, it will not be possible to specify the audio gap, meaning that the audio gap will be lost. To avoid this, the audio frame located immediately after an audio gap is processed so as to be arranged at the front of the next audio pack, so that the PTS (audio gap start time A_STP_PTM and audio gap length A_GAP_LEN) of the audio frame immediately after the audio gap can be clarified within the stream.

Whenever necessary, a Padding-Packet, as prescribed by MPEG standard, may be inserted immediately after audio data in an audio packet that stores the audio data to be reproduced immediately before an audio gap. FIG. 14C shows audio pack G3 which includes an audio gap which includes the audio data y−2, y−1, y to be reproduced for the audio frames y−2, y−1, y located at the latter part of VOB#1 shown in FIG. 14B and a Padding_Packet. This drawing also shows audio pack G4 that includes the audio frames u+1, u+2, and u+3 that are positioned at the front of VOB#2.

The above-mentioned audio pack G4 is the pack that includes the audio data that is to be reproduced for the audio frame immediately after the audio gap, while audio pack G3 is the pack that is located in immediately before this pack.

If the audio data to be reproduced for the audio frame located immediately after the audio gap is included in a pack, the pack located immediately before such pack is called an "audio pack including an audio gap".

Here, the audio pack G3 is positioned toward the end of the video pack sequence in a VOBU, with no picture data with a later reproduction time being included in VOB#1. However, it is assumed that the reproduction of VOB#2 will follow the reproduction of VOB#1, so that picture data included in VOB#2 is the picture data that should be read corresponding to audio frames y−2, y−1, and y.

If this is the case, the audio pack G3 that includes the audio gap may be positioned within any of the first three VOBU in VOB#2 without violating the "one-second rule". FIG. 14D shows that this audio pack G3 that includes the audio gap may be positioned within any of VOBU#1, VOBU#2, and VOBU#3 at the start of VOB#2.

The operation of the audio decoder needs to be temporarily halted for the period of the audio gap. This is because the audio decoder will try to perform the decode processing even during the audio gap, so that the host control unit that performs the core control processing in a reproduction apparatus has to indicate an audio pause to the decoder once the reproduction of picture data and audio data has ended, thereby temporarily halting the audio decoder. This indication is shown as the ADPI (Audio Decoder Pause Information) in FIG. 19.

By doing so, the operation of the audio decoder can be stopped during the period of the audio gap. However, this does not mean that the audio output can be stopped regardless of how an audio gap appears in the data.

This is because it is normal for the control unit to be composed of a standard microcomputer and software, so that depending on the circumstances for stopping the operation of the audio decoder, should audio gaps repeatedly occur during a short period of time, there is the possibility of the control unit not issuing the halt indication sufficiently early As one example, when VOBs of approximately one second in length are reproduced consecutively, it becomes necessary to give a halt indication to the audio decoder at intervals of around one second. When the control unit is composed of a standard microcomputer and software, there is the possibility that the control unit will not be able to halt the audio decoder for the period where such audio gaps are present.

When reproducing VOBs, the reproduction time of picture data and the reproduction time of audio data have been aligned several times, with it being necessary to provide the audio decoder with a halt indication every time. When the control unit is composed of a standard microcomputer and software, there is the possibility that the control unit will not be able to halt the audio decoder for the period where such audio gaps are present. For this reason, the following restrictions are enforced so that audio gaps only occur once within a predetermined period.

First, to allow the control unit to perform the halt operation with ease, the reproduction period of VOBs is set at 1.5 seconds or above, thereby reducing the frequency with which audio gaps may occur.

Second, the alignment of the reproduction time of picture data and the reproduction time of audio data is only performed once in each VOB. By doing so, there will only be one audio gap in each VOB.

Third, the period of each audio gap is restricted to being less than one audio frame.

Fourth, the audio gap start time VOB_A_STP_PTM is set with the video presentation start time VOB_V_S_PTM of the following VOB as a standard, so that the audio gap start time VOB_A_STP_PTM is restricted to being within one audio frame of the following video presentation start time VOB_V_S_PTM.

As a result,

VOB_V_S_PTM—reproduction period of one audio frame

<A_STP_PTM≦VOB_V_S_PTM

If an audio gap that satisfies the above formula occurs, the first image in the following VOB will just have been displayed, so that even if there in no audio output at this time, this will not be particularly conspicuous to the user.

By providing the above restriction, when audio gaps appear during seamless reproduction, the interval between the audio gaps will be at least "1.5 seconds reproduction period of two audio frames". More specifically, by substituting actual values, the reproduction period of each audio frame will be 32 msec when Dolby AC3 is used, so that the minimum interval between audio gaps is 1436 msec. This interval means that there is a high probability of the control unit being able to perform the halt control processing well within the deadline for the processing.

(1-3-3-11) Audio Gap Location Information

The audio gap location information "A_GAP_LOC" is a 3-bit value that shows into which of the three VOBs located at the start of the latter VOB the audio pack including the audio gap has been inserted. When the first bit in this value is "1", this shows the audio gap is present in VOBU#1. In the same way, the values "2" and "3" respectively show that the audio gap is present in VOBU#2 or VOBU#3.

The reason this flag is necessary is that it will be necessary to regenerate the audio gap when the latter of two VOBs that are to be seamlessly reproduced has been partially deleted.

The partial deletion of the VOB refers to the deletion of a plurality of VOBUs that are located at the start or the end of a VOB. As one example, there are many cases during video editing when the user wishes to remove the opening credit sequence. The deletion of the VOBUs which include this opening credit sequence is called the "partial deletion of a VOB".

When performing partial deletion, audio packs including an audio gap that are moved to a latter VOB require special attention. As described above, the audio gap is determined according to the video presentation start time VOB_V_S_PTM of the latter VOB, so that when some of the VOBUs are deleted from the latter VOB, the picture data that has the video presentation start time VOB_V_S_PTM that determines the audio gap and the VOBUs for this picture data will be deleted.

The audio gap is multiplexed into the one of the first three VOBs at the start of a VOB. Accordingly, when a part of a VOB, such as the first VOBU, is deleted, it will not be clear as to whether the audio gap will have been destroyed as a result of this deletion. Since the number of audio gaps that may be provided within one VOB is limited to one, it is also necessary to delete a previous audio gap that is no longer needed once a new audio gap has been generated.

As shown in FIG. 14D, the audio pack G3 that includes the audio gap needs to be inserted into one of VOBU#1 to VOBU#3 in VOB#2 so as to comply to the one-second rule, so that the audio pack that includes this audio gap needs to be taken out of the packs included in VOB#1 to VOB#3. While this involves a maximum of three VOBUs, the immediate extraction of only the audio pack G3 that includes the audio gap is technically very difficult. This means that stream analysis is required. Here, each VOBU includes several hundred packs so that a significant amount of processing is required to refer to the content of all such packs.

The audio gap location information A_GAP_LOC uses a 3-bit flag to show into which of the three VOBUs at the start of a latter VOB an audio pack including an audio gap has been inserted, so that only one VOBU needs to be searched when looking for the audio gap. This facilitates the extraction of the audio pack G3 including the audio gap.

FIGS. 15A to 15E show the procedure for the regeneration of the audio gap by the video data editing apparatus when the VOBUs located at the start of VOB#2 have been deleted, out of two VOBs, VOB#1 and VOB#2, that are to be reproduced seamlessly.

As shown in FIG. 15A, the VOBUs, "VOBU#98, "VOBU#99", and "VOBU#100" are located at the end of VOB#1 and the VOBUs, "VOBU#1", "VOBU#2", and "VOBU#3" are located at the start of VOB#2. In this example, the user instructs the video data editing apparatus to perform a partial deletion to delete VOBU#1 and VOBU#2 in VOB#2.

In this case, the audio pack G3 that includes the audio gap is required, out of the audio data stored in VOBU#100, but it is known for certain that this audio pack G3 including the audio gap will be arranged into one of VOBU#1, VOBU#2, and VOBU#3 in VOB#2. To find the VOBU into which the audio pack G3 including the audio gap has been arranged, the video data editing apparatus refers to the audio gap location information A_GAP_LOC. When the audio gap location information A_GAP_LOC is set as shown in FIG. 15B, it can be seen that the audio pack G3 including the audio gap is located in VOBU#3 in VOB#2.

Once the video data editing apparatus knows that the audio pack G3 including the audio gap is located in VOBU#3, the video data editing apparatus will know whether the audio gap was multiplexed into the area that was subjected to the partial deletion. In the present example, the audio gap is not included in the deleted area, so that the value of A_GAP_LOC is only amended by the number of VOBU that were deleted.

This completes the explanation of the VOBs, video stream, audio stream, and VOB information that is stored on an optical disc for the present invention.

(1-4) System Construction of the Video Data Editing Apparatus

Figure 16:
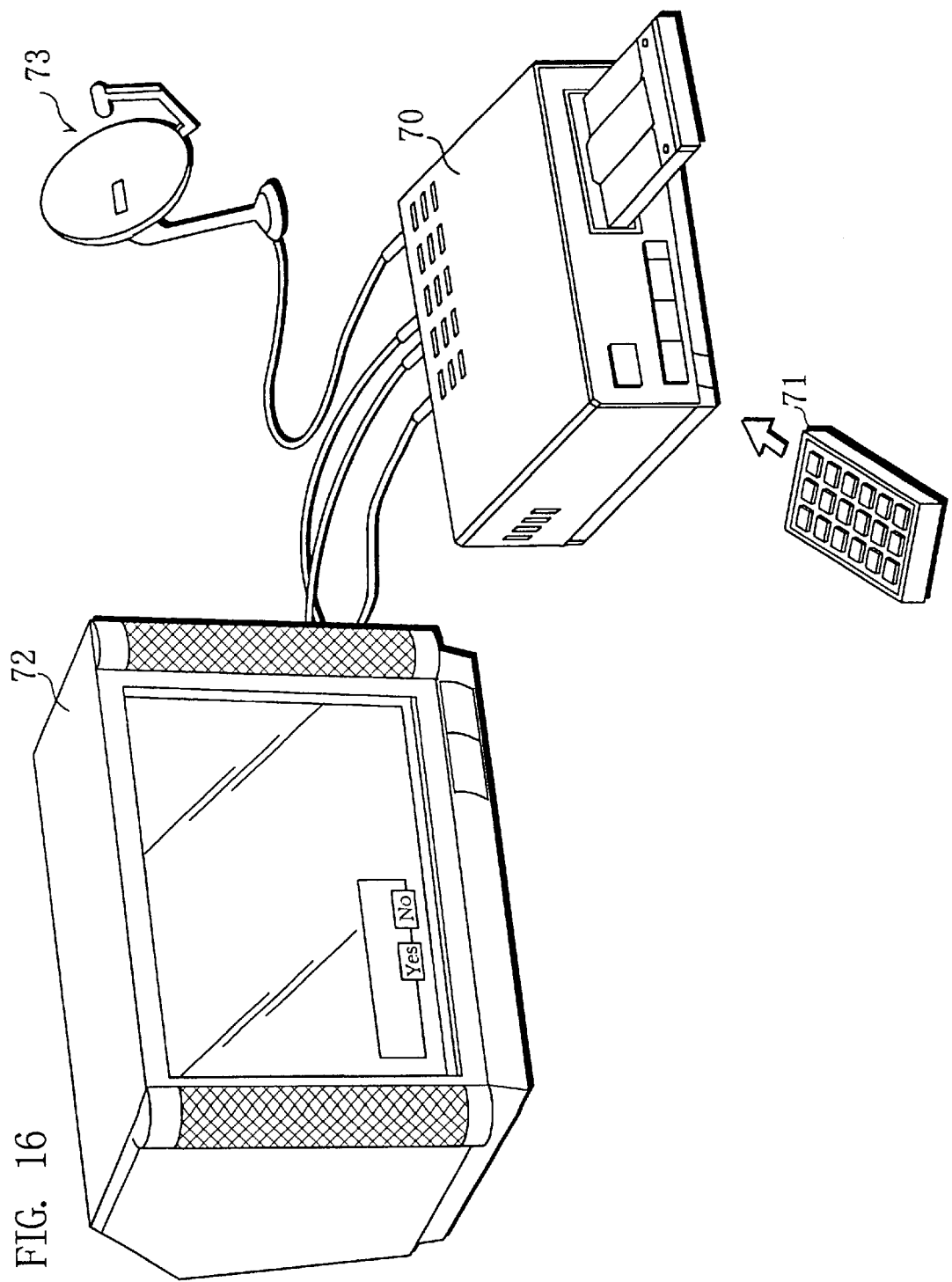
FIG. 16 shows an example system configuration using the video data editing apparatus of the first embodiment.

The video data editing apparatus of the present embodiment is provided with functions for both a DVD-RAM reproduction apparatus and a DVD-RAM recording apparatus. FIG. 16 shows an example of the system construction that includes the video data editing apparatus of the present embodiment. As shown in FIG. 16, this system includes a video data editing apparatus (hereinafter DVD recorder 70), a remote controller 71, a TV monitor 72 that is connected to the DVD recorder 70, and an antenna 73. The DVD recorder 70 is conceived as a device to be used in place of a conventional video cassette recorder for the recording of television broadcasts, but also features editing functions. The system illustrated in FIG. 16 shows the case when the DVD recorder 70 is used as a domestic video editing apparatus. The DVD-RAM described above is used by the DVD recorder 70 as the recording medium for recording television broadcasts.

When a DVD-RAM is loaded into the DVD recorder 70, the DVD recorder 70 compresses a video signal received via the antenna 73 or a conventional NTSC signal and records the result onto the OVD-RAM as VOBs. The DVD recorder 70 also decompresses the video streams and audio streams included in the VOBs recorded on a DVD-RAM and outputs the resulting video signal or NTSC signal and audio signal to the TV monitor 72.

(1-4-1) Hardware Construction of the DVD Recorder 70

Figure 17:
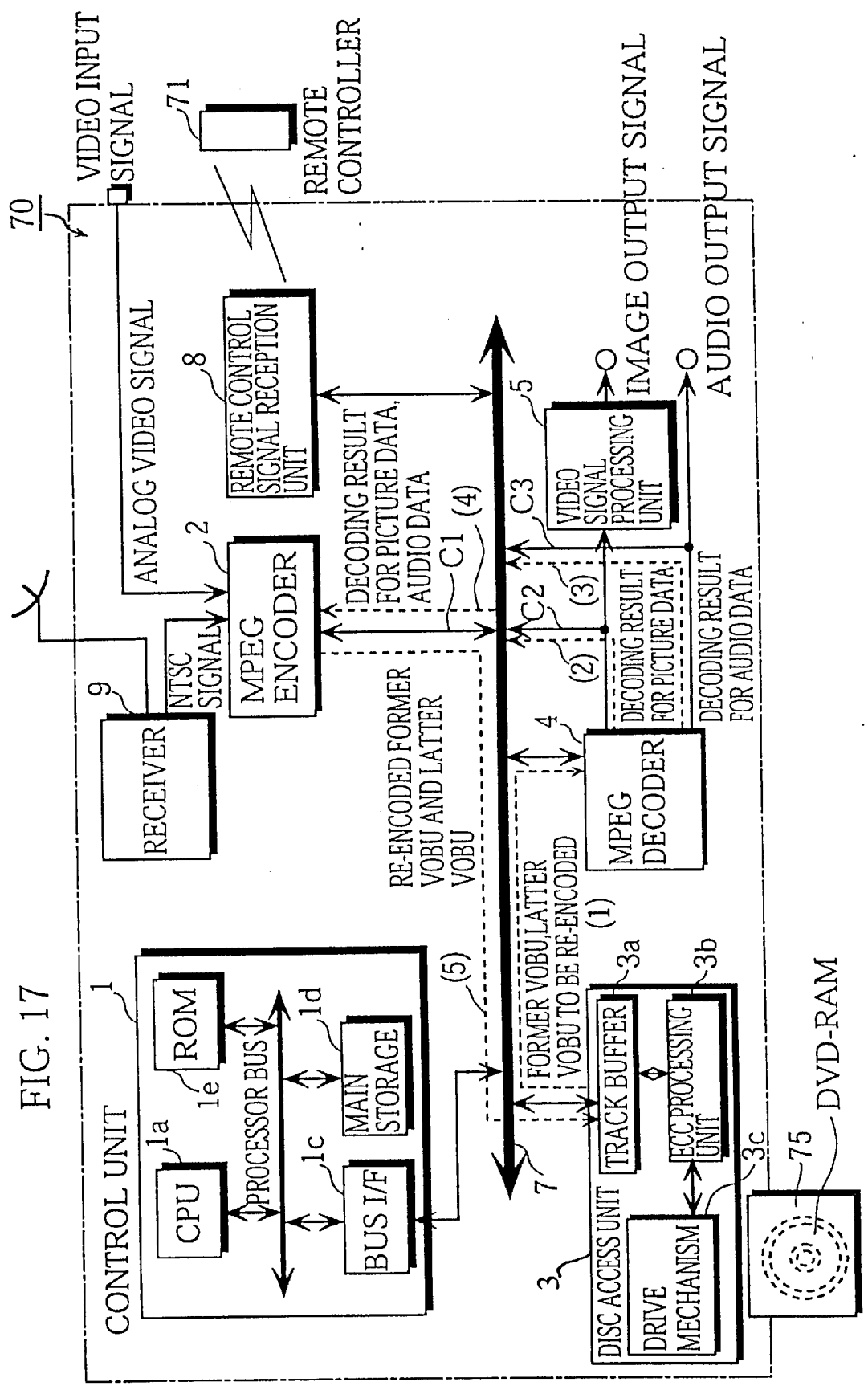
FIG. 17 is a block diagram showing the hardware construction of the DVD recorder 70.

FIG. 17 is a block diagram showing the hardware construction of the DVD recorder 70. As shown in FIG. 17, the DVD recorder 70 is composed of a control unit 1, an MPEG encoder 2, a disc access unit 3, an MPEG decoder 4, a video signal processing unit 5, a remote controller 71, a bus 7, a remote control signal reception unit 8, and a receiver 9.

The arrows drawn with solid lines in FIG. 17 show the physical connections that are achieved by the circuit wiring inside the DVD recorder 70. The broken lines, meanwhile, show the logical connections that indicate the input and output of various kinds of data on the connections shown with the solid lines during a video editing operation. The numerals (1) to (5) assigned to the broken lines show how VOBUs and the picture data and audio data that compose VOBUs are transferred on the physical connections when the DVD recorder 70 re-encodes VOBUs.

The control unit 1 is the host-side control unit that includes the CPU 1a, the processor bus 1b, the bus interface 1c, the main storage 1d, and the ROM 1e. By executing programs stored in the ROM 1e, the control unit 1 records, reproduces, and edits VOBs.

The MPEG encoder 2 operates as follows. When the receiver 9 receives an NTSC signal via the antenna 73, or when a video signal outputted by a domestic video camera is received via the video input terminals provided at the back of the DVD recorder 70, the MPEG encoder 2 encodes the NTSC signal or video signal to produce VOBs and outputs the generated VOBs to the disc access unit 3 via the bus 7 As a process that particularly relates to video editing, the MPEG encoder 2 receives an input of the decoding result of the MPEG decoder 4 from the connection line C1 via the bus 7, as shown by the broken line (4), and outputs the encoding result for this data to the disc access unit 3 via the bus 7, as shown by the broken line (5).

The disc access unit 3 includes a track buffer 3a, an ECC processing unit 3b, and a drive mechanism 3c for a DVD-RAM, and accesses the DVD-RAM in accordance with control by the control unit 1.

In more detail, when the control unit 1 gives an indication for recording on the DVD-RAM and the VOBs encoded by the MPEG encoder 2 have been successively outputted as shown by the broken line (5), the disc access unit 3 stores the received VOBs in the track buffer 3a, and, once ECC processing has been performed by the ECC processing unit 3b, controls the drive mechanism 3c to successively record these VOBs onto the DVD-RAM.

On the other hand, when the control unit 1 indicates a data read from a DVD-RAM, the disc access unit 3 controls the drive mechanism 3c to successively read VOBs from the DVD-RAM, and, once the ECC processing unit 3b has performed ECC processing on these VOBs, stores the result in the track buffer 3a.

The drive mechanism 3c mentioned here includes a platter for setting the DVD-RAM, a spindle motor for clamping and rotating the DVD-RAM, an optical pickup for reading a signal recorded on the DVD-RAM, and an actuator for the optical pickup Reading and writing operations are achieved by controlling these components of the drive mechanism 3c, although such control does not form part of the gist of the present invention. Since such control can be achieved using well-known methods, no further explanation will be given in this specification.

When VOBs that have been read from the DVD-RAM by the disc access unit 3 are outputted as shown by the broken line (1), the MPEG decoder 4 decodes these VOBs to obtain uncompressed digital video data and an audio signal. The MPEG decoder 4 outputs the uncompressed digital video data to the video signal processing unit 5 and outputs the audio signal to the TV monitor 72. During a video editing operation, the MPEG decoder 4 outputs the decoding result for a video stream and audio stream to the bus 7 via the connections lines C2, C3, as shown by the broken lines (2) and (3) in FIG. 17. The decoding result outputted to the bus 7 is outputted to the MPEG encoder 2 via the connection line C1, as shown by the broken line (4).

The video signal processing unit 5 converts the image data outputted by the MPEG decoder 4 into a video signal for the TV monitor 72. On receiving graphics data from outside, the video signal processing unit 5 converts the graphics data into an image signal and performs signal processing to combine this image signal with the video signal.

The remote control signal reception unit 8 receives a remote controller signal and informs the control unit 1 of the key code included in the signal so that the control unit 1 can perform control in accordance with user operations of the remote controller 71.

(1-4-1-1) Internal Construction of the MPEG Encoder 2

Figure 18:
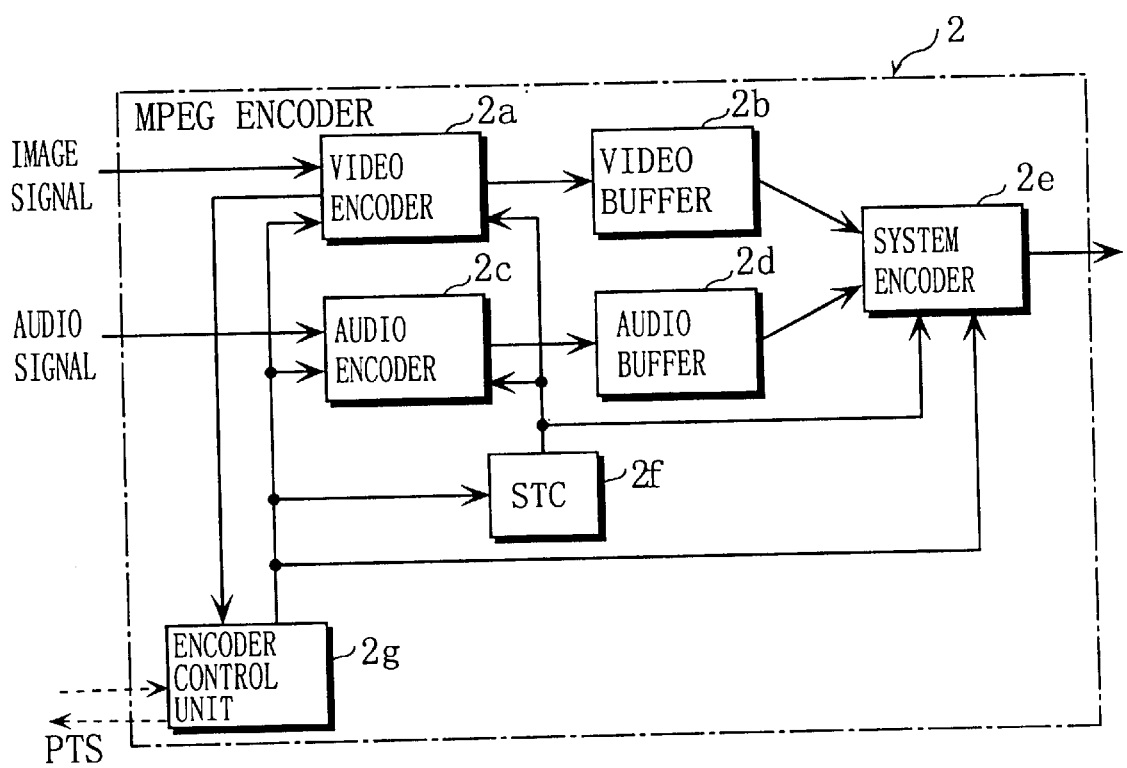
FIG. 18 shows the construction the MPEG encoder 2.

FIG. 18 is a block diagram showing the construction of the MPEG encoder 2. As shown in FIG. 18, the MPEG encoder 2 is composed of a video encoder 2a, a video buffer 2b for storing the output of the video encoder 2a, an audio encoder 2c, an audio buffer 2d for storing the output of the audio encoder 2c, a stream encoder 2e for multiplexing the encoded video stream in the video buffer 2b and the encoded audio stream in the audio buffer 2d, an STC (System Time Clock) unit 2f for generating the synchronization clock of the MPEG encoder 2, and the encoder control unit 2g for controlling and managing these components of the MPEG encoder 2.

(1-4-1-2) Internal Construction of the MPEG decoder 4

FIG. 19 shows the construction of the MPEG decoder 4. As shown in FIG. 19, the MPEG decoder 4 is composed of a demultiplexer 4a, a video buffer 4b, a video decoder 4c, an audio buffer 4d, an audio decoder 4e, a reordering buffer 4f, an STC unit 4g, switches SW1 to SW4, and a decoder control unit 4k.

The demultiplexer 4a refers to the header of a packet that has been read from a VOB and judges whether the various packs are video packs or audio packs. The demultiplexer 4a outputs video data in packs judged to be video packs to the video buffer 4b and audio data in packs judged to be audio packs to the audio buffer 4d.

The video buffer 4b is a buffer for accumulating video data that is outputted by the demultiplexer 4a. Each set of picture data in the video buffer 4b is stored until its decode time when it is taken from the video buffer 4b.

The video decoder 4c takes out sets of picture data from the video buffer 4b at their respective decode times and instantly decodes the data.

The audio buffer 4d is a buffer for accumulating the audio data outputted by the demultiplexer 4a.

The audio decoder 4e successively decodes the audio data stored in the audio buffer 4d in frame units. On receiving ADPI (Audio Decoder Pause Information) issued by the control unit 1, the audio decoder 4e halts the decode processing for audio frame data. The ADPI is issued by the control unit 1 when the present time reaches the audio gap start time A_STP_PTM shown by the seamless linking information.

The reordering buffer 4f is a buffer for storing the decoding result of the video decoder 4c when it has decoded an I picture or P picture. The reason the decoding results for I pictures or P pictures are stored is that the encoding order was originally produced by rearranging the display order. Accordingly, after every B picture that should be displayed before the decoding results stored in the reordering buffer 4f has been decoded, the reordering buffer 4f outputs the decoding results of the hitherto stored I pictures and P pictures as an NTSC signal.

The STC unit 4g generates the synchronization clock that shows the system clock for use in the MPEG decoder 4.

The adder 4h outputs a value produced by adding the STC_offset to the standard clock shown by the synchronization clock as the offset standard clock. The control unit 1 calculates this STC_offset by finding the difference between the video presentation start time VOB_V_S_PTM and the video presentation end time VOB_V_E_PTM that are given in the seamless linking information, and sets the STC_offset in the adder 4h.

The switch SW1 supplies the demultiplexer 4a with the standard time measured by the STC unit 4g or the offset standard time outputted by the adder 4h.

The switch SW2 supplies the audio decoder 4e with the standard time measured by the STC unit 4g or the offset standard time outputted by the adder 4h. The supplied standard time or offset standard time is used to collate the decode time and presentation start time of each audio frame.

The switch SW3 supplies the video decoder 4c with the standard time measured by the STC unit 4g or the offset standard time outputted by the adder 4h The supplied standard time or offset standard time is used to collate the decode time of each set of picture data The switch SW4 supplies the reordering buffer 4f with the standard time measured by the STC unit 4g or the offset standard time outputted by the adder 4h. The supplied standard time or offset standard time is used to collate the presentation start time of each set of picture data.

The decoder control unit 4k receives a decode processing request from the control unit 1 for an integer multiple of VOBUs, which is to say an integer multiple of GOPs, and has the decode processing performed by all of the components from the demultiplexer 4a to the reordering buffer 4f. Also, on receiving a valid/invalid indication for the reproduction output of the decoding result, the decoder control unit 4k has the decoding results of the video decoder 4c and the audio decoder 4e outputted to the outside if the indication is valid, or prohibits the output of the decoding results of the video decoder 4c and the audio decoder 4e to the outside if the indication is invalid.

The valid/invalid indication can be given for a smaller unit than a video stream, such as for a video field. Information that indicates the valid section of the reproduction output in video field units is called valid reproduction section information.

(1-4-1-2-1) Timing for the Switching of Switches SW1~SW4

Figure 20:
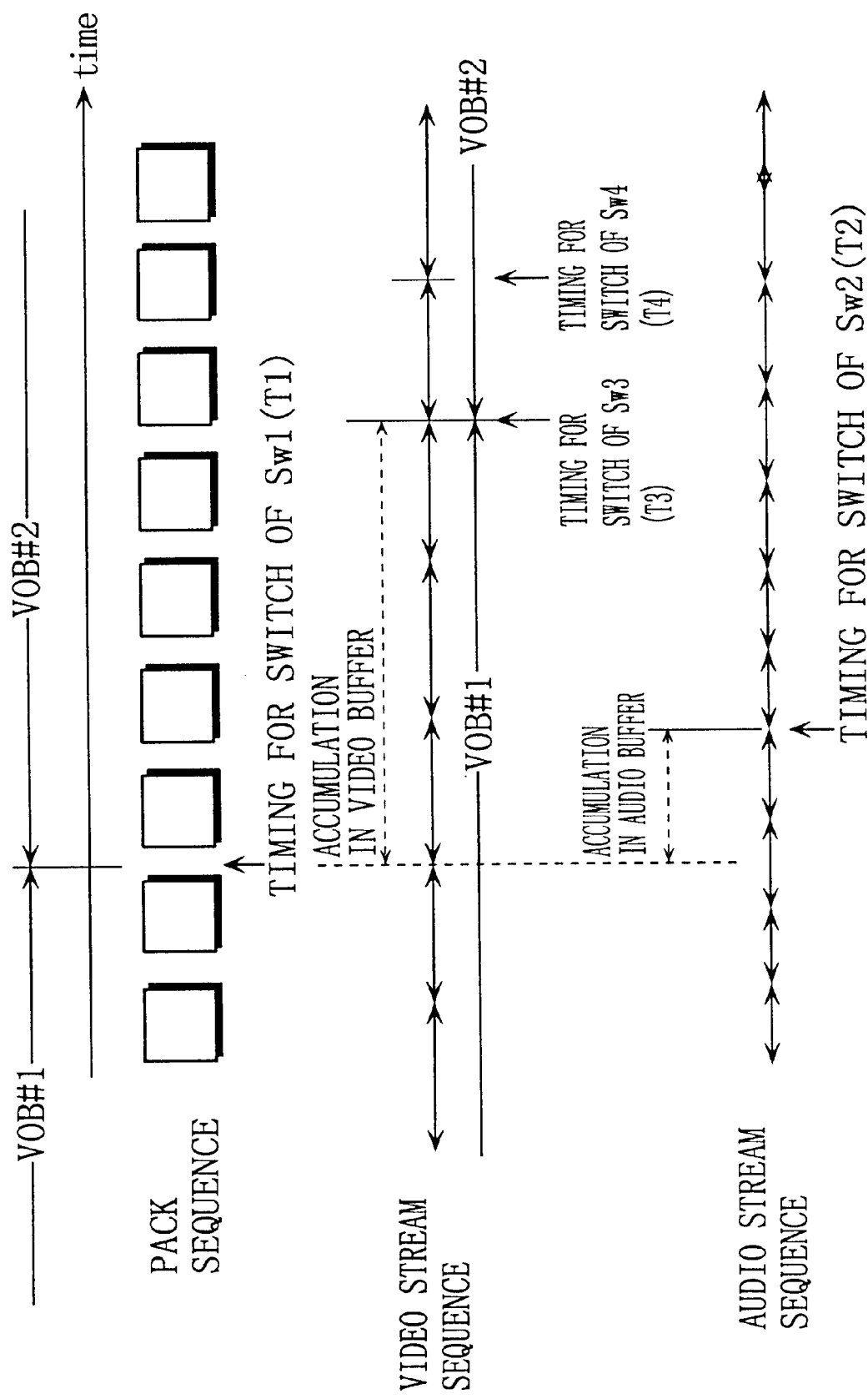
FIG. 20 is a timing chart showing the timing for the switching of switches SW1 to SW4.

FIG. 20 is a timing chart of the timing for the switching of switches SW1 to SW4. This timing chart shows the switching of switches SW1 to SW4 when seamless reproduction of VOB#1 and VOB#2 is performed. The upper part of FIG. 20 shows the pack sequences that compose VOB#1 and VOB#2, while the middle part shows the video frames and the lower part shows the audio frames.

The timing for the switching of switch SW1 is the point where the pack sequence that is transferred to the MPEG decoder 4 changes from VOB#1 to VOB#2. This time is indicated as the Last_SCR in the seamless linking information of VOB#1.

The timing for the switching of switch SW2 is the point where the all of the audio data in the VOB that is stored in the audio buffer 4d before the switching of switch SW1, which is to say VOB#1, has been decoded.

The timing for the switching of switch SW3 is the point where all of the video data in the VOB that is stored in the video buffer 4b before the switching time (T1) of switch SW#1, which is to say VOB#1, has been decoded.

The timing for the switching of switch SW4 is the point during the reproduction of VOB#1 where the last video frame has been reproduced.

The programs stored in the ROM 1e include modules that enable two VOBs that have been recorded on the DVD-RAM to be reproduced seamlessly.

(1-4-1-2-2) Procedure for the Seamless Processing of VOBs

Figure 21:
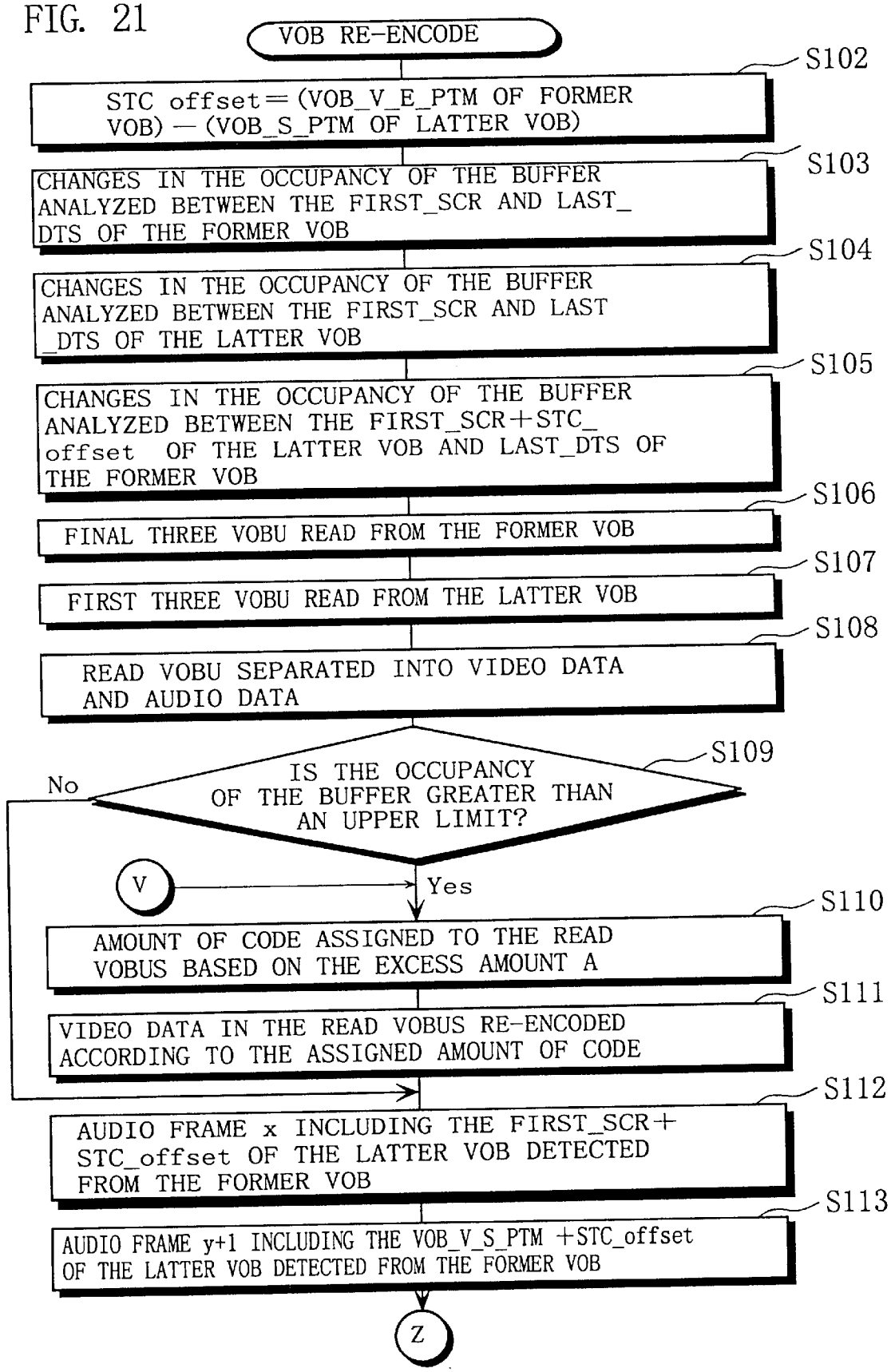
FIG. 21 is a flowchart showing the procedure of the seamless processing.
Figure 22:
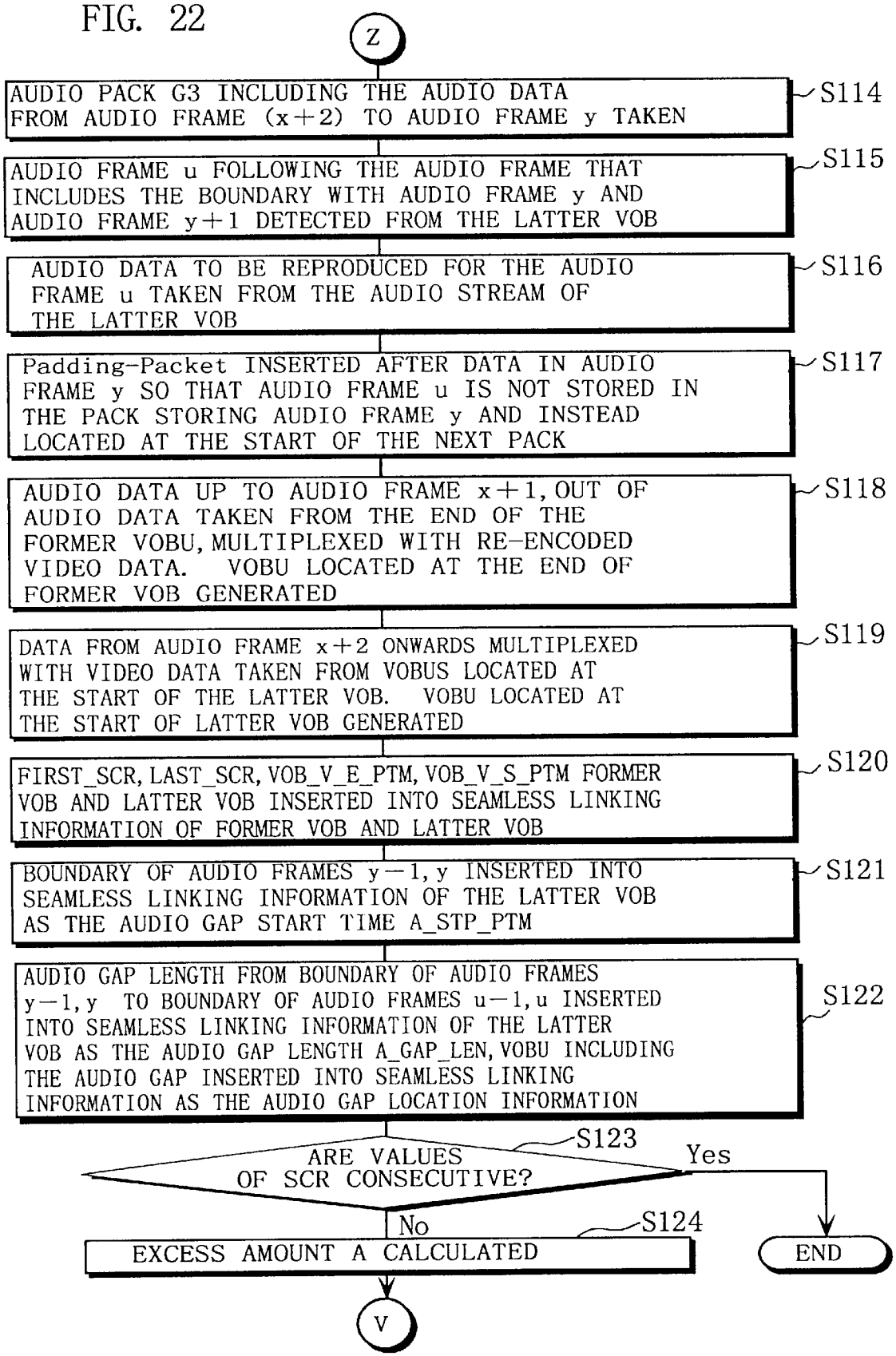
FIG. 22 is also a flowchart showing the procedure of the seamless processing.
Figure 24A:
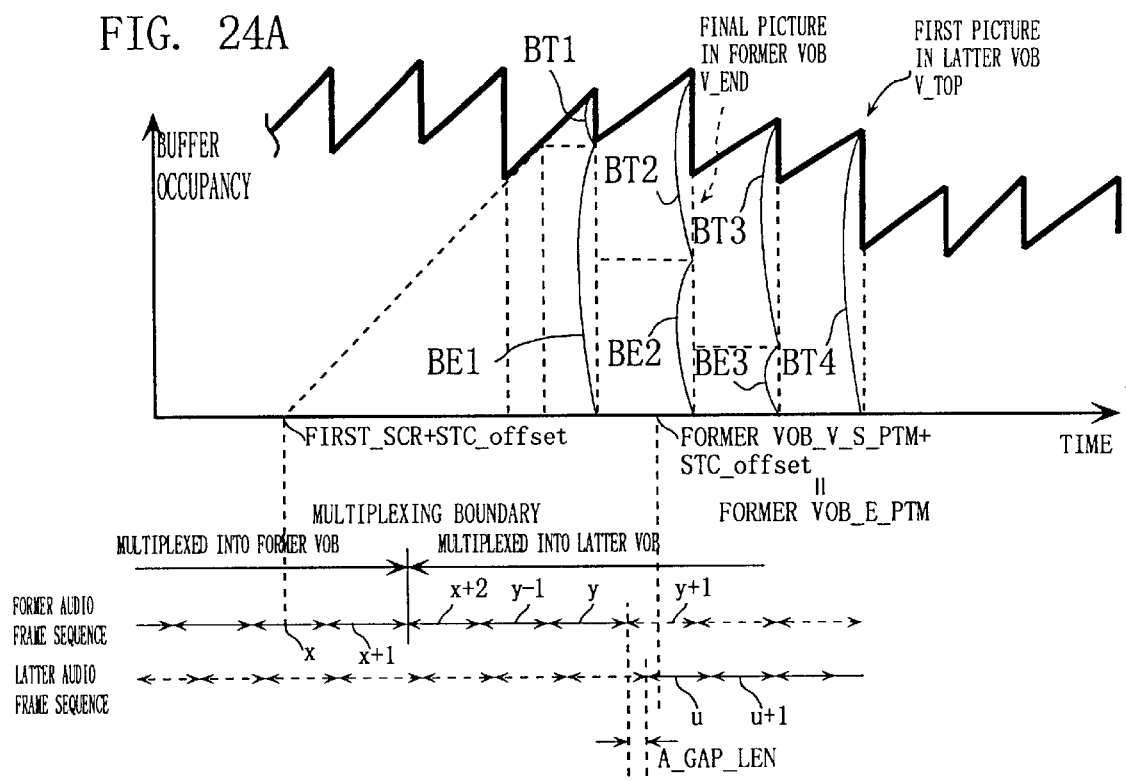
FIG. 24A shows the audio frames in the audio stream that correspond to the audio frames x, x+1, y, u, u+1, u+2 used in FIG. 22.
Figure 25:
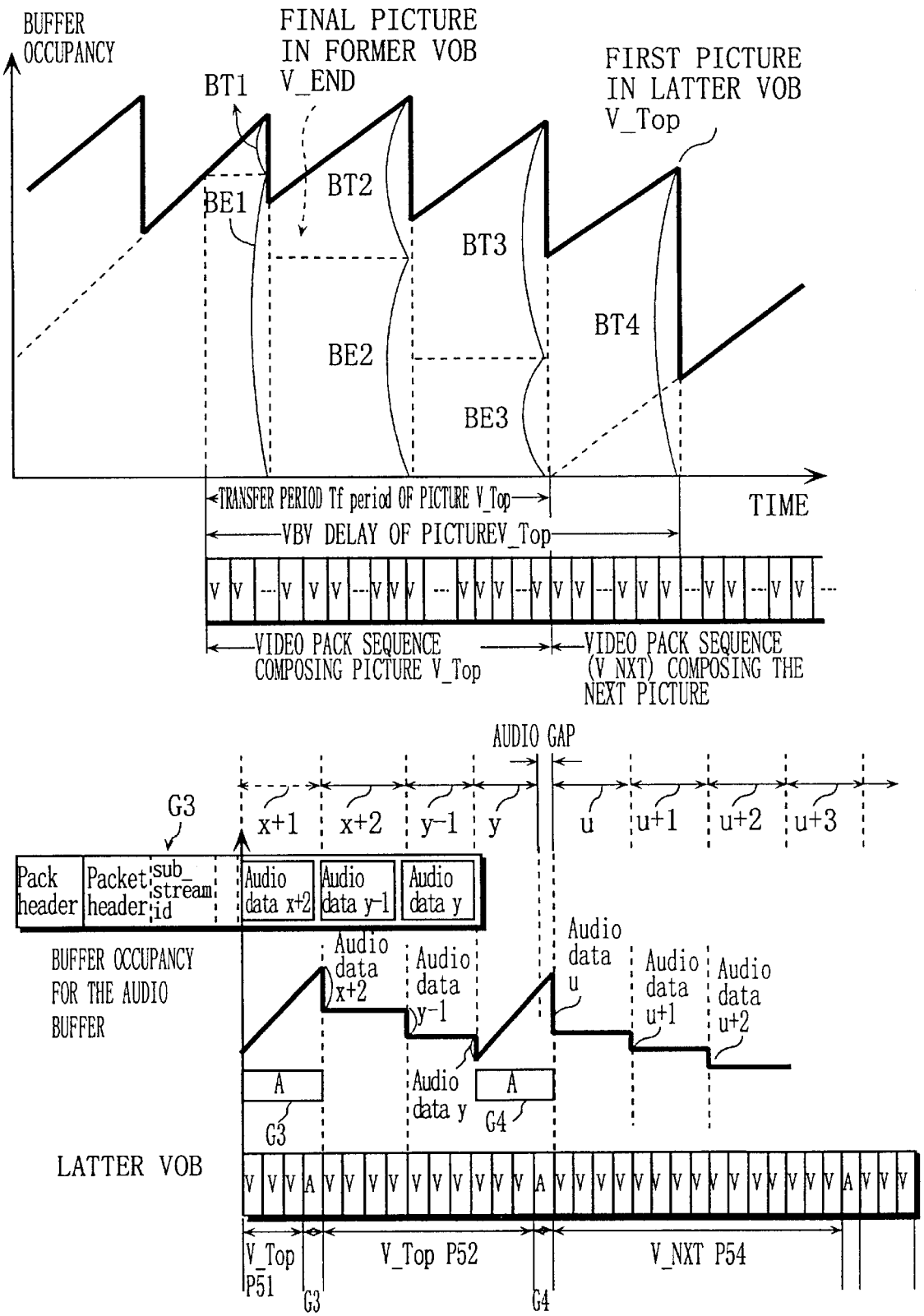
FIG. 25 shows how the audio packs storing audio data for a plurality of audio frames and the video packs storing video data for each video frame are multiplexed.

FIGS. 21 and 22 are flowcharts showing the procedure that seamlessly links two VOBs in an AV file. FIGS. 23A and 23B show an analysis of the buffer state for each video pack. FIGS. 24A and 25 show the audio frames in the audio stream that correspond to the audio frames x, x+1, y−1, y, u+1, u+2, and u+3 mentioned in FIG. 22.

The following is an explanation of the re-encoding of VOBs. In step S102 of FIG. 21, the control unit 1 performs the calculation VOB_V_E_PTM of former VOB minus VOB_V_S_PTM of latter SOB to obtain the STC_offset.

In step S103, the control unit 1 analyzes the changes in the occupancy of the buffer from the First_SCR of the former VOB to the decode end time of all of the data in the former VOB. FIGS. 23A and 23B show the analysis process for the occupancy of the buffer performed in step S103.

When video pack #1 and video pack #2 are included in the former VOB as shown in FIG. 23A, the SCR#1, SCR#2, and DTS#1 included in these video packs are plotted on the time axis. After this, the data size of the data included in video pack #1 and video pack #2 is calculated.

A line is plotted starting from SCR#1 with the bitrate information in the pack header as the gradient, until the data size of video pack #1 has been plotted. After this, the data size of video pack #2 is plotted starting from SCR#2. Next, the data size of the picture data P1 that is to be decoded is removed at DTS#1. This data size of picture data P1 is obtained by analyzing the bitstream.

After plotting the data sizes of the video packs and picture data in this way, the buffer state of the video buffer 4b from the first SCR to the DTS can be plotted as a graph. By using the same procedure for all of the video data and audio data in a VOB, a graph showing the state of the buffer can be obtained, as shown in FIG. 23B.

In step S104, the control unit 1 performs the same analysis as in step S103 for the latter VOB, and so analyzes the changes in the occupancy of the video buffer from the First_SCR of the latter VOB to the decode end time Last_DTS of all the data in the latter VOB.

In step 3105, the control unit 1 analyzes the changes in the occupancy of the video buffer from the First_SCR of the latter VOB+STC_offset to the Last_DTS of the former VOB. This period from the First_SCR of the latter VOB+

STC_offset to the Last_DTS of the data in the former VOB is when the first picture data of the latter VOB is being transferred to the video buffer 4b while the last picture data of the former VOB is still stored in the video buffer 4b.

When the video data of the former VOB and the latter VOB coexist in the buffer, the buffer state will be as shown in FIG. 10C. In FIG. 10C, the video buffer 4b stores video data of both the former VOB and the latter VOB during the period from the First_SCR+STC_offset to the Last_DTS, with Bv1+Bv2 representing the highest occupancy of the video buffer 4b during this period.

In step S106, the control unit 1 controls the disc access unit 3 to read the three VOBUs that are located at the end of the former VOB. After this, in step S107 the control unit 1 controls the disc access unit 3 to read the three VOBUs that are located at the front of the latter VOB.

FIG. 23C shows the area that should be read from the former VOB in step S106. In FIG. 23C, the former VOB includes the VOBUs #98~#105, so that the VOBUs #103 to #105 are read as the VOBUs that include the picture data V_END that should be decoded last. FIG. 23D, shows the area that should be read from the latter VOB in step S107. In FIG. 23D, the former VOB includes the VOBUs #1~#7, so that when the VOBU #1 comes first, VOBUs #1 to #3 should be read as the VOBUs that include the picture data V_TOP.

According to the one-second rule, there is a possibility that the audio data and picture data that should be reproduced within one second are stored across three VOBUs, so that by reading the three VOBUs at the start and end of a VOB, in step S106, all of the picture data and audio data to be reproduced between a point one second from the presentation end time of the picture data V_END located at the end of the former VOB and this presentation end time itself can be read together.

Also, in step S107, all of the picture data and audio data to be reproduced between the presentation start time of the picture data V_TOP located at the start of the latter VOB and a point one second after this presentation start time can be read together. It should be noted that the reads in this flowchart are performed for VOBU units, although the reads may instead be performed for the picture data and audio data that is to be reproduced in one second, out of all of the picture data and audio data included in a VOBU. In this embodiment, the number of VOBUs that correspond to one second is three, although any number of VOBUs may be re-encoded. Reads may alternatively be performed for picture data and audio data that is to be reproduced in a period longer than one second.

Next, in step S108 the control unit 1 controls the demultiplexer 4a to separate the VOBUs for the first part and the last part into a video stream and an audio stream, and has the video decoder 4c and the audio decoder 4e decode these streams. During normal reproduction, the decoding results of the video decoder 4c and the audio decoder 4e will be outputted as video and audio. When re-encoding is performed, however, these decoding results should inputted into the MPEG encoder 2, so that the control unit 1 has the video stream and the audio stream of the decoding results output to the bus 7, as shown by the arrows (2) and (3) that are drawn with broken lines in FIG. 17.

The video stream and the audio stream that are the decoding results are transferred via the bus 7 in order to the MPEG encoder 2, as shown by the broken line (4).

After this, the control unit 1 calculates the amount of code for the re-encoding of the decoded video stream and decoded audio stream by the MPEG encoder 2. First, in step S109, the control unit 1 judges whether the accumulated amount of data in the buffer exceeds the upper limit of the buffer at any point in the decoding when the former VOB and the latter VOB coexist in the buffer. In the present embodiment, this is achieved by judging whether the value Bv1+Bv2 calculated in step S105 exceeds the upper limit of the buffer. It this value does not exceed the upper limit, the processing advances to step S112, or if the value does exceed the upper limit, the control unit 1 subtracts the excess amount of code A from the calculated amount and assigns the resulting amount of code to the decoded VOBU sequence.

If the amount of code is decreased, this means the picture quality of the video stream will decrease during the reproduction of these VOBUs. However, overflows in the video buffer 4b must be prevented when seamlessly linking two VOBs, so that this method that decreases picture quality is used. In step S111, the control unit 1 controls video decoder 4c to re-encode the decoding results of the video decoder 4c and the audio decoder 4e according to the amount of code assigned in step S110.

Here, the MPEG encoder 2 performs a decode to temporarily convert the pixel values in the video data into digital data in a YUV coordinate system. Digital data in such a YUV coordinate system is digital data for the signals (luminance signal (Y), chrominance signal (U,V)) that specify colors for a color TV, with the video decoder 4c re-encoding this digital data to produce sets of picture data. The technique used for the assigning of an amount of code is that described in MPEG2 DIS (Draft International Standard) Test Model 3. Re-encoding to reduce the amount of code is achieved by processes such as replacing the quantization coefficients. Note that the amount of code from which the excess amount A has been subtracted may be assigned to only the latter VOB or to only former VOB.

In step S112, the control unit 1 calculates which part of the decoding result for the audio data taken from the former VOB corresponds to the audio frame x that includes the STC_offset+First_SCR of the latter VOB. In FIG. 24A, the graph shows the buffer state for the former VOB and latter VOB, while the lower part shows the audio frames of the audio data separated from the former VOB and the audio frames of the audio data separated from the latter VOB. The audio frame sequences in the lower part of FIG. 24A show the correspondence between each audio frame and the time axis of the graph in the upper part. The descending line drawn from the point shown as First_SCR+STC_offset in the graph intersects one audio frame out of the audio frame sequence for the former VOB.

The audio frame that intersects this descending line is the audio frame x, and the audio frame x+1 following immediately after is the final audio data included in the former VOB. It should be noted that the data in the audio frames x and x+1 is included in the audio data that should be reproduced during a period that is indicated by points 1.0 seconds before and after the reproduction period of the final picture data V_END, with this being included in the three VOBUs read in step S105.

Figure 24B:
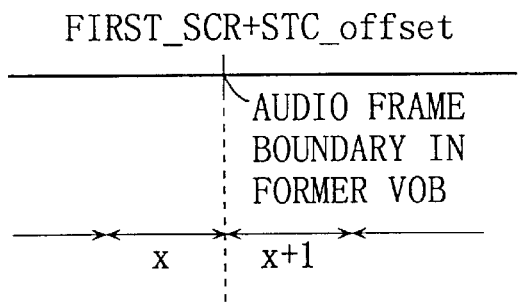
FIG. 24B shows the case when the First_SCR+STC_offset corresponds to a boundary between audio frames in the former VOB.

FIG. 24B shows the case where the First_SCR+STC_offset matches an audio frame boundary in the former VOB. In this case, the audio frame immediately before the boundary is set as the audio frame x.

In step S113, the control unit 1 calculates the audio frame y+1 that includes the STC_offset+VOB_V_S_PTM of the latter VOB. In FIG. 24A, the descending line drawn from the video presentation start time VOB_V_S_PTM+STC_offset in the graph intersects one audio frame in the audio frame sequence of the latter VOB. The audio frame that intersects this descending line is the audio frame y+1. Here, the audio frames up to the preceding audio frame y are the valid audio frames that are still used after the editing has been performed, out of the original audio data included in the former VOB.

Figure 24C:
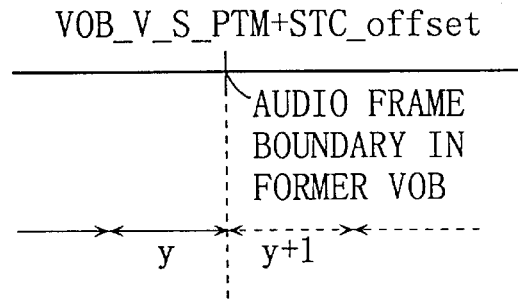
FIG. 24C shows the case when the video reproduction start time VOB_V_S_PTM+STC_offset corresponds to a boundary between audio frames in the former VOB.

FIG. 24C shows the case where the video presentation start time VOB_V_S_PTM+STC_offset matches an audio frame boundary in the former VOB. In this case, the audio frame immediately before the video presentation start time VOB_V_S_PTM+STC_offset is set as the audio frame y.

In step S114, the audio data from the audio frame x+2 to the audio frame y is taken from the former audio data. In FIG. 24A, the audio frames from audio frame y+1 onwards have been drawn with a broken line, showing that this part is not multiplexed into the VOB. It should be noted that the audio frames that have been moved to the latter VOB will have been assigned time stamps for the former VOB, so that these audio frames are reassigned time stamps for the latter VOB.

In step S115, the audio frame u immediately after the audio frame that includes the boundary between the audio frames y and y+1 is detected from the audio frame sequence of the latter VOB. When a descending line is drawn from the boundary of the audio frames y and y+1, this line will intersect one of the audio frames in the audio frame sequence of the latter VOB. The audio frame that follows this intersected audio frame is the audio frame u.

Figure 24D:
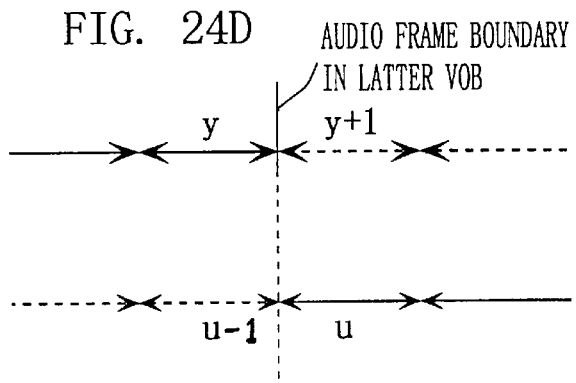
FIG. 24D shows the case when the presentation end time of the video frame y corresponds to a boundary between audio frames in the latter VOB.

FIG. 24D shows the case where the presentation end time of the audio frame y matches an audio frame boundary in the latter VOB. In this case, the audio frame immediately after this presentation end time is set as the audio frame u.

In step S116, the audio pack G4, which includes an audio data sequence where the audio data reproduced for the audio frame u is arranged at the front is generated from the audio stream in the latter VOB. In FIG. 24A, the audio frames that precede audio frame u have been drawn with a broken line, with this audio data shown using a broken line not being multiplexed into the latter VOB.

As a result of steps S114~S116 above, the audio data from the first audio frame to the audio frame x+1 is multiplexed into the former VOR. The audio data from the audio frame x+2 to the audio frame y and the audio data from the audio frame u to the final audio frame is multiplexed into the latter VOB. By performing multiplexing in this way, the audio frames for the audio data at the end of the former VOB will be read from the DVD-RAM at the same time as picture data that is to be reproduced further ahead in the reproduction.

At this point, when the audio data in the former VOB is not present as far as frame y, which is to say the audio data is short, silent audio frame data is inserted to compensate for the insufficient number of frames. In the same way, when the audio data in the latter VOB is not present starting from audio frame u, which is to say the audio data is short, silent audio frame data is inserted to compensate for the insufficient number of frames.

When the audio frames from the audio frame x+2 to the audio frame y in the former VOB and the audio data from the audio frame u to the final audio frame in the latter VOB is multiplexed into the latter VOB, attention needs to paid to the AV synchronization.

As shown in FIG. 24A, a reproduction gap occurs between the audio frame y and the audio frame u, and if multiplexing is performed without regard to this reproduction gap, a loss of synchronization will occur whereby the audio frame u will be reproduced before the corresponding video frame.

To prevent the increase of such time lags between audio and video, a time stamp showing the audio frame u may be assigned to the audio packet.

To do so, in step S117, a Padding-Packet or stuffing bytes are inserted into the pack which includes the data of the audio frame y so that the audio frame u is not stored in the pack storing the audio frame y. As a result, the audio frame u is located at the start of the next pack.

In step S118, the VOBU sequence that is located at the end of the former VOB is generated by multiplexing the audio data up to the audio frame x+1, out of the audio data extracted from the VOBUs located at the end of this former VOB, with the video data that has been re-encoded.

In step S119, the audio data in audio frame x+2 onwards is multiplexed with the video data that is extracted from the VOBUs located at the start of the latter VOB to generate the VOBUs that should be arranged at the front of the latter VOB.

In detail, the control unit 1 has the audio pack G3, which includes the audio data sequence from the first audio frame x+2 to the audio frame y and the Padding_Packet, and the audio pack G4, which includes the audio data sequence from the audio frame u onwards in the latter VOB, multiplexed with the re-encoded video data and has the stream encoder 2e generate the VOBUs that are to be arranged at the start of the latter VOB. As a result of this multiplexing, the audio frames at the end of the audio data of the former VOB will be read from the DVD-RAM at the same time as sets of picture data that will be reproduced at a later time.

FIG. 25 shows how the audio packs that store a plurality of sets of audio data to be reproduced for a plurality of audio frames are multiplexed with video packs that store picture data that is to be reproduced for a plurality of video frames.

In FIG. 25, the transfer of the picture data V_TOP that should be decoded at the start of the latter VOB will be completed within the period Tf_Period. The pack sequence arranged below this period Tf_Period in FIG. 25 shows the packs that compose the picture data V_TOP.

In FIG. 25, the audio pack G3 that includes the audio gap stores the sets of audio data x+2, y−1, y that are to be reproduced for the audio frames x+2, y−1, y. Of the sets of audio data stored in this audio pack, the first to be decoded is the audio data x+2.

This audio data x+2 should be decoded at the presentation end time of the audio frame x+1, and so should be read from the DVD-RAM together with the picture data V_TOP whose pack sequence is transferred during the same period (Tf_Period) as the audio frame x+1. As a result, this audio data is inserted between the video pack sequence P51, which stores the picture data V_TOP, and the video pack sequence P52, as shown at the bottom of FIG. 25.

In the audio pack G4 that stores the sets of audio data u, u+1, and u+2 that are to be reproduced for the audio frames u, u+1, and u+2, the audio data u is to be decoded first. This audio data u should be decoded at the presentation end time of the audio frame u−1, so that this audio data u should be read from the DVD-RAM together with the picture data V_NXT whose pack sequence is transferred during the same period. As a result, this audio data u is inserted between the video pack sequence P52, which stores the picture data V_TOP, and the video pack sequence P53 which stores the picture data V_NXT, as shown at the bottom of FIG. 25.

As shown above, the audio pack G3 that includes the audio gap is inserted between the video pack sequences P51 and P52, while the audio pack G4 is inserted between the video pack sequences P52 and P53, thereby completing the multiplexing.

After this, in step S120 the control unit 1 inserts the First_SCR and Last_SCR of the former VOB and latter VOB, the seamless flag, the VOB_V_E_PTM, and the VOB_V_S_PTM into the seamless linking information for the former VOB. In steps S121 and S122, the control unit 1 writes all of the information relating to the audio gap, which is to say the audio gap start time, A_STP_PTM, the audio gap length A_GAP_LEN, and the audio gap location information A_GAP_LOC into the seamless linking information.

After the above processing, the control unit 1 has the end of the former VOB, the start of the latter VOB, and the seamless linking information written onto the DVD-RAM.

The video packs and audio packs that store the video data and audio data obtained through the above re-encoding are assigned SCRs with ascending values. The initial value of the assigned SCRs is the value of the SCR of the pack originally located at the start of the area subjected to the re-encoding.

Since the SCRs show the time at which the respective video packs and audio packs should be inputted into the video buffer 4b and the video decoder 4c, if there is a change in the amount of data before and after re-encoding, it will be necessary to update the values of the SCRs. Even if this is the case, however, the decoding process will still be carried out correctly provided that the SCRs for the re-encoded first part of the latter VOB are below the SCRs of the video packs in the remaining part of the latter VOB that was not re-encoded.

The PTS and the DTS are assigned in accordance with the video frames and audio frames, so that there will be no significant change in their values when re-encoding is performed. As a result, continuity of the DTS-PTS is maintained between the data not subjected to re-encoding and the data in the re-encoded area.

To reproduce two VOBs seamlessly, non-continuity in the time stamps must be avoided. To do so, the control unit 1 judges in step S123 of FIG. 22 whether overlapping SCRs have appeared. If this judgement is negative, the processing in the flowchart of FIG. 22 ends. If overlapping SCRs have appeared, the control unit 1 proceeds to step S124 where it calculates the excess amount A based on the number of packs that have the overlapping SCRs. The control unit 1 then returns to step S110 to repeat the re-encoding, basing the amount of assigned code for the repeated re-encoding on this excess amount A.

As shown by the arrow (5) in FIG. 17, the six VOBUs that have been newly multiplexed by the processing in FIG. 22 are outputted to the disc access unit 3. The disc access unit 3 then writes the VOBU sequence onto the DVD-RAM.

It should be noted that while the flowchart of FIG. 21-FIG. 22 describes the seamless linking of two VOBs, the same processing may be used to link two sections of the same VOB. For the example shown in FIG. 6B, when deleting the VOBUs #2, #4, #6, and #8, the VOBU located before each deleted part may be seamlessly linked to the VOBU located after the deleted pack by the processing in FIGS. 21 and 22.

The following is a description of the reproduction procedure for seamlessly reproducing two VOBs that have been seamlessly linked by the processing described above.

When the user indicates the seamless reproduction of two or more VOBs recorded in an AV file, the control unit 1 first refers to the seamless flag in the seamless linking information of the latter VOB. If this seamless flag is "on", the control unit 1 sets the time obtained by subtracting the video presentation start time VOB_V_S_PTM of the latter VOB from the video presentation end time VOB_V_E_PTM of the former VOB to obtain the STC_offset. The control unit 1 then has the adder 4h add the STC_offset to the standard time measured by STC unit 4g.

After this, the buffer input time First_SCR of the former VOB indicated by the seamless linking information is compared with the standard time measured by the STC unit 4g. When the standard time reaches this first_SCR, the control unit 1 controls the switch SW1 to switch to output the offset standard time outputted by the adder 4h instead of the standard time outputted by the STC unit 4g. After this, the control unit 1 switches the states of the switches SW2~SW4 in accordance with the timing chart in FIG. 20.

With the present embodiment, seamless reproduction of a plurality of VOBs can be achieved by reading and re-encoding only the respective ends and starts of the VOBs. Since the re-encoded data is only the VOBUs located at the start and end of the VOBs, the re-encoding of VOBs can be achieved in a very short time.

Note that while the present embodiment describes a case where seamless linking information is managed for each VOB, the information that is required for the seamless linking of VOBs may be collectively provided. As one example, the video presentation end time VOB_V_E_PTM and the video presentation start time VOB_V_S_PTM that are used to calculate the STC_set are described as being given in two separate sets of VOB information, though these may be given as the seamless linking information of the latter VOB. When doing so, it is desirable for the VOB information to include information for the presentation end time of the previous VOB (PREV_VOB_V_E_PTM).

In the same way, it is preferable for information that is the final SCR in the former VOB (PREV_VOB_LAST_SCR) to be included in the seamless linking information of the latter VOB.

In the present embodiment, the DVD recorder 70 was described as being a device that takes the place of a conventional (non-portable) domestic VCR, although when a DVD-RAM is used as the recording medium for a computer, the following system setup may be used. The disc access unit 3 may function as a DVD-RAM drive device, and may be connected to a computer bus via an interface that complies to SCSI, IDE or IEEE1394 standard.

In such a case, the DVD recorder 70 will include a control unit 1, an MPEG encoder 2, a disc access unit 3, an MPEG decoder 4, a video signal processing unit 5, a remote controller 71, a bus 7, a remote control signal reception unit 8, and a receiver 9.

In the above embodiment, VOBs were described as being a multiplexed combination of a video stream and an audio stream, although sub-picture data produced by subjecting data for subtitles to run-length encoding may also be multiplexed into VOBs. A video stream composed of sets of still image data may also be multiplexed In addition, the above embodiment describes the case where the re-encoding of data is performed by the MPEG decoder 4 after the VOBs have been decoded by the MPEG encoder 2. However, during the re-encoding the VOBs may instead be directly inputted from the disc access unit 3 to the MPEG encoder 2 without prior decoding.

The present embodiment describes the case where one picture is depicted using one frame, although there are cases where one picture is in fact depicted using 1.5 frames, such as for a video stream where 3:2 pulldown is used with images for 24 frame per second being subject to compression, in the same way as with film materials.

The processing module software represented by the flowcharts in this first embodiment (FIGS. 21–22) may be realized by a machine language program which may be distributed and sold having been recorded on a recording medium. Examples of such recording medium are an IC card, an optical disc, or a floppy disc. The machine language program recorded on the recording medium may then be installed into a standard personal computer. By executing the installed machine language programs, the standard personal computer can achieve the functions of the video data editing apparatus of the present embodiment.

Second Embodiment

While the first embodiment deals with a premise that seamless linking is performed for VOBs, this second embodiment describes the seamless linking of a plurality of parts of VOBs. In this second embodiment, these parts of a VOB are specified using time information that indicates video fields. The video fields referred to here are units that are smaller than one video frame, with the time information for video fields being expressed using the PTS of video packs.

The parts of a VOB that are specified using time information for video fields are called cells, and the information used for indicating these cells is called cell information. Cell information is recorded in the RTRW management file as one element in the PGC information. The details of the data construction and generation of cell information and PGC information is given in the fourth embodiment.

Figures 26, 27A, 27B:
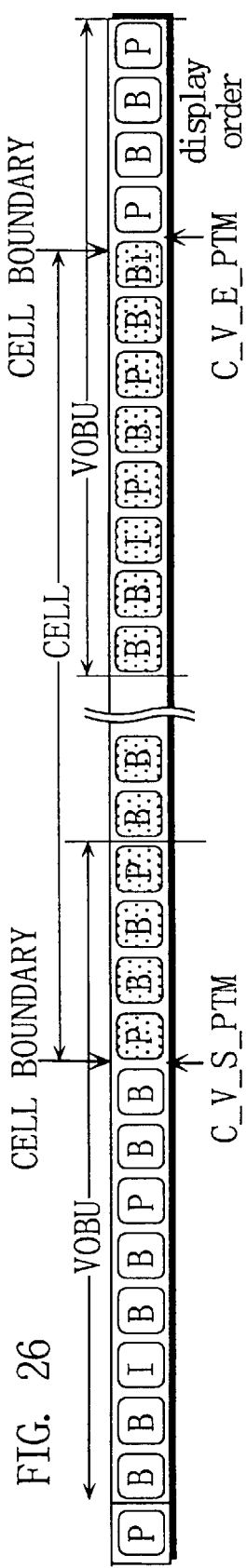
FIG. 26 shows an example of the section of a VOB that is specified using time information for a pair of C_V_S_PTM and C_V_E_PTM.
FIG. 27A shows the area that is to be read from s the former cell in step S106.
FIG. 27B shows the area that is to be read from the latter cell in step S107.

FIG. 26 shows examples of the cells indicated by the video fields for the start and the end. In FIG. 26, the sets of time information C_V_S_PTM, C_V_E_PTM specify the video fields at the start and end of a cell.

In FIG. 26, the time information C_V_S_PTM is the presentation start time of a video field at which the P picture in VOBU#100 that forms one part of the present VOB should be reproduced. In the same way, the time information C_V_E_PTM is the presentation end time of a video field at which the B1 picture in VOBU#105 that forms one part of the same VOB should be reproduced. As shown in FIG. 26, the time information C_V_S_PTM and C_V_E_PTM specify a section from a P picture to a B picture as a cell.

(2-1) Reconstruction of GOPs

When seamlessly linking parts of a VOB that are indicated by time information, it becomes necessary to use two processes that were not required in the first embodiment. First, the construction of the GOPs has to be reconstructed to convert the section indicated by the time information into a separate VOB, and second, the increases in buffer occupancy due to the reconstruction of GOPs have to be estimated.

The reconstruction of GOPs refers to a process that changes the construction of GOPs so that the section indicated as a cell has the proper display order and coding order.

More specifically, when a section to be linked is indicated by cell information, there can be cases where an editing boundary is defined midway through a VOBU, as shown in FIG. 28A. If this is the case, the two cells to be linked will not have a proper display order or coding order.

In order to rectify the display order and coding order, the reconstruction of GOPs is performed using processing based on the three rules shown in FIG. 28B When the final picture data in the display order of a former cell is a B picture, the processing based on the first rule re-encodes this picture data to convert it into a P picture (or an I picture). The P picture in the forward direction that was referred to by the B picture is located before the B picture in the coding order. However, this P picture will not be displayed after the editing, and so is deleted from the VOB.

When the first picture data in the encoding order of the latter cell is a P picture, the processing based on the second rule re-encodes this picture data to convert it to an I picture.

When the first set or consecutive sets of picture data in the display order of the latter cell is/are B pictures, the processing based on the third rule re-encodes this picture data to convert it to picture data whose display does not rely on the correlation with other images that have previously been reproduced. Hereinafter, images formed of picture data that only relies on correlation with images that are yet to be displayed will be called Forward-B pictures.

(2-2) Estimating the Increase in Buffer Occupancy

When the picture types of certain images have been changed by the processing based on the three rules described above, the processing for estimating the increases in buffer occupancy estimates the sizes of these converted sets of picture data.

When the reconstruction described above is performed for the former cell, the final picture data in the reproduction order of the former cell is converted from a B picture to a P picture or an I picture, thereby increasing the size of this data.

When the reconstruction described above is performed for the latter cell, the picture data located at the start of the coding order of the final cell is converted from a P picture to an I picture, and the picture type of the video data located at the front of the display order is converted to a Forward-B picture. This also increases the size of the data.

Figure 29A:
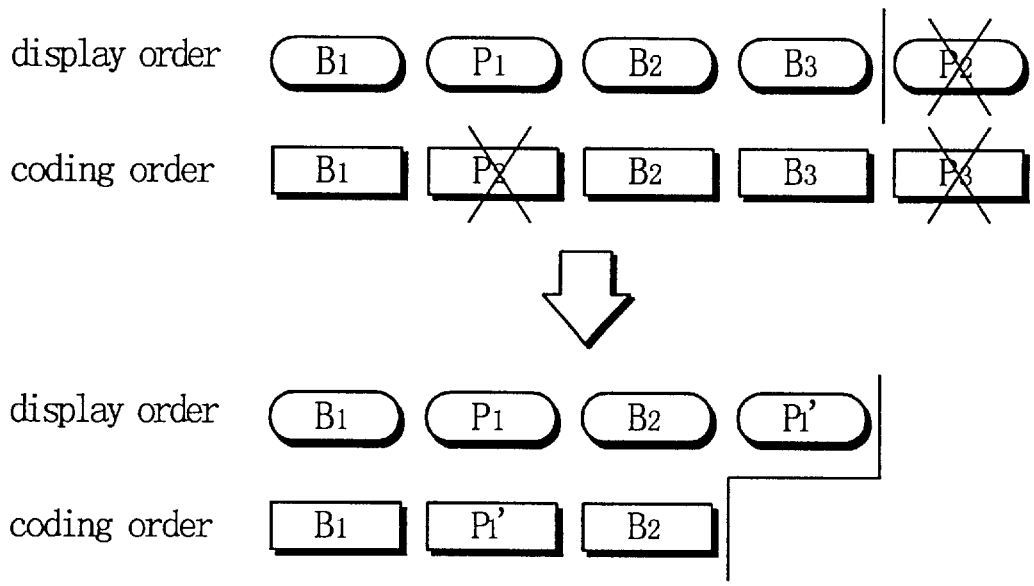
FIG. 29A shows the processing when changing a picture type of picture data in the former cell.
Figure 29B:
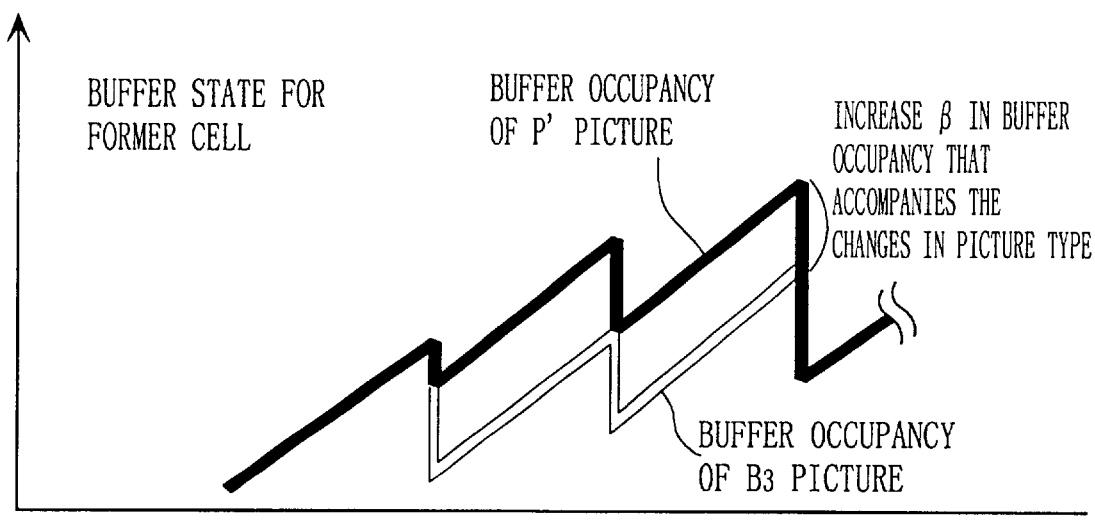
FIG. 29B shows the procedure for measuring the change β in the buffer occupancy when changing a picture type in the former cell.

The following is an explanation of the procedure for estimating the increases in data size that accompany the conversion in picture type. FIGS. 29A and 29B will be used to explain this procedure.

In FIG. 29A, the first cell continues as far as the B picture B3. According to the above rules, the video data editing apparatus has to convert this B picture B3 to the P picture P1 When the B picture B3 is dependent on the P picture P2 that is reproduced after the B picture B3, the picture type conversion process will incorporate the necessary information of the P picture P2 into the P picture P1' that is produced by the conversion process.

In view of this procedure, the video data editing apparatus can estimate the data size of the P picture P1' that is obtained by the conversion process using a sum of the size of the B picture B3 and the size of the P picture P2. This estimation method merely represents one potential method, however, so that other methods are equally possible. By determining the amount of code for use in re-encoding based on the estimated buffer occupancy, the video data editing apparatus can assign an optimal amount of code to the former cell and latter cell.

Figure 30A:
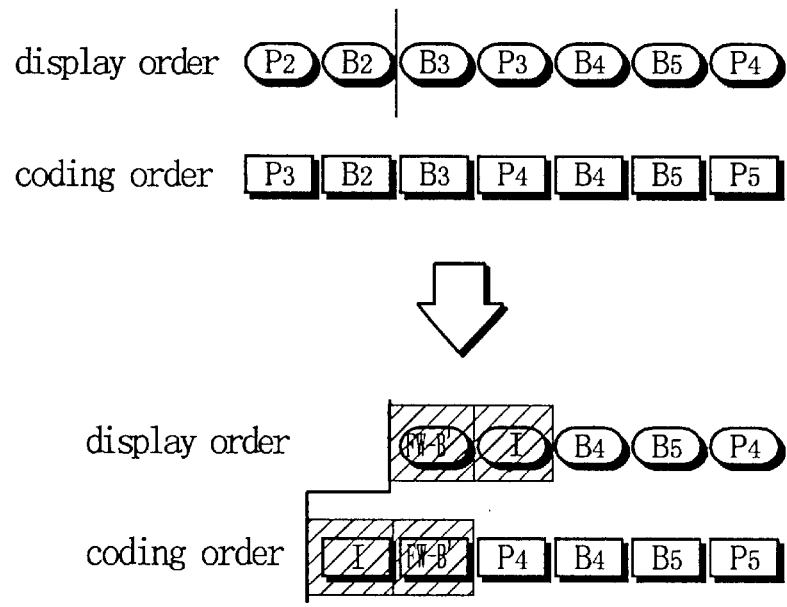
FIG. 30A shows the processing where changing the picture type of the latter cell.
Figure 30B:
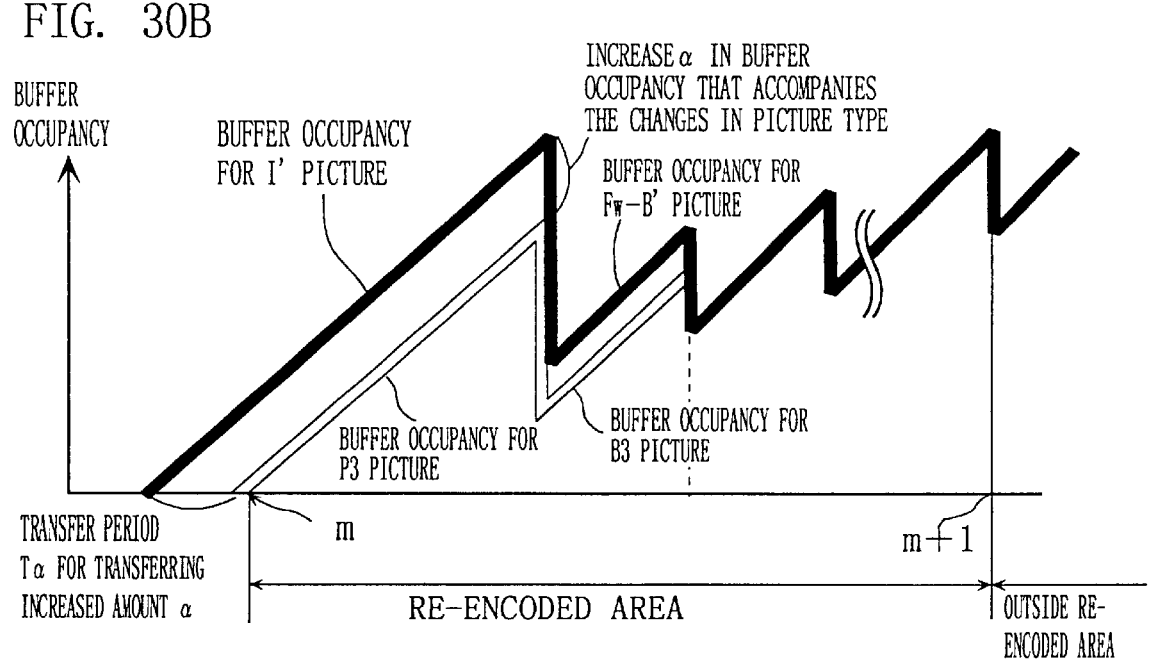
FIG. 30B shows the procedure for measuring the change α in the buffer occupancy when changing a picture type in the latter cell.

FIGS. 30A and 30B show how the increases in buffer occupancy that accompany changes in picture type within the latter cell are estimated.

In FIG. 30A, the data from the B picture B3 onwards belongs to the latter VOB. Each cell is determined based on the display time for the start of the cell, so that the B picture B3 is the picture data located at the start of the display order of the latter cell. As a result, the video data editing apparatus needs to convert the B picture B3 into the Forward-B picture B' according to the rules given above. When this B picture B3 had an information component that is dependent on the previously reproduced P picture P2, this information component of the P picture P2 will have been incorporated into the Forward-B B' picture during the picture type conversion.

In view of this procedure, the video data editing apparatus can estimate the data size of the Forward-B picture B' that is obtained by the conversion process using a sum of the size of the B picture B3 and the size of the P picture P2.

For the latter VOB, the video data editing apparatus needs to convert the picture type of the picture data located at the start of the coding order. By referring to the display order of the latter VOB in FIG. 28A, it can be seen that the P picture P3 is the picture data that is to be displayed immediately after the B picture B3. The P picture P3 is stored in the reordering buffer 4f of the video data editing apparatus until the decoding of the B picture B3 is complete, and so is only displayed after the decoding of B picture B3 has been performed. By having the reordering buffer 4f reorder the picture data in this way, the P picture P3 will precede the B picture B3 in the coding order even though P picture P3 is displayed after the B picture B3. According to the rules described earlier, the video data editing apparatus needs to convert picture data P3 detected as the first picture data in the coding order into an I picture. When this P picture has an information component that relies on the I picture that is reproduced before the P picture P3, this information component of the I picture will have been incorporated into the P picture P3 during the picture type conversion.

In view of this procedure, the video data editing apparatus can estimate the data size of the I picture I' that is obtained by the conversion process using a sum of the size of the P picture P3 and the size of the preceding I picture. Based on the buffer occupancy that is estimated in this way, the video data editing apparatus can then assign optimal amounts of code to the former and latter cells to be used in the re-encoding.

(2-3) Procedure for Seamlessly Connecting Cells

Figure 33:
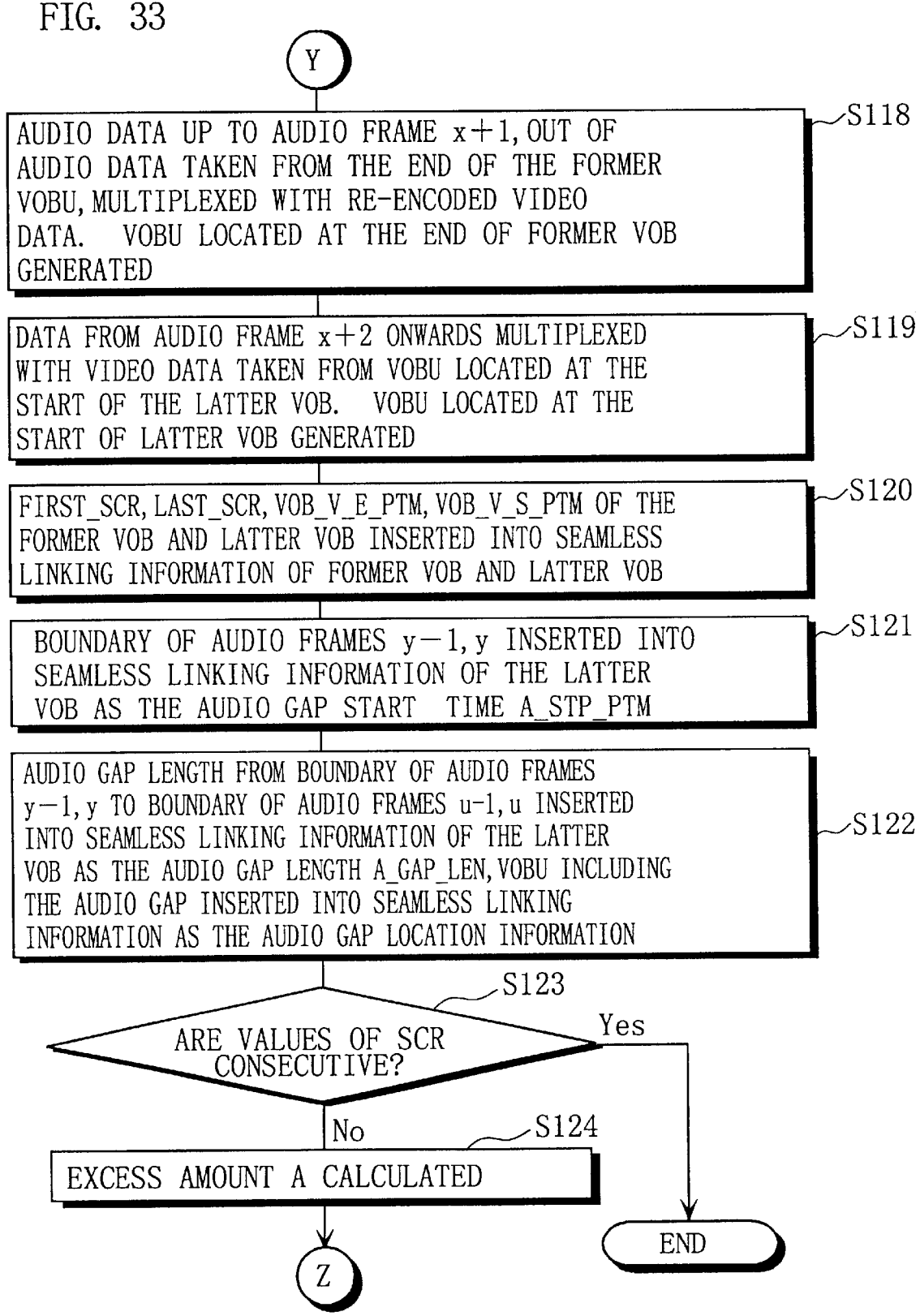
FIG. 33 is also a flowchart showing the procedure for the seamless processing.
Figure 34:
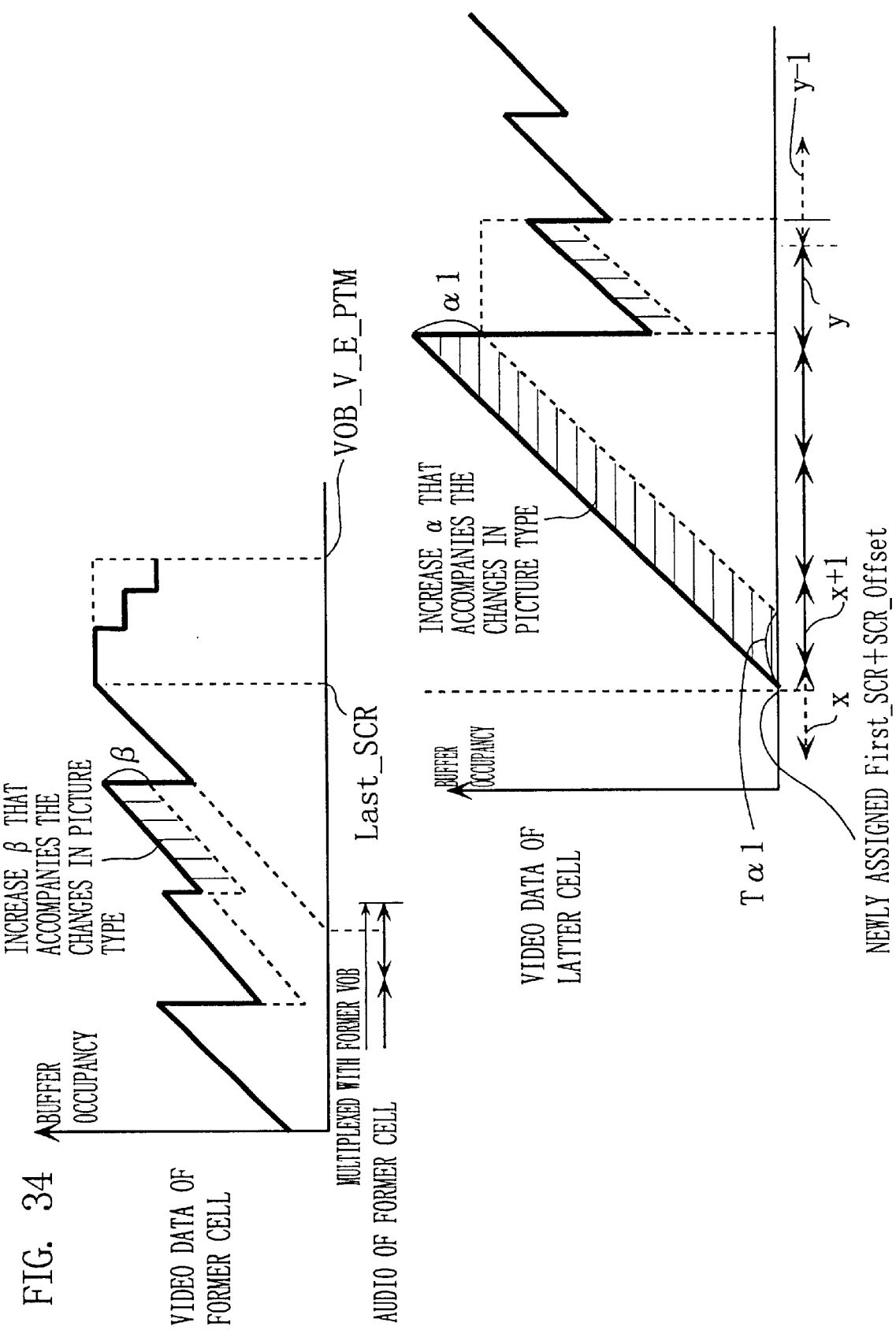
FIG. 34 shows the audio frames in the audio stream that correspond to the audio frames x, x+1, and y used in the flowchart of FIG. 31.

FIGS. 31 to 33 are flowcharts showing the procedure that links two cells to enable seamless reproduction of the two. Note that many of the steps in these flowcharts are the same as the steps in the flowcharts shown in FIGS. 21 and 22 with the term "VOB" having been replaced with term "cell". These steps have been given the same reference numerals as in the first embodiment, and their explanation has been omitted FIG. 34 shows the audio frames in the audio stream that correspond to the audio frame x, the audio frame x+1, and the audio frame y that are used in FIG. 31.

In step S102, the control unit 1 refers to the time information specifying the end of the cell to be reproduced first (hereinafter called the "former cell") and the time information specifying the end of the cell to be reproduced second (hereinafter called the "latter cell") and subtracts the C_V_S_PTM of the latter cell from the C_V_E_PTM of the former cell to obtain the STC_offset.

In step S103, the control unit 1 analyzes the changes in the buffer occupancy from the First_SCR of the former cell to the decode end time Last_DTS of all of the data in the former cell.

In step S104, the control unit 1 performs the same analysis as in step S103 for the latter cell, and so analyzes the changes in the buffer occupancy from the First_SCR of the latter cell to the decode end time Last_DTS of all of the data in the latter cell.

In step S130, the control unit 1 estimates the increase α in the buffer occupancy that accompanies the changes in picture type for the latter cell, in accordance with the procedure shown in FIGS. 30A and 30B. In step S131, the control unit 1 estimates the increase β in the buffer occupancy that accompanies the changes in picture type for the former cell, in accordance with the procedure shown in FIGS. 29A and 29B. In step S132, the control unit 1 adds the estimated increases α, β to the respective buffer occupancy for the latter and former cells.

In step 3105, the control unit 1 analyzes the changes in the occupancy of the video buffer from the First_SCR of the latter cell+STC_set to the Last_DTS of the former cell.

As shown in FIG. 10C of the first embodiment, the highest occupancy Bv1+Bv2 of the video buffer 4b is obtained for the period where video data for both the former cell and latter cell is stored in the video buffer 4b.

In step S106, the control unit 1 controls the disc access unit 3 to read the three VOBs believed to include the picture data located at the end of the former cell from the DVD-RAM. After this, in step S107 the control unit 1 controls the disc access unit 3 to read the three VOBs believed to include the picture data located at the start of the latter cell.

FIG. 27A shows the area that should be read from the former cell in step S106. FIG. 27B shows the VOB includes VOBUs #98 to #107, with VOBUs #99 to #105 being indicated as the former cell. When the picture data to be reproduced last in the former cell is the picture data Bend, this picture data will be included in one of VOBUs #103 to #105 in accordance with the one-second rule, so that VOBU#103 to VOB#105 will be read as the VOBU sequence that includes the picture data to be reproduced last.

The VOB shown in FIG. 27B includes the VOBUs #498 to #507, and of these, VOBUs #500 to #506 are indicated as the latter cell. When the picture data to be displayed first in this latter cell is the picture data PTOP, this picture data PTOP will be included in VOBUs #500 to #502, so that VOBUs #500 to #502 will be read as the VOBU sequence that includes picture data to be displayed first. These VOBUs include the all of the picture data that depends on the picture data PTOP and the picture data Bend, in addition to the audio data that is to be reproduced at the same time as the picture data PTOP and the picture data Bend. As a result, all of the picture data that is required for the conversion of picture types is read by this operation.

It should be noted that the reads in this flowchart are performed for VOBU units, although the reads may instead be performed for the picture data and audio data that is to be reproduced in one second, out of all of the picture data and audio data included in a VOBU. In the present embodiment, the number of VOBs that correspond to one second of reproduction is given as three, although any number of VOBs may be used. Reads may alternatively be performed for picture data and audio data that is to be reproduced in a period longer than one second.

After these reads are complete, in step S108 the control unit 1 controls the demultiplexer 4a to separate the video data and audio data from the VOBU located at the end of the former cell and the start of the latter cell.

In step S109, the control unit 1 judges whether the accumulated amount of data in the buffer exceeds the upper limit of the buffer at any point in the decoding when the former cell and the latter cell coexist in the buffer More specifically, this is achieved by judging whether the value Bv1+Bv2 calculated in step S105 exceeds the upper limit of the buffer.

If this value does not exceed the upper limit, the processing advances to step S133, or it the value does exceed the upper limit, the control unit 1 assigns an amount of code based on the excess amount A to the former cell and latter cell in Step S110. Note that the re-encoding performed in this case may only be performed for one of the former VOB and latter VOB, or for both. In step S111, the video data obtained from the two cells is re-encoded according to the amount of code assigned in step S110.

In step S133, the First_SCR that has been newly assigned to the re-encoded video data in the latter cell is obtained. In this latter cell, the first picture data in the display order and the first picture data in the coding order will have been converted into picture types with larger amounts of picture data, so it should be obvious that the value First_SCR+ STC_offset will indicate an earlier time than before.

In step S112, the control unit 1 calculates the audio data, out of the audio data separated from the former cell, that corresponds to the audio frame x which includes the sum of the STC_offset and the First_SCR that is newly assigned to the video data in the latter VOB. In FIG. 34, the upper and lower graphs respectively show the transition in the buffer occupancy due to the video data in the former cell and latter cell. The lower graph in FIG. 34 shows the audio frames of the audio data separated from the former cell.

The audio frame sequence below the lower graph in FIG. 34 shows each audio frame against the time axis of the graph given above it The buffer occupancy for the new latter cell obtained as a result of the re-encoding increases by the amount α1. Note that this amount α1 differs from the increased amount α that was estimated in step S132. Due to this amount α1, the First_SCR that is newly assigned to the latter video data indicates an earlier time As can be seen from the lower graph in FIG. 34, the new value of First_SCR+STC_set is positioned at time which is Tα1 earlier than before. In FIG. 34, the descending guideline drawn from the new value of First_SCR+STC_offset intersects one audio frame in the audio frame sequence of the former cell. This intersected audio frame is the audio frame x, with the following audio frame x+1 being the final audio frame in the former cell.

Since the value of the sum of the STC_offset and the new First_SCR of the latter cell indicates an earlier time, this means that an earlier frame is indicated as the audio frame x. As a result, when a read is commenced for the video data in the latter cell, the audio data that should be read from the former cell together with this video data is comparatively larger than in the first embodiment.

Hereafter, the processing in steps S113 to S119 is performed so that the stream encoder 2e performs the multiplexing shown in FIG. 25.

After this, in step S120 the First_SCR, Last_SCR, the seamless flag, the C_V_E_PTM, and the C_V_S_PTM for the former and latter cells are inserted into the seamless linking information of the former cell. The control unit 1 then performs the processing in steps S121 and S122. Of the data for the six VOBUs obtained through the re-encoding, the three VOBUs arranged at the start (the first VOBUs) originally formed part of the former cell, and so are appended to the end of the former cell. Similarly, the three VOBUs arranged at the end (the latter VOBUs) originally formed part of the latter cell, and so are inserted at that start of the latter cell.

While one of the former and latter cell that have been given re-encoded data is managed having been assigned the same identifier as the VOB from which it was taken, the other of the two cells is managed having been assigned a different identifier to the VOB from which it was taken This means that after this division, the former cell and latter cell are managed as separate VOBs. This is because there is a high possibility of the time stamps not being continuous at the boundary between the former cell and the latter cell.

As in the first embodiment, in step S123 the control unit 1 judges whether the values of the SCR are continuous. If so, the control unit 1 ends the processing in the flowcharts of FIGS. 31 to 33. If not, the control unit 1 calculated the excess amount A based on the number of packs given overlapping SCRs, determines an amount of code based on the excess amount A, and returns to step S109 to repeat the re-encoding.

As a result of the above processing, cells are re-encoded, with the cells indicated by the cell information being set as separate VOBs. This means that VOB information for the newly generated VOBs need to be provided in the RTRW management file. The following is an explanation of how this VOB information for cells is defined.

The "video stream attribute information" includes compression mode information, TV system information, aspect ratio information, and resolution information, although this information may be set to match the information for the VOB(s) from which the cells were taken.

The "audio stream attribute information" includes an encoding mode, the presence/absence of dynamic range control, a sampling frequency, and a number of channels, although this information may be set to match the information for the VOB(S) from which the cells were taken.

The "time map table" is composed of the size of each VOBU that composes the VOB and the display period of each VOBU, although a corresponding part of the information given for the VOB(s) from which the cells were taken may be used, with the sizes and display periods only being amended for VOBUs that have been re-encoded.

The following is an explanation of the "seamless linking information" that was generated in step S133. This seamless linking information is composed of a seamless flag, a video presentation start time VOB_V_S_PTM, a video presentation end time VOB_V_E_PTM, a First_SCR, a Last_SCR, an audio gap start time A_STP_PTM, and an audio gap length A_GAP_LEN. These elements are written into the seamless linking information one at a time.

Only when the relationship between the former cell and the latter cell is satisfies the following conditions (1) and (2) is the seamless flag set at "01". If either condition is not satisfied, the seamless flag is set at "00."

(1) Both cells must use the same display method (NTSC, PAL, etc.) for the video stream as given in the video attribute information.

(2) Both cells must use the same encoding method (AC-3, MPEG, Linear-PCM) for the audio stream as given in the audio attribute information.

The "video presentation start time VOB_V_S_PTM" is updated to the presentation start time after re-encoding.

The "video presentation end time VOB_V_E_PTM" is updated to the presentation end time after re-encoding.

The "First_SCR" is updated to the SCR of the first pack after re-encoding.

The "Last_SCR" is updated to the SCR of the final pack after re-encoding.

The "audio gap start time A_STP_PTM" is set at the presentation end time of the audio frame y that is the final audio frame to be reproduced for the audio data that is moved to the latter cell in FIG. 34.

The "audio gap length A_GAP_LEN" is set as the period from the presentation end time of the final audio frame y to be reproduced using the audio data that is moved to the latter cell in FIG. 34 to the presentation start time of the audio frame u.

Once the VOB information has been generated as described above, an RTRW management file included this new VOB information is recorded onto the DVD-RAM. By doing so, the two cells that are indicated by the cell information can be recorded on the DVD-RAM as two VOBs that are to be reproduced seamlessly.

As described above, this second embodiment can process cells in a VOB or VOBs so as to have the cells seamlessly reproduced by merely reading and re-encoding the end of the former cell and the start of the latter cell, since only the VOBUs located at the start and end of the respective cells are re-encoded, this re-encoding of cells can be achieved in a very short time.

It should be noted that while the present embodiment describes the case where video fields as used as the unit when indicating cells, video frames may be used instead.

The processing module software represented by the flowcharts in this first embodiment (FIGS. 31–33) may be realized by a machine language program which may be distributed and sold having been recorded on a recording medium. Examples of such recording medium are an IC card, an optical disc, or a floppy disc. The machine language program recorded on the recording medium may then be installed into a standard personal computer. By executing the installed machine language programs, the standard personal computer can achieve the functions of the video data editing apparatus of the present embodiment.

Third Embodiment

The third embodiment of the present invention manages AV files in a file system and allows greater freedom in video editing.

(3-1) Directory Structure on a DVD-RAM

Figure 35:
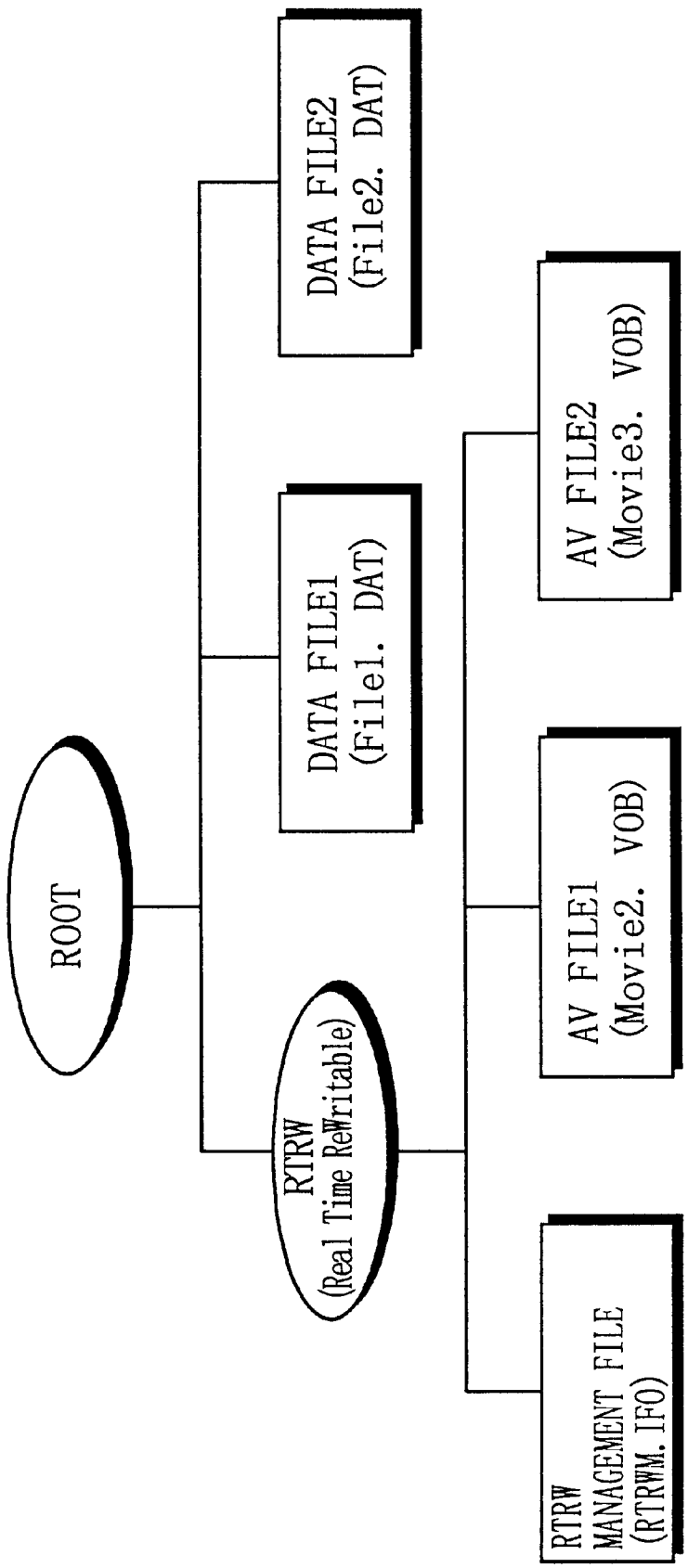
FIG. 35 shows the hierarchical directory structure.

The RTRW management file and AV files of the first embodiment are arranged in the directories shown in FIG. 35 within a file system that complies to ISO/IEC 13346. In FIG. 35, the ovals represent directories and the rectangles represent files. The root directory includes directories called a "RTRW" and two files called "File1.DAT" and "File2.DAT". The RTRW directory includes three files called "Movie1.VOB", "Movie2.VOB", and "RTRW-M.IFO".

(3-1-1) File System Management Information in the Directories

Figure 36:
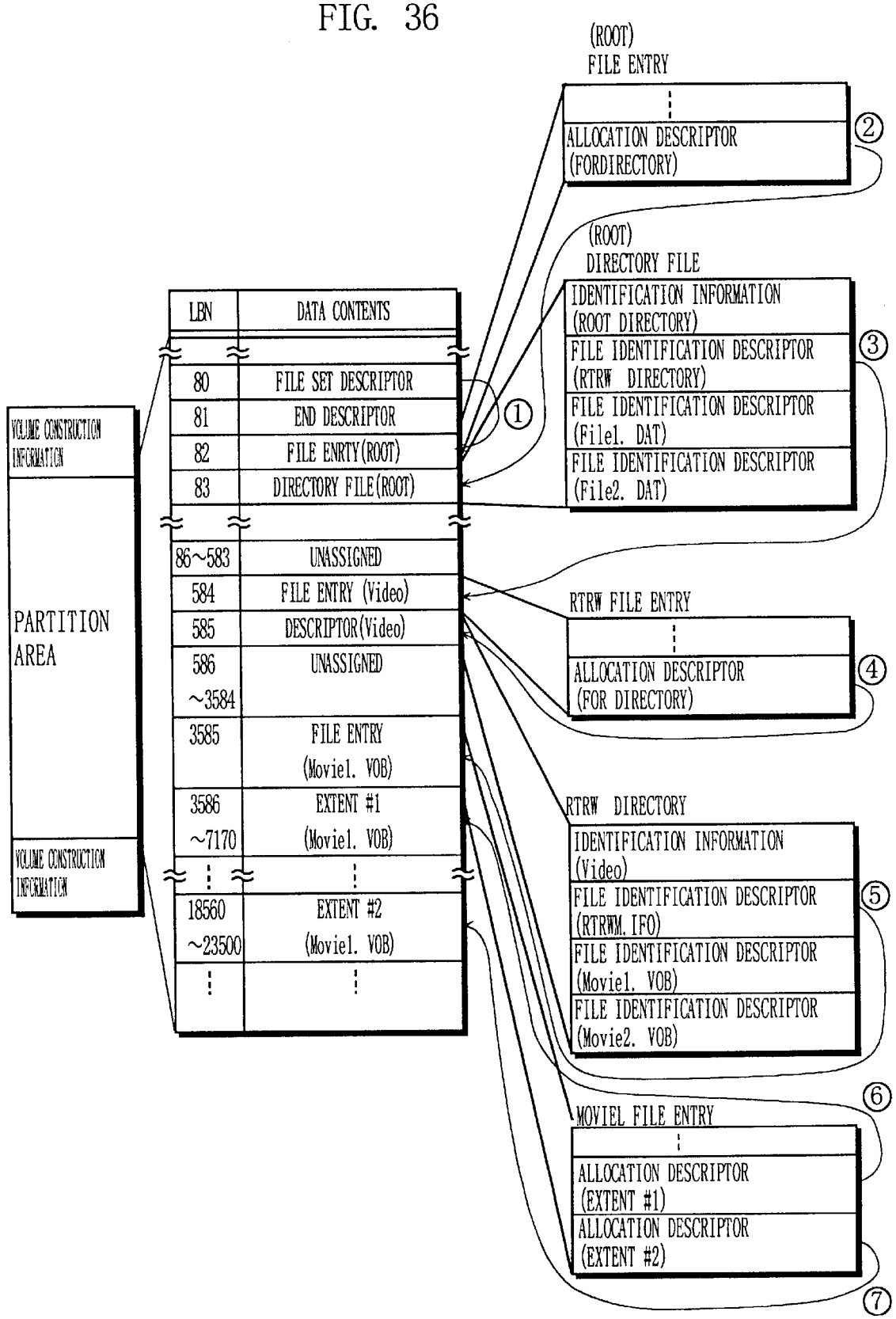
FIG. 36 shows the information, aside from the sector management table and AV block management table shown in FIG. 6, in the management information for the file system.

The following is a description of the management information used for managing the RTRW management file and AV files in the directory structure shown in FIG. 35. FIG. 36 shows the file system management information in the directory structure of FIG. 35.

Figure 3D:
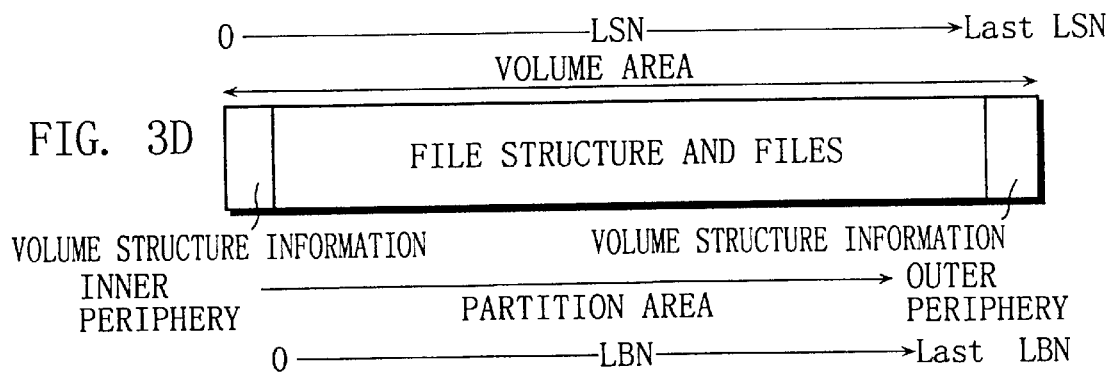
FIG. 3D shows the logical block numbers (LBN) in the volume area.

FIG. 36 shows the volume area shown in FIG. 3D, the sectors, and stored contents of sectors in a hierarchy. Arrows ①–① in this drawing show the order in which the storage positions of the file "Movie1.VOB" are specified by the present management information.

The first level in the hierarchy in FIG. 36 shows the volume area shown in FIG. 3D.

The second level in the hierarchy shows file set descriptors, end descriptors, file entries, and directories, out of the entire management information. The information on this second level complies with a file system that is standardized under ISO/IEC 13346. File systems that are standardized under ISO/IEC 13346 manage directories in a hierarchy.

The management information in FIG. 36 is arranged in accordance with the directory structure. However, a recording region is only shown for the AV file "Movie1.VOB".

The file set descriptor (LBN 80) on the second level shows information such as the LBN of the sector that stores the file entry for the root directory. The end descriptor (LBN 81) shows the end of the file set descriptor.

A file entry (such as LBN 82, 584, 3585) is stored for each file (or directory), and shows a storage position for a file or directory. File entries for files and file entries for directories have a same format, so that hierarchical directories can be freely constructed.

A directory (such as LBN83, 584, 3585) shows storage positions for file entries of the files or directories included in the directory.

Three files entries and two directories are shown on the third level in the hierarchy. The file entries and directories are tracked by the file system and have a data construction that enables the storage position of a specified file to be indicated regardless of the construction of the hierarchy in the directory structure.

Each file entry includes an allocation descriptor that shows a storage position of a file or directory When the data recorded in each file is divided into a plurality of extents, a file entry includes a plurality of allocation descriptors for each extent.

The expression "extent" refers here to a section of data included in a file that should be preferably stored in consecutive regions. When, for example, the size of a VOB to be recorded in an AV file is large, but there are no consecutive regions for storing the VOB, the AV file cannot be recorded on the DVD-RAM.

However, when there is a plurality of small consecutive regions distributed across the partition area, by dividing the VOBs to be recorded in the AV file, the resulting divided sections of the VOBs may be stored into the distributed consecutive areas.

By dividing VOBs in this way, the probability of being able to store VOBs as AV files increases, even when the number of consecutive regions and length of the partition area are limited To improve the efficiency with which data is recorded on a DVD-RAM, the VOBs recorded in one AV file are divided into a plurality of extents, with these extents being recorded in separate consecutive areas on the disc without regard to the order of the extents.

It should be noted that the expression "consecutive regions" here refers to a region composed of ECC blocks that are logically or physically consecutive.

As one example, the file entries with the LBN 82 and 584 in FIG. 36 each include a single allocation descriptor, which means that the file is not divided into a plurality of extents (which is to say, is composed of a single extent). The file entry 3585 meanwhile has two allocation descriptors, which means that the data to be stored in the file is composed of two extents.

Each directory includes a file identification descriptor showing a storage position of a file entry for each file and each directory included in the directory. When tracing a route through the file entries and directories, the storage position of the file "root/video/Movie1.VOB" can be found by following the order given as file set descriptor →①→file entry (root)→②→director y (root)→③→file entry (RTRW)→④→directory (RTRW)→⑤→file entry (Movie1.VOB)→⑥⑦→file (extents #1 and #2 of Movie1VOB).

Figure 37:
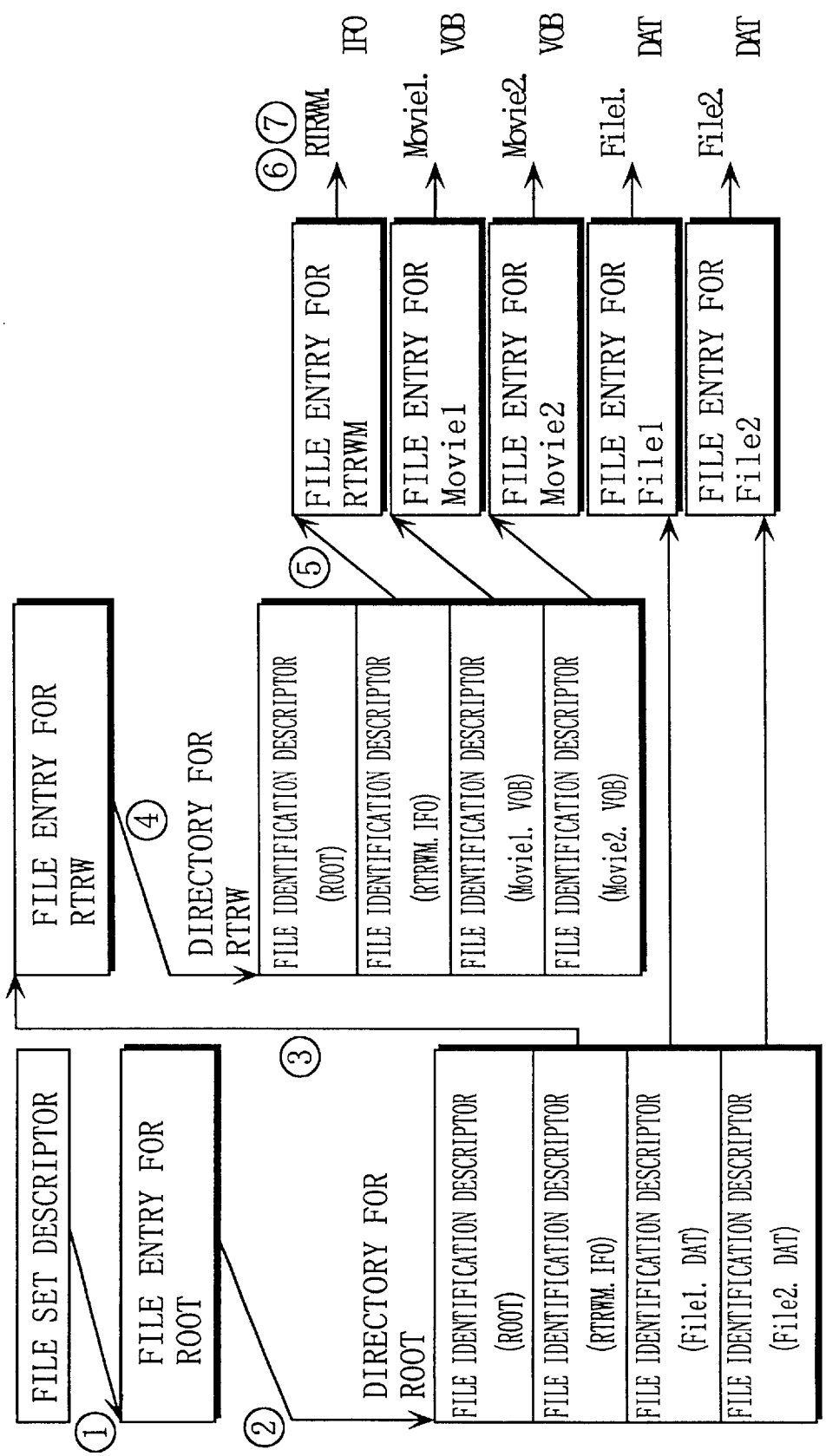
FIG. 37 shows the linked relations shown by the arrows in FIG. 6 within the directory structure.

FIG. 37 shows the link relationship between the file entries and directories on this route in another format that traces the directory construction. In this drawing, the directories used for route include file identification descriptors for the directory of the parent directory (the parent of the root being the root itself), the RTRW directory, the File1.DAT file, and the File2.DAT file. The RTRW directory includes file identification descriptors for each of the directory of the parent directory (root), the Movie1.VOB file, the Movie2.VOB file, and the RTRWM.IFO file. In the same way, the storage position of the Movie1.VOB file is specified by tracing the route ①–⑥⑦.

3-1-2 Data Construction of a File Entry

FIG. 38A shows the data construction of a file entry in more detail. As shown in FIG. 38A, a file entry includes a descriptor tag, an ICB tag, an allocation descriptor length, expanded attributes, and an allocation descriptor. In this figure, the legend "BP" represents "bit position", while the legend "RBP" represents "relative bit position".

The descriptor tag is a tag showing the present entry is a file entry. For a DVD-RAM, a variety of tags are used, such as the file entry descriptor and the space bitmap descriptor. For a file entry, a value "261" is used as the descriptor tag indicating a file entry.

The ICB tag shows attribute information for the file entry itself.

The expanded attributes are information showing the attributes with a higher-level content than the content specified by the attribute information field in the file entry.

The allocation descriptor field stores as many allocation descriptors as there are extents that compose the file. Each allocation descriptor shows the logical block number (LBN) that indicates the storage position of an extent for a file or a directory The data construction of an allocation descriptor is shown in FIG. 38B.

The allocation descriptor in FIG. 38B includes data showing the extent length and a logical block number showing the storage position of the extent. However, the top two bits of the data indicating the extent length show the storage state of the extent storage area. The meanings of the various values are as shown in FIG. 38C.

Figure 39A:
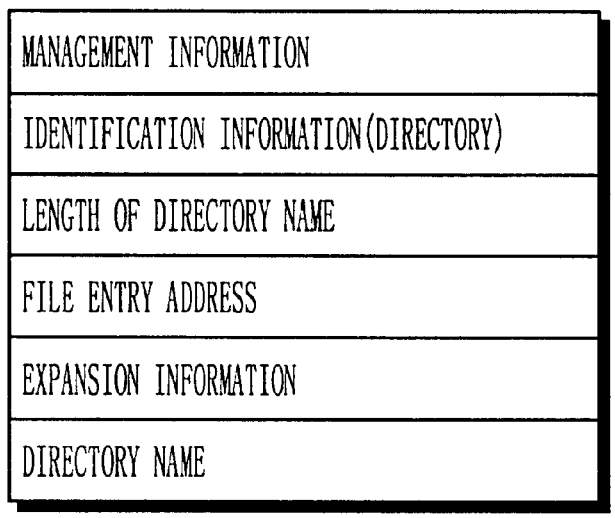
FIG. 39A shows the detailed data construction of the file identification descriptor for a directory.
Figure 39B:
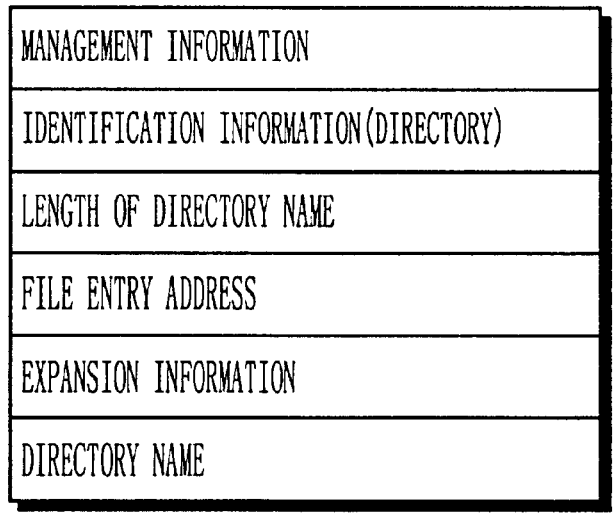
FIG. 39B shows the detailed data construction of the file identification descriptor for a file.

(3-1-3) Data Contrustion of the File Identification Descriptors for Directories and Files FIGS. 39A and 39B show the detailed data construction of the file identification descriptors for directories and files in the various directories. These two types of file identification descriptors have the same format, and so each include management information, identification information, a directory name length, an address showing the logical block number that stores the file entry for the directory or file, expansion information, and a directory name. In this way, the address of a file entry is associated with a directory name or file name.

(3-1-4) Minimum Size of an AV Block

When a VOB to be recorded in an AV file is divided into a plurality of extents, the data length of each extent must exceed the data length of an AV block. The expression "AV block" here refers to the minimum amount of data for which there is no danger of underflow for the track buffer 3a when reading a VOB from the DVD-RAM.

To guarantee consecutive reproduction, the minimum size of an AV block is defined in relation to the track buffer provided in a reproduction apparatus. The following explanation deals with how this minimum size of an AV block is found.

(3-1-5) Minimum Size of an AV Block Area

First, the rationale behind the need to determine the minimum size of an AV block for guaranteeing uninterrupted reproduction is described.

FIG. 40 shows a model of how a reproduction apparatus that reproduces video objects buffers AV data read from the DVD-RAM in the track buffer. This model shows the minimum requirements of a reproduction apparatus for uninterrupted reproduction to be guaranteed.

In the upper part of FIG. 40, the reproduction apparatus subjects the AV data it reads from the DVD-RAM to ECC processing, temporarily accumulates the resulting data in the track buffer, which is a FIFO memory, and then outputs the data from the track buffer to the decoder. In the illustrated example, $V_r$ is the input transfer rate of the track buffer (or in other words, the rate at which data is read from the optical disc), and $V_o$ is the output transfer rate of the track buffer (decoder input rate), where $V_r > V_o$. In the present model, $V_r = 11$ Mbps.

The lower part of FIG. 40 is a graph showing the changes in the amount of data in the track buffer for the present model. In this graph, the vertical axis represents the amount of data in the buffer, while the horizontal axis represents time. This graph assumes that the AV block#k that includes a defective sector is read following the AV block#j that includes no defective sectors.

The period T1 shown on the time axis shows the time required to read all AV data in the AV block#j that includes no defective sectors. During this period T1, the amount of data in the track buffer increases at the rate $(V_r - V_o)$ The period T2 (hereinafter called the "jump period") shows the time required by the optical pickup to jump from the AV block#j to the AV block#k. This jump period includes the seek time for the optical pickup and the time taken for the rotation of the optical disc to stabilize. In the worst case scenario of a jump from the inner periphery to the outer periphery of the optical disc, the jump time is assumed to be around 1500 ms for the present model. During the jump period T2, the amount of data in the track buffer decreases at a rate of $V_o$.

The periods T3 to T5 show the time taken to read all AV data in the AV block#k that includes a defective sector.

Of these periods, the period T4 shows the time taken to skip to the next ECC block from a present ECC block that includes a defective sector. This skip operation involves skipping a present ECC block if one or more of the 16 sectors is defective and jumping to the next ECC block. This means that in an AV block, instead of merely logically replacing each defective sector in an ECC block with a replacement sector (or a replacement ECC block), use of each ECC block (all 16 sectors) with a defective sector is stopped. This method is called the ECC block skip method. The period T4 is the disc rotation wait time, which, in the worse case scenario, is the time taken for one revolution of the disc. This is presumed to be around 105 ms for the present model. In periods T3 and T5, the amount of data in the buffer increases at a rate given as $V_r - V_o$, while during period T4, the amount decreases at the rate $V_o$.

When "N_ecc" represents the total number of ECC blocks in an AV block, the size of an AV block is given by the formula "N_ecc*16*8*2048" bits. To ensure consecutive reproduction is performed, the minimum value of N_ecc is found as described below.

In period T2, AV data is only read from the track buffer with no concurrent replenishing of AV data. During this period T2, should the amount of data in the buffer reach zero, an underflow will occur in the decoder. In such case, the uninterrupted reproduction of AV data cannot be guaranteed. As a result, the relation shown as Equation 1 below needs to be satisfied to guarantee the uninterrupted reproduction of AV data (which is to say, to ensure that no underflow occurs).

Equation 1

(buffered data amount B)≧(consumed data amount R)

The buffered data amount B is the amount of data stored in the buffer at the end of the period T1. The consumed data amount R is the total amount of data read during the period T2.

The buffered data amount B is given by Equation 2 below.

Equation 2

(buffered data amount B)=(period T1)*$(V_r-V_o)$
=(read time for 1 AV block)*$(V_r-V_o)$
=(AV block size L/$V_r$)*$(V_r-V_o)$
=(N_ecc*16*8*2048/$V_r$)*$(V_r-V_o)$
=(N_ecc*16*8*2048)* $(1-V_o/V_r)$ The consumed data amount R is given by Equation 3 below.

Equation 3

(consumed data amount R)=T2 *$V_o$

Substituting Equations 2 and 3 into the respective sides of Equation 1 gives Equation 4 below.

Equation 4

(N_ecc*16*8*2048)*$(1-V_o/V_r)$>T2 *$V_o$

By rearranging Equation 4, it can be seen that the number N_ecc of ECC blocks that guarantees consecutive reproduction must satisfy Equation 5 below.

Equation 5

N_ecc>T2 *$V_o$/((16*8*2048)*$(1-V_o/V_r)$)

In Equation 5, T2 is the jump period described above, which has a maximum of 1.5s. $V_r$, meanwhile, has a fixed value, which for the model in the upper part of FIG. 40 is 11 Mbps. $V_o$ is expressed by the following Equation 6 that takes the variable bit rate of the AV block that includes a number N_ecc of ECC blocks into consideration. Note that $V_o$ is not the maximum value of the logical transfer rate for output from the track buffer, but is given by the equation below as the effective input rate of variable rate AV data into the decoder. AV block length here is given as the number N_pack of packs in an AV block composed of N_ecc ECC blocks ((N_ecc-1)*16<N_pack≦N_ecc*16).

Equation 6

$V_o$=AV block length(bit)*(1/AV block reproduction time (sec)) =(N_pack*2048*8)*(27M/(SCR_first_next−SCR_first_current))

In the above equation, SCR_first_next is the SCR of the first pack in the next AV block, while SCR_first_current is the SCR of the first pack in the present AV block. Each SCR shows the time at which the corresponding pack should be outputted from the track buffer to the decoder. The unit for SCRs is 1/27 megaseconds.

As shown in the above Equations 5 and 6, the minimum size of an AV block can theoretically be calculated in accordance with the actual bit rate of the AV data.

Equation 5 applies to a case where no defective sectors exist on the optical disc. When such sectors are present, the number of ECC blocks Necc required to ensure uninterrupted reproduction is as described below.

It is presumed here that the AV block area includes ECC blocks with defective sectors, the number of which is represented as "dN_ecc". No Av data is recorded into the dN_ecc defective ECC blocks due to the ECC block skipping described above. The loss time Ts caused by skipping the dN_ecc defective ECC blocks is represented as "T4*dN ecc," where "T4" represents the ECC block skip time for the model shown in FIG. 40.

To ensure the uninterrupted reproduction of the AV data when defective sectors are included, the AV block area needs to include as the number of ECC blocks represented by Equation 7.

Equation 7

N_ecc≧dN_ecc+$V_o$*(Tj+Ts)/((16*8*2048)*$(1-V_o/V_r)$)

As described above, the size of the AV block area is calculated from Formula 5 when no defective sector is present, and from Formula 7 when defective sectors are present.

It should be noted here that when AV data is composed of a plurality of AV blocks, the first and last AV blocks do not need to satisfy Equation 5 or 7. This is because the timing at which decoding is commenced for the first AV block can be delayed, which is to say, the supply of data to the decoder may be delayed until sufficient data is accumulated in the buffer, thereby ensuring uninterrupted reproduction between the first and second AV blocks. The last AV block, meanwhile, is not followed by any particular AV data, meaning that the reproduction may simply end with this last AV block.

(3-2) Functional Blocks of the DVD Recorder 70

Figure 41:
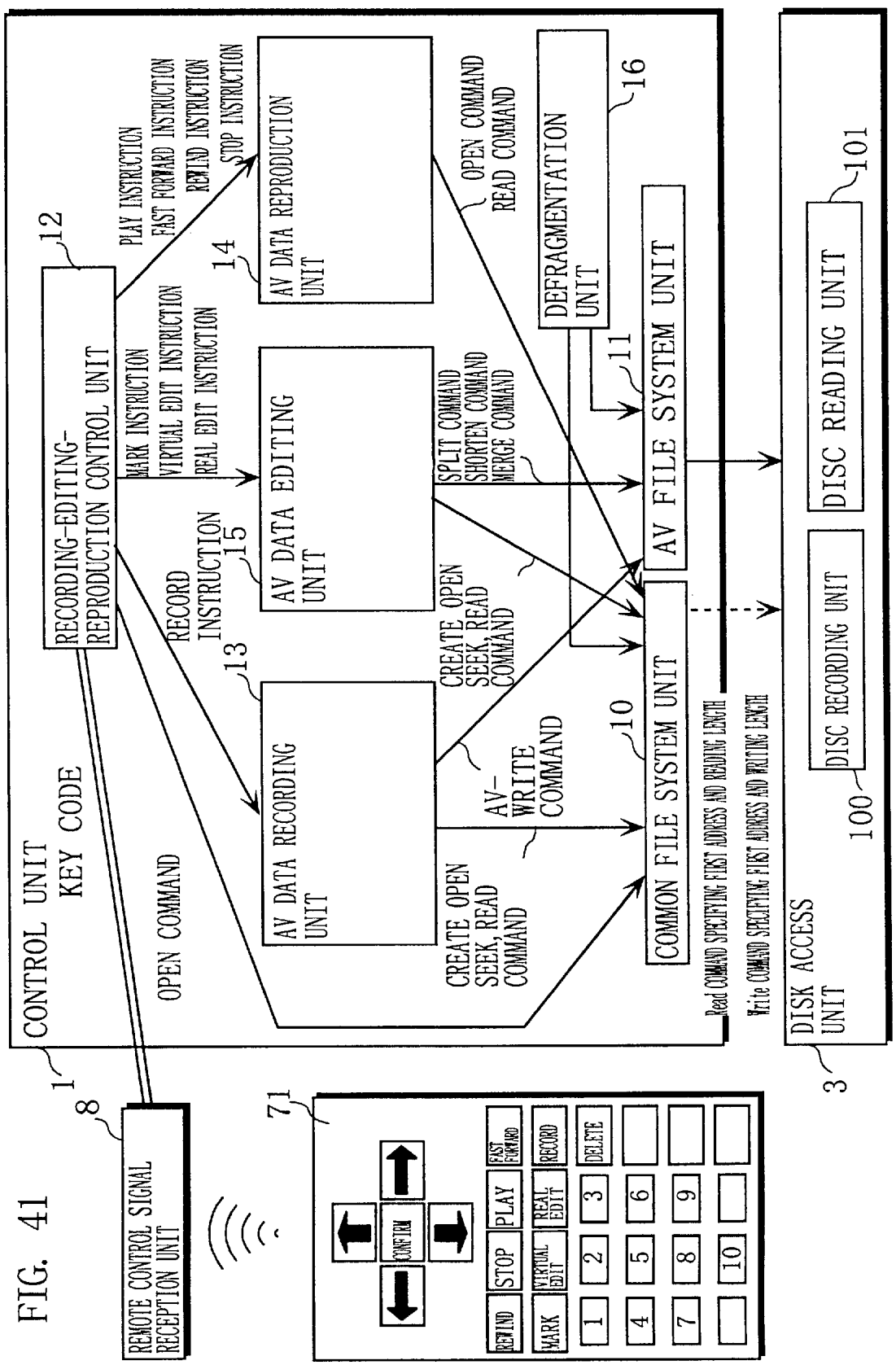
FIG. 41 is a functional block diagram showing the construction of the DVD recorder 70 divided by function.

FIG. 41 is a function block diagram showing the construction of the DVD recorder 70 divided into functions. Each function in FIG. 41 is realized by the CPU 1a in the control unit 1 executing a program in the ROM 1e to control the hardware shown in FIG. 17.

The DVD player of FIG. 41 includes the disc recording unit 100, the disc reading unit 101, the common file system unit 10, the AV file system unit 11, the recording-editing-reproduction control unit 12, the AV data recording unit 13, the AV data reproduction unit 14, and the AV data editing unit 15.

(3-2-1) Disc Recording Unit 100—Disc Reading Unit 101

The disc recording unit 100 operates as follows. On receiving an input of the logical sector number from which recording is to start and the data to be recorded from the common file system unit 10 and the AV file system unit 11, the disc recording unit 100 moves the optical pickup to the appropriate logical sector number and has the optical pickup record data in ECC block units (16 sectors) into the indicated sectors on the disc. When the amount of data to be recorded is below 16 sectors, the disc recording unit 100 first reads the data, subjects it to ECC processing, and records it onto the disc as an ECC block.

The disc reading unit 101 operates as follows. On receiving an input of a logical sector number from which data is to be read and a number of sectors from the common file system unit 10 and the AV file system unit 11, the disc reading unit 101 moves the optical pickup to the appropriate logical sector number and has the optical pickup read data in ECC block units from the indicated logical sectors. The disc reading unit 101 has ECC processing performed on the read data and transfers only the required sector data to the common file system unit 10. As with the disc recording unit 100, the disc reading unit 101 reads VOBs in units of 16 sectors for each ECC block, thereby reducing the overheads.

(3-2-2) Common File System Unit 10

The common file system unit 10 provides the recording-editing-reproduction control unit 12, the AV data recording unit 13, the AV data reproduction unit 14, and the AV data editing unit 15 with the standard functions for accessing data format standardized under ISO/IEC 13346. These standard functions provided by the common file system unit 10 control the disc recording unit 100 and the disc reading unit 101 to read or write data onto or from the DVD-RAM in directory units and file units.

Representative examples of the standard functions provided by the common file system unit 10 are as follows.

1. Having the disc recording unit 100 record a file entry and output the file identification descriptor to the recording-editing-reproduction control unit 12, the AV data recording unit 13, the AV data reproduction unit 14, and the AV data editing unit 15

2. Converting a recorded area on the disc that includes one file into an empty area.

3. Controlling the disc reading unit 101 to read the file identification descriptor of a specified file from a DVD-RAM.

4. Controlling the disc recording unit 100 to record memory present in the memory onto the disc as a non-AV file.

5. Controlling the disc reading unit 101 to read an extent that composes a file recorded on the disc.

6. Controlling the disc reading unit 101 to move the optical pickup to a desired position in the extents that compose a file.

To use any of the functions (1) to (6), the recording-editing-reproduction control unit 12 to AV data editing unit 15 may issue a command to the common file system unit 10 to indicate the file to be read or recorded as a parameter. Such commands are called common tile system-oriented commands.

Various types of common file system-oriented commands are available, such as "(1)CREATE", "(2)DELETE", "(3) OPEN/CLOSE", "(4)WRITE", "(5)READ", and "(6) SEEK". Such commands are respectively assigned to the functions (1) to (6).

In the present embodiment, the assignment of commands to the standard functions is as follows. To use function (1), the recording-editing-reproduction control unit 12 to AV data editing unit 15 may issue a "CREATE" command to the common file system unit 10. To use function (2), the recording-editing-reproduction control unit 12 to AV data editing unit 15 may issue a "DELETE" command to the common file system unit 10. In the same way, to respectively use functions (3), (4), (5), and (6), the recording-editing-reproduction control unit 12 to AV data editing unit 15 may issue an "OPEN/CLOSE", "WRITE", "MAD" or "SEEK" command to the common file system unit 10.

(3-2-3) AV File System Unit 11

The AV file system unit 11 provides the AV data recording unit 13, AV data reproduction unit 14, and AV data editing unit 15 with extended functions which are only necessary when recording or editing an AV file. These extended functions cannot be provided by the common file system unit 10.

The following are representative examples of these extended functions.

(7) Writing a VOB that has been encoded by the MPEG encoder 2 onto a DVD-RAM as an AV file.

(8) Cutting out an indicated part of the VOBs recorded in an AV file and setting the part as a different file.

(9) Clearing an indicated part of the VOBs recorded in an AV file.

(10) Linking two AV files that are present on the DVD-RAM with VOBUs that have been re-encoded according to the procedure in the first and second embodiments.

To use the extended functions (7) to (10), the recording-editing-reproduction control unit 12 to AV data editing unit 15 may issue a command to the common file system unit 10 to indicate the file to be recorded, linked, or cut out. Such commands are called AV file system-oriented commands. Here, the AV file system-oriented commands "AV-WRITE", "SPLIT", "SHORTEN", and "MERGE" are available, with these being respectively assigned to the functions (7) to (10).

In the present embodiment, the assignment of commands to the extended functions is as follows. To use the function (7), the AV data recording unit 13 to AV data editing unit 15 may issue an AV-WRITE command. To use the function (8), the AV data recording unit 13 to AV data editing unit 35 may issue a SPLIT command. Similarly, to use the function (9) or (10), the AV data recording unit 13 to AV data editing unit 15 may issue a "SHORTEN" or "MERGE" command. With function (10), the extent of the file after linking is as long as or longer than an AV block.

(3-2-4) Recording-Editing-Reproduction Control Unit 12

The recording-editing-reproduction control unit 12 issues an OPEN/CLOSE command that indicates directory names as parameters to the common file system unit 10, and by doing so has the common file system unit 10 read a plurality of file identification descriptors from the DVD-RAM. The recording-editing-reproduction control unit 12 then analyzes the directory structure of the DVD-RAM from the file identification descriptors and receives a user indication of a file or directory to be operated upon.

On receiving the user indication of the target file or directory, the recording-editing-reproduction control unit 12 identifies the desired operation content based on the user operation notified by the remote control signal reception unit 8, and issues instructions to have the AV data recording unit 13, the AV data reproduction unit 14, and the AV data editing unit 15 perform the appropriate processing for the file or directory indicated as the operation target.

To have the user indicate the operation target, the recording-editing-reproduction control unit 12 outputs graphics data, which visually represents the directory structure, the total number of AV files, and the data sizes of empty areas on the present disc, to the video signal processing unit 5. The video signal processing unit 5 converts this graphics data into an image signal and has it displayed on the TV monitor 72.

Figure 42:
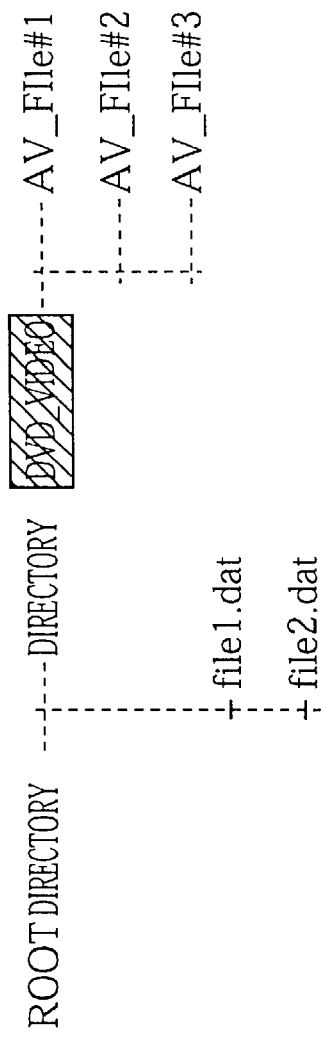
FIG. 42 shows an example of an interactive screen displayed on the TV monitor 72 under the control of the recording-editing-reproduction control unit 12.

FIG. 42 shows an example of the graphics data displayed on the TV monitor 72 under the control of the recording-editing-reproduction control unit 12. During the display of this graphics data, the display color of any of the files or directories may change to show potential operation targets. This change in color is used to focus the attention of the user, and so is called the "focus state". Display using the normal color, meanwhile, is called the "normal state".

When the user presses the mark key on the remote controller 71, the display of the file or directory that is currently in the focus state returns to the normal state and a different, newly-indicated file or directory is displayed in the focus state. When any of the files or directories is in the focus state, the recording-editing-reproduction control unit 12 waits for the user to press the "confirm" key on the remote controller 71.

When the user presses the enter key, the recording-editing-reproduction control unit 12 identifies the file or directory that is currently in the focus state as a potential operation target. In this way, the recording-editing-reproduction control unit 12 can identify the file or directory that is the operation target.

To identify the operation content, however, the recording-editing-reproduction control unit 12 determines what operation content has been assigned to the key code received from the remote control signal reception unit 8. As shown on the left side of FIG. 41, keys with the legends "PLAY", "REWIND", "STOP", FAST FORWARD", "RECORD", "MARK", "VIRTUAL EDIT", AND "REAL EDIT" are present on the remote controller 71. In this way, the recording-editing-reproduction control unit 12 identifies the operation content indicated by the user according to the key code received from the remote control signal reception unit 8.

(3-2-4-1) Operation Contents That Can Be Received by the Recording-Editing-Reproduction Control Unit 12

The operation contents are classified into operation contents that are provided on conventional domestic AV equipment, and operation contents that are specially provided for video editing As specific examples, "play", "rewind", "stop", "fast forward", and "record" all fall into the former category, while "mark", "virtual edit", and "real edit" all fall into the latter category.

A "play" operation has the DVD recorder 70 play back a VOB that is recorded in an AV file that is specified as the operation target.

A "rewind" operation has the DVD recorder 70 rapidly play back a presently reproduced VOB in reverse.

A "stop" operation has the DVD recorder 70 stop the reproduction of the present VOB.

A "fast forward" operation has the DVD recorder 70 rapidly play back the present VOB in the forward direction.

A "record" operation has the DVD recorder 70 generate a new AV file in the directory indicated as the operation target and write the VOB to be recorded into the new AV file.

These operations in this former category are well-known to users as functions of conventional domestic AV equipment, such as video cassette recorders and CD players. The operations in the latter category are performed by users when, to use an analogy of editing a conventional movie film, sections of movie film are cut out and spliced together to produce a new movie sequence.

A "mark" operation has the DVD recorder 70 replay a VOB included in the AV file indicated as the operation target and marks desired images out of the video images replayed by the VOB. To use the analogy of editing a movie film, this "mark" operation involves the marking of points where the film is to be cut.

A "virtual edit" operation has the DVD recorder 70 select a plurality of pairs of two points indicated by a mark operation as reproduction start points and reproduction end points and then define a logical reproduction route by assigning a reproduction order to these pairs of points.

In a virtual edit operation, the section defined by one pair of a reproduction start point and reproduction end point selected by the user is called a "cell". The reproduction route defined by assigning a reproduction order to the cells is called a "program chain".

A real "edit" operation has the DVD recorder 70 cut out each section indicated as a cell from an AV file recorded on a DVD-RAM, set the cut-out sections as separate files, and link a plurality of cut-out sections in accordance with the reproduction order shown by a program chain. Such edit operations are analogous to the cutting of a movie film at the marked positions and the splicing of the cut sections together. In these edit operations, the extent of the linked files is equal to or greater than the length of one AV block.

The recording-editing-reproduction control unit 12 controls which of the AV data recording unit 13 to the AV data editing unit 15 are used when performing the operation contents described above. In addition to specifying the operation target and operation content, the recording-editing-reproduction control unit 12 chooses the appropriate component(s) for the operation content out of the AV data recording unit 13 to AV data editing unit 15 and outputs instructions informing these components of the operation content.

The following is a description of example instructions that the recording-editing-reproduction control unit 12 gives to the AV data recording unit 13, the AV data reproduction unit 14, and the AV data editing unit 15 using combinations of an operation target and an operation content.

In FIG. 42, the directory "DVD_Video" is in the focus state, so that if the user presses the "RECORD" key, the recording-editing-reproduction control unit 12 identifies the directory "DVD_Video" as the operation target and "record" as the operation content. The recording-editing-reproduction control unit 12 selects the AV data recording unit 13 as the component capable of performing a record operation, and instructs the AV data recording unit 13 to generate a new AV file in the directory indicated as the operation target.

When the file "AV_FILE#1" is in the focus state and the user presses the "PLAY" key on the remote controller 71, the recording-editing-reproduction control unit 12 identifies the file "AV_FILE#1" as the operation target and "play" as the operation content. The recording-editing-reproduction control unit 12 selects the AV data reproduction unit 14 as the component capable of performing a play operation, and instructs the AV data reproduction unit 14 to reproduce the AV file indicated as the operation target.

When the file "AV_FILE#1" is in the focus state and the user presses the "MARK" key on the remote controller 71, the recording-editing-reproduction control unit 12 identifies the file "AV_FILE#1" as the operation target and "mark" as the operation content. The recording-editing-reproduction control unit 12 selects the AV data editing unit 15 as the component capable of performing a mark operation, and instructs the AV data editing unit 15 to perform a marking operation for the AV file indicated as the operation target.

(3-2-5 AV Data Recording Unit 13

The AV data recording unit 13 controls encoding operations of the MPEG encoder 2 while issuing common file system-oriented commands and AV file system-oriented commands in a predetermined order to the common file system unit 10 and the AV file system unit 11. By doing so, the AV data recording unit 13 makes use of the functions (1) to (10) and realizes recording operations.

(3-2-6) AV Data Reproduction Unit 14

The AV data reproduction unit 14 controls decoding operations of the MPEG decoder 4, while issuing common file system-oriented commends and AV file system-oriented commands in a predetermined order to the common file system unit 10 and the AV file system unit 11. By doing so, the AV data reproduction unit 14 makes use of the functions (1) to (10) and realizes "play", "rewind", "fast forward", and "stop" operations.

(3-2-7) AV Data Editing Unit 15

The AV data editing unit 15 controls the decoding operations of the MPEG decoder 4, while issuing common file system-oriented commands and AV file system-oriented commands in a predetermined order to the common file system unit 10 and the AV file system unit 11. By doing so, the AV data reproduction unit 14 makes use of the functions (1) to (10) and realizes "mark", "virtual edit", and "edit" operations.

In more detail, on receiving instructions from the recording-editing-reproduction control unit 12 to mark the AV file indicated as the operation target, the AV data editing unit 15 has the AV data reproduction unit 14 reproduce the indicated AV file and monitors when the user presses the "MARK key on the remote controller 71. When the user presses the "MARK" key during the reproduction, the AV data editing unit 15 writes information called a "mark point" onto the disc as a non-AV file. This mark point information shows the time in seconds from the start of the reproduction of the AV file to the point where the user pressed the "MARK" key.

On receiving instructions from the recording-editing-reproduction control unit 12 for a virtual edit operation, the AV data editing unit 15 generates information that defines a logical reproduction route in accordance with the user key operations of the remote controller 71. The AV data editing unit 15 then controls the common file system unit 10 so that this information is written onto the DVD-RAM as a non-AV file.

On receiving instructions from the recording-editing-reproduction control unit 12 for a real edit operation, the AV data editing unit 15 cuts out the sections of the DVD-RAM indicated as cells and sets the cut-out sections as separate files which it links to form a sequence of cells.

When linking a plurality of files, the AV data editing unit 15 performs processing so that seamless reproduction of images will be achieved. This means that there will be no interruptions in the image display when a linked AV file is reproduced. The AV data editing unit 15 links extents to make all extents, except for the last extent to be reproduced, equal to or greater than the AV block length.

(3-2-7-1) Processing for Virtual Edits And Edits by the AV Data Editing Unit 15

FIG. 43 is a flowchart for the processing of virtual edit and real edit operations. FIGS. 44A to 44F are figures showing a supplementary example of the processing by the AV data editing unit 15 according to the flowchart of FIG. 43. The following describes the editing processes of the AV data editing unit 15 with reference to the flowchart of FIG. 43 and the example in FIGS. 44A to 44F.

The AV file shown in FIG. 44A is already stored on the DVD-RAM. When this AV file is indicated as the operation target, the user presses the "PLAY" key on the remote controller 71. The recording-editing-reproduction control unit 12 detects key operations, so that when the user presses the "MARK" key, the AV data editing unit 15 has the AV data reproduction unit 14 commence the reproduction of the AV file in step S1.

After the start of reproduction, the reproduction proceeds as far as the time t1 in FIG. 44B when the user next presses the "MARK" key. In response to this, the AV data editing unit 15 sets the mark point#1, which expresses a relative time code for time t1, into the present AV file. The user subsequently presses the "MARK" key a total of seven times at times t2, t3, t4, . . . t8. In response, the AV data editing unit 15 sets the mark points #2, #3, #4, #5, . . . #8, which express relative time codes for time t2, t3, t4, t8, into the present AV file, as shown in FIG. 44B.

After the execution of step S1, the processing proceeds to step S2 where the AV data editing unit 15 has the user indicate pairs of mark points. The AV data editing unit 15 then determines the cells to be reproduced within the present AV file in accordance with the selected pairs of mark points.

In FIG. 44C, the user indicates that mark points #1 and #2 form pair (1), mark points #3 and #4 form pair (2), mark points #5 and #6 form pair (3), and mark points #7 and #8 form pair (4).

In this way, the AV data editing unit 15 sets the AV data within each pair of points as a separate cell, and so in the present example sets the four cells, Cell#1, Cell#2, Cell#3, and Cell#4. Note that in the present example, the AV data editing unit 15 may alternatively set the pair of Mark#2 and Mark#3 as one cell, and the pair of Mark#4 and Mark#5 as another cell.

Next, in step S3, the AV data editing unit 15 generates a program chain by assigning a reproduction order to the cells it has produced. In FIG. 44D, Cell#1 is the first in the reproduction route (shown by the legend "$1^{st}$" in the drawing), Cell#2 is the second in the reproduction route (shown by the legend "$2^{nd}$" in the drawing), and Cells #3 and #4 respectively are the third and fourth in the reproduction route (shown by the legends "$3^{rd}$" and "$4^{th}$" in the drawing). By doing so, the AV data editing unit 15 treats the plurality of cells as a program chain, based on the chosen reproduction order. Note that FIG. 44D shows the simplest reproduction order of cells, with the setting of other orders, such as Cell#3→Cell#1→Cell#2→Cell#4, being equally possible.

In step S6, the AV data editing unit 15 monitors whether the user has indicated the reproduction of the program chain. In step S5, the AV data editing unit 15 monitors whether the user has indicated an editing operation for the program chain. When the user indicates reproduction, the AV data editing unit 15 instructs the AV data reproduction unit 14 to reproduce the program chain indicated for reproduction.

On receiving reproduction instructions from the AV data editing unit 15, the AV data reproduction unit 14 has the optical pickup seek Mark#1 which is the reproduction start position for Cell#1, as shown in FIG. 44E. Once the optical pickup has moved to Mark#1 in the AV file in accordance with the SEEK command, the AV data editing unit 15 has the section between Mark#1 and Mark#2 read by issuing a READ command to the common file system unit 10. In this way, the VOBUs in Cell#1 are read from the DVD-RAM, before being sequentially decoded by the MPEG decoder 4 and displayed as images on the TV monitor 72.

Once the VOBUs have been decoded as far as Mark#2, the AV data editing unit 15 has the same processing performed for the remaining cells. By doing so, the AV data editing unit 15 has only the sections indicated as Cells #1, #2, #3, and #4 reproduced.

The AV file shown in FIG. 44A is a movie that was broadcast on television. FIG. 44F shows the image content of the different sections in this AV file. The section between time t0 and time t1 is the credit sequence V1 which shows the cast and director of the movie. The section between time t1 and time t2 is the first broadcast sequence V2 of the movie itself. The section between time t2 and time t3 is a commercial sequence V3 that was inserted into the TV broadcast. The section between time t3 and time t4 is the second broadcast sequence V4 in the movie. The section between time t5 and time t6 is the third broadcast sequence V5 in the movie.

Here, times t1, t2, t3, t4, t5, and t6 are set as Mark#1, Mark#2, Mark#3, Mark#4, Mark#5, and Mark#6, and pairs of marks are set as cells. The display order of cells is set as a program chain.

When performing a read as shown in FIG. 44E, AV data editing unit 15 has the credit sequence V1 skipped, so that the reproduction starts with the first movie sequence V2 given between the time t1 and the t2. Following this, the AV data editing unit 15 has the commercial sequence V3 skipped, and has the second movie sequence V4 between the time t3 and the t4 reproduced.

The following is a description of the operation of the AV data editing unit 15 when the user indicates a real edit operation, with reference to FIGS. 45A to 45E and FIGS. 46A to 46F. FIGS. 45A to 45E show a supplementary example of the processing of the AV data editing unit 15 in the flowchart of FIG. 43. The variables mx, Af in the flowchart of FIG. 43 and FIGS. 45A to 45E indicate a position in the AV file. The following explanation deals with the processing of the AV data editing unit 15 for a real edit operation.

First, in step S8, the AV data editing unit 15 determines at least two sections that are to be cut out from the present AV file in accordance with the program chain that was generated during a virtual edit operation.

The "source AV file" in FIG. 45A has been given the mark points Mark#1, #2, #3, . . . #8. The cells that have been set for this source AV file are defined by pairs of the mark points Mark#1, #2, #3, . . . #8, so that the AV data editing unit 15 treats the mark points in each pair as an editing start point and an editing end point, respectively. As a result, the AV data editing unit 15 treats the pair of Marks #1 and #2 as the editing start point "In(1)" and the editing end point "Out(1)". The AV data editing unit 15 similarly treats the pair of Marks #3 and #4 as the editing start point "In(2)" and the editing end point "Out(2)", the the pair of Marks #5 and #6 as the editing start point "In(3)" and the editing end point "Out(3)", and the pair of Marks #7 and #8 as the editing start point "In(4)" and the editing end point "Out(4)".

The period between Mark#1 and Mark#2 corresponds to the first movie sequence V2 between the time t1 and the time t2 shown in FIG. 44F. Similarly, the period between Mark#3 and Mark#4 corresponds to the second movie sequence V4 between the time t3 and the time t4 shown in FIG. 44F, and the period between Mark#5 and Mark#6 corresponds to the second movie sequence V5 between the time t5 and the time t6. Accordingly, by indicating this real edit operation, the user obtains an AV file that only includes the movie sequences V2, V4, and V5.

Next, in step S9, the AV data editing unit 15 issues a SPLIT command to the AV file system unit 11 to have the determined split region divided into mx AV files (where mx is an integer no less than 2). The AV data editing unit 15 treats each closed area indicated by a pair of an editing start point and an editing end point in FIG. 45A as an area to be cut out, and so cuts out the four AV files shown in FIG. 45B.

The AV data editing unit 15 hereafter specifies one of the cut-out mx AV files using the variable Af, with the cut-out files being numbered AV file Af1, Af2, Af3, . . . Afm. In step S10, the AV data editing unit 15 sets the variable Af at "1" to initialize the variable Af. In step S11, the AV data editing unit 15 issues a READ command to the AV file system unit 11 for the VOBUs (hereinafter called the "end part") located at the end of the AV file Af and the VOBUs (hereinafter called the "first part") located at the start of the AV file Af+1. After issuing these commands, in step S12 the AV data editing unit 15 uses the same procedure as the second embodiment to re-encode the last part of AV file Af and the first part of AV file Af.

After the re-encoding, the AV data editing unit 15 issues a SHORTEN command to the AV file system unit 11 for the last part of the AV file Af and the first part of the AV file Af+1 (Af2).

In FIG. 45C, the last part of the AV file Af1 and the first part of the AV file Af2 are read as a result of the READ command and are re-encoded. As a result of the re-encode process, the re-encoded data produced by re-encoding the read data is accumulated in the memory of the DVD recorder 70. In step S13, the AV data editing unit 15 issues a SHORTEN command, which results in the area formerly occupied by the read last and first parts being deleted.

It should be noted that the deletion performed in this way results in one of the two following cases.

The first case is when regardless of whether either of the AV file Af1 or the AV file Af+1, whose sections to be re-encoded have been deleted, has continuous length that is equal to or greater than the AV block length, the continuous length of the other AV file is below the data size of an AV block. Since the length of an AV block is set at the length which prevents overflows from occurring, if AV file Af or Af+1 is reproduced in a state where its continuous length is shorter than the length of an AV block, an underflow will occur in the track buffer.

The second case is where the data size of the data (in-memory data) that has been re-encoded and stored in the memory is below the data size (length) of an AV block. When the data size of the in-memory data is large and so would occupy a region on a DVD-RAM that is equal to or greater than one AV block, the data may be stored at a different position on the DVD-RAM away from the AV files Af and Af+1. However, when the data size of the in-memory data is smaller than one AV block, the data cannot be stored at a different position on the DVD-RAM away from the AV files Af and Af+1.

This is for the following reasons. During a read performed for in-memory data that is smaller than the size of an AV block but is stored at a separate position, a sufficient amount of data cannot be accumulated in the track buffer. Should the jump from the in-memory data to the AV file Af+1 take a relatively long time, an underflow will occur in the track buffer while the jump is taking place.

In FIG. 45D, the broken lines show that the last part of the AV file Af1 and the first part of the AV file Af2 have been deleted. This results in the length of the AV file Af1 being below the length of an AV block, and in the length of the in-memory data being below the length of an AV block.

If this AV file Af1 is left as it is, there is the risk that an underflow will occur when jumping from the AV file Af1 to the AV file Af2. To prevent the occurrence of such underflows, in step S14 the AV data editing unit 15 issues a MERGE command for the AV file Af1 and the AV file Af+1.

As shown in FIG. 45F and FIG. 46A, this processing results in the linking of the AV file Af1 and the re-encoded VOBUs so that the continuous length of the recording region for all the extents forming the AV file Af1 ends up equal to or longer than the length of an AV block. After issuing the MERGE command, the AV data editing unit 15 judges in step S15 whether the variable Af matches the number of AV files mx–1. If the numbers do not match, the AV data editing unit 15 increments the variable Af in step S16 and returns to step S11 In this way, the AV data editing unit 15 repeats the processing in steps S11 to S14.

After the variable Af has been incremented to become "2", the AV data editing unit 15 issues a READ command so that the last part of the AV file Af2 (after the previous linking) and the first part of the AV file Af3 are read, as shown in FIG. 46B. Once the VOBUs in this last part and first part have been re-encoded, the resulting re-encoded data is stored in the memory of the DVD recorder 70.

The regions on the DVD-RAM that were originally occupied by the first part and the last part are deleted as a result of the SHORTEN command that the AV data editing unit 15 issued by the step S13. As a result, the remaining AV file Af3 has a continuous length that is below the length of an AV block. The AV data editing unit 15 issues a MERGE command to the AV file system unit 11 for the AV files Af2 and Af3, as shown in FIGS. 46D and 46E. This procedure is repeated until the variable Af is equal to the value mx–1.

As a result of the above processing, the extents in the storage area only contain the movie sequences V2, V4, and V5. These extents each have a continuous length that is above the length of an AV block, so that it is guaranteed that there will be no interruptions to the image display during the reproduction of these AV files.

The period between the Mark#1 and the Mark#2 corresponds to the first movie sequence V2. The period between the Mark#3 and the Mark#4 corresponds to the first movie sequence V4, and the period between the Mark#5 and the Mark#6 corresponds to the third movie sequence V5. As a result, by performing an edit operation, the user can obtain a sequence composed of AV files for only the movie sequences V2, V4, and V5.

Figure 48A:
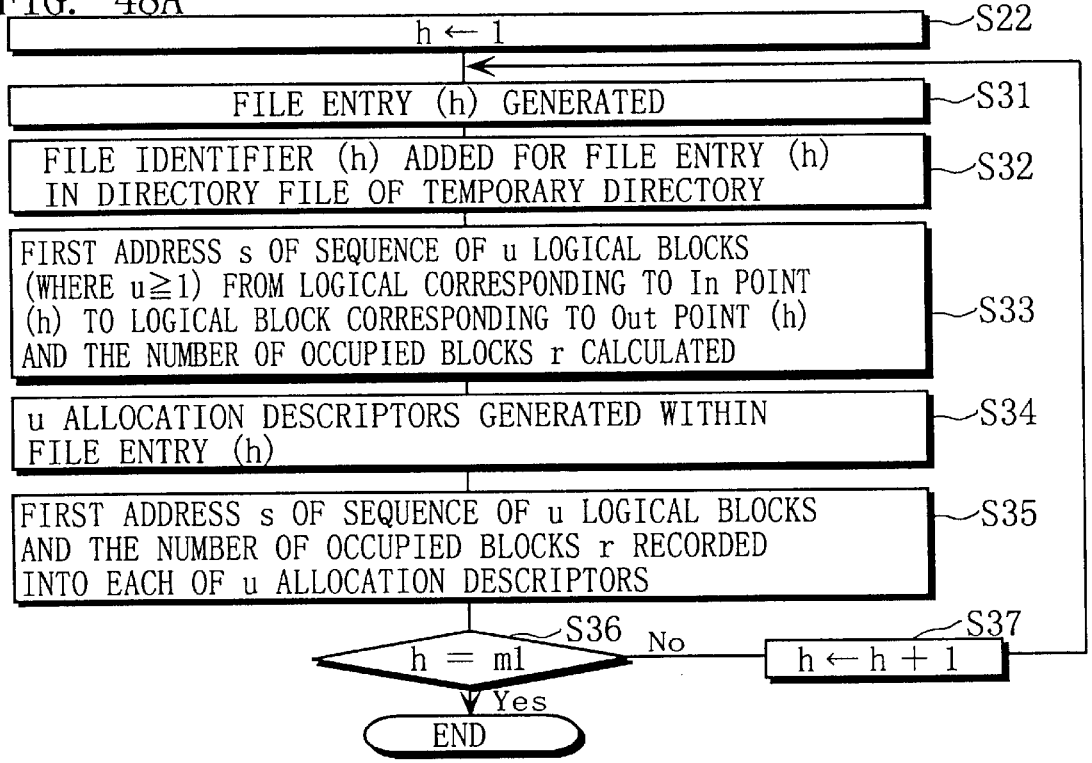
FIG. 48A is a flowchart showing the processing by the AV file system unit 11 when executing a "SPLIT" command.

(3-2-7-1-2) Processing of the AV File System Unit 11 When a Split Command Issued The following explanation deals with the details of the processing by the AV file system unit 11 when providing extended functions in response to a SPLIT command. FIG. 48A shows the operation of the AV file system unit 11 when providing extended functions in response to a SPLIT command. In this flowchart, one out of the mx pairs of an editing start point (In point) and an editing end point (Out point) is indicated using the variable h. In step S22, the value "1" is substituted into the variable h so that the first pair of In point and Out point are processed.

The AV file system unit 11 generates a file entry (h) in step S31, and adds the file identifier (h) for the file entry (h) in a directory file of a temporary directory.

In step S33, the AV file system unit 11 calculates the first address s of the sequence of u logical blocks (where $u \geq 1$) from the logical block corresponding to the In point (h) to the logical block corresponding to the Out point (h), and the number of occupied blocks r.

In step S34, the AV file system unit 11 generates u allocation descriptors within the file entry (h). In step S35, the AV file system unit 11 records the first address s of the sequence of u logical blocks and the number of occupied blocks r into the each of the u allocation descriptors. In step S35, the AV file system unit 11 judges whether the variable h has reached the value mx−1.

Figure 48B:
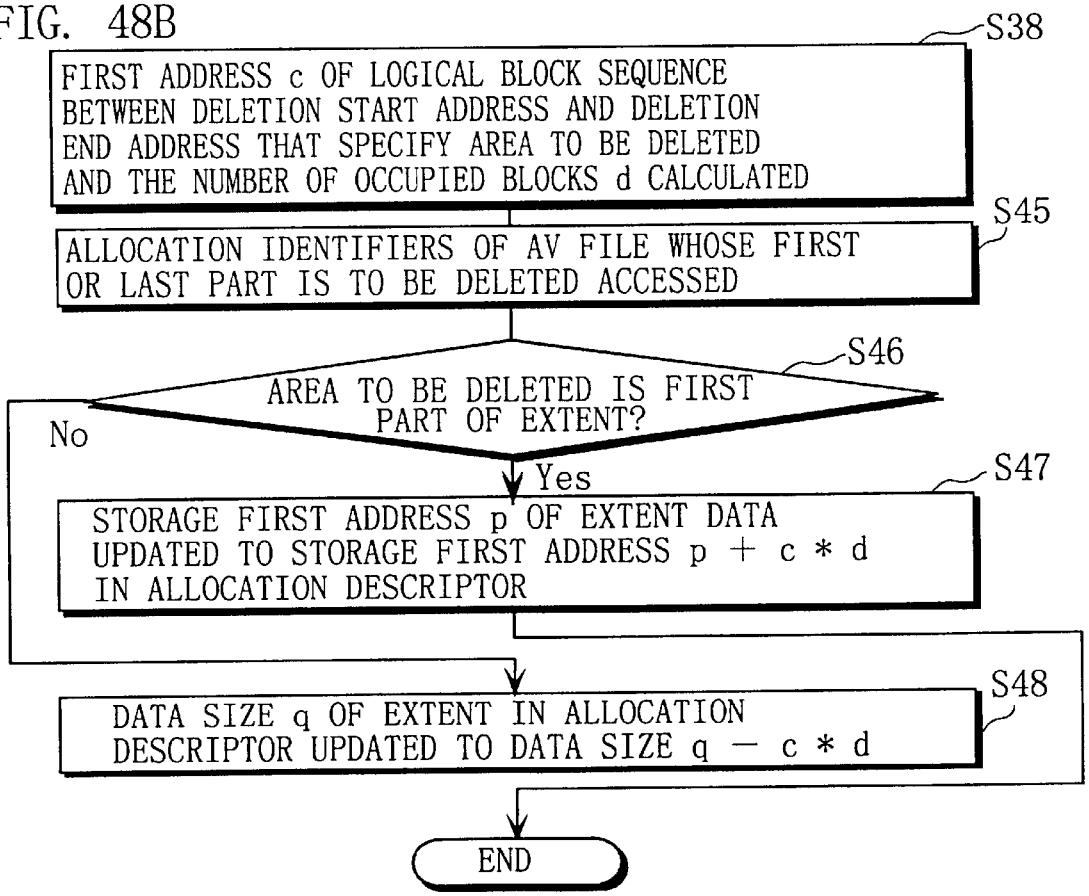
FIG. 48B is a flowchart showing the processing when executing a "SHORTEN" command is issued.

If the variable h has not reached this value, the AV file system unit 11 increments the variable h and returns to step S31. By doing so, the AV file system unit 11 repeats the processing in steps S31 to S35 until variable h reaches the value mx−1, and so cuts out the closed sections within each of the mx−1 pairs of an In point and an Out point as AV files.
(3-2-7-1-3) Processing of the File System Unit 11 When Shorten Command Is Issued The explanation deals with the processing of the AV file system unit 11 when providing extended functions in response to a SHORTEN command. FIG. 48 is a flowchart showing the content of this processing.

In step S38, the AV file system unit 11 calculates both the first address c of the logical block sequence between the deletion start address and the deletion end address that specify the area to be deleted and the number of occupied blocks d. In step S45, the AV file system unit 11 accesses the allocation identifiers of the AV file whose first or last part is to be deleted. In step S46, the AV file system unit 11 judges whether the area to be deleted is the first part of the extent of an AV file.

If the area to be deleted is the first part of an extent ("Yes" in step S46), the AV file system unit 11 advances to step S47 and updates the storage first address p of the extent to the storage first address p+c*d in the allocation descriptor.

After this, in step S48 the AV file system unit 11 updates the data size q of the extent of the number q of occupied blocks given in the allocation descriptor to the data size q−c*d. On the other hand, if in step S46 the AV file system unit 11 finds that the area to be deleted is the last part of an AV file, the AV file system unit 11 proceeds directly to step S48, and updates the data size q of the extent of the number q of occupied blocks given in the allocation descriptor to the data size q−c*d.
(3-2-7-1-4) Processing of the AV file System Unit 11 When a MERGE Command is Issued The following explanation deals with the processing content of the AV file system unit 11 when providing extended functions in response to a MERGE command. The following explanation aims to clarify the procedure used to process the areas surrounded by the dot-dash lines y3, y4 in FIG. 45E and FIG. 46D.

In response to a MERGE command, the AV file system unit 11 arranged the AV files Af and Af+1, which were partially deleted as a result of the SPLIT and SHORTEN commands, and the re-encoded data in-memory data), which is present in the memory of the DVD recorder 70 as a result of the re-encoding, onto the DVD-RAM in a way that enables the seamless reproduction of the AV file At, the data in the memory, and the AV file Af+1 in that order.

Figure 47A:
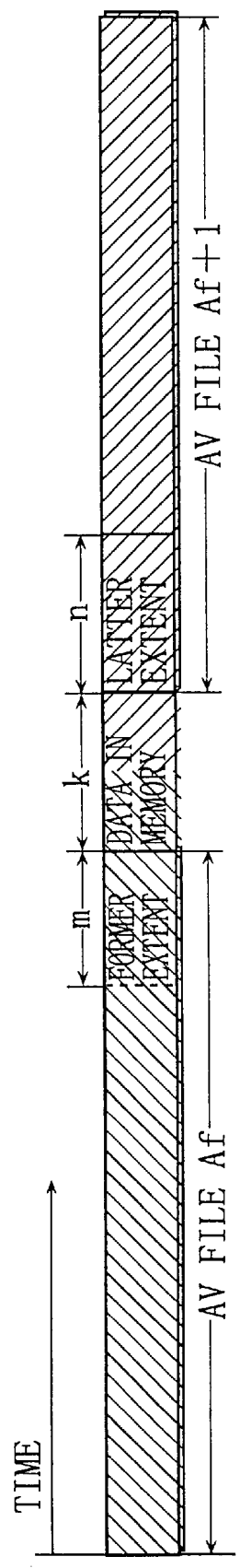
FIG. 47A shows the relationship between the extents and the in-memory data, in terms of time.

FIG. 47A shows an example of the AV data processed by the AV file system unit 11 when providing extended functions in response to a MERGE command. In FIG. 47A, the AV files x and y have been processed according to a SPLIT command.

The virtual editing is assumed to have defined a reproduction route whereby the AV data is reproduced in the order AV file x→in-memory data→AV file y.

FIG. 47A shows an example reproduction route for the AV data in the AV files x and y In FIG. 47A, the horizontal axis represents time, so that the reproduction route can be seen to set the display order as AV file x→in-memory data→AV file y.

Of the AV data in AV file x, the data part m located at the end of AV file x is stored in a consecutive area of the DVD-RAM, with this being called the "former extent".

Of the AV data in AV file y, the data part n located at the start of AV file y is also stored in a consecutive area of the DVD-RAM, with this being called the "latter extent".

As a result of the "SPLIT" command, AV files x and y are obtained with certain sections of AV data having been cut away. However, while the file system manages the areas on the disc that correspond to the cut-away data as if they were empty, the data of the original AV file is in fact left as it is in the logical blocks on the DVD-RAM.

It is assumed that when the reproduction route is set by the user, the user does not need to consider the way in which AV blocks on the DVD-RAM store the cut-away AV files. As a result, there is no way in which the positions on the DVD-RAM storing the former and latter extents can be identified for certain. Even if the reproduction route specifies the order as AV file x→AV file y, there is still the possibility of AV data that is unrelated to the present reproduction route being present on the disc between the former and the latter extent.

In view of the above consideration, the linking of AV files cut away by a SPLIT command does not assume that the former extent and latter extent are recorded at consecutive positions on the DVD-RAM, and so should instead assume that the former extent and latter extent are recorded at completely unrelated positions on the DVD-RAM.

Here, it should be assumed that at least one "other file extent", which is unrelated to the reproduction route indicating the AV files x and y, is present between the storage regions of the former extent and the latter extent.

Figure 47B:
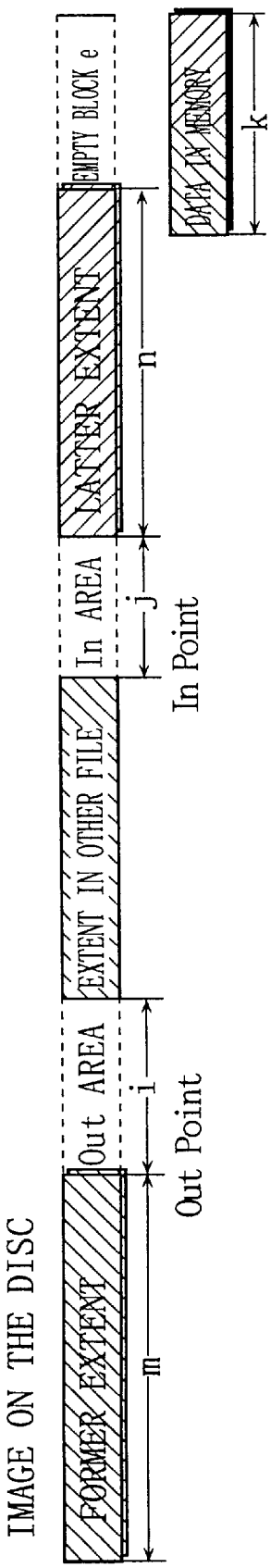
FIG. 47B shows the positional relationship between the extents, the In area and the Out area.

FIG. 47B shows a representation of the positional relationship of the storage areas on the DVD-RAM of the former extent and the latter extent, in view of the above consideration.

The AV file x including the former extent is partially cut away as a result of the SPLIT command, and so includes an empty area where the former extent was formerly present. This area is called the Out area. As described above, this Out area in fact still logically includes the data of the AV file x that was cut out, although the AV file system unit 11 treats the area as an empty area since the SPLIT command has already been issued.

The AV file y including the latter extent is partially cut away as a result of the SPLIT command, and so includes an empty area where the latter extent was formerly present. This area is called the In area. As described above, this In area in fact still logically includes the data of the AV file y that was cut out, although the AV file system unit 11 treats the area as an empty area since the SPLIT command has already been issued.

In FIG. 47B, the former extent is stored at a preceding position to the latter extent, though this merely illustrates one example, so that it is perfectly possible for the latter extent to be stored at a preceding position to the former extent.

In the present example, the other file extent is present between the former extent and the latter extent. While the In area and the Out area are ideal for the recording of the in-memory data, the continuous length of the In area and the Out area is restricted due to the presence of the other file extent between the former extent and the latter extent.

Figure 49:
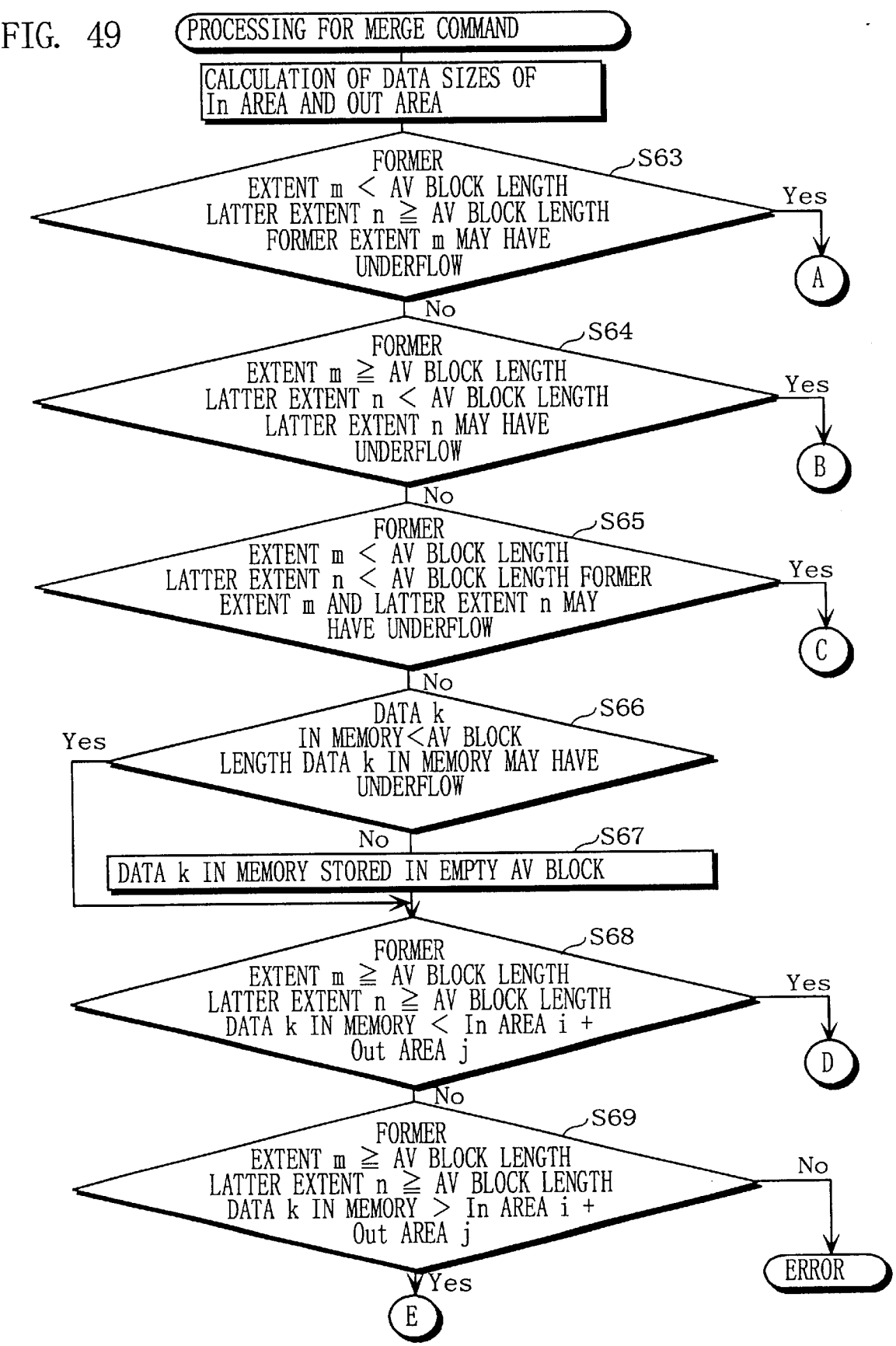
FIG. 49B is a flowchart showing the processing when executing a "MERGE" command is issued.

In step S62 in the flowchart of FIG. 49, the AV file system unit 11 calculates the data size of the Out area, and the data size of the In area.

On finding the data size of the In area and the Out area, the AV file system unit 11 refers to the data size m of the former extent and the data size n of the latter extent and judges whether the former extent could cause an underflow in the track buffer during reproduction.

(3-2-7-1-4-1) Processing When the Former Extent m is less than the AV Block Length When the former extent m is shorter than the AV block length and the latter extent n is at least equal to the AV block length, an underflow may occur for the former extent m. The processing proceeds to step S70 in FIG. 50.

Figure 50:
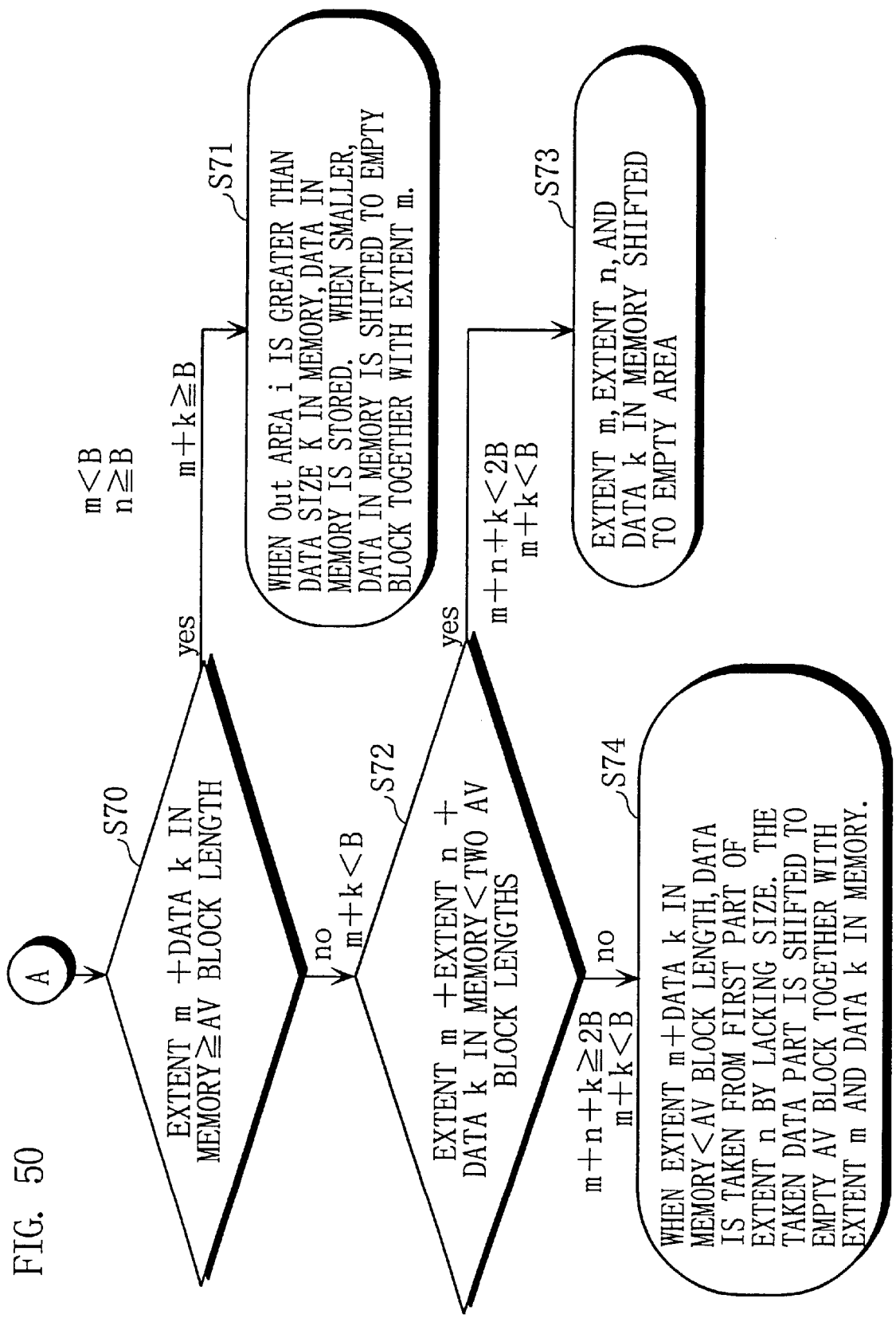
FIG. 50 is a flowchart for the case when the former extent is below AV block length but the latter extent is at least equal to AV block length.

FIG. 50 is a flowchart when the former extent m is shorter than the AV block length and the latter extent n is at least equal to the AV block length. The processing by the AV file system unit 11 in FIG. 50 is explained with reference to FIGS. 51, 52, and 53 FIGS. 51, 52, and 53 show the relationships among the data sizes of the extents m and n, the In area and the Out area i and j, the in-memory data k, and the AV block B, as well as the areas in which each piece of the data is recorded and the areas to which the data is moved.

The former extent is shorter than the AV block length. As a result, an underflow would occur if no remedial action were taken. Accordingly, the flowchart in FIG. 50 shows the processing to determine the appropriate storage location for the former extent and the in-memory data.

Figures 51A, 51B:
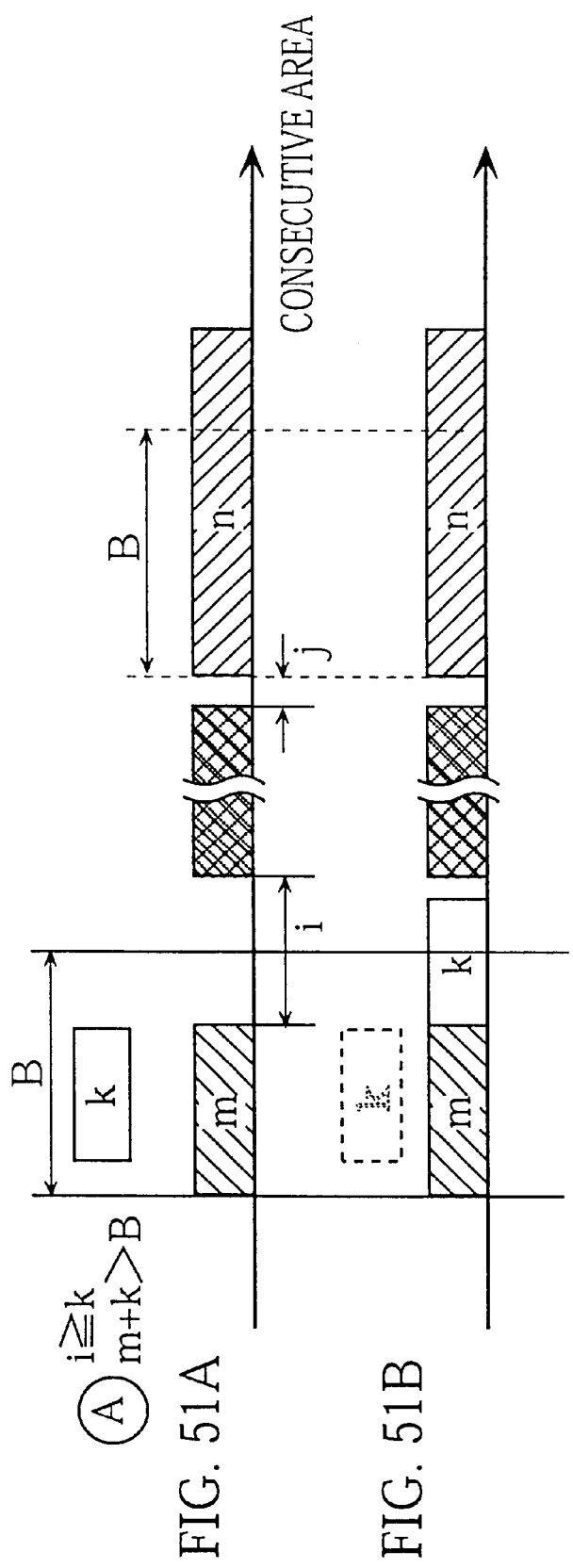
FIGS. 51A–51B are a supplementary example showing the processing of the AV file system unit 11 in the flowchart of FIG. 50.

In step S70, it is judged whether the sum of the sizes of the former extent and the in-memory data is equal to or greater than the AV block length. If so, the processing proceeds to step S71, and it is judged whether the Out area is larger than the in-memory data. When the Out area is larger than the in-memory data, the in-memory data is written in the Out area to make the consecutive length of the former extent at least equal to the AV block length. FIG. 51A shows an arrangement of the former extent, the latter extent, the In area, and the Out area on the DVD-RAM in a relationship i≧k, m+k>B. In FIG. 51B, when the in-memory data is recorded in the Out area, the consecutive length of the former extent becomes at least equal to the AV block length.

On the other hand, when the Out area is smaller than the in-memory data, data is moved. FIG. 52A shows an arrangement of the former extent, the latter extent, the In area, and the Out area on the DVD-RAM in a relationship i<k, m+k>B.

In FIG. 52A, the former extent is first read into the memory, and in FIG. 52B the former extent is written in an empty area in the same zone as the former extent. After the first extent has been moved, the in-memory data is written immediately after the moved former extent, as shown in FIG. 52C.

When the sum of the sizes of the former extent and the in-memory data is less than the AV block length, the processing proceeds to step S72. In step S72, it is judged whether the sum of the sizes of the former extent, the latter extent, and the in-memory data is at least equal to two AV block lengths is judged. When the sum of the sizes is less than the AV block length, even if data is moved, the size is less than the AV block length. As a result, an underflow occurs. When the sum of the sizes is less than two AV block lengths, even if the former extent, the in-memory data, and the latter extent are written in a logical block, the recording time will not be too long. In the flowchart in FIG. 50, when the sum of the sizes of the in-memory data, the former extent, and the latter extent is less than two AV blocks, the processing proceeds from step S72 to step S73, and the former extent and the latter extent are moved.

FIG. 53A shows an arrangement of the former extent, the latter extent, the In area, and the Out area on the DVD-RAM in a relationship i<k, m+k<B, B≦m+n+k<2B. In this case, a search is performed for an empty area in the same zone as the former extent and the latter extent. When an empty area is found, the former extent is read into the memory and is written in the empty area to move the former extent to the empty area, as shown in FIG. 53B After the move, the in-memory data is written just after the moved former extent, as shown in FIG. 53C. After the in-memory data has been written, the latter extent is read into the memory and is written immediately after the occupied area of the in-memory data to move the latter extent to the empty area, as shown in FIG. 53D.

When the sum of the sizes of the in-memory data, the former extent, and the latter extent is at least equal to two AV block lengths, the processing proceeds from step S72 to step S74. When the sum of the sizes is equal to or greater than two AV block lengths, it will take a long time to write the data into the logical block. Meanwhile, a simple method in which the former extent is moved and the in-memory data is written just after the moved former extent should not be adopted in view of the access speed. Here, it should be especially noted that the processing proceeds from step S72 to step S74 because the sum of the sizes of the in-memory data and the former extent is less than the AV block length. The reason why the sum of the sizes of the in-memory data and the former extent is less than the AV block length yet the sum of the sizes of the in-memory data, the former extent, and the latter extent is at least equal to two AV block lengths is that the latter extent size is relatively large, with the difference between the latter extent size and the AV block length being large. As a result, when the sum of the sizes of the former extent and the in-memory data is less than the AV block length, part of the data in the latter extent may be added to the sum, with there being no risk of the remaining data size of the latter extent being insufficient.

When the sum of the sizes of the in-memory data, the former extent, and the latter extent is at least equal to two AV block lengths, the processing proceeds from step S72 to step S74, and the data are linked in the manner shown in FIGS. 54A to 54D.

FIG. 54A shows an arrangement of the former extent, the latter extent, the In area, and the Out area on the DVD-RAM in a relationship m+k<B, m+n+k≧2B. In this case, a search is performed for an empty area in the same zone as the former extent and the latter extent. When such an empty area is found, the former extent is read into the memory and is then written in the empty area to move the former extent, as shown in FIG. 54B. Next, the in-memory data is written immediately after the moved former extent, as shown in FIG. 54C. When the in-memory data has been written, a set of data that is sufficiently large to make the size of the data in this empty area equal to AV block size is moved from the start of the latter extent just after the in-memory data as shown in FIG. 54D.

After the former extent, the in-memory data, and front part of the latter extent are linked in the above-described procedure, the file entries of the AV file Af that includes the former extent and the AV file Af+1 are integrated. One integrated file entry is obtained, and the processing ends.

(3-2-7-1-4-2) Processing When the Latter Extent n is shorter than the AV Block Length When the judgment "No" is given in step S63 in the flowchart of FIG. 49, the processing proceeds to step S64 where it is judged whether the former extent m is at least equal to the AV block length but the latter extent n is shorter than the AV block length. In other words, in step S63, it is judged whether an underflow may occur for the latter extent.

Figure 55:
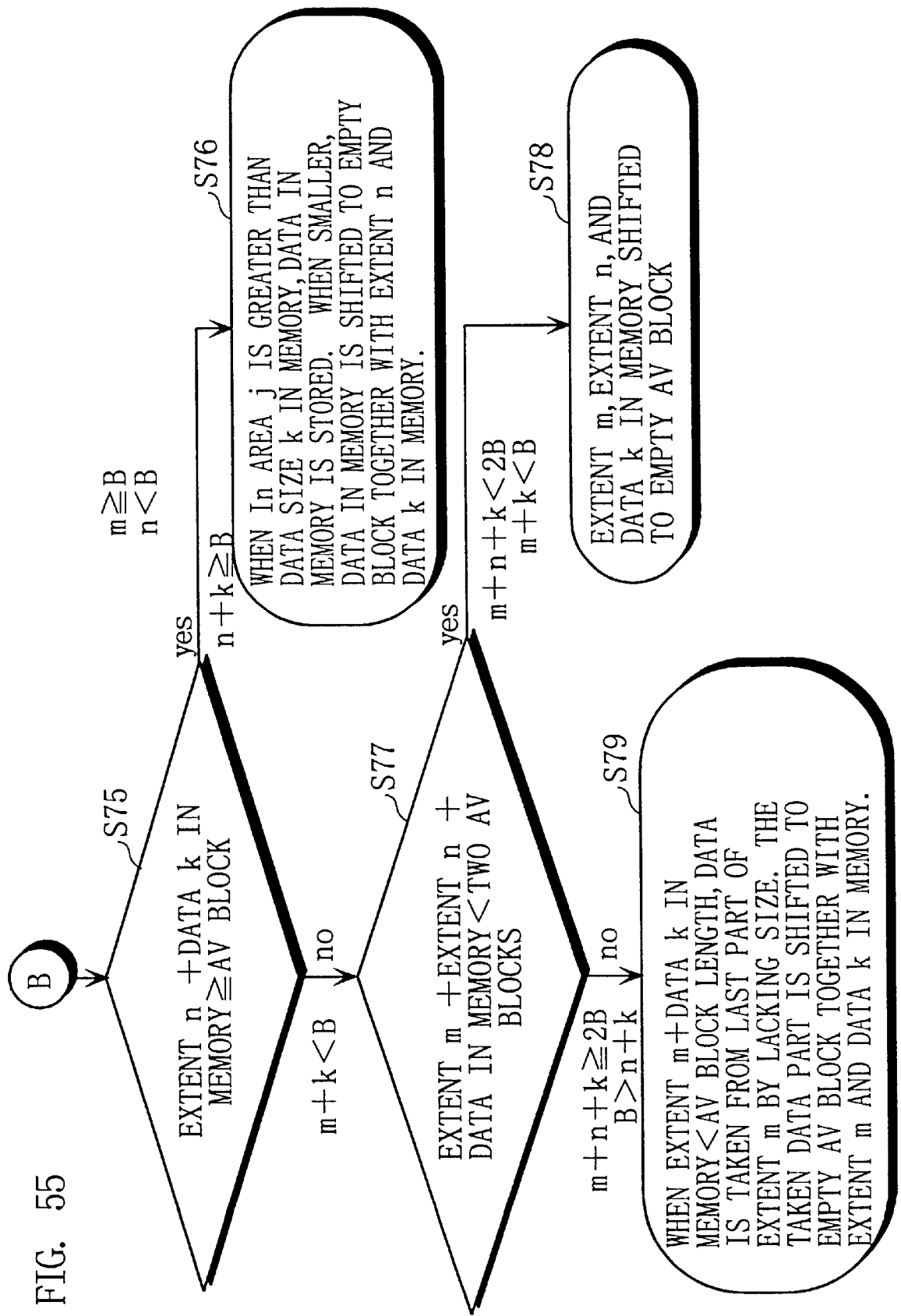
FIG. 55 is a flowchart for the case when the former extent is at least equal to AV block length but the latter extent is below AV block length.

FIG. 55 is a flowchart when the latter extent is shorter than the AV block length and the former extent is at least equal to the AV block length. The processing by the AV file system unit 11 in the flowchart in FIG. 55 is explained with reference to FIGS. 56, 57, 58 and 59. FIGS. 56, 57, 58 and 59 show the relationships among the data sizes of the extents m and n, the In area and the Out area i and j, the in-memory data k, and the AV block B, as well as the areas in which each piece of the data is recorded and the areas to which the data is moved.

Figure 56A:
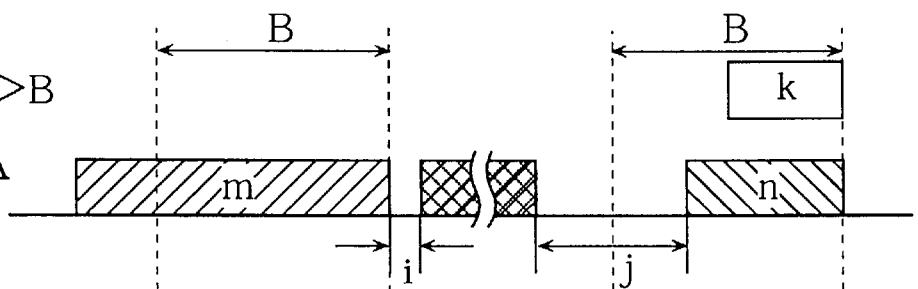
FIGS. 56A–56B are a supplementary example showing the processing of the AV file system unit 11 in the flowchart of FIG. 55.
Figure 56B:
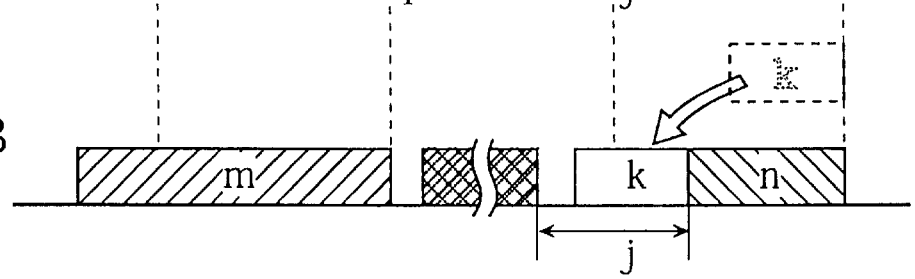

In step S75, it is judged whether the sum of the sizes of the latter extent and the in-memory is at least equal to the AV block length. If so, the processing proceeds from step S75 to step S76, where it is judged whether the In area is larger than the in-memory data. FIG. 56A shows an arrangement of the former extent, the latter extent, the In area, and the Out area on the DVD-RAM in a relationship j≧k, n+k>B. In FIG. 56B, the recording of the in-memory data in the In area results in the consecutive length of the latter extent becoming at least equal to the AV block length.

Figures 57A, 57B, 57C:
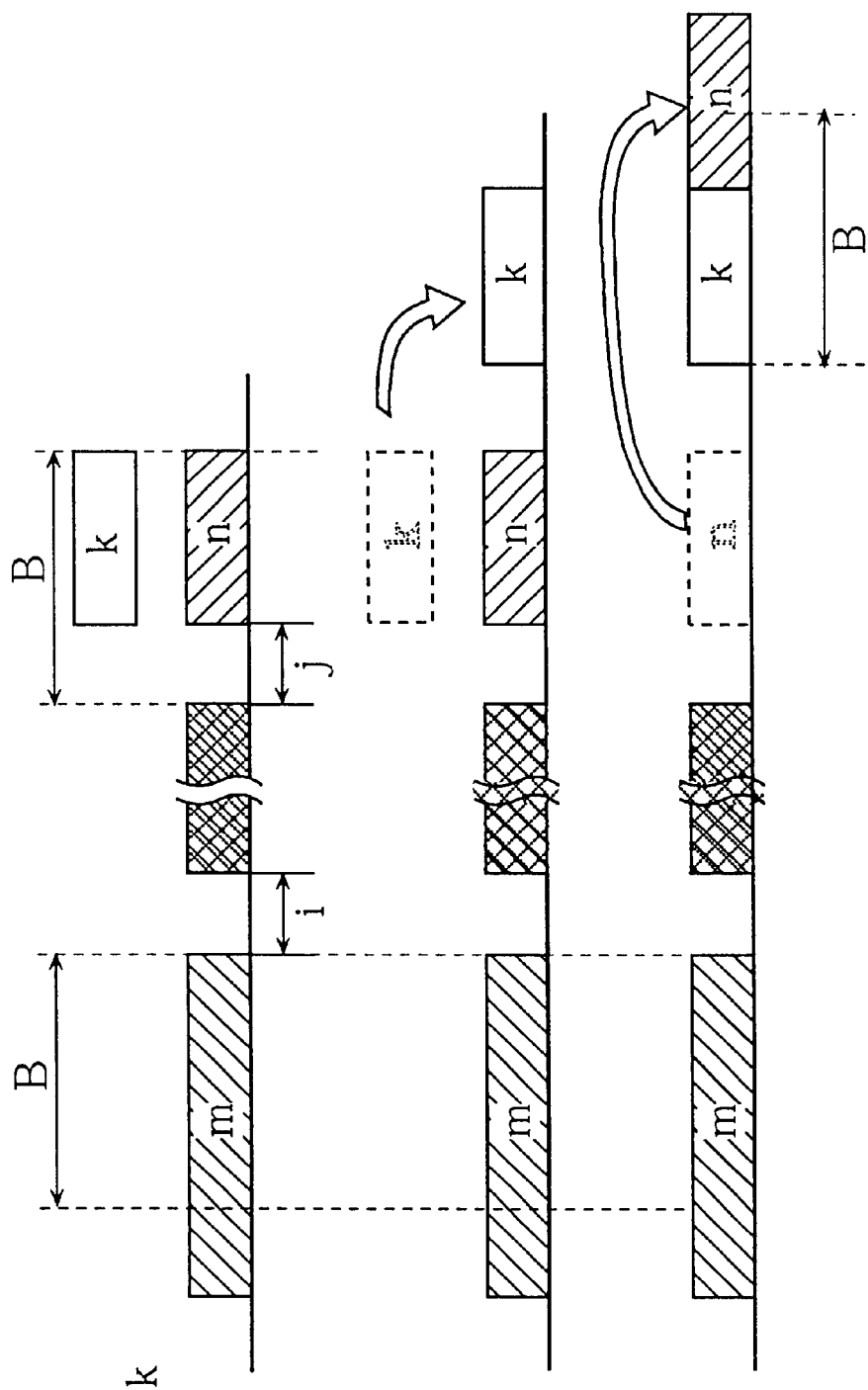
FIGS. 57A–57C are a supplementary example showing the processing of the AV file system unit 11 in the flowchart of FIG. 55.

On the other hand, when the In area is smaller than the in-memory data, data is moved. FIG. 57A shows an arrangement of the former extent, the latter extent, the In area, and the Out area on the DVD-RAM in a relationship j<k, n+k>B. In this case, a search is performed for an empty area in the same zone as the former extent and the latter extent. When such an empty area is found, the in-memory data is written in the empty area as shown in FIG. 57B. The latter extent is then read into the memory and is written immediately after the occupied area of the in-memory data, as shown in FIG. 57C.

When the sum of the sizes of the latter extent and the in-memory data is less than the AV block length, the processing proceeds from step S75 to step S77. In step S77, it is judged whether the sum of the sizes of the former extent, the latter extent, and the in-memory data is at least equal to two AV block lengths.

When the sum of the sizes is less than two AV block lengths, the processing proceeds to step S78. FIG. 58A shows an arrangement of the former extent, the latter extent, the In area, and the Out area on the DVD-RAM in a relationship j<k, n+k<B, m+n+k<2B. In step S78, the AV file system unit 11 searches for an empty area in the same zone as the former extent and the latter extent. When such an empty area is found, the former extent is read into the memory and is written into the empty area to move the former extent to the empty area, as shown in FIG. 58B. Next, the in-memory data is written immediately after the moved former extent, as shown in FIG. 58C. When the in-memory data has been written, the latter extent is read into the memory and is written immediately after the area occupied by the in-memory data to move the latter extent to the empty area, as shown in FIG. 58D.

When the sum of the sizes of the in-memory data, the former extent, and the latter extent is at least equal to two AV block lengths, the processing proceeds from step S77 to step S79, and the data are linked in the manner shown in FIGS. 59A to 59D.

FIG. 59A shows an arrangement of the former extent, the latter extent, the In area, and the Out area on the DVD-RAM in a relationship n+k<B, m+n+k≧2B. In this case, a search is performed for an empty area in the same zone as the former extent and the latter extent. When such an empty area is found, data with a data size of (the AV block length−(n+k)) is moved from the end of the former extent to the empty area, as shown in FIG. 59B. As shown in FIG. 59C, the in-memory data is written immediately after this data moved from the former extent. When the in-memory data has been written, the latter extent is moved to immediately after the occupied area of the in-memory data, as shown in FIG. 59D.

When the judgement "No" is given in step S64 in the flowchart in FIG. 49, the processing proceeds to step S65, where it is judged whether both the former extent m and the latter extent Ii are shorter than the AV block length is judged. In other words, it is judged whether an underflow may occur for both the former extent m and the latter extent n.

Figure 60:
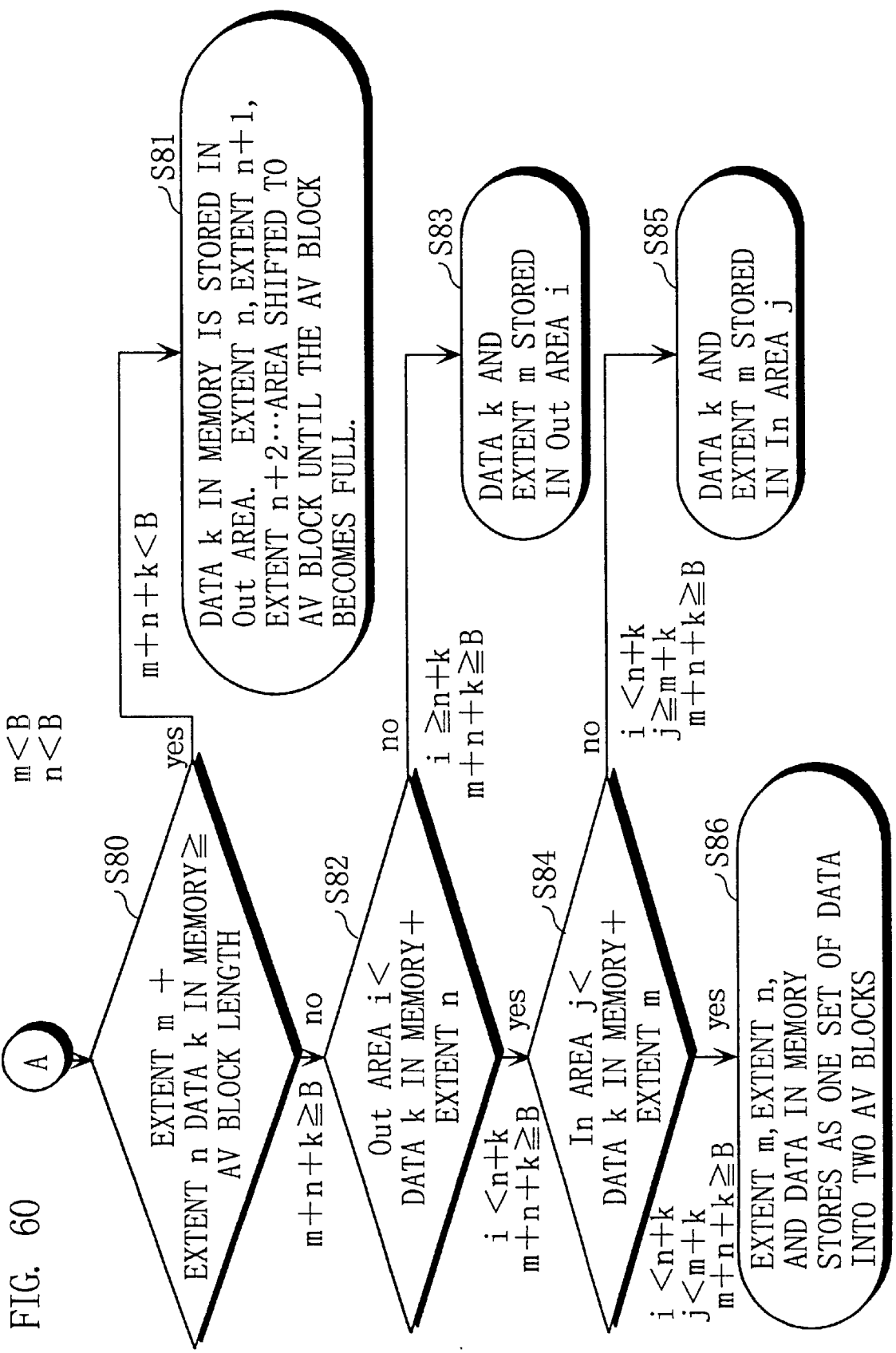
FIG. 60 is a flowchart for the case when both the former extent and the latter extent are below AV block length.

FIG. 60 is a flowchart for when both the former extent and the latter extent are shorter than the AV block length. The processing by the AV file system unit 11 in the flowchart in FIG. 60 is explained with reference to FIGS. 61, 62, 63 and 64. FIGS. 61, 62, 63 and 64 show the relationships among the data sizes of the extents m and n, the In area and the Out area i and j, the in-memory data k, and the AV block B, as well as the areas in which each piece of the data is recorded and the areas to which the data is moved.

In step S80 in this flowchart, it is judged whether the sum of the sizes of the in-memory data, the former extent, and the latter extent is at least equal to AV block length. If not, the processing proceeds to step S81. In this case, the sum of the sizes of the former extent, the in-memory data, and the latter extent is shorter than the AV block length. As a result, it is judged whether there is an extent which follows the latter extent. When no extent follows the latter extent, the latter extent is at the end of the AV file that is created by the linking of data, so that no additional processing is needed. When an extent follows the latter extent, an underflow may occur since the sum of the sizes of the former extent, the in-memory data, and the latter extent is less than the AV block length. In order to avoid such underflow, when the extent following the latter extent is linked to the latter extent by the link processing shown in FIGS. 61A–61D. FIG. 61A shows an arrangement of the former extent, the latter extent, the In area, and the Out area on the DVD-RAM in a relationship m+n+k<B. In step S81, the AV file system unit 11 writes the in-memory data in the In area, as shown in FIG. 61B. When the in-memory data has been written in the In area, the AV file system unit 11 reads the latter extent into the memory and writes the read latter extent immediately after the area occupied by the in-memory data to move the latter extent to the empty area, as shown in FIG. 61C.

Then, as shown in FIG. 61D, the AV file system unit 11 takes data whose size is (the AV block length−(the former extent+the in-memory data+the latter extent)) from the extent following the latter extent. The AV file system unit 11 links this data with the former extent, the in-memory data, and the latter extent.

Figures 62A, 62B, 62C:
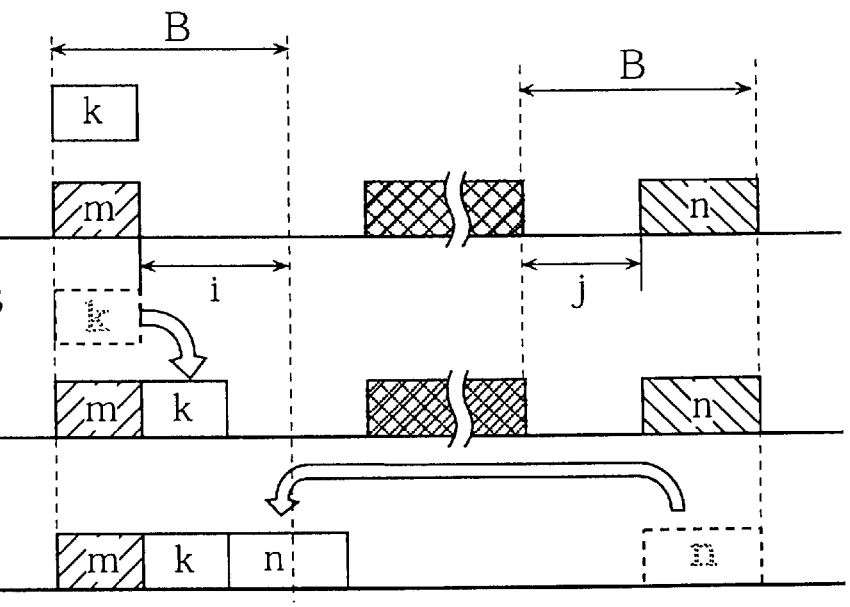
FIGS. 62A–62C are a supplementary example showing the processing of the AV file system unit 11 in the flowchart of FIG. 60.

When the sum of the sizes of the former extent, the latter extent, and the in-memory data is at least equal to the AV block length, the processing proceeds to step S82. In step S82, the AV file system unit 11 judges whether the data size of the Out area following the former extent is less than the sum of the sizes of the latter extent and the in-memory data. If not, the processing proceeds to step S83. FIG. 62A shows an arrangement of the former extent, the latter extent, the In area, and the Out area on the DVD-RAM in a relationship i≧n+k, m+n+k≧B. In step S83, the AV file system unit 11 writes the in-memory data into the In area, as shown in FIG. 62B. After writing the in-memory data, the AV file system unit 11 reads the latter extent into the memory and writes the latter extent immediately after the occupied area of the in-memory data to move the latter extent.

When the data size of the Out area following the former extent is less than the sum of the sizes of the latter extent and the in-memory data, the processing proceeds from step S82 to step S84. In step S84, it is judged whether the data size of the In area preceding the latter extent is less than the sum of the sizes of the former extent and the in-memory data. If not, the processing proceeds to step S85. FIG. 63A shows an arrangement of the former extent, the latter extent, the In area, and the Out area on the DVD-RAM in a relationship i<n+k, m+n+k≧B. In step S65, the AV file system unit 11 writes the in-memory data in the In area as shown in FIG. 63B. After writing the in-memory data, the AV file system unit 11 reads the former extent into the memory and writes the former extent into a storage area immediately before the occupied area of the in-memory data to move the former extent to the In area, as shown in FIG. 63C.

When the judgement "No" is given in step S84, the processing proceeds to step S86. FIG. 64A shows an arrangement of the former extent, the latter extent, the In area, and the Out area on the DVD-RAM in a relationship i<n+k, j<m+k, m+n+k≧B. In step S86, it is judged whether the sum of the sizes of the former extent, the latter extent, and the in-memory data is more than two AV block lengths. If not, the AV file system unit 11 searches for an empty area in the same zone as the former extent. When an empty area is found, the AV file system unit 11 reads the former extent into the memory and writes the read former extent into the empty area to move the former extent to the empty area, as shown in FIG. 64B. After the move, the AV file system unit 11 writes the in-memory data into a storage area immediately after the moved former extent, as shown in FIG. 64C. After writing the in-memory data, the AV file system unit 11 reads the latter extent into the memory and writes the latter extent into a storage area just after the occupied area of the in-memory to move the latter extent to the empty area, as shown in FIG. 64D.

When the combined size of the former extent, the latter extent, and the in-memory data exceeds AV blocks, it is judged whether either the Out area or the In area is large. When the Out area is large, a part of the in-memory data is recorded in the Out area to make the continuous length equal to AV block length. The remaining part of the in-memory data is recorded in a different empty area, and the latter extent is moved to a position directly after this remaining part of the in-memory data.

When the In area is large, the AV file system unit 11 moves the former extent to an empty area and records a first part of the in-memory data to make the continuous length equal to AV block length. After this, the remaining part of the in-memory data is recorded in the In area.

As a result of the above processing for moving extents, the total consecutive length can be kept equal to or below 2 AV block lengths.

After the former extent, the in-memory data, and front part of the latter extent are linked in the above-described procedure, the file entries of the AV file Af that includes the former extent and the AV file Af+1 are integrated, one integrated file entry is obtained, and the processing ends.

(3-2-7-1-4-3) Processing When Both the Former Extent and the Latter Extent are at Least Equal to the AV Block Length When the judgement "No" is given in step S65 in the flowchart of FIG. 49, the processing proceeds to step S66 where it is judged whether the in-memory data is at least equal to the AV block length. If so, the in-memory data is recorded in an empty area and the processing ends.

Figure 65:
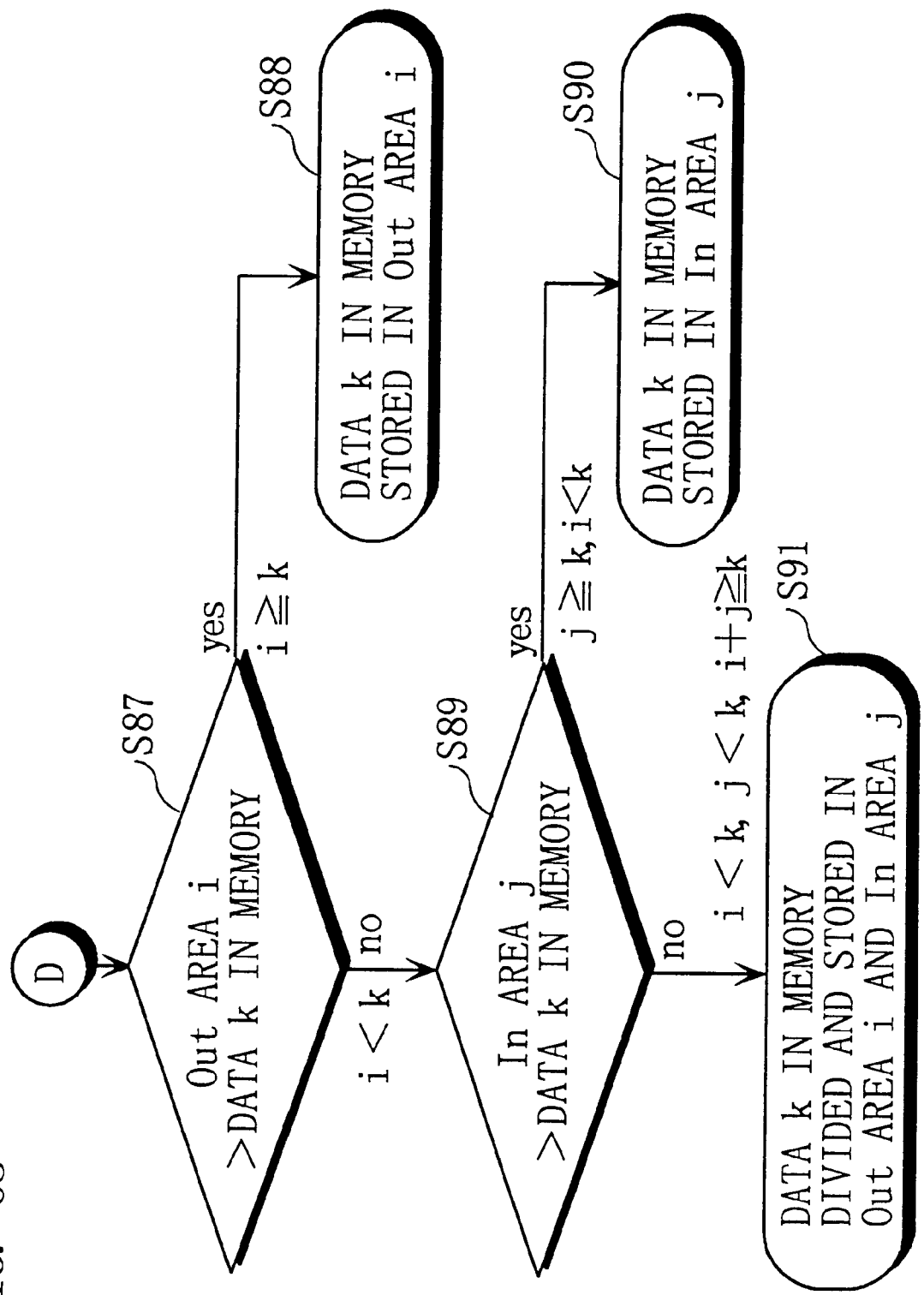
FIG. 65 is a flowchart for the case when the both the former extent and the latter extent are at least equal to AV block length.

When the judgment "No" is given in step S66 in the flowchart of FIG. 49, the AV file system unit 11 judges whether the former extent m is at least equal to the AV block length, the latter extent n is at least equal to the AV block length, but the in-memory data is smaller than the combined size of the In area i and the Out area j. FIG. 65 is a flowchart when the latter extent is at least equal to the AV block length.

Figure 66A:
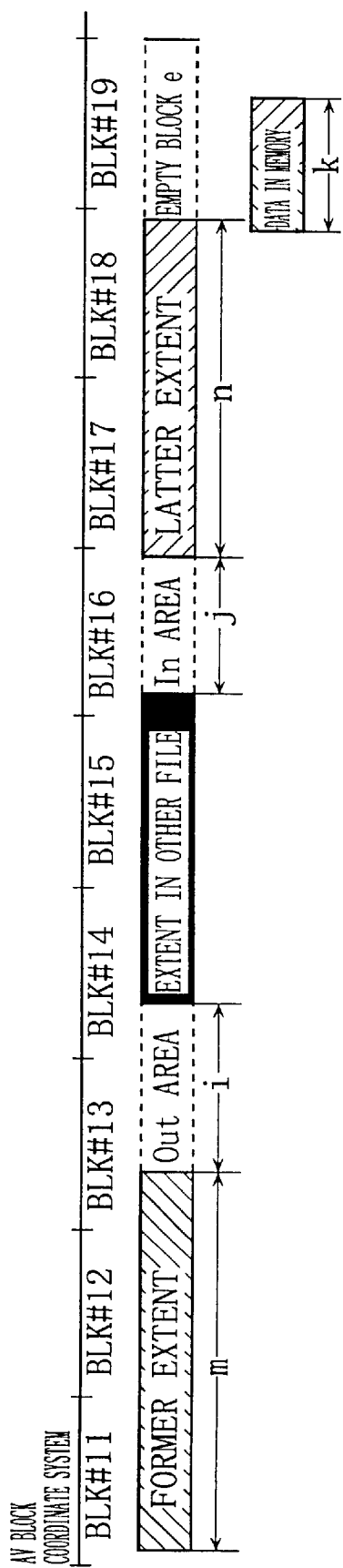
FIGS. 66A–66D are a supplementary example showing the processing of the AV file system unit 11 in the flowchart of FIG. 65.
Figure 66B:
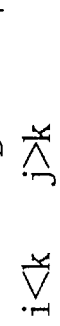
Figure 66C:
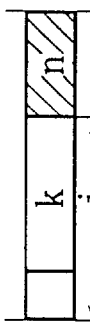
Figure 66D:

FIGS. 66A–66D show an supplementary example showing the processing of the AV file system unit 11 in FIG. 65. In FIG. 66A, the former extent and latter extent are both at least equal to the AV block length. FIGS. 66B–66D show how the in-memory data and extents are recorded in the In area, Out area, and other empty areas as a result of the steps in FIG. 65.

In this case, there is no risk of an underflow occurring for either the former or the latter extent. It would be ideal, however, if the in-memory data could be recorded in at least one of the Out area following the AV file Af and the In area preceding the AF file Af+1 without having to move the former or latter extent.

In step S87 of the flowchart in FIG. 65, it is judged whether the size of the Out area exceeds the data size of the in-memory data. If so, the in-memory data is simply recorded into the Out area in step S88, as shown in FIG. 66B.

If the size of the Out area is below the data size of the in-memory data, the processing proceeds to step S89, where it is judged whether the size of the In area exceeds the data size of the in-memory data. If so, the in-memory data is simply recorded into the In area in step S90, as shown in FIG. 66C. If the in-memory data cannot be recorded into either the Out area or the In area, the processing proceeds to step S91 where the in-memory data is divided into two parts that are respectively recorded in the Out area and In area, as shown in FIG. 66D.

After the former extent, the in-memory data, and front part of the latter extent are linked in the above-described procedure, the file entries of the AV file Af that includes the former extent and the AV file Af+1 are integrated. One integrated file entry is obtained, and the processing ends.

(3-2-7-1-4-4) Processing When Both the Former Extent and the Latter Extent are at Least Equal to the AV Block Length In step S69 in the flowchart of FIG. 49, it is judged whether the former extent m is at least equal to the AV block length and the latter extent n is at least equal to the AV block length, but the size of the in-memory data k exceeds the combined size of the Out area j and the In area i.

Figure 67:
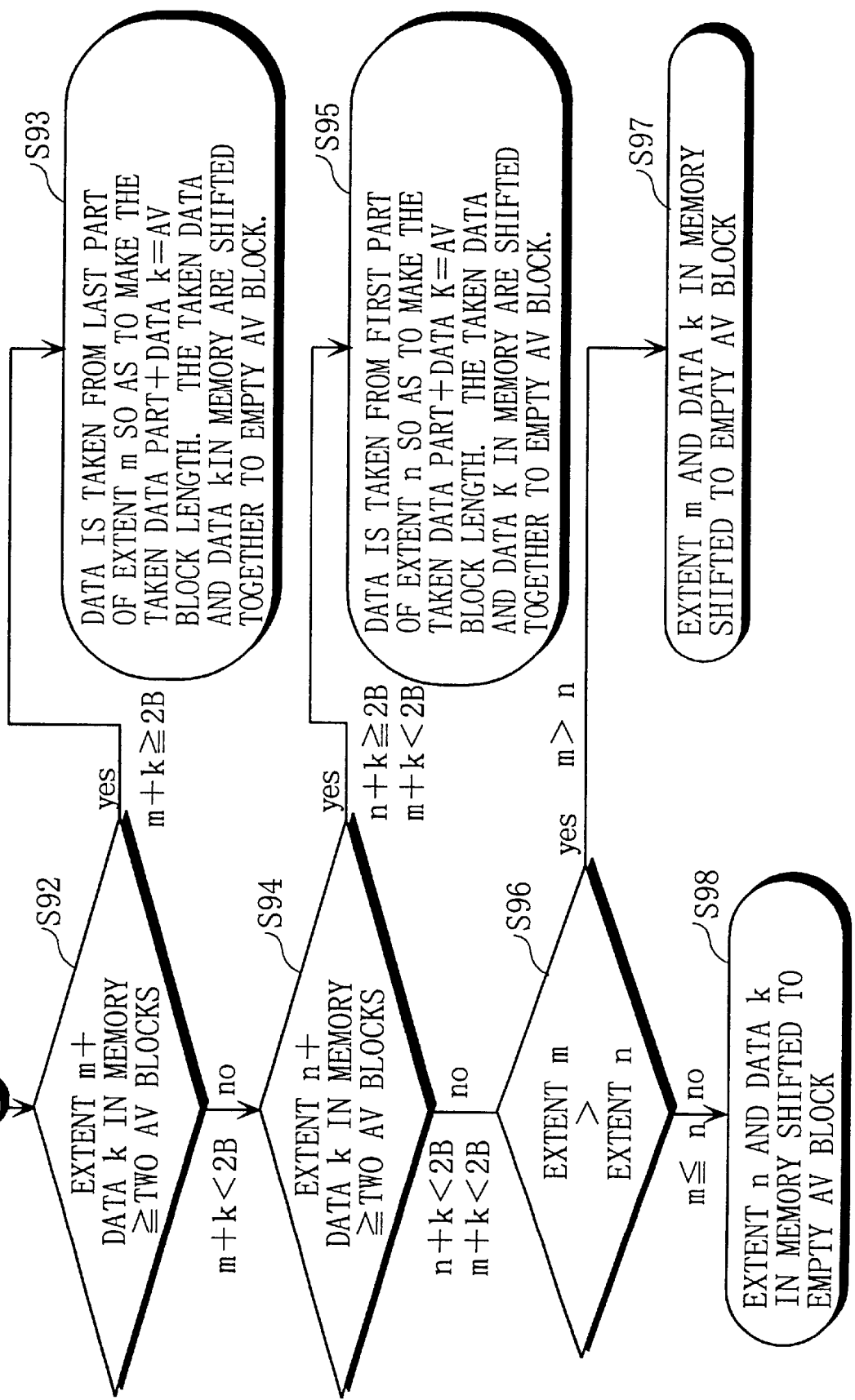
FIG. 67 is a flowchart showing the case when the both the former extent and the latter extent are at least equal to AV block length but the data sizes of the In area and Out area are insufficient.
Figure 68A:
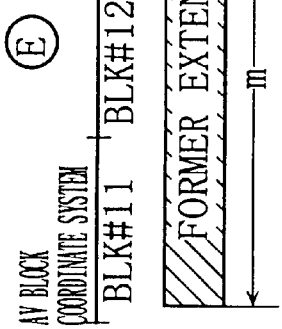
FIGS. 68A–68E are a supplementary example showing the processing of the AV file system unit 11 in the flowchart of FIG. 67.
Figure 68B:
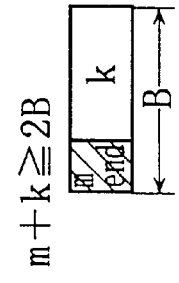
Figure 68C:
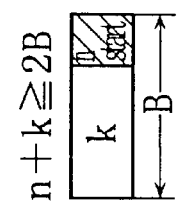
Figure 68D:
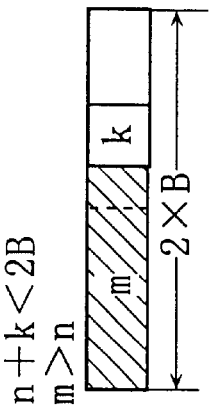

FIG. 67 is a flowchart showing the processing when both the former extent but the combined size of the In area and the Out area is below the data size of the in-memory data. FIGS. 68A–68Z show supplementary examples of the processing of the AV file system unit 11 in the flowchart of FIG. 67. In FIG. 68A, both the former extent and the latter extent are at least equal to AV block length. FIGS. 68B–68D show how the extents and in-memory data are recorded in the In area, Out area, and other empty areas as a result of the steps in FIG. 67.

In this case, both the former extent and the latter extent are at least equal to AV block length, so that there is no risk of an underflow occurring, although the recording area of the in-memory data must have a continuous length that is at least equal to AV block length.

In step S92, it is judged whether the total size of the former extent and the in-memory data is at least equal to two AV block lengths.

If the total size exceeds two AV block lengths, the processing advances to step S93 where data whose size is (AV block length-data size of in-memory data k) is read from the end of the former extent and moved to an empty area where the in-memory data is also recorded. This results in the recording state of this empty area and both extents being equal to AV block length, as shown in FIG. 68B.

If the judgement "No" is given in step S92, the processing advances to step S94, where it is judged whether the total size of the latter extent and the in-memory data is at least equal to two AV block lengths. If so, the processing follows the pattern in step S92, since an excessively long logical block write operation is to be avoided and since a relatively large amount of data can be moved from the latter extent without any risk of the latter extent ending up shorter than AV block length.

If the total size of the latter extent and the in-memory data is at least equal to two AV block lengths, the processing advances to step S95, where data whose size is (AV block length-data size of in-memory data k) is read from the start of the latter extent and moved to an empty area in the same zone as the former and latter extents, where the in-memory data is then also recorded. This results in the recording state of this empty area and both extents being equal to AV block length, as shown in FIG. 68C.

If the total size of the former extent and the in-memory data is below two AV block lengths, and the total size of the latter extent and the in-memory data is below two AV block lengths, the total data amount to be written into logical blocks will be less than two AV block lengths, so that the move processing can be performed without concern for the time taken by the write processing involved.

Accordingly, when the total size of the former extent and the in-memory data is below two AV block lengths, and the total size of the latter extent and the in-memory data is below two AV block lengths, the processing advances to step S96, where the larger of the former extent and the latter extent is found. In this situation, either the former or the latter extent may be moved, although in the present embodiment it is ideal for the smaller of the two to be moved, hence this judgement in step S96. When the former extent is the smaller of the two, in step S97 the former extent is moved, with the in-memory data then being recorded at a position immediately after the in-memory data. When doing so, the continuous length of the data recorded in this empty area will be below two AV block lengths, as shown in FIG. 68D.

Figure 68E:
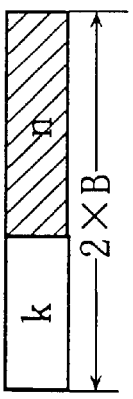

When the latter extent is the smaller of the two, in step S98 the latter extent is moved, with the in-memory data then being recorded at a position immediately before the in-memory data. When doing so, the continuous length of the data recorded in this empty area will be below two AV block lengths, as shown in FIG. 68E.

After the former extent, the in-memory data, and front part of the latter extent are linked in the above-described procedure, the file entries of the AV file Af that includes the former extent and the AV file Af+1 are integrated. One integrated file entry is obtained, and the processing ends.

Flowcharts for "MERGE" processing in a variety of circumstances have been explained, with it being possible to limit the data size of the moved and recorded data to two AV block lengths in the worst case scenario. However, this does not mean that there are no cases where data that exceeds two AV blocks lengths needs to be written, with the following two cases describing such exceptions where data that exceeds two AV blocks lengths needs to be written.

In the first exception, an empty area with a continuous length of two AV block lengths is required, although only separate empty areas of AV block length are available. In this case to create an empty area with a continuous length of two AV block lengths, AV data for one AV block length must be moved.

In the second exception, in step S81 of FIG. 60, the moving of data from the latter extent results in the remaining part of the latter extent becoming below AV block length. In this case, a further move operation becomes necessary, with the total amount of moved data in the entire processing exceeding two AV block lengths.

While the above explanation only deals with the linking of two AV files and in-memory data, a MERGE command may be executed for only one AV file and in-memory data. This case is the same as when adding data to the final extent in an AV file, so that the total size after such addition needs to be at least equal to AV block size. As a result, the in-memory data is recorded into the Out area following this final extent. When the Out area is too small to record all the in-memory data, the remaining part of the in-memory data may be recorded in a separate empty AV block.

The above linking process has been explained for the premise of seamless reproduction within a file, although it may also be used for seamless reproduction across files. Seamless reproduction across files refers to a branch in reproduction from a present AV file to another AV file. In the same way as described above, when linking two AV files and in-memory data, the continuous length of each extent must be at least equal to AV block length, so that a thorough link procedure must be used.

This completes the explanation of the linking procedure used by the AV file system unit 11.

(3-2-7-1-5) Updating of the VOB Information and PGC Information

The following is an explanation of the updating of the VOB information (time map table, seamless linking information) and PGC information (cell information) when executing a SPLIT command or MERGE command.

First, the processing when a SPLIT command has been executed will be explained. Out of the plurality of AV files that are obtained by the execution of the SPLIT command, one AV file is assigned the same AV_File_ID as the AV file which recorded the VOB from which it was split. The AV_File_IDs of the other AV files split from the AV file however need to be assigned new values.

VOBs that were originally recorded as an AV file will lose several sections due the execution of a SPLIT command, so that the marks that indicated the lost sections need to be deleted. In the same way, the cell information that gave these marks as the start points and end points need to be deleted from the RTRW management file.

In addition to deleting the mark points, it is necessary to generate new cell information that indicates the video presentation start frame of the AV file as C_V_S_PTM and the video presentation end frame of the AV file as C_V_E_PTM, and to add this new cell information to the RTRW management file.

The VOB information that includes the seamless linking information and time map table is divided into a plurality of parts when the corresponding VOB is divided. In more detail, if mx VOBs are produced by the division, the VOB information is divided to give mx time map tables and mx sets of seamless linking information.

The video presentation start time VOB_V_S_PTM and the video presentation end time VOB_V_E_PTM of a VOB generated by the processing that accompanies the execution of the SPLIT command are respectively set based on the C_V_S_PTM, C_V_E_PTM indicated by the start point and end point in the cell information used for the SPLIT command. The LAST_SCR and FIRST_SCR in the seamless linking information are also updated.

The following is a description of how the information is updated when a MERGE command has been executed. The execution of a MERGE command results in one AV file being produced from a plurality of AV files, so that the VOBs that are included in this plurality of AV files will be composed of sets of frame data that are not interrelated, meaning that the time stamps across these AV files will not be continuous. Since these are managed as a VOB that differs from the plurality of VOBs that were originally included in different AV files, separate VOB_IDs will be assigned to these VOBs.

The other necessary processing is as described in the second embodiment. However, the C_V_E_PTM in the cell information that specifies a split area needs to be increased by the number of frames included in the part of the former VOBU that have been encoded. Similarly, the C_V_S_PTM in the cell information that specifies a split area in a latter AV file needs to be decreased by the number of frames included in the part of the latter VOBU that have been encoded.

(3-2-3)

The defragmentation unit 16 is connected to a fixed magnetic disc apparatus. This defragmentation unit 16 reads an extent, out of the extents recorded on the DVD-RAM that have been subjected to link processing or other processing, that has an empty area on either side of its recording area and writes this extent onto the fixed magnetic disc apparatus to generate backup data in the fixed magnetic disc apparatus. After writing all of such extent onto the fixed magnetic disc apparatus, the defragmentation unit 16 reads the generated backup data and writes the backup data for the backed-up extent into the empty area adjacent to the extent.

Here, extents which have an empty area adjacent to their recording area are extents that have been generated by the AV file system unit 11 executing a "SPLIT" command or a "SHORTEN" command. These empty areas that equate to areas have been cleared and not since used as the recording area of the in-memory data or the moved-to area for an extent when a MERGE command has been performed.

FIGS. 69A–69D show an example that illustrates the operation of the defragmentation unit 16. In FIG. 69A, extent #x is shown as an extent with empty areas i, j on both sides of its recording area. As shown in FIG. 69A, the defragmentation unit 16 detects this extent, reads it from the DVD recorder 70, and writes it onto the fixed magnetic disk apparatus.

As a result of this write operation, backup data is generated in the fixed magnetic disk apparatus, as shown in FIG. 69B. After this, the defragmentation unit 16 reads the backup data from the fixed magnetic disk apparatus, as shown in FIG. 69C, and writes the extent onto the DVD-RAM to use both the current recording area of the extent #x and the empty area j following this recording area. This creates a continuous empty area of length i+j before the extent #x, as shown in FIG. 69D. By next performing this processing for the extent #y, the continuous length of the empty area can be further increased.

The recording performed by the defragmentation unit 16 is achieved by first storing an extent on the fixed magnetic disk apparatus, so that even if a power failure occurs for the DVD recorder 70 during the writing of the extent back onto the DVD-RAM, this writing processing can still be re-executed. By generating backup data before moving the extents to free large empty areas on the DVD-RAM, there is no risk of the losing the data in an extent when there is a power failure for the DVD recorder 70.

With the present embodiment described above, the editing of a plurality of AV files can be freely performed by the user. Even if a plurality of fragmental AV files with short continuous lengths are generated, the DVD recorder 70 will be able to links these short AV files to generated AV files with continuous lengths that are at least equal to AV block length As a result, problems caused by the fragmentation of AV files can be managed, and uninterrupted reproduction can be performed for the AV data that is recorded in these AV files.

During the link processing, it is judged whether the total size of the data to be written is as least equal to two AV block lengths, and if so, the moved amount of prerecorded AV data is restricted. As a result, it can be guaranteed that total size of the data to be written is below two AV block lengths, so that the linking can be completed in a short amount of time.

Even when it is necessary as a result of a user editing operation for a plurality of files to record re-encoded data with a short continuous length, the DVD recorder 70 will record this re-encoded data at a recording position that allows the re-encoded data to be linked with the AV data that precedes or follows it during reproduction. This means that the fragmented recording of re-encoded data is prevented from the outset, so that uninterrupted reproduction will be possible for the AV data that is recorded in such an AV file.

It should be noted here that the movement of data may also be performed so as to avoid excessive separation on the disc of two sets of AV data that have been linked together. In such a case, the data produced by linking the sets of data that are physically separated on the disc is arranged in a manner that ensures uninterrupted reproduction of the two sets of AV data. However when special reproduction such as fast forward is performed, excessive separation of the data on the disc will result in jerky reproduction of the data.

To ensure smooth reproduction in such a case, when two sets of AV data are linked, if one of the sets of data has a consecutive length that is several times a predetermined amount and an empty block of suitable size is positioned between the two sets of data, the data may be moved to this empty block. By doing so, smooth reproduction can be ensured for both normal reproduction and special reproduction.

It should be noted here that the time information may be taken from the mark points in the cell information and managed with information such as address taken from the time map table in the form of a table. By doing so, this information can be presented to the user as potential selections in a screen showing the initial pre-editing state.

Reduced images (known as "thumbnails") may also be generated for each mark point and stored as separate files, with pointer information also being produced for each thumbnail. When displaying the cell information at the pre-editing stage, these thumbnails may be displayed to show the potential selections that can be made by the user.

Also, while the present embodiment describes a case when video data and audio data are handled, this is not an effective limitation for the techniques of the present invention. For a DVD-ROM, sub-picture data for subtitles that has been run-length encoded and still images may also be handled.

The processing of AV file system unit 11 (FIGS. 48A, 48B, 49–50, 55, 60, 65, 67) that was described in this third embodiment using flowcharts can be achieved by a machine language program. Such machine language program may be distributed and sold having been recorded on a recording medium. Examples of such recording medium are an IC card, an optical disc, or a floppy disc. The machine language program recorded on the recording medium may then be installed into a standard personal computer. By executing the installed machine language programs, the standard personal computer can achieve the functions of the video data editing apparatus of this third embodiment.

Fourth Embodiment

The fourth embodiment of the present invention performs a two-stage editing process composed of virtual edits and real edits using two types of program chain, namely user-defined PGCs and original PGCs. To define the user-defined PGCs and the original PGCs, a new table is added to the RTRW management file of the first embodiment.

(4-1) RTRW Management File

The following is a description of the construction of the RTRW management file in this fourth embodiment. In the fourth embodiment, the RTRW management file is recorded in the same directory as AV files (the RTRW directory), and has the content shown in FIG. 70A.

FIG. 70A shows a detailed expansion of the stored content of the RTRW management file in the fourth embodiment. This is to say, the logical format located on the right side of FIG. 70A shows the logical format located on the left side in more detail, with the broken guidelines in FIG. 70A showing the correspondence between the left and right sides.

From the logical format of VOBs shown in FIG. 70A, the RTRW management file can be seen to include an original PGC information table, a user-defined PGC information table, and a title search pointer, in addition to the VOB information of the first embodiment.

(4-1-2) Content of the Original PGC Information

The original PGC information table is composed of a plurality of sets of original PGC information. Each set of original PGC information is information that indicates either the VOBs that are stored in an AV file present in the RTRW directory or sections within these VOBs, in accordance with the order in which these are arranged in the AV file. Each set of original PGC information corresponds to one of the VOBs recorded in an AV file present in the RTRW directory, so that when an AV file is recorded in the RTRW directory, sets of original PGC information are generated by the video data editing apparatus and recorded in the RTRW management file.

FIG. 70B shows the data format of a set of original PGC information. Each set of original PGC information is composed of a plurality of sets of cell information, with each set of cell information being composed of a cell ID (CELL #1, #2, #3, #4... in FIG. 70B) that is a unique identifier assigned to the set of cell information, an AV file ID (AVF_ID in FIG. 70B), a VOB_ID, a C_V_S_PTM, and a C_V_E_PTM.

The AV file ID is a column for writing the identifier of the AV file that corresponds to the set of cell information.

The VOB_ID is a column for writing the identifier of a VOB that is included in the AV file. When a plurality of VOBs are included in the AV file that corresponds to the set of cell information, this VOB_ID indicates which of the plurality of VOBs corresponds to the present set of cell information.

The cell start time C_V_S_PTM (abbreviated to C_V_S_PTM in the drawings) shows the start time of the cell indicated by the present cell information, and so has a column for writing the PTS that is assigned to the start time of the first video field in the section using PTM descriptor format.

The cell end time C_V_E_PTM (abbreviated to C_V_E_PTM in the drawings) shows the end time of the cell indicated by the present cell information, and so has a column for writing the end time of the final video field in the section using PTM descriptor format.

The time information given as the cell start time C_V_S_PTM and cell end time C_V_E_PTM shows the start time for an encoding operation by the video encoder and the end time for the encoding operation, with these corresponding to the mark points inserted by the user.

The cell end time C_V_E_PTM in each set of cell information in a set of original PGC information matches the cell start time C_V_S_PTM of the next set of cell information in the given order. Since this relationship is established between the sets of cell information, an original PGC indicates all of the sections in a VOB without omitting any of the sections. As a result, an original PGC is unable to indicate sections of a VOB in an order where the sections are interchanged.

(4-1-3) Content of the User-defined PGC information

The user-defined PGC information table is composed of a plurality of sets of user-defined PGC information. The data format of sets of user-defined PGC information is shown in FIG. 70C. Like the sets of original PGC information, the sets of user-defined PGC information are composed of a plurality of sets of cell information, each of which is composed of an AV file ID, a VOB_ID, a C_V_S_PTM, and a C_V_E_PTM.

A set of user-defined PGC information is composed of a plurality of sets of cell information in the same way as a set of original PGC information, although the nature and arrangement of these sets of cell information differ to those in a set of original PGC information. While a set of original PGC information indicates that the sections in a video object are to be sequentially reproduced in the order in which the sets of cell information are arranged, a set of user-defined PGC information is not restricted to indicating that the sections in a video object are to be reproduced in the order in which they are arranged.

The sections indicated by the sets of cell information in a user-defined PGC can be the same as the sections indicated by the sets of user-defined PGC information or a part (partial section) of one of the sections indicated by a set of original PGC information. Note that it is possible for the section indicated by one set of cell information to overlap a section indicated by another set of cell information.

There also may be gaps between a section that is indicated by one set of cell information and a section that is indicated by another set of cell information. This means that sets of user-defined PGC information do not need to indicate every section in a VOB, so that one or more parts of a VOB may not be indicated.

While original PGCs have strict limitations concerning their reproduction orders, user-defined PGCs are not subject to such limitations, so that the reproduction order of cells may be freely defined. As a specific example, the reproduction order of the cells in a user-defined PGC may be the inverse of the order in which the cells are arranged. Also, a user-defined PGC may indicate sections of VOBs that are recorded in different AV files.

Original PGCs indicate the partial sections in one AV file or one VOB in accordance with the order in which the AV file or VOBs are arranged, so that original PGCs may be said to respect the arrangement of the indicated data. User-defined PGCs, however, have no such restriction, and so are able to indicate the sections in the user's desired order. As a result, these user-defined PGCs are ideal for storing reproduction orders that are provisionally determined by the user for the linking of a plurality of sections in VOBs during a video data editing operation.

Original PGCs are associated to AV files and the VOBs in AV files, and the cells in an original PGC only indicate sections in these VOBs. User-defined PGCs, meanwhile, are not limited to being associated to particular VOBs, so that the sets of cell information included in user-defined PGC information may indicate sections in different VOBs.

As another difference, an original PGC is generated when recording an AV file, while a user-defined PGC may be generated at any point following the recording of an AV file.

(4-1-4) Unity of the PGC information—Video Attribute Information—AV File

Figure 71:
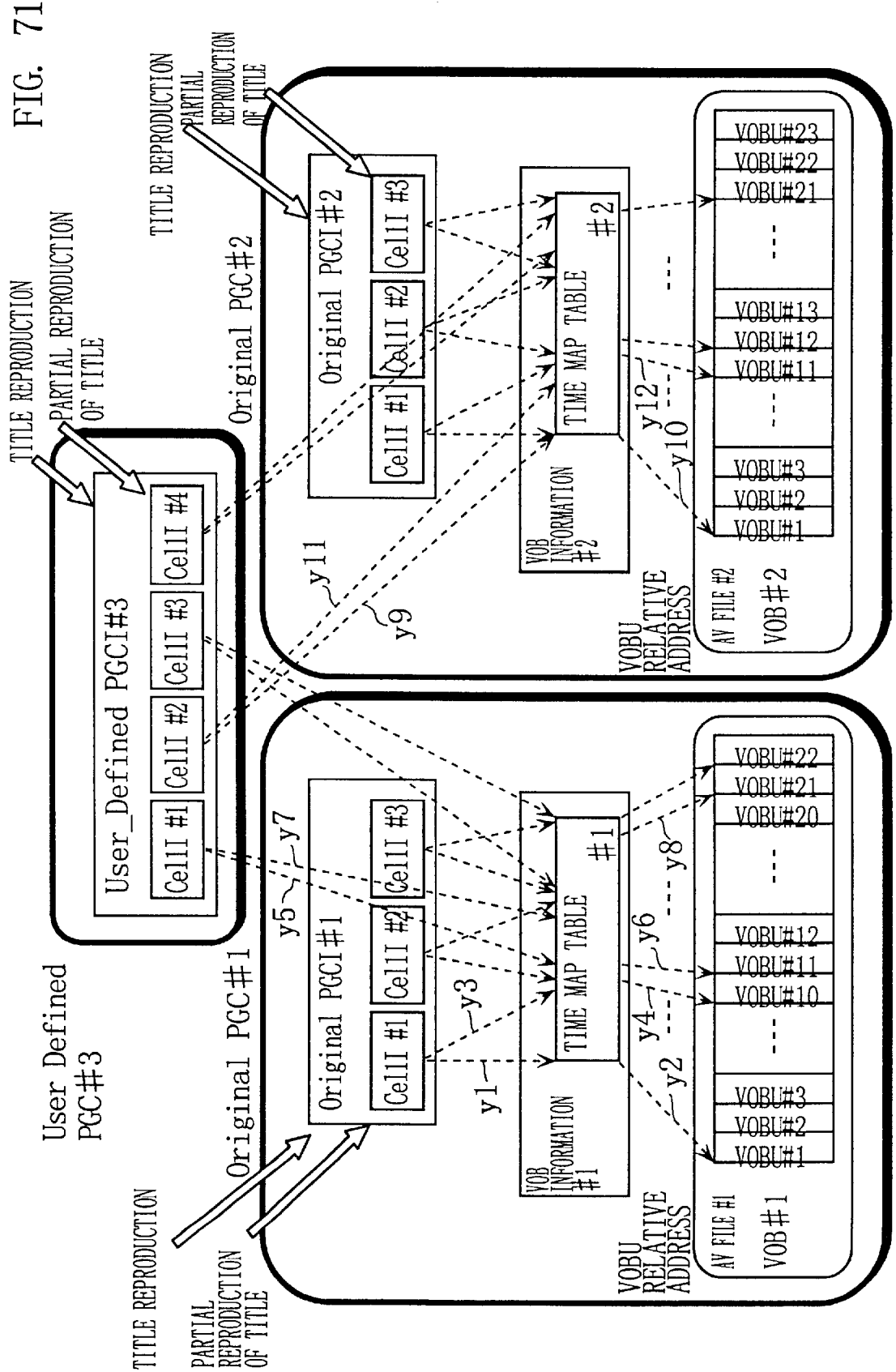
FIG. 71 shows the inter-relationships between the AV file, the extents, the VOBs, the VOB information, the original PGC information, and the user-defined PGC information, with the unified elements being enclosed in the frames drawn with the heavy lines.

The following is an explanation of the inter-relatedness of the AV files, VOBs, and sets of PGC information. FIG. 71 shows the inter-relatedness of the AV files, VOBs, time map table, and sets of PGC information, with the elements that form a unified body being enclosed within the frames drawn using thick black lines. Note that in FIG. 71, the term "PGC information" has been abbreviated to "PGCI".

In FIG. 71, the AV file #1, the VOB information #1, and the original PGC information #1 composed of the sets of cell information #1 to #3 have been arranged within the same frame, while the AV file #2, the VOB information #2, and the original PGC information #2 composed of the sets of cell information #1 to #3 have been arranged within a different frame.

These combinations of an AV file (or VOB), VOB information, and original PGC information that are present in the same frame in FIG. 71 are called an "original PGC" under DVD-RAN standard. A video data editing apparatus that complies to DVD-RAM standard treats the units called original PGCs as a management unit called a video title.

For the example in FIG. 71, the combination of the AV file #1, the VOB information #1, and original PGC information #1 is called the original PGC #1, while the combination of the AV file #2, the VOB information #2, and original PGC information #2 is called the original PGC #2.

When recording an original PGC, in addition to recording the encoded VOBs on the DVD-RAM, it is necessary to generate VOB information and original PGC information for these VOBs. The recording of an original PGC is therefore regarded as complete when all three of the AV file, VOB information table, and original PGC information have been recorded onto the DVD-RAM. Putting this another way, the recording of encoded VOBs on a DVD-RAM as an AV file itself is not regarded as completing the recording of an original PGC on the DVD-RAM.

This is also the case for deletion, so that original PGCs are deleted as a whole. Putting this another way, when any of an AV file, VOB information and original PGC information is deleted, the other elements in the same original PGC are also deleted.

The reproduction of an original PGC is performed by the user indicating the original PGC information. This means that the user does not give direct indications for the reproduction of a certain AV file or VOBs.

It should be noted here that an original PGC may also be reproduced in part. Such partial reproduction of an original PGC is performed by the user indicating sets of cell information that are included in the original PGC, although reproduction of a section that is smaller than a cell, such as a VOBU, cannot be indicated.

The following describes the reproduction a user-defined PGC. In FIG. 71, it can be seen that the user-defined PGC information #3, composed of the cells #1 to #4, is included in a separate frame to the original PGCs #1 and #2 described earlier. This shows that for DVD-RAM standard, the user-defined PGC information is not in fact AV data, and is instead managed as a separate title.

As a result, a video data editing apparatus defines the user-defined PGC information in the RTRW management file, and by doing so is able to complete the generation of a user-defined PGC. For user-defined PGCs, there is a relationship whereby the production of a user-defined PGC equates to the definition of a set of user-defined PGC information.

When deleting a user-defined PGC, it is sufficient to delete the user-defined PGC information from the RTRW management file, with the user-defined PGC being regarded as not existing thereafter.

The units for reproduction of a user-defined PGC are the same as for an original PGC. This means that the reproduction of a user-defined PGC is performed by the user indicating the user-defined PGC information. It is also possible for user-defined PGCs to be partially reproduced Such partial reproduction of a user-defined PGC is achieved by the user indicating cells that are included in the user-defined PGC.

The differences between original PGCs and user-defined PGCs are as described above, but, from the viewpoint of the user, there is no need to be aware of such differences. This is because the entire reproduction or partial reproduction of both types of PGCs is performed in the same way by respectively indicating the PGC information or cell information. As a result, both kinds of PGCs are managed in the same way using a unit called a "video title".

The following is an explanation of the reproduction of original PGCs and user-defined PGCs. The arrows drawn with broken lines in FIG. 71 show how certain sets of data refer to other data. Arrows y2, y4, y6, and y8 show the relationship between each VOBU in a VOB and the time codes included in the time map table in the VOB information, while y1, y3, y5, and y7 show the relationship between the time codes included in the time map table in the VOB information and the sets of cell information.

Here, it is assumed that the user has indicated one of the PGCs, so that a video title is to be reproduced. When the indicated PGC is the original PGC #1, the set of cell information #1 located at the front of the original PGC information #1 is extracted by the reproduction apparatus. Next, the reproduction apparatus refers to the AV file and VOB identifiers included in the extracted set of cell information #1, and specifies the AV file #1, the VOB#1, and the time map table #1 for this VOB as the AV file and VOB corresponding to this cell information.

The specified time map table #1 includes the size of each VOBU that composes the VOB and the reproduction period of each VOBU. To improve the data accessing ability, the specified time map table #1 also includes the address and elapsed time relative to the start of the VOB for representative VOBUs that are selected at a constant interval, such as a multiple of ten seconds. As a result, by referring to the time map table using the cell start time C_V_S_PTM, as shown by the arrow yl, the reproduction apparatus can specify the VOBU in the AV file that corresponds to the cell start time C_V_S_PTM included in the set of cell information #1, and so can specify the first address of this VOBU. By doing so, the reproduction apparatus can determine the first address of the VOBU that corresponds to this cell start time C_V_S_PTM, can access VOBU #1 as shown by the arrow y2, and so can start reading the VOBU sequence that starts from VOBU#1.

Since the set of cell information #1 also includes the cell end time C_V_E_PTM, the reproduction apparatus can access the time map table using this cell end time C_V_E_PTM, as shown by the arrow y3, to specify the VOBU in the AV file that corresponds to the cell end time C_V_E_PTM included in the set of cell information #1. As a result, the reproduction apparatus can determine the first address of the VOBU that corresponds to the cell end time C_V_E_PTM. When the VOBU that corresponds to the cell end time C_V_E_PTM is VOBU #10, for example, the reproduction apparatus will stop reading the VOBU sequence on reaching VOBU#10, as shown by arrow y4.

By accessing the AV file via the cell information #1 and the VOB information #1, the reproduction apparatus can read only the section indicated by the cell information #1, out of the data in VOB #1 that is included in AV file #1. If reads are also performed for the cell information #2, #3, and #4, all VOBUs that are included in VOB#1 can be read and reproduced.

When reproduction is performed for an original PGC as described above, the sections in the VOB can be reproduced in the order in which they are arranged in the VOB.

The following explanation is for when the user indicates the reproduction of a video title indicated by one of the user-defined PGCs.

When the indicated PGC is the user-defined PGC #1, the reproduction apparatus extracts the set of cell information #1 that is positioned at the front of the user-defined PGC information #1 for this user-defined PGC #1. Next, the reproduction apparatus refers to the time map table #1 using the cell start time C_V_S_PTM included in this cell information #1, as shown by the arrow y5, and specifies the VOBU in VOBU #1 that corresponds to this cell start time C_V_S_PTM included in the cell information #1. In this case, the reproduction apparatus specifies VOBU #11 as the VOBU that corresponds to the cell start time C_V_S_PTM, accesses VOBU #11 as shown by the arrow y6, and starts reading a VOBU sequence that starts from VOBU #11.

The cell information #1 included in the user-defined PGC *1 also includes the cell end time C_V_E_PTM, so that the reproduction apparatus refers to the time map table using this cell end time C_V_E_PTM, as shown by the arrow y7, and specifies the VOBU in VOB #1 that corresponds to the cell end time C_V_E_PTM that is included in the cell information #1. When the VOBU that corresponds to the cell end time C_V_E_PTM is VOBU #21, for example, the reproduction apparatus will stop reading the VOBU sequence on reaching VOBU #21, as shown by arrow y8.

As described above, after accessing the AV file via the cell information #1 and VOB information #1, the reproduction apparatus performs the same processing for the cell information #2, #3, and #4 included in the user-defined PGC information #1.

After extracting the cell information #2 which is located at a position following the cell information #1, the reproduction apparatus refers to the AV file identifier included in the extracted cell information #2 and so determines that AV file #2 corresponds to this cell information and that time map table #2 corresponds to this AV file.

The specified time map table #2 includes the size of each VOBU that composes the VOB and the reproduction period of each VOBU. To improve the data accessing ability, the specified time map table #2 also includes the address and elapsed time relative to the start of the VOB for representative VOBUs that are selected at a constant interval, such as a multiple of ten seconds. As a result, by referring to the time map table using the cell start time C_V_S_PTM, as shown by the arrow y9, the reproduction apparatus can specify the VOBU in the AV file that corresponds to the cell start time C_V_S_PTM included in the set of cell information #2, and so can specify the first address of this VOBU. By doing so, the reproduction apparatus can determine the first address of the VOBU that corresponds to this cell start time C_V_S_PTM, can access VOBU #2 as shown by the arrow y10, and so can start reading the VOBU sequence that starts from VOBU#2.

Since the set of cell information #2 also includes the cell end time C_V_E_PTM, the reproduction apparatus can access the time map table using this cell end time C_V_E_PTM, as shown by the arrow y11, to specify the VOBU in the AV file that corresponds to the cell end time C_V_E_PTM included in the set of cell information #2. As a result, the reproduction apparatus can determine the first address of the VOBU that corresponds to the cell end time C_V_E_PTM. When the VOBU that corresponds to the cell end time C_V_E_PTM is VOBU #11, for example, the reproduction apparatus will stop reading the VOBU sequence on reaching VOBU#11, as shown by arrow y12.

By reproducing the user-defined PGC information in this way, the desired sections in VOBs included in two AV files may be reproduced in the given order This completes the explanation of the unity of AV file, VOB information, and PGC information. The following is a description of the title search pointer shown in FIG. 70.

(4-1-5) Content of the Title Search Pointer

The title search pointer is information for managing the VOB information, time map table, PGC information, and AV files recorded on a DVD-RAM in the units called video titles that were described above. Each title search pointer is composed of the PGC number that is assigned to a set of original PGC information or a set of user-defined PGC information, a title type, and a title recording history.

Each title type corresponds to one of the PGC numbers, and is set at the value "00" to show that the AV title with the corresponding PGC number is an original type PGC, or is set at the value "01" to show that the AV title with the corresponding PGC number is a user-defined PGC.

The title recording history shows the data and time at which the corresponding PGC information was recorded onto the DVD-RAM.

When the RTRW directory on a DVD-RAM is indicated, a reproduction apparatus that complies to DVD-RAM standard reads the title search pointers from the RTRW management file and so can instantly know how many original PGCs and user-defined PGCs are given in each directory on the DVD-RAM and when each of these video titles were recorded in the RTRW management file.

(4-1-6) Interchangeability of User-defined PGCs and Original PGCs in a Real Edit The user-defined PGC information defined in a virtual edit can be used to indicate the linking order for cells in a real edit, as shown in this fourth embodiment.

Also, once a real edit has been performed as described in the fourth embodiment, if a set of user-defined PGC information is converted into a set of original PGC information, original PGC information can be easily generated for the VOBs obtained by this linking.

This is because the data construction of the user-defined PGC information and the original type information only differ in the value given as the title type, and because the sections of a VOB obtained by a real edit are the sections that were indicated by the user-defined PGC information before the real edit.

Figure 72:
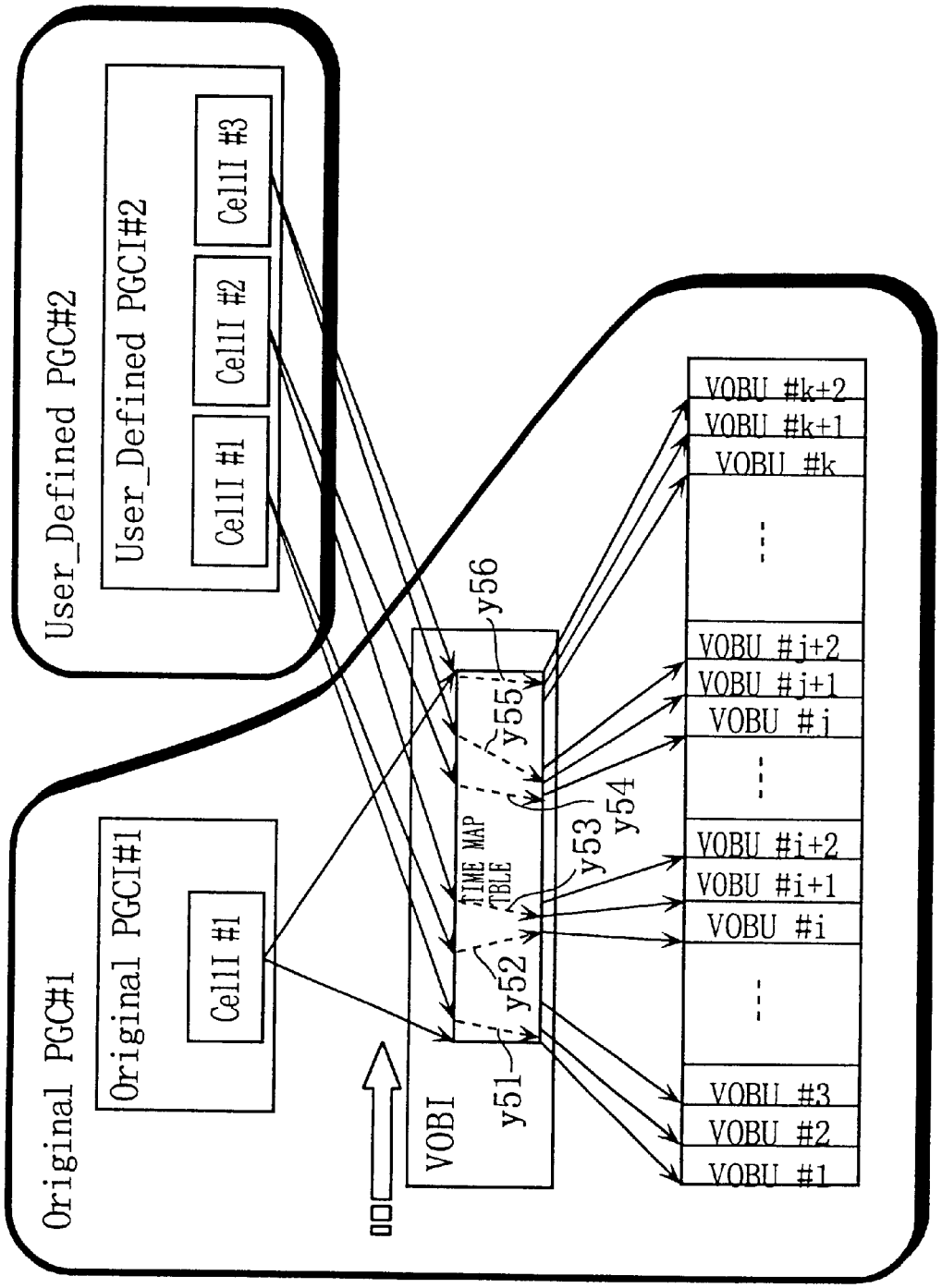

The following is an explanation of the procedure for a real edit in this fourth embodiment, and of the process for updating user-defined PGC information to original PGC information. FIG. 72 shows an example of a user-defined PGC and an original PGC.

In FIG. 72, original PGC information #1 includes only cell#1, and forms part of an original PGC with VOB#1 and the VOB information. On the other hand, user-defined PGC information #2 forms a user-defined PGC using only cell#1, cell#2, and cell#3.

In FIG. 72, cell#1 indicates the section from VOBU#1 to VOBU#i, as shown by the broken arrows y51 and y52, while cell#2 indicates the section from VOBU#i+1 to VOBU#j, as shown by the broken arrows y53 and y54, and cell#3 indicates the section from VOBU#j+1 to VOBU#k+2, as shown by the broken arrows y55 and y56.

Figure 73:
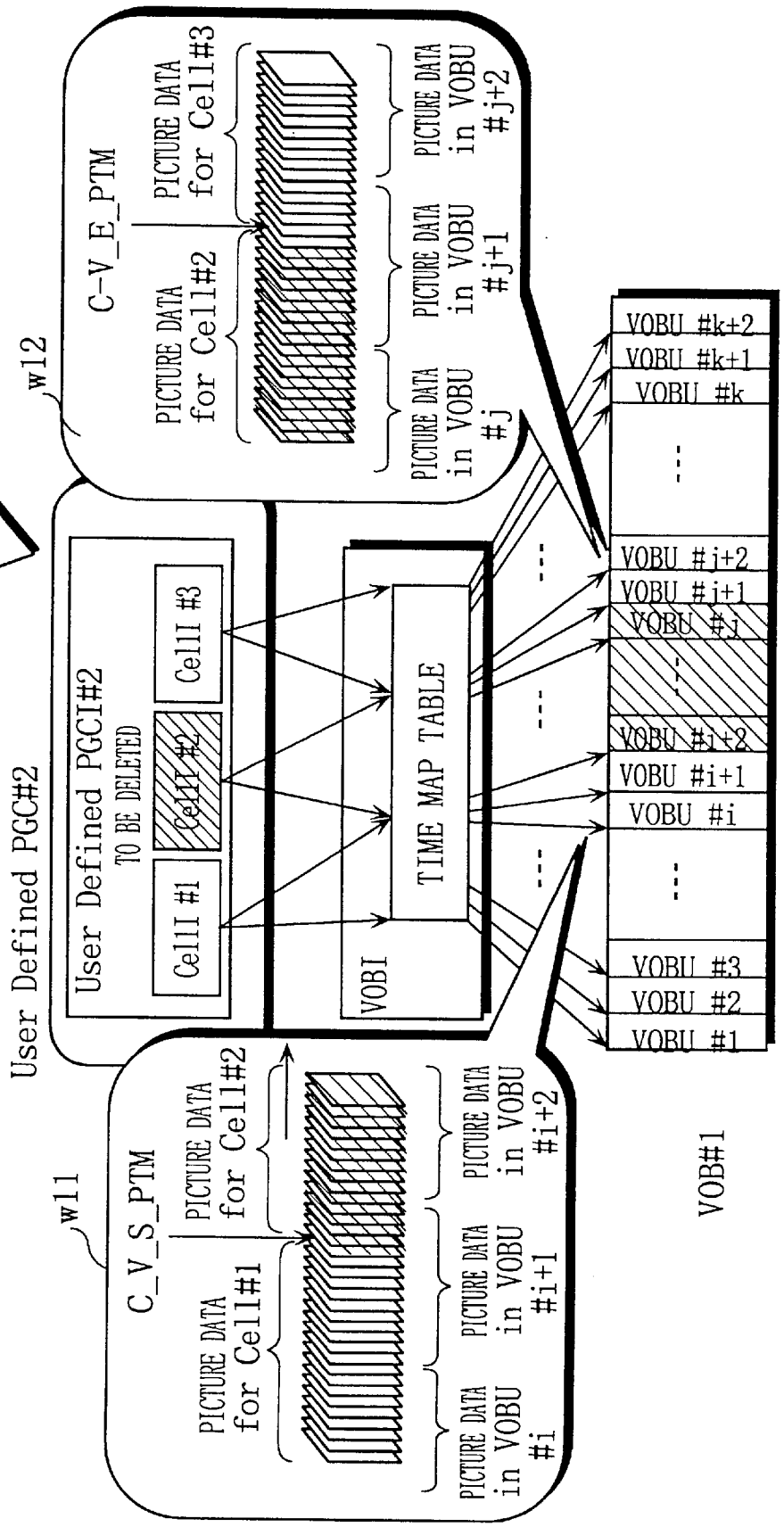

In the following example, cell#2 is deleted from the user-defined PGC information, and the user indicates a real edit using the user-defined PGC information #2 composed of the cells #1 and #3. In FIG. 73, the area that corresponds to the deleted cell is shown using shading.

Cell#2, which is deleted here indicates one of the video frames, out of the plurality of sets of picture data included in VOBU #i+1 shown within the frame w11, using the cell start time C_V_S_PTM. Cell#2 also indicates one of the video frames, out of the plurality of sets of picture data included in VOBU #j+1 shown within the frame w12, using the cell end time C_V_E_PTM.

If a real edit is performed using the user-defined PGC information #2, VOBUs #i−1, i, and i+1 located at the end of cell#1 and VOBUs #j, j+1, and j+2 located at the start of cell#2 will be subjected to re-encoding. This re-encoding is performed according to the procedure described in the first and second embodiments, and the linking of the extents is then performed according to the procedure described in the third embodiment.

Figure 74A:
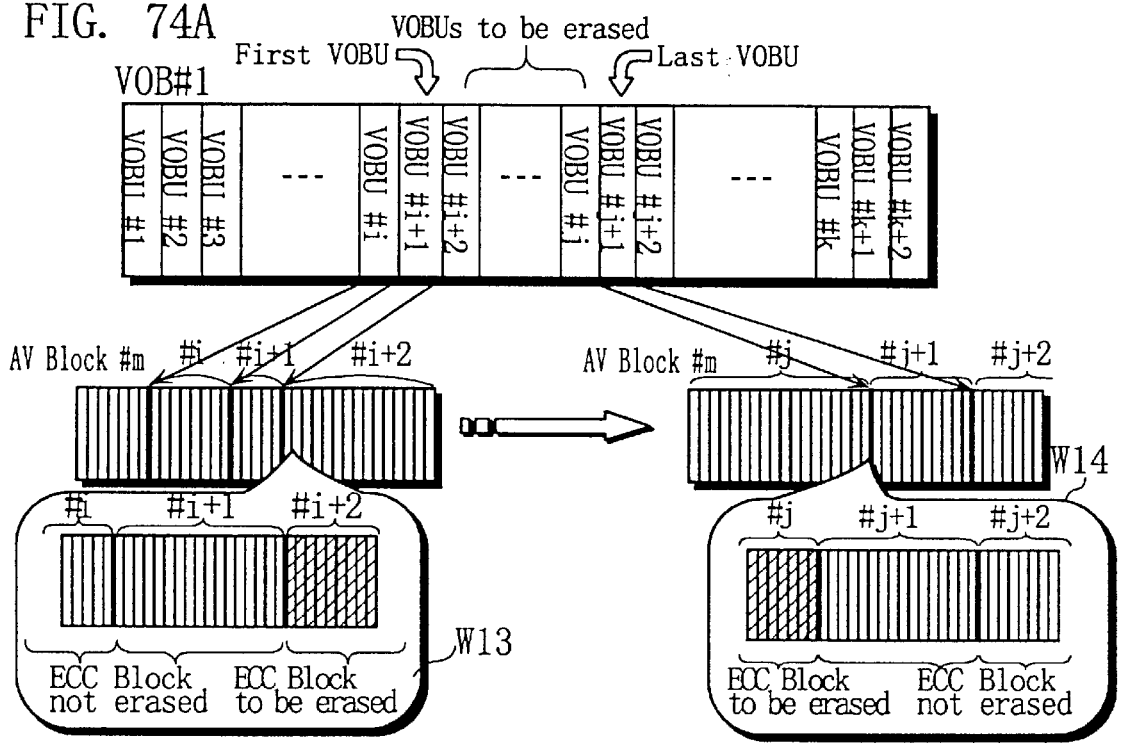

FIG. 74A shows the ECC blocks on the DVD-RAM that are freed by a real edit performed using user-defined PGC information #2. As shown on the second level of FIG. 74A, VOBUs #i, #i+1, and #i+2 are recorded in the AV block #m, and VOBUs #j, #j+1, and #j+2 are recorded in the AV block #n.

As shown in FIG. 73, cell #2 indicates the picture data included in VOBU #i+1 as the C_V_S_PTM, and the picture data included in VOBU #j+1 as the C_V_E_PTM. As a result, a SPLIT command and a SHORTEN command of the second embodiment are issued to free the area from the ECC block occupied by VOBU #i+2 to the ECC block occupied by VOBU #j, as shown by the frames w13 and w14 in FIG. 74A. However, the ECC blocks occupied by VOBUs #i and #i+1 and the ECC blocks occupied by VOBUs #j+1 and j+2 are not freed.

Figure 74B:
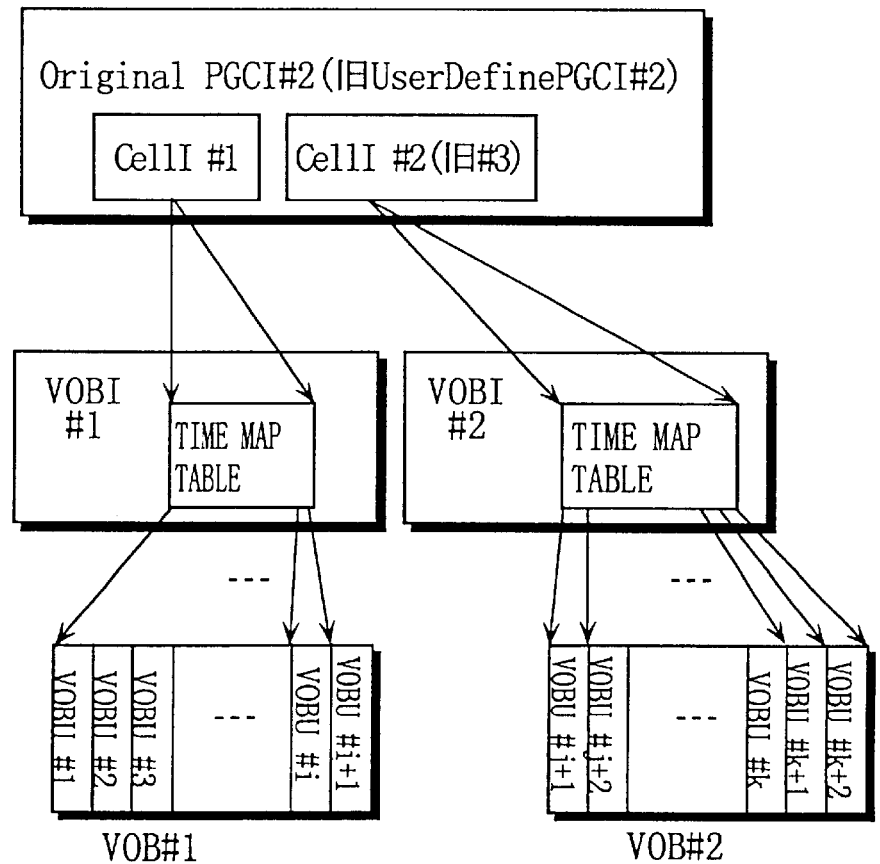

FIG. 74B shows an example of a VOB, VOB information and PGC information after a real edit. Since the area corresponding to cell #2 have been deleted, VOB #1 is deleted into (new) VOB#1 and VOB#2.

When the SPLIT command is issued, the VOB information for VOB#1 is divided into VOB information #1 and VOB information #2. The time map tables included in this VOB information is also divided into the time map table #1 and the time map table #2. Although not illustrated, the seamless linking information is also divided.

The VOBUs in VOB#1 and VOB#2 are referred to by a reproduction apparatus via these divided time map tables.

The user-defined PGC information and original PGC information have the same data construction, with only the value of the title types differing. The sections of VOBs obtained after a real edit were originally indicated by the user-defined PGC information #2 before the real edit, so that the user-defined PGC information #2 is converted into original PGC information. Since this user-defined PGC information #2 is used to define the original information, there is no need for a separate process to generate new original PGC data after a real edit.

(4-2-Functional Blocks of the DVD Recorder 70

Figure 75:
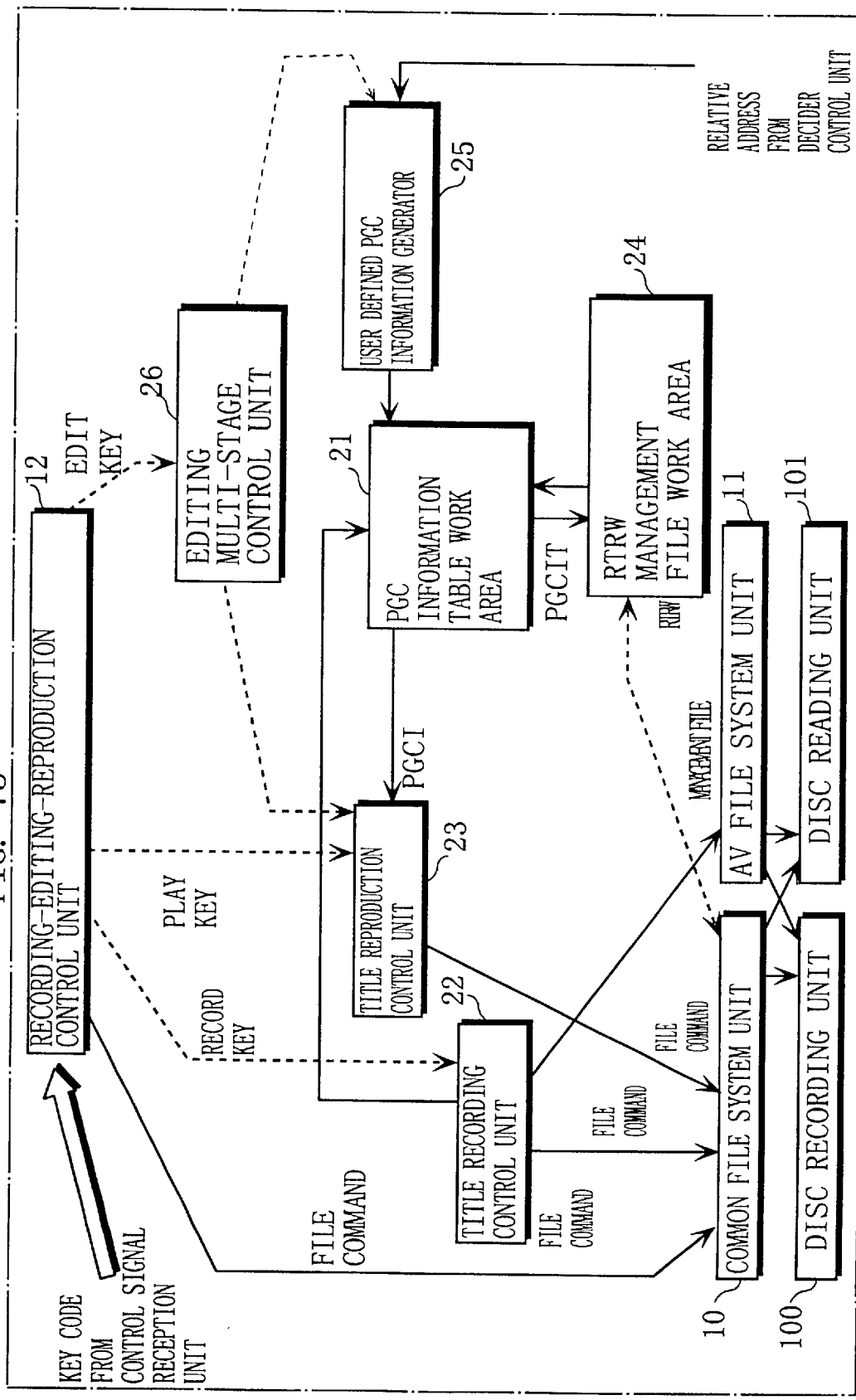

FIG. 75 is a functional block diagram showing the construction of the DVD recorder 70 in this fourth embodiment. Each function shown in FIG. 75 is realized by the CPU 1*a* executing the programs in the ROM 1*e* and controlling the hardware shown in FIG. 17.

The DVD player shown in FIG. 75 is composed of a disc recording unit 100, a disc reading unit 101, a common file system unit 10, an AV file system unit 11, and a recording-editing-reproduction control unit 12, in the same way as in video data editing apparatus described in the third embodiment. The present embodiment differs with the third embodiment, however, in that the AV data recording unit 13 is replaced with the title recording control unit 22, the AV data reproduction unit 14 is replaced with the title reproduction control unit 23, and the AV data editing unit 15 is replaced with the editing multi-stage control unit 26 This DVD player also includes a PGC information table work area 21, an RTRW management file work area 24, and a user-defined PGC information generator 25, in place of the defragmentation unit 16.

(4-2-1) Recording-Editing-Reproduction Control Unit 12

The recording-editing-reproduction control unit 12 in this fourth embodiment receives a user indication of a directory in the directory structure on the DVD-RAM as the operation target. On receiving the user indication of the operation target, the recording-editing-reproduction control unit 12 specifies the operation content according to the user operation that has been reported by the remote control signal reception unit 8. At the same time, the recording-editing-reproduction control unit 12 gives instructions so that processing corresponding to the operation content is performed for the directory that is the operation target by the title recording control unit 22, the title reproduction control unit 23, or any of the other components.

Figure 77A:
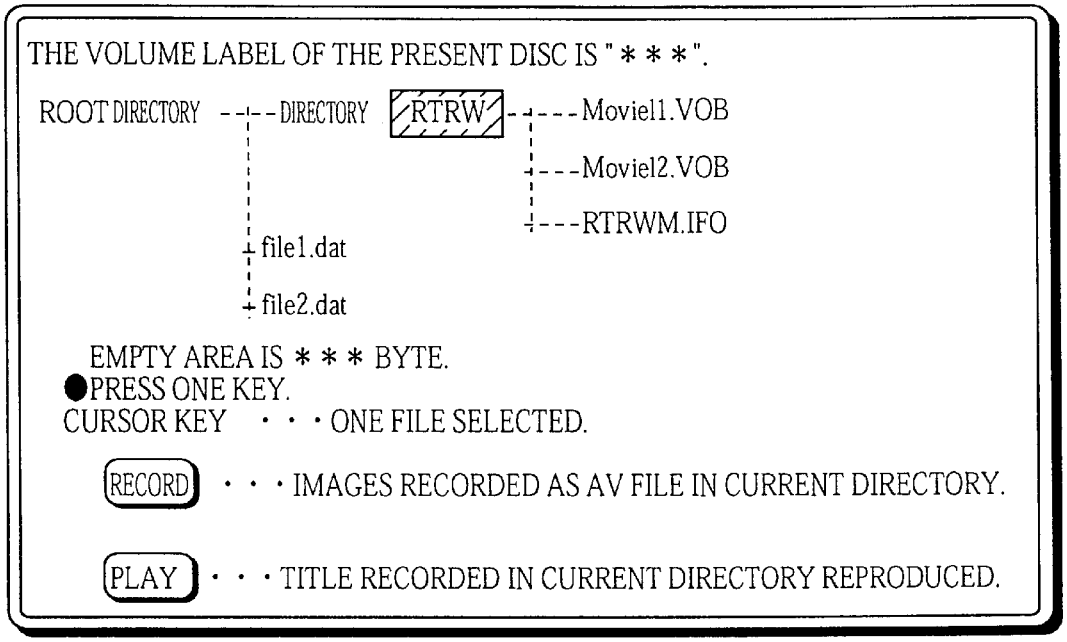

FIG. 77A shows an example of graphics data that is displayed on the TV monitor 72 under the control of the recording-editing-reproduction control unit 12. When any of the directories have been set into the focus state, the recording-editing-reproduction control unit 12 waits for the user to press the enter key. When the user does so, the recording-editing-reproduction control unit 12 specifies the directory that is presently in the focus state as the current directory.

(4-2-2) PGC Information Table Work Area 21

The PGC information table work area 21 is a memory area that has a standardized logical format so that sets of PGC information can be successively defined. This PGC information table work area 21 has internal regions that are managed as a matrix. The plurality of sets of PGC information that are present in the PGC information table work area 21 are arranged in different columns while a plurality of sets of cell information are arranged in different rows. In the PGC information table work area 21, any set of cell information in a stored set of PGC information can be accessed using a combination of a row number and a column number.

FIG. 76 shows examples of sets of original PGC information that are stored in PGC information table work area 21. It should be noted here that when the recording of an AV file is completed, the user-defined PGC information table will be empty (shown as "NULL" in FIG. 76"). In FIG. 76, the original PGC information #1 includes the set of cell information #1 showing the section between the start time t0 and the end time t1, the set of cell information #2 showing the section between the start time t1 and the end time t2, the set of cell information #3 showing the section between the start time t2 and the end time t3, and the set of cell information #4 showing the section between the start time t3 and the end time t4.

(4-2-3) Title Recording Control Unit 22

The title recording control unit 22 records VOBs onto the DVD-RAM in the same way as the AV data recording unit 13 in the third embodiment, although in doing so the title recording control unit 22 also stores a time map table in the RTRW management file work area 24, generates VOB information, and generates original PGC information which it stores in the PGC information table work area 21.

When generating original PGC information, the title recording control unit 22 follows the procedure described below. First, on receiving notification of a pressing of the record key from the recording-editing-reproduction control unit 12, the title recording control unit 22 secures a row area in the PGC information table work area 21 Next, after the AV data recording unit 13 has assigned an AV file identifier and a VOB identifier to the VOB to be newly recorded, the title recording control unit 22 obtains these identifiers and stores them in the secured row area corresponding to a newly assigned PGC number.

Next, when encoding is started for the VOB, the title recording control unit 22 instructs the MPEG encoder 2 to output the PTS of the first video frame. When the encoder control unit 2g has outputted this PTS for the first video frame, the title recording control unit 22 stores this value and waits for the user to perform a marking operation.

Figure 80A:
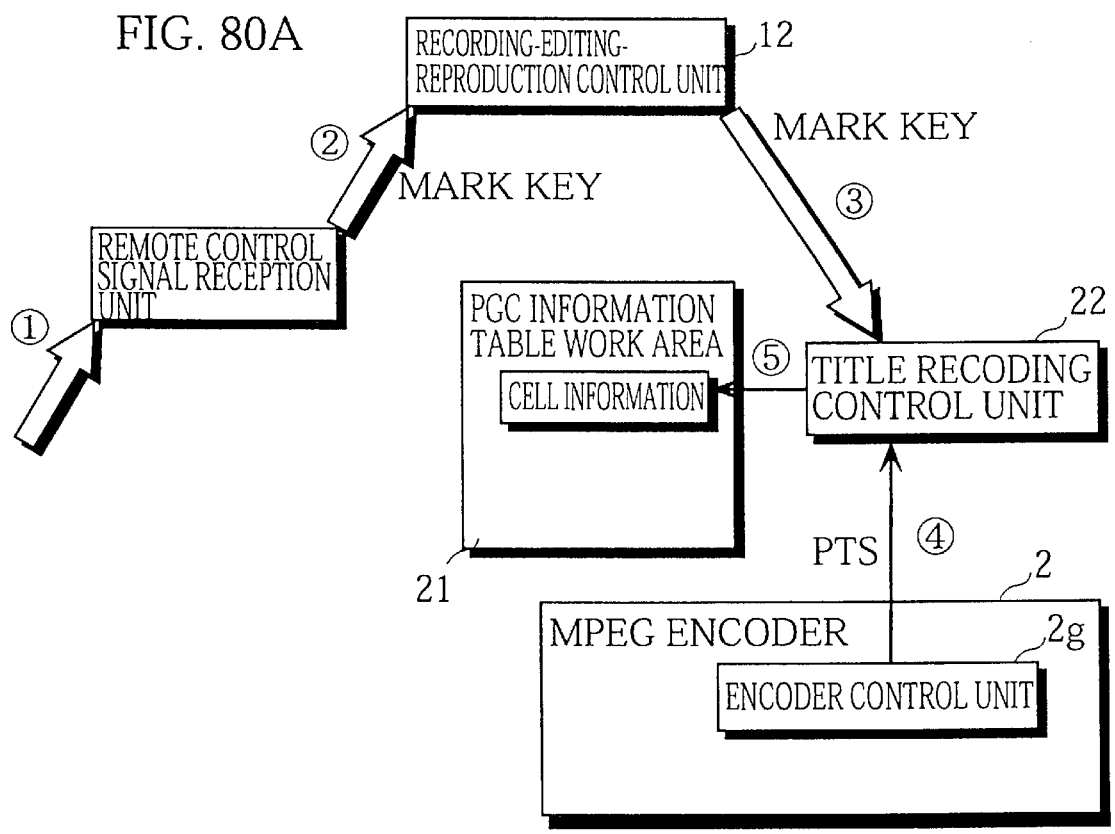

FIG. 80A shows how data input and output are performed between the components shown in FIG. 75 when a marking operation is performed. While viewing the video images displayed on the TV monitor 72, the user presses the mark key on the remote controller 71. This marking operation is reported to the title recording control unit 22 via the route shown as ①, ②, ③ in FIG. 80A. The title recording control unit 22 then obtains the PTS for the point where the user pressed the mark key from the encoder control unit 2g, as shown by ④ in FIG. 80A, and sets this as time information.

The title recording control unit 22 repeatedly performs the above processing while a VOB is being encoded. If the user presses the stop key during the generation of the VOB, the title recording control unit 22 instructs the encoder control unit 2g to output the presentation end time for the last video frame to be encoded. Once the encoder control unit 2g has outputted this presentation end time for the last video frame to be encoded, the title recording control unit 22 stores this as time information.

By repeating the above processing until the encoding of a VOB is complete, the title recording control unit 22 ends up storing the AV file identifier, the VOB identifier, the presentation start time of the first video frame, the presentation start time of each video frame corresponding to a point where a marking operation was performed, and the presentation end time of the final video frame.

Of this stored time information, the title recording control unit 22 sets the start time and end time of a section and the corresponding AV file identifier and VOB identifier as one set of cell information which it stores in a newly-secured row in the PGC information table work area 21. By doing so, the title recording control unit 22 newly generates original PGC information.

On completing the above generation, the title recording control unit 22 associates this original PGC information to the assigned PGC number, and, in the PGC information table work area 21, generates a title search pointer that has type information showing that this PGC information is original PGC information, and a title recording history showing the date and time at which the recording of this PGC information was completed.

It should be noted here that if the title reproduction control unit 23 can detect when there is a large change in the content of scenes, the user-defined PGC information generator 25 may automatically obtain the PTS for the points at which such scene changes occur and automatically set these PTS in sets of cell information.

The generation of a time map table or VOB information does not form part of the gist of this embodiment, and so will not be explained.

(4-2-4) Title Reproduction Control Unit 23

The title reproduction control unit 23 performs reproduction or partial reproduction for any of the titles recorded in the current directory that is indicated by the recording-editing-reproduction control unit 12.

Figure 77B:
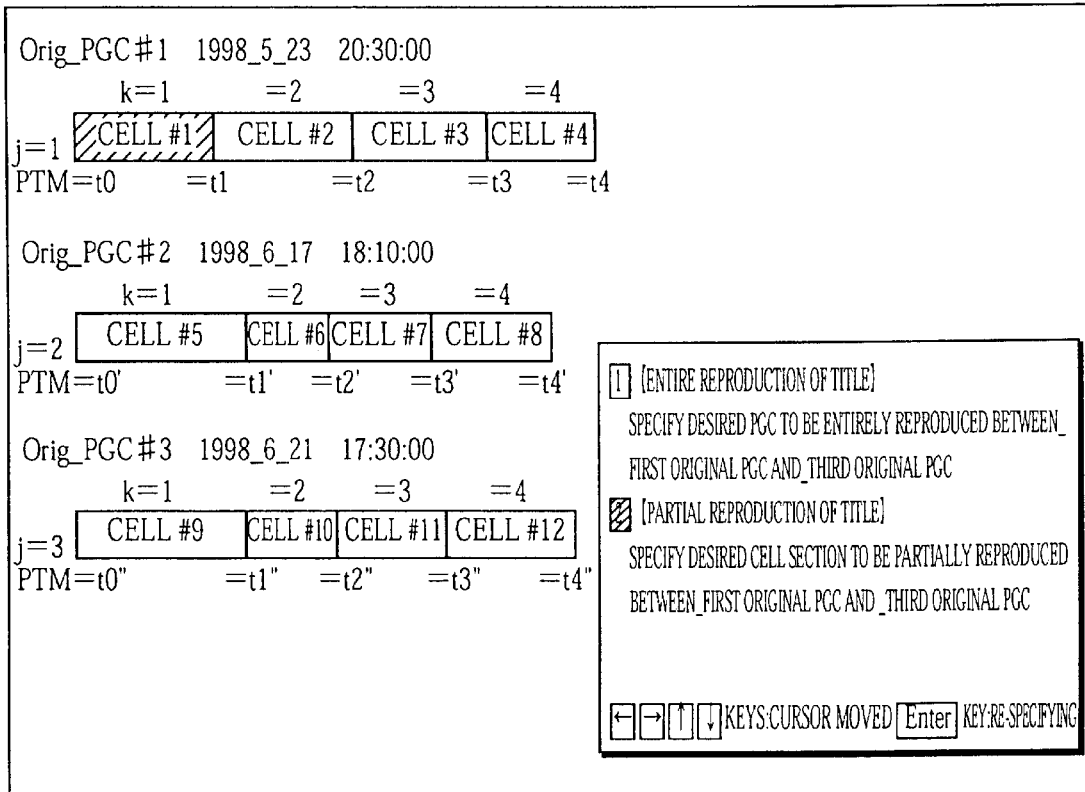

This is described in more detail below. When, as shown in FIG. 77A, one of the directories is selected as the current directory and the user gives an indication for the reproduction of one of the title stored in this directory, the title reproduction control unit 23 displays the screen image shown in FIG. 77A, reads the original PGC information table and user-defined PGC information table in the RTRW management file in this directory, and has the user select the complete reproduction or partial reproduction of one of the original PGCs or user-defined PGCs in the current directory. FIG. 77B shows the PGCs and cells that are displayed as the list of potential operation targets. The sets of PGC information and cell information that represent these PGCs and cells are the same as those shown in the example of FIG. 76.

The original PGCs that appear in this interactive screen are shown in a simple graph that shows time in the horizontal axis, with each original PGC being displayed along with the date and time at which it was recorded In FIG. 77B, the menu at the bottom right of the screen shows whether complete reproduction or partial reproduction is to be performed for the video title in the current directory. By pressing the "1" or "2" key on the remote controller 71, the user can select complete reproduction or partial reproduction of the video title. If the user selects complete reproduction, the title reproduction control unit 23 has the user select one of the PGCs as the operation target, while if the user selects partial reproduction, the title reproduction control unit 23 has the user select one of the cells as the operation target.

When complete reproduction has been selected for a PGC, the title reproduction control unit 23 extracts the cells from the PGC selected as the operation target and, by referring a time map table such as that shown in FIG. 71, reproduces the sections indicated by the cells one by one. On completing the reproduction of the sections, the title reproduction control unit 23 has the interactive screen shown in FIG. 77B displayed and waits for the next selection of cell information.

Figure 78A:
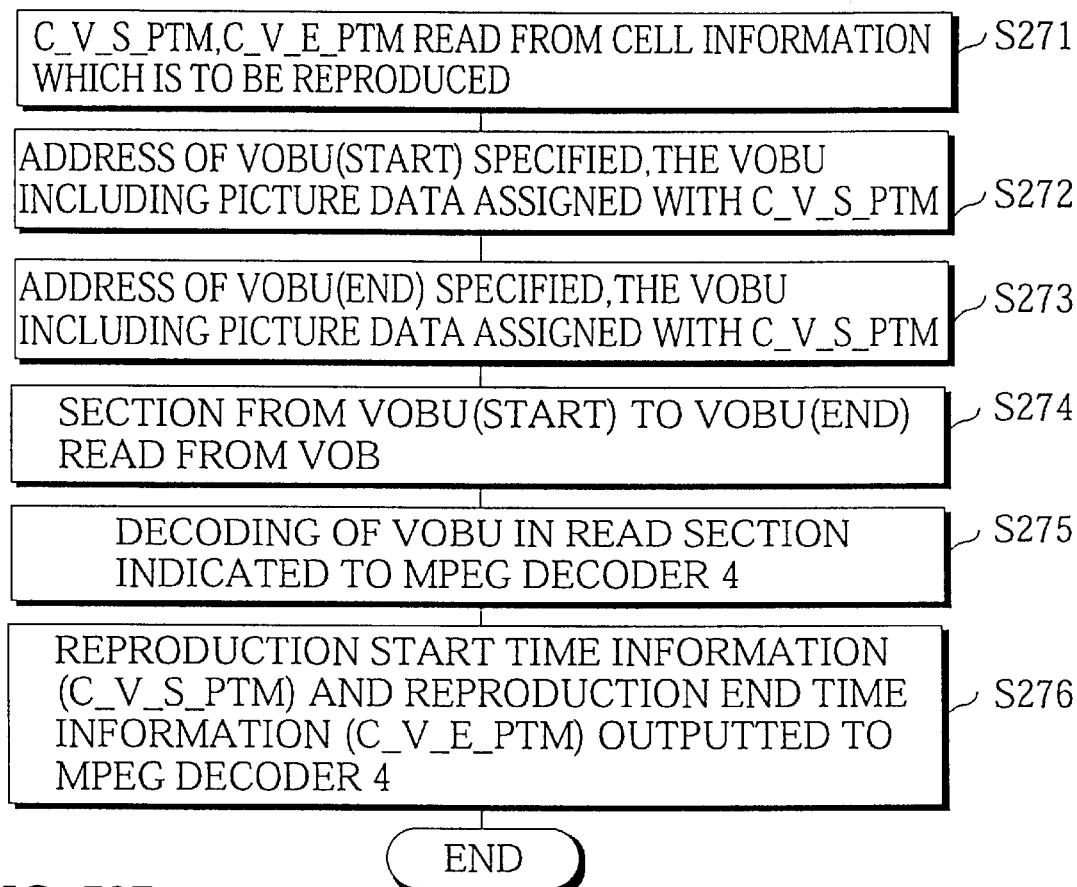

FIG. 78A is a flowchart showing the processing when partially reproducing sets of cell information. First, in step S271, the title reproduction control unit 23 reads the C_V_S_PTM and C_V_E_PTM from the cell information to be reproduced out of the original PGC information or user-defined PGC information. Next, in step S272, the title reproduction control unit 23 specifies the address of the VOBU (START) that includes the picture data assigned C_V_S_PTM.

In step S273, the title reproduction control unit 23 specifies the address of the VOBU (END) that includes the picture data assigned C_V_E_PTM, and in step S274, the title reproduction control unit 23 reads the section from VOBU (START) to VOBU (END) from the present VOB. In step S275, the title reproduction control unit 23 instructs the MPEG decoder 4 to decode the read VOBUs. In step S276, the title reproduction control unit 23 outputs the cell presentation start time (C_V_S_PTM) and cell presentation end time (C_V_E_PTM) to the decoder control unit 4k of the MPEG decoder 4 as valid reproduction section information, together with a decode processing request.

Figure 78B:
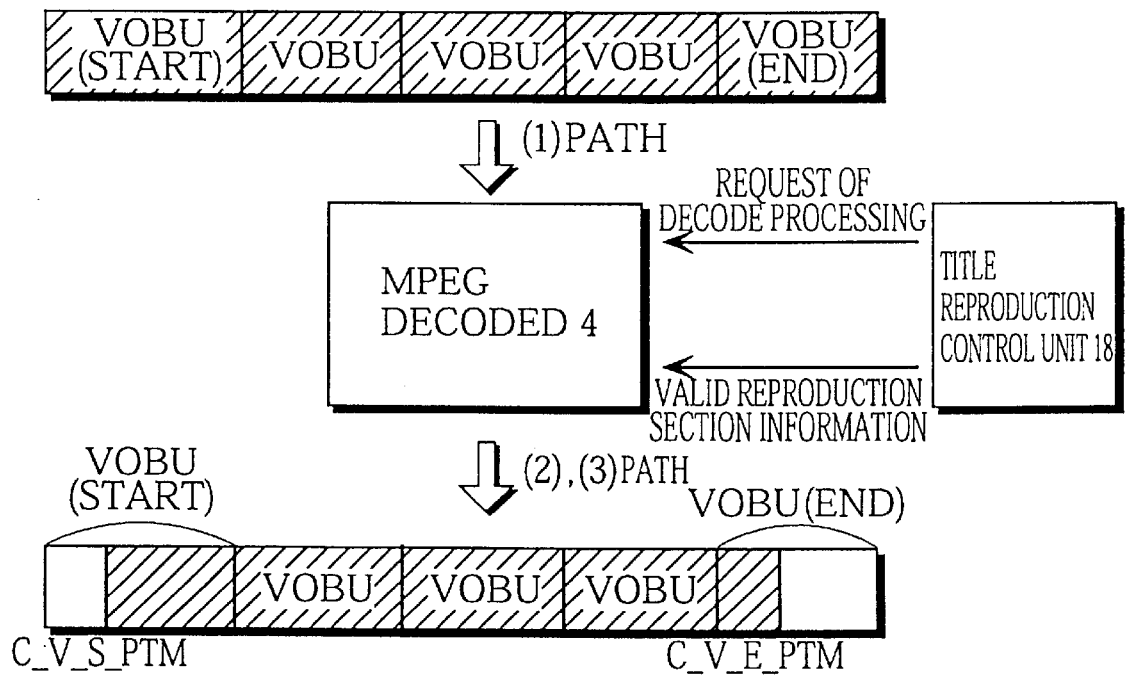

The reason the title reproduction control unit 23 outputs the valid reproduction section information to the MPEG decoder 4 is that the decoder control unit 4k in the MPEG decoder 4 will try to decode even picture data that is not within the section indicated by the cell. In more detail, the unit for the decode processing of the MPEG decoder 4 is a VOBU, so that the MPEG decoder 4 will decode the entire section from VOBU(START) to VOBU(END), and in doing so will have picture data outside the section indicated by the cell reproduced. A cell indicates a section in units of video fields, so that a method for prohibiting the decoding and reproduction of picture data outside the section is necessary. To prohibit the reproduction of such picture data, the title reproduction control unit 23 outputs valid reproduction section information to the title reproduction control unit 23. FIG. 78B shows how only the section between the cell presentation start time (C_V_S_PTM) and the cell presentation end time (C_V_E_PTM), out of the area between the VOBU (START) and the VOBU (END), is reproduced.

By receiving this valid reproduction section information, the MPEG decoder 4 can stop the display output of an appropriate number of video fields from the start of the VOBU (START) to C_V_S_PTM and the display output of an appropriate number of video fields from C_V_E_PTM to the VOBU (END). For the hardware construction shown in FIG. 17, the disc access unit 3 reads the VOBU sequence and outputs this to the MPEG decoder 4 via the logical connection (1). The MPEG decoder 4 decodes this VOBU sequence and prohibits the reproduction output of the part that precedes C_V_S_PTM and the part that follows C_V_E_PTM. As a result, only the section indicated by the cell information is reproduced.

Since one set of original PGC information or user-defined PGC information includes a plurality of sets of cell information, the procedure shown in FIG. 78A may be repeated for each set of cell information included in one set of PGC information.

(4-2-5) RTRW Management File Work Area 24

The RTRW management file work area 24 is a work area for arranging the original PGC information table composed of the plurality of sets of original PGC information generated in the PGC information table work area 21, the user-defined PGC information table composed of a plurality of sets of user-defined PGC information, the title search pointers, and the sets of VOB information, in accordance with the logical format shown in FIG. 70. The common file system unit 10 writes the data arranged in the RTRW management file work area 24 into the RTRW directory as non-AV files, and in doing so stores a RTRW management file in the RTRW directory.

(4-2-6) Use-Defined PGC Information Generator 25

The user-defined PGC information generator 25 generates user-defined PGC information based on one set of PGC information recorded in the RTRW management file of the current directory. Two types of cell information can be present in the user-defined PGC information (called sets of user-defined cell information), with these being a first type that indicates an area inside a section indicated by cell information in an existing set of PGC information, and a second type that indicates the same section as a set of cell information in an existing set of PGC information. The user-defined PGC information generator 25 generates these two types of cell information using different methods.

To generate the first type of user-defined cell information that indicates an area inside a section indicated by existing cell information, the user-defined PGC information generator 25 has the title reproduction control unit 23 perform partial reproduction for the section indicated by the existing cell information. During the partial reproduction for this section, the user-defined PGC information generator 25 monitors when the user performs marking operations, and generates sets of cell information with the times of the marking operations as the start point and end point. In this way, the user-defined PGC information generator 25 generates user-defined PGC information composed of this first type of cell information.

Figure 79A:
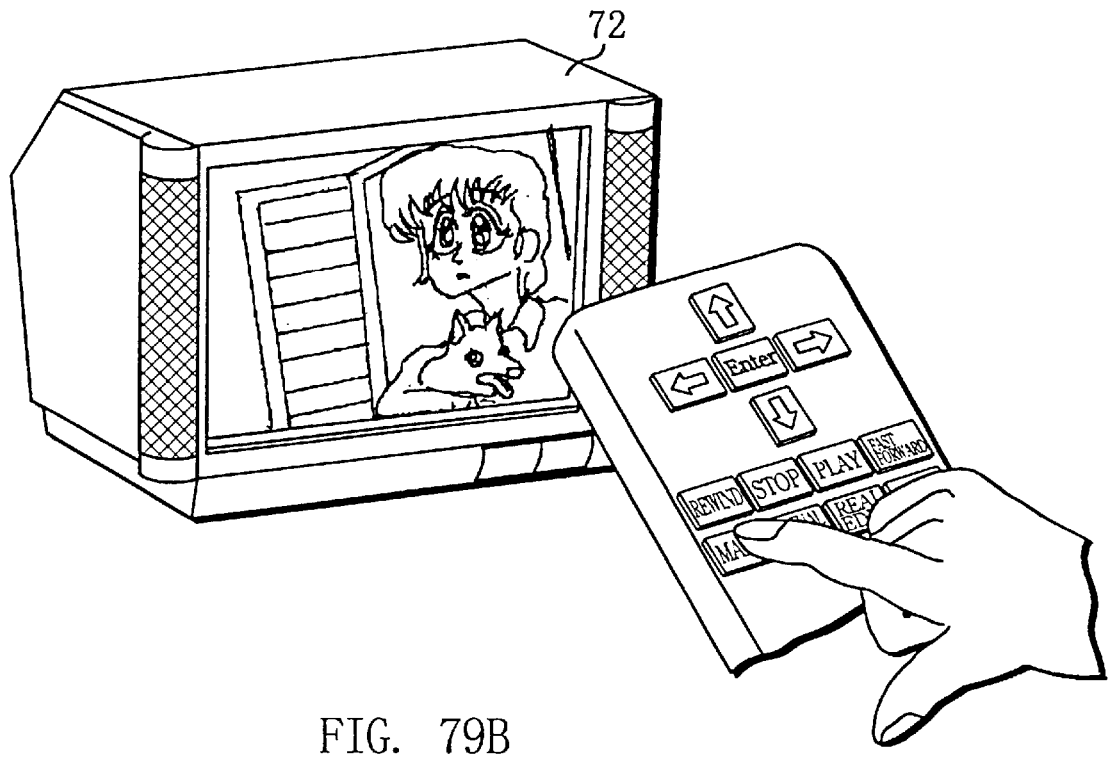
Figure 79B:
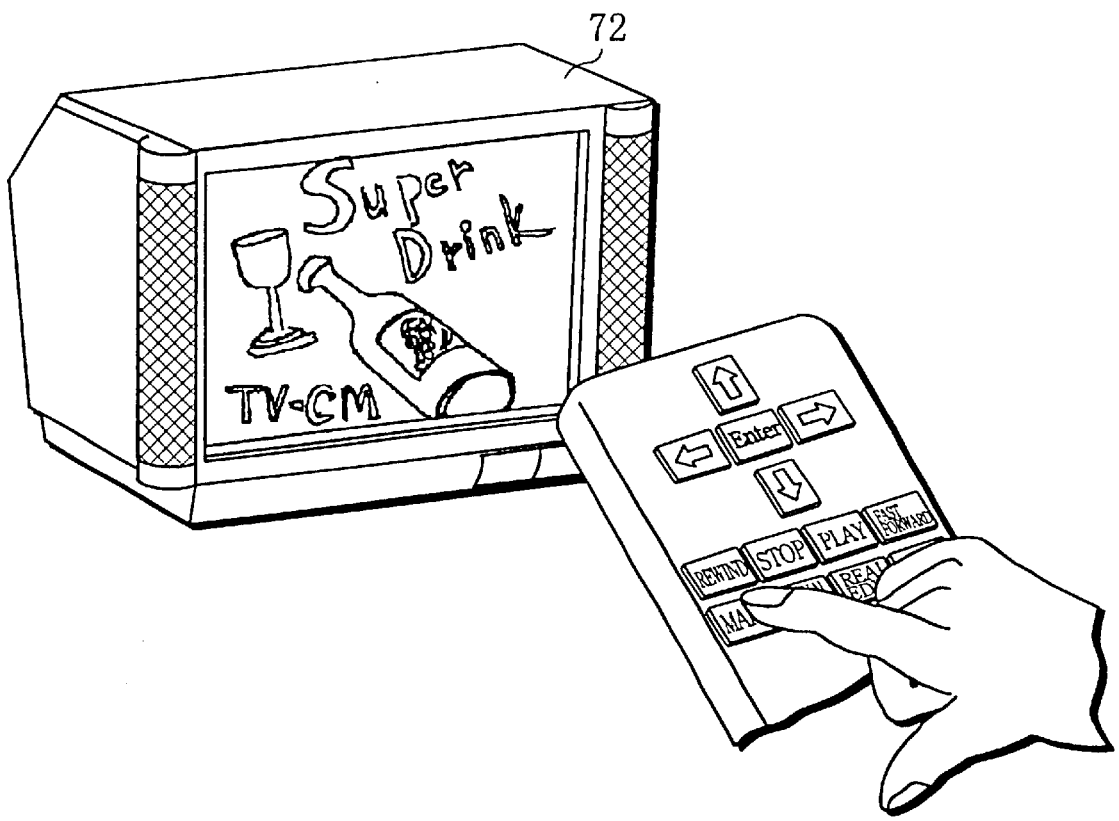

FIGS. 79A and 79B show how the user uses the TV monitor 72 and remote controller 71 when generating user-defined PGC information. FIG. BOB shows the data input and output between the components shown in FIG. 75 when a marking operation is performed. As shown in FIG. 79A, the user views the video images displayed on the TV monitor 72 and presses the mark key on the remote controller 71 at the beginning of a desired scene. After this, the desired scene ends, as shown in FIG. 79B, and the video images change to a content in which the user has no interest. Accordingly, the user presses the mark key again.

Figure 80B:
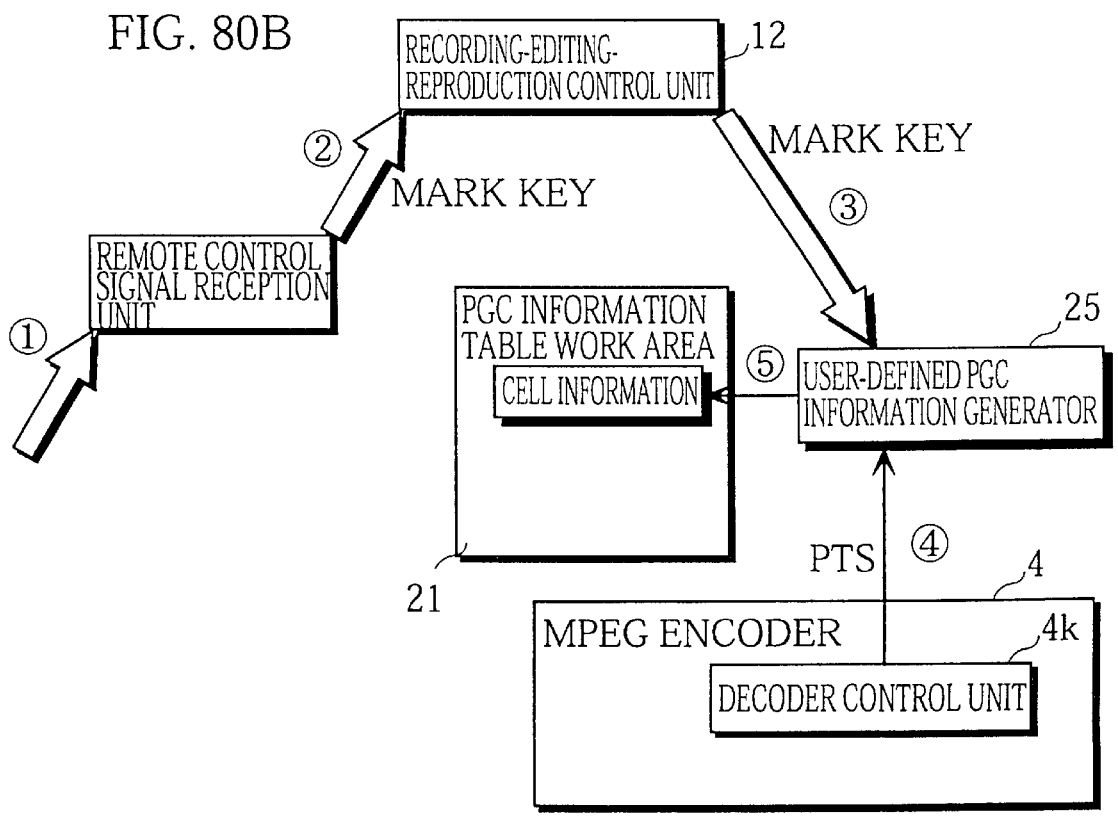

This marking operation is reported to the user-defined PGC information generator 25 via the route shown as ①, ②, ③ in FIG. 80B. The user-defined PGC information generator 25 then obtains the PTS of the points when the user pressed the mark key from the MPEG decoder 4, as shown by ④ in FIG. 80B, and stores the PTS as time information. The user-defined PGC information generator 25 then generates a set of cell information by attaching the appropriate AV file identifier and VOB identifier to a pair of stored PTS that are the start point and end point of a section, and stores this cell information in a newly secured row area the PGC information table work area 21, as shown by ⑤ in FIG. 80B.

When generating user-defined PGC information that indicates a section indicated by an existing set of cell information, the user-defined PGC information generator 25 merely copies the existing cell information into a different row area in the PGC information table work area 21.

In more detail, the user-defined PGC information generator 25 secures a row area for one row in the RTRW management file work area 24, and assigns a new user-defined PGC information identifier to this row area.

Once the cell information that should be used in the present user-defined PGC information has been indicated, out of the sets of cell information in the PGC information already stored in the PGC information table work area 21, using a combination of a row number and a column number, the user-defined PGC information generator 25 reads the cell information and copies it into a newly secured row area in the PGC information table work area 21.

(4-2-7) Editing Multi-stage Control Unit 26

The editing multi-stage control unit 26 controls the title reproduction control unit 23, the user-defined PGC information generator 25, and the seamless linking unit 20 to perform a multi-stage editing process including:

1. virtual edits achieved by defining user-defined PGC information;
2. previews which allow the user to view the video images that would be obtained by a real edit, based on the result of a virtual edit;
3. seamless linking, as described in the first and second embodiments; and
4. real edits performed by linking AV files as described in the third embodiment.

(4-2-7-1) Procedure for Multi-Stage Editing by the Editing Multi-Stage Control Unit 26

The following is a description of the specific procedure for the multi-stage control performed by the editing multi-stage control unit 26. When the user selects a virtual edit using the remote controller 71 in response to the interactive screen shown in FIG. 77A, the editing multi-stage control unit 26 accesses the RTRW directory, has the common file system unit 10 read the RTRW management file from the RTRW directory, and has the RTRW management file stored in the RTRW management file work area 24. Next, out of the RTRW management file stored in the RTRW management file work area 24, the editing multi-stage control unit 26 transfers the original PGC information table, the user-defined PGC information table, and the title search pointers to the PGC information table work area 21, and transfers the time map table to the time map table work area.

Based on the transferred original PGC information table, the editing multi-stage control unit 26 displays the interactive screen shown in FIG. 85, and waits for the next user indication.

FIG. 85 shows an example of the interactive screen displayed by the TV monitor 72 to have the user select the sections for the cells of a user-defined PGC in a virtual edit.

This interactive screen displays the original PGCs and user-defined PGCs as simple graphs, where the horizontal axis represents time. The recording date and time of each original PGC and user-defined PGC is also displayed. This interactive screen displays the plurality of cells as a horizontal arrangement of rectangles. The user may select any of these rectangles using the cursor keys on the remote controller 71. These original PGCs and cells are the same as those shown in FIG. 76, and the following describes the updating of the original PGC information table, the user-defined PGC information table and the title search pointers with FIG. 76 as the initial state.

FIG. 81 is a flowchart showing the processing of the editing multi-stage control unit 26 when defining a user-defined PGC. In this flowchart, the variable j indicates one of the plurality of original PGCs that are arranged vertically in the interactive screen and the variable k indicates one of the plurality of cells that are arranged horizontally in the interactive screen.

The variable m is the PGC number that should be assigned to the set of user-defined PGC information that is being newly defined in the RTRW management file, and the variable n is the cell number that should be assigned to the set of cell information that is being newly defined in the RTRW management file.

In step S201, the editing multi-stage control unit 26 substitutes a value given by adding one to the last number of the original PGC information in the RTRW management file into the variable m and "1" into the variable n. In step S202, the editing multi-stage control unit 26 adds a space for the mth user-defined PGC information to the user-defined PGC information table and in step S203, the editing multi-stage control unit 26 waits for the user to make a key operation. Once the user has made a key operation, in step S204 the editing multi-stage control unit 26 sets the flag for the pressed key, out of the flags that correspond to the keys on the remote controller 71, at "1", and in step S205 judges whether the Enter_Flag, which shows whether the enter key has been pressed, is "1". In step S206, the editing multi-stage control unit 26 judges whether the End_Flag, which shows whether the end key has been pressed, is "1". When both these flags are "0", the editing multi-stage control unit 26 uses the Right_Flag, Left_Flag, Down_Flag, Upper_Flag, which respectively show whether the right, left, down, or up keys have been pressed, to perform the following calculations, before substituting the calculation results into the variables k and j.

k←k+1*(Right_Flag)−1*(Left_Flag)
j←j+1*(Down_Flag)−1*(Up_Flag)

When the right key has been pressed, the Right_Flag is set at "1" r so that the variable k is incremented by "1". When the up key has been pressed, the Up_Flag is set at "1", so that the variable j is incremented by "1". Conversely, when the left key has been pressed, the Left_Flag is set at "1", so that the variable k is decremented by "1". In the same way, when the down key has been pressed, the Down_Flag is set at "1", so that the variable j is decremented by "1".

After updating the values of the variables k and j in this way, the editing multi-stage control unit 26 has the cell representation in row j and column k displayed in the focus state in step S208, clears all of the flags assigned to keys on the remote controller 71 to zero in step S209, and returns to step S203 where it waits once again for a key operation. By repeating the procedure in steps S203 to S209 described above, the focus state can move up/down and left/right among the cells according to key operations made using the remote controller 71.

If the user presses the enter key with any of the cells in the focus state during the above processing, the editing multi-stage control unit 26 proceeds to step S251 in FIG. 82.

In step S251 of FIG. 82, the editing multi-stage control unit 26 has the user give an indication as to whether the cell information in row j and column k should be used as it is, or whether only an area within the section indicated by this cell information is to be used. When the cell information is to be used as it is, the editing multistage control unit 26 copies the cell representation in row j and column k to the space given as row m and column n in step S252, and defines Original_PGC#j.CELL#k as User_Defined_PGC#m.CELL#n in step S253. After this defining, in step S254 the editing multi-stage control unit 26 increments the variable n and proceeds to step S209 in FIG. 81.

When an area within the section indicated by this cell information in row j and column k should be used, the editing multi-stage control unit 26 proceeds to step S255 to have the title reproduction control unit 23 commence partial reproduction for the cell information in row j and column k.

In step S255, the editing multi-stage control unit 26 determines the circumstances for the reproduction of the cell information in row j and column k. This determination is performed since when the section indicated by this cell information has been reproduced in part, there is no need to reproduce the section once again from the start, with it being preferable in this case for the reproduction of the section indicated by the cell information in row j and column k to commence at the position where the previous reproduction was terminated (Step S266), this point being called the reproduction termination point t.

On the other hand, when the cell information in row j and column k has not been reproduced, the section indicated by the cell information in row j and column k is reproduced from the start in step S265, with the processing then returning to steps S256 and entering the loop formed of steps S256 and S257. Step S256 waits for the reproduction of the cell to end, while step S257 waits for the user to press the mark key. When the judgement "Yes" is given in step S257, the processing advances to step S258, where the time information for the pressing of the mark key is obtained, and then to step S259.

In step S259, the editing multi-stage control unit 26 judges whether two sets of time information have been obtained. It not, the processing returns to step S256, or if so, the processing advances to step S260 where the obtained two sets of time information are set as the start point and end point.

One of the sets of time information obtained here is the start of the video scene which was marked by the user during its display on the TV monitor 72, while the other set of time information is the end of this video scene. These sets of time information are interpreted as marking a section in the original PGC which is especially wanted by the user as material for a video edit. Accordingly, user-defined PGC information should be generated this section, so that cell information is generated in the PGC information table work area 21. The processing then advances to step S261.

In step S261, the user-defined PGC information generator 25 obtains the VOB_ID and AV file ID in Original_PGC#j.CELL#k. In step S262, the user-defined PGC information generator 25 generates User_Defined_PGC#m.CELL#n using the obtained start point and end point, VOB_ID, and AV file ID. In step S263, the end point information is stored as the reproduction termination point t and in step S254, the variable n is incremented, before the processing returns to step S209.

As a result of the above processing, new user-defined cell information is generated from the cell information in row j and column k. After this, another cell is set into the focus state and another set of user-defined cell information is generated from this cell, so that a set of user-defined PGC information is gradually defined one cell at a time.

It should be noted here that if the reproduction based on the cell information in row j and column k in the loop process shown as step S256 to step S257 ends without a marking operation having been made, the processing will return to step S254.

When it is determined that the end key has been pressed, the judgement "Yes" is given in step S206 in FIG. 80B and the processing advances to step S213. In step S213, a menu is displayed to have the user indicate whether a next user-defined PGC is to be defined. When the user wishes to define a new user-defined PGC and gives an indication of such, in step S214 the variable m is incremented, the variable n is initialized and the processing proceeds to steps S209 and S203.

(4-2-7-2) Specific Example of the Definition of User-Defined PGC Information

The following is a description of the operation when defining user-defined PGC information from a plurality of sets of original PGC information that are displayed in the interactive screen image of FIG. 85.

FIGS. 86A and 86B show the relationship between the user operations made via the remote controller 71 and the display processing that accompanies the various user operations FIG. 87A through FIG. 90 also illustrate examples of such operations, and are referred to in the following explanation of these operations.

Figure 87B:
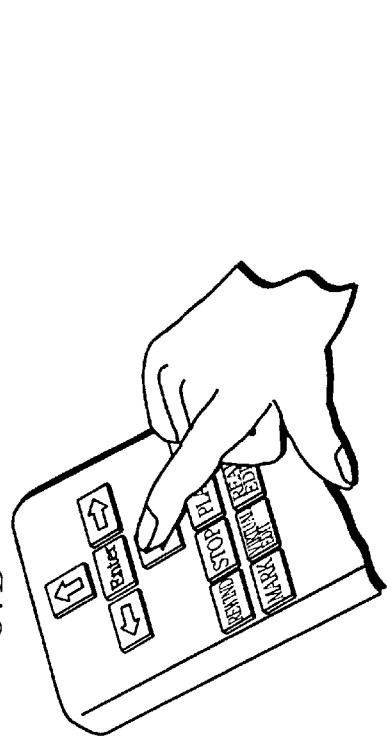
Figure 87C:
Figure 87D:

As shown in FIG. 85, once the cell #1 which is in row 1 and column 1 has been set in the focus state, the user presses the enter key, as shown in FIG. 86B. As a result, the judgement "Yes" is given in step S205 and the processing proceeds to the flowchart in FIG. 82. In steps S251 to S266 of the flowchart in FIG. 82, the first cell information CELL #1A in the user-defined PGC #1 is generated based on the Original_PGC#1.CELL#1 shown in FIG. 86A. Once this generation is complete, the variable n is incremented in step S254, and the processing returns to step S203 via step S209 with the value of the variable n at "2". In this example, the user presses the down key once, as shown in FIG. 87B, and the right key twice, as shown in FIGS. 87C and 87D. In step S204, the flags that corresponds to the keys that have been pressed are set at "1".

Figure 87A:
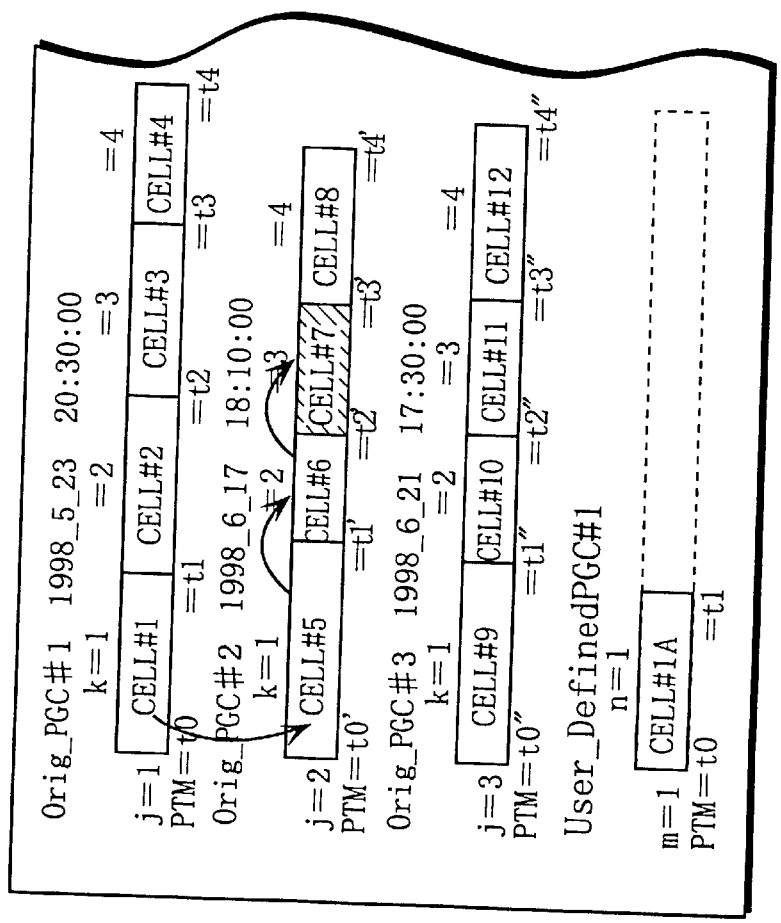

AS a result of the first press of the down key:
k=1(=1+1*0-1*0)
j=2(=1+1*1-1*0)
As a result of the first press of the right key:
k=2(=1+1*1-1*0)
j=2(=2+1*0-1*0)
As a result of the second press of the right key:
k=3(=2+1*1-1*0)
j=2(2+1*0-1*0)
As shown in FIG. 87A, the cell #7 located in row 2 and column 3 is set in the focus state.

Once the cell in row 2 and column 3 has been set in the focus state, the user presses the enter key, as shown in FIG. 88B, so that the judgement "Yes" is given in step S205 and the processing advances to the flowchart in FIG. 82. The cell information #7A, which is the second set of cell information in UserDefined_PGC#1, is then generated based on the Original_PGC#2.CELL#7 located in row 2 and column 3 of the original PGC information table (see FIG. 88A).

After the second set of cell information has been generated, the above processing is repeated. The user presses the enter key as shown in FIG. 89B, so that the cell information #11A and the cell information #3A are respectively generated as the third and fourth sets of cell information in UserDefined_PGC#1.

The processing returns to step S203 and, in the present example, the user then presses the end key. As a result, the End_Flag corresponding to the end key is set at "1", and the processing advances to step S213. Since the end key has been pressed, the editing multi-stage control unit 26 regards the definition of the user-defined PGC information #1 as complete. In step S213, the user is asked to indicate whether he/she wishes to define another set of user-defined PGC information (the user-defined PGC information #2) that follows this defined user-defined PGC information #1. If the user wishes to do so, the variable m is incremented, the variable n is initialized, and the processing proceeds to step S209

By repeating the above processing, the user-defined PGC information #2 and the user-defined PGC information #3 are defined. As shown in FIG. 91, this user-defined PGC information #2 is composed of cell #2B, cell #4B, cell #10B, and cell #5B, and the user-defined PGC information #3 is composed of cell #3C, cell #6C, cell #8C, and cell #9C.

FIG. 91 shows the contents of the user-defined PGC information table, the original PGC information table and the title search pointers at the end of the virtual edit process.

If the user presses the end key at this point, the interactive screen shown in FIG. 90 will be displayed in step 3215 in FIG. 81, and the editing multi-stage control unit 26 waits for the user to select a set of user-defined PGC information using the up and down keys. Here, the user can select a preview by pressing the play key, and can select a real edit by pressing the real edit key, with the user-defined PGC information table not being recorded yet.

If the user gives indication for an operation that records a user-defined PGC, the user-defined PGC information table that includes the new user-defined PGC generated in the PGC information table work area 21 is transferred to the RTRW management file work area 24, where it is written into the part of the RTRW management file written in the RTRW management file work area 24 that corresponds to the user-defined PGC information table.

At the same time, file system commands are issued so that a title search pointer for the newly generated user-defined PGC information is added to the title search pointers that are already present in the RTRW management file transferred to the RTRW management file work area 24.

FIG. 83 is a flowchart showing the processing during a preview or a real edit. The following is a description of the processing when performing a preview of a VOB linking operation, with reference to this flowchart in FIG. 83.

FIGS. 92A–92B and 93A–93C show the relationship between operations made using the remote controller 71 and the display processing that accompanies these operations.

In step S220 of the flowchart of FIG. 83, the first number in the user-defined PGC information table is substituted into the variable j, and step S221, a key operation is awaited. When the user makes a key operation, in step S222 the flag corresponding to the key pressed by the user is set at "1".

In step S223, it is judged whether the Play_Flag, which shows whether the play key has been pressed, is "1", and in step S224, it is judged whether the RealEdit_Flag, which shows whether the real edit key has been pressed, is "1". When both these flags are "0", the processing proceeds to step S225 where the following calculation is performed using the values of the Up_Flag and Down_Flag that respectively show whether the up and down keys have been pressed. The results of this calculation is substituted into the variable j.

$$j \leftarrow j+1*(Down\_Flag)-1*(Up\_Flag)$$

When the user has pressed the up key, the Up_Flag will be set at "1", meaning that the variable j is decremented. Conversely, the user has pressed the down key, the Down_Flag will be set at "1", meaning that the variable j is incremented. Once the variable j has been updated in this way, in step S226 the image on the display corresponding to the PGC information positioned on row j is set in the focus state. In step S227, all of the flags corresponding to keys on the remote controller 71 are cleared to zero and the processing returns to step S221 where another key operation is awaited. This processing in steps S221 to S227 is repeated, with the focus state moving to a different set of PGC information in accordance with user operations of the up and down keys on the remote controller 71.

If the user presses the play key, while the above processing is being repeated, with one of the sets of PGC information in the focus state, the Play_Flag is set at "1", the judgement "Yes" is given in step S223, and the processing proceeds to S228. In step S228, the editing multi-stage control unit 26 instructs the title reproduction control unit 23 to reproduce the VOBs in accordance with the PGC, out of the user-defined PGCs, that has been indicated by the user.

When the PGC indicated by the user is a user-defined PGC, the cells included in the user-defined PGC will indicate sections out of the plurality of section in one or more VOBs in a user-defined order. Since such reproduction will not satisfy the necessary conditions for seamless reproduction that were described in the first and second embodiments, so that image display and output will be stopped at the boundary of a cell during reproduction before advancing to the next cell. Since the necessary conditions for seamless reproduction of cells are not satisfied, image display and audio display will be interrupted. However, the object of this operation is only to give the user a preview of the linking result for a plurality of scenes, so that this object is still achieved regardless of such interruptions.

(4-2-7-3) Processing for a Preview of a Multi-Stage Edit and for a Real Edit

The operation for the linking of VOBs in a real edit is described below.

FIGS. 94A to 94C show the relationship between user operations of the remote controller 71 and the display processing that accompany these key operations. The user presses the up key as shown in FIG. 94B to have cell #1A set into the focus state, and this is reflected in the display screen displayed on the TV monitor 72 as shown in FIG. 94A. If the user then presses the real edit key, as shown in FIG. 94C, the judgement "Yes" is made in step S224 in FIG. 83, and the processing from step S8 to step S16 in the flowchart of FIG. 43 described in the third embodiment is performed.

After completing this processing in the third embodiment, the processing advances to step S237 in FIG. 84. After the variable n is set at "1" in step S237, a search is performed for the Original_PGC#j.CELL#k which was used when generating the UserDefined_PGC#m.CELL#n in step S238 and in step S239 it is judged whether this Original_PGC#j exists. If so, this Original_PGC#j is deleted in step S240, or if not, a search is performed for the UserDefined_PGC#q that was generated from this Original_PGC#j in step S240.

In step S242, it is determined whether there is at least one such UserDefined_PGC#q, and if so, all such UserDefined_PGC#q are deleted in step S243. In step S244, it is judged whether the value of variable n matches the last number of the cell information, and if not, the processing advances to step S245 where the variable n is incremented to indicate the next set of cell information in the PGC information #q before the processing returns to step S238. The loop process in step S238 to step S245 is repeated until the variable n reaches the last number of the cell information in the PGC information #q.

The sections indicated by the user-defined PGC information #1 are all of VOBs #1, #2, and #3, so that these are all subjected to the real edit. The sets of original PGC information that were used to generate the cell information included in user-defined PGC information #1 indicate VOBs that are subjected to the real edit, so that all of these sets of original PGC information are deleted. The sets of user-defined PGC that were generated from these sets of PGC information also indicate VOBs that are subjected to the real edit, so that all of these sets of user-defined PGC information are also deleted.

The judgement "Yes" is made in step S244, so that the processing advances to step S246, and, out of the freed PGC numbers obtained by deleting the sets of original PGC information, the lowest number is obtained as the PGC number #e. Next, in step S247, the cell information is updated using the AV file ID assigned to the AV file and the VOB_ID after the MERGE command, and in step S248 the PGC number of the UserDefined_PGC#q is updated to the PGC number #e. In the title search pointers, meanwhile, the type information is updated to the original type.

FIG. 95 shows examples of the PGC information table and the title search pointers after the deletion of sets of original PGC information and user-defined PGC information that accompanies a real edit.

Since the VOBs #1, #2, and #3 indicated by the sections in user-defined PGC information #1 are subjected to the real edit, the original PGC information #1, the original PGC information #2, the original PGC information #3, the user-defined PGC information #2, and the user-defined PGC information #3 will already have been deleted. Conversely, what was formerly the user-defined PGC information #1 has been defined as the original PGC information #1.

Once the PGC information has been updated in the PGC information table work area 21 as described above, the new original PGC information is transferred to the RTRW management file work area 24 where it is used to overwrite the RTRW management file presently stored in the RTRW management file work area 24. At the same time, the title search pointer for this newly generated original PGC information is transferred to the RTRW management file work area 24 where it is used to overwrite the title search pointers already present in the RTRW management file.

Once the user-defined PGC information table and title search pointers have been written, file system commands are issued so that the RTRW management file stored in the RTRW management file work area 24 is written into the RTRW directory.

With this present embodiment, the sections to be used as materials for a real edit are indicated by user-defined cell information, with these being freely arranged to provisionally decide the reproduction route.

When the user wishes to set a reproduction route of the editing materials, this can be achieved without having to temporarily produce a VOB, so that the editing of video materials can be performed in a short time using a simple method. This also means that there is no need to use more of the storage capacity of the DVD-RAM to store a temporarily produced VOB.

If the provisional determination of scene linking can be achieved by merely defining a set of user-defined PGC information, the user can produce many variations of the reproduction route in a short time. The sets of user-defined cell information are indicated using time information for sections in VOBs, so that the indicated VOBs can be maintained in the state in which they were already recorded.

The user can generate a plurality of sets of user-defined PGC information for different reproduction routes and then view previews of these routes to find the most suitable of these reproduction routes. The user can then indicate a real edit for his/her preferred reproduction route, and so process the VOBs in accordance with the selected user-defined PGC information. This means that the user can perform a bold editing process that directly rewrites the VOBs that are already stored on an optical disc. While the original VOBs will be effectively deleted from the disc, the user is able to verify the result of this before giving the real edit indication, making this not a particular problem for the present invention.

Once a real edit has been performed, the title type in the title search pointer of the user-defined PGC information used for the real edit will be set to "original type PGC information", so that this can be used as the base for following video editing operations.

As described above, a single video data editing apparatus that uses only one optical disc can perform advanced video editing whereby a user can select one out of a plurality of freely chosen potential arrangements of the source material.

As a result, by using the present video data editing apparatus, a large number of video enthusiasts will be able to perform advanced editing operations that were considered out of the reach of conventional domestic video equipment.

It should be noted here that the time information may be taken from the mark points in the cell information and managed with information such as address taken from the time map table in the form of a table. By doing so, this information can be presented to the user as potential selections in a screen showing the pre-editing state.

Reduced images (known as "thumbnails") may also be generated for each mark point and stored as separate files, with pointer information also being produced for each thumbnail. When displaying the cell information at the pre-editing stage, these thumbnails may be displayed to show the potential selections that can be made by the user.

The processing of components such as the title reproduction control unit 23 (see FIG. 78) and the processing of the editing multi-stage control unit 26 (FIGS. 81 to 84) that was described in this fourth embodiment using flowcharts can be achieved by a machine language program. Such machine language program may be distributed and sold having been recorded on a recording medium. Examples of such recording medium are an IC card, an optical disc, or a floppy disc. The machine language program recorded on the recording medium may then be installed into a standard personal computer By executing the installed machine language programs, the standard personal computer can achieve the functions of the video data editing apparatus of this fourth embodiment.

As a final note regarding the relationship between VOBs and original PGC information, it is preferable for one set of original PGC information to be provided for each VOB.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A video data editing apparatus for use with an optical disc, the optical disc having recorded thereon at least one file of video data split into a plurality of segments, each segment being recorded in a consecutive area on the optical disc, wherein the optical disc is for use with a reproduction apparatus including a read unit, a track buffer, a decoder, and an optical pickup, and the at least one file of video data is accessible by the reproduction apparatus, at least one of the segments are to be read by the read unit via the optical pickup, the video data is to be decoded by the decoder, at least one of the segments are to be inputted into the track buffer, and video data is to be outputted from the track buffer to the decoder, said video editing apparatus comprising:

detection means for detecting a first segment, from the plurality of segments, where a length of the consecutive area in which the first segment is recorded is below a predetermined length, the predetermined length being a length below which the first segment would cause an underflow in the track buffer; and linking means for linking the detected first segment with at least part of a second segment, and moving at least one of the first segment and a linked part of the second segment to a different area of the optical disc so as to make a total continuous length of the first segment and the linked part of the second segment at least equal to the predetermined length, wherein the second segment includes video data that is reproduced either immediately before or immediately after reproduction of video data in the first segment.

2. The video data editing apparatus of claim 1, wherein:

the consecutive area on the optical disc is divided into a plurality of ECC blocks, each ECC block being composed of consecutive N-sec sectors, each sector being S-size-byte in size;

the segment is composed of a plurality of packs, each pack being S-size-byte in size; and the predetermined length of the consecutive area corresponds to a number N-ecc of ECC blocks that is expressed by a following equation:

$$N\text{-}ecc=V_o*Tj/((N\text{-}sec*8*S\text{-}size)*(1V_o/V_r)),$$

where Tj represents a maximum jump period for the optical pickup, $V_r$ represents a transfer rate for input from the track buffer in Mbps, and $V_o$ represents a transfer rate for output from the track buffer in Mbps.

3. The video data editing apparatus of claim 2, wherein said linking means includes:

a first measuring unit operable to measure a continuous length of an empty area on the optical disc on at least one side of a recording area of the first segment detected by said detecting means;

a second measuring unit operable to measure a continuous length of an empty area on the optical disc on at least one side of a recording area of the second segment;

a first judgement unit operable to judge whether a continuous length of any empty area measured by said first measuring unit is greater than a data size of the second segment;

a first moving unit operable to move, when a judgement by said first judgement unit is affirmative, the second segment to the empty area judged to be larger than the data size of the second segment so that the first segment and second segment are recorded on the disc in reproduction order;

a second judgement unit operable to judge, when the judgement of the first judgement unit is negative, whether a continuous length of any empty area measured by said second measuring unit is greater than a data size of the first segment;

a second moving unit operable to move, when a judgement by said second judgement unit is affirmative, the first segment to the empty area judged to be larger than the data size of the first segment so that the first segment and second segment are recorded on the disc in reproduction order.

4. The video data editing apparatus of claim 3, wherein said linking means further includes:

a search unit operable to search, when the judgements of both said first judgement unit and said second judgement unit are negative, the optical disc for an empty area whose continuous length is greater than a length L, where the length L is a total length of the first segment and the second segment; and a third moving unit operable to move, when said search unit has found an empty area with a continuous length greater than the length L, the first segment and the second segment to the empty area found by said search unit.

5. The video data editing apparatus of claim 4, further comprising a third judgement unit operable to judge, when said search unit has found an empty area with a continuous length greater than the length L, whether the length L is below a maximum length S, the maximum length S being at least twice the predetermined length, wherein said third movement unit moves the first segment and the second segment to the empty area only when the length L is below the maximum length S, said linking means further including:

a fourth movement unit operable to move, when the length L is not below the maximum length S, all of the first segment and only the linked part of the second segment to the empty area found by said search unit.

6. The video data editing apparatus of claim 3, further comprising:

storage means for storing re-encoded data obtained by re-encoding a section of video data read by said video data editing apparatus during an editing operation;

a fourth judgement unit operable to judge, when a judgement of said first judgement unit is affirmative, whether the first segment is a remaining part of a segment that was originally recorded on the optical disc but has had a section of data read out by said video data editing apparatus during the editing operation; and a first recording unit operable to record, when a judgement of said fourth judgement unit is affirmative, the re-encoded data that is stored by said storage means into the empty area, wherein said first moving unit is operable to move the second segment to a position on the optical disc that follows immediately after a recording position of the re-encoded data.

7. The video data editing apparatus of claim 6, further comprising:

a second recording unit operable to record, when a judgement of the second judgement unit is affirmative and the first segment is a remaining part, the re-encoded data stored by said storage means immediately after the first segment has been moved by said second moving unit.

8. A video data editing apparatus for use with an optical disc, the optical disc having recorded thereon at least one file of video data split into a plurality of segments, each segment being recorded in a consecutive area on the optical disc, said video data editing apparatus comprising:

storage means for storing recording data that is video data to be reproduced immediately after video data in one of the segments and immediately before video data in a different segment;

reception means for receiving an instruction to record the recording data;

first measuring means for measuring, when an instruction to record the recording data has been received, a continuous length of a following region, the following region being immediately after a first occupied area for the segment whose video data is to be reproduced immediately before the recording data;

second measuring means for measuring, when an instruction to record the recording data has been received, a continuous length of a preceding region, the preceding region being immediately before a second occupied area for the segment whose video data is to be reproduced immediately after the recording data; and recording means for recording the recording data onto the optical disc, based on the continuous lengths measured by said first measuring means and said second measuring means;

wherein said recording means includes:
- a first judgement unit operable to judge whether the continuous length of the following region measured by said first measuring means and the continuous length of the preceding region measured by said second measuring means exceed a data size of the recording data;
- a first recording unit operable to record the recording data into one of the preceding region and the following region whose continuous length has been judged by said first judgement unit to exceed the data size of the recording data;
- a second judgement unit operable to judge, when said first judgement unit finds that the continuous length of both the following region and the preceding region are below the data size of the recording data, whether a combined length L of the following region and the preceding region exceeds the data size of the recording data; and
- a second recording unit operable to divide the recording data, when said second judgement unit finds that the combined length L exceeds the data size of the recording data, to obtain divided parts and for recording the respective divided parts into the following region and the preceding region.

9. The video data editing apparatus of claim 8, wherein said recording means includes:
- a searching unit operable to search, when the combined length L is below the data size of the recording data, for an empty area on the disc whose continuous length is no greater than a maximum length;
- a third judgement unit operable to judge whether a further combined length L2 of the recording data and one of the segment whose video data is to be reproduced immediately before the recording data and the segment whose video data is to be reproduced after the recording data is below a predetermined maximum value;
- a first moving unit operable to move a segment, for which said third judgement unit gives an affirmative judgement, to the empty area found by said searching unit; and
- a third recording unit operable to record the recording data in the empty area to which said first moving unit has moved the segment.

10. The video data editing apparatus of claim 8, wherein said recording means includes:
- a second moving unit operable to
  calculate, when the combined length L is below the data size of the recording data and said third judgement unit has given a negative judgement for both the segment whose video data is to be reproduced immediately before the recording data and the segment whose video data is to be reproduced after the recording data, a size equal to a difference between a predetermined size and a data size of the recording data,
  take a data part having the calculated data size from at least one of the segments whose respective video data is reproduced immediately before and immediately after the recording data, and
  move the taken data part to the empty area; and
- a fourth recording unit operable to record the recording data in the empty area.

11. A recording medium storing an editing program that is to be read by a computer, the editing program being for use in editing data on an optical disc, the optical disc having recorded thereon at least one file of video data split into a plurality of segments, each segment being recorded in a consecutive area on the optical disc, wherein the optical disc is for use with a reproduction apparatus including a read unit, a track buffer, a decoder, and an optical pickup, and the at least one file of video data is accessible by the reproduction apparatus, the segments are to be read by the read unit via the optical pickup, the video data is to be decoded by the decoder, the segments are to be inputted into the track buffer, and video data is to be outputted from the track buffer to the decoder, said editing program comprising:

detecting a first segment, from the plurality of segments, where a length of the consecutive area in which the first segment is recorded is below a predetermined length, the predetermined length being a length at which the first segment would cause an underflow in the track buffer; and linking the detected first segment with at least part of a second segment, and moving at least one of the first segment and a linked part of the second segment to a different area of the optical disc so as to make a total continuous length of the first segment and the linked part of the second segment at least equal to the predetermined length, wherein the second segment includes video data that is reproduced either immediately before or immediately after reproduction of video data in the first segment.

12. The recording medium of claim 11, wherein:
the consecutive area on the optical disc is divided into a plurality of ECC blocks, each ECC block being composed of consecutive N-sec sectors, each sector being S-size-byte in size;

the segment is composed of a plurality of packs, each pack being S-size-byte in size; and the predetermined length of the consecutive area corresponds to a number N-ecc of ECC blocks that is expressed by a following equation:

$$N\text{-}ecc = V_o * Tj / ((N\text{-}sec * 8 * S\text{-}size) * (1 - V_o/V_r)),$$

where Tj represents a maximum jump period for the optical pickup, $V_r$ represents a transfer rate for input from the track buffer in Mbps, and $V_o$ represents a transfer rate for output from the track buffer in Mbps.

13. The recording medium of claim 12, wherein said linking includes:

measuring a continuous length of an empty area on the optical disc on at least one side of a recording area of the first segment detected by said detecting means;

measuring a continuous length of an empty area on the optical disc on at least one side of a recording area of the second segment;

judging whether a continuous length of any empty area on at least one side of the recording area of the first segment is greater than a data size of the second segment;

moving, when said judging is affirmative, the second segment to the empty area judged to be larger than the data size of the second segment so that the first segment and second segment are recorded on the disc in reproduction order;

further judging, when said judging is negative, whether a continuous length of any empty area on at least one side of the recording area of the second segment is greater than a data size of the first segment;

moving, when said further judging is affirmative, the first segment to the empty area judged to be larger than the data size of the first segment so that the first segment and second segment are recorded on the disc in reproduction order.

* * * * *

UNITED STATES PATENT AND TRADEMARK OFFICE
CERTIFICATE OF CORRECTION

PATENT NO.     : 6,330,392 B1
DATED          : December 11, 2001
INVENTOR(S)    : Tokuo Nakatani et al.

It is certified that error appears in the above-identified patent and that said Letters Patent is hereby corrected as shown below:

<u>Title page,</u>
Item [56], References Cited, FOREIGN PATENT DOCUMENTS, change "0724264A2     7/1996 (GB)" to -- 0724264A2   7/1996 (EP) --.

<u>Column 1,</u>
Line 61, insert -- . -- following "recording".

<u>Column 2,</u>
Line 60, insert -- . -- following "buffer".

<u>Column 4,</u>
Line 24, replace "include;" with -- include: --.
Line 40, insert -- . -- following "data".

<u>Column 7,</u>
Line 22, delete "s".

<u>Column 9,</u>
Lines 13 and 19, delete the second appearance of "the".
Line 58, ";" should be --: --.

<u>Column 12,</u>
Line 5, insert -- . -- following "track".
Line 28, replace "detective" with -- defective --.
Line 29, insert -- . -- following "found".
Line 53, replace "recorded" with -- Recorded --.

<u>Column 19,</u>
Line 27, replace "T2 4" with -- T24 --.
Line 31, insert -- . -- following "reproduced".

<u>Column 22,</u>
Line 13, insert -- . -- following "increases".
Line 27, insert -- , -- following "Pack Header".
Line 36, insert -- . -- following "Program_max_rate".
Line 46, replace "Buffer.bound.into" with -- Buffer.bound.info --.

UNITED STATES PATENT AND TRADEMARK OFFICE
CERTIFICATE OF CORRECTION

PATENT NO. : 6,330,392 B1
DATED : December 11, 2001
INVENTOR(S) : Tokuo Nakatani et al.

It is certified that error appears in the above-identified patent and that said Letters Patent is hereby corrected as shown below:

Column 24,
Line 36, insert -- . -- following "file".

Column 27,
Line 66, replace "VOE=First_SCR" with -- VOB=First_SCR --.

Column 28,
Line 15, replace "Is" with -- is --.
Line 19, replace "VOR" with -- VOB --.
Line 51, insert -- ) -- following "(1-3-3-8".

Column 29,
Line 56, replace "sane" with -- same --.

Column 33,
Line 8, replace "OVD-RAM" with -- DVD-RAM--.
Line 41, insert -- . -- following "7".

Column 34,
Line 3, insert -- . -- following "pickup".

Column 35,
Line 39, insert -- . -- following "$4h$".
Line 41, insert -- . -- following "data".

Column 36,
Line 35, replace "SOB" with -- VOB --.
Line 64, replace "3105" with -- S105 --.

Column 38,
Line 7, replace "It" with -- If --.

Column 39,
Line 43, replace "VOR" with -- VOB- --.

Column 42,
Line 8, replace "first _SCR" with -- First_SCR --.
Line 26, replace "STC_set" with -- STC_offset --.

UNITED STATES PATENT AND TRADEMARK OFFICE
CERTIFICATE OF CORRECTION

PATENT NO. : 6,330,392 B1
DATED : December 11, 2001
INVENTOR(S) : Tokuo Nakatani et al.

It is certified that error appears in the above-identified patent and that said Letters Patent is hereby corrected as shown below:

Column 44,
Line 38, insert -- . -- following "P1".

Column 45,
Line 41, insert -- . -- following "omitted".

Column 46,
Line 4, replace "3105" with -- S105 --.
Line 6, replace "STC_set" with -- STC_offset --.
Line 55, insert -- . -- following "buffer".
Line 60, replace "it" with -- if --.

Column 47,
Line 19, insert -- . -- following "it".
Line 24, insert -- . -- following "time".
Line 26, replace "STC_set" with -- STC_offset --.
Line 59, insert -- . -- following "taken".

Column 49,
Line 46, replace "1" with -- 7 --.

Column 50,
Line 31, insert -- . -- following "limited".

Column 51,
Line 22, insert -- . - following "directory".
Line 30, replace "Construstion" with -- Construction --.

Column 52,
Line 16, insert -- . -- following "($V_r$- $V_o$)".

Column 53,
Line 60, delete "as".
Line 63, replace "$\geqq$" with -- $\geq$ --.

Column 54,
Line 62, insert -- . -- following "unit 15".

UNITED STATES PATENT AND TRADEMARK OFFICE
CERTIFICATE OF CORRECTION

PATENT NO. : 6,330,392 B1
DATED : December 11, 2001
INVENTOR(S) : Tokuo Nakatani et al.

It is certified that error appears in the above-identified patent and that said Letters Patent is hereby corrected as shown below:

Column 55,
Line 13, replace "tile" with -- file --.
Line 30, replace "MAD" with -- READ --.
Line 62, replace "35" with -- 15 --.

Column 56,
Line 54, insert -- " -- before "FAST FORWARD".
Line 66, insert -- . -- following "editing".

Column 58,
Line 33, replace "commends" with -- commands --.

Column 59,
Line 38, insert -- ... -- following "t4".

Column 62,
Line 23, replace "45F" with -- 45E --.

Column 63,
Line 13, replace "$\geqq$" with -- $\geq$ --.
Line 30, insert -- AV -- following "the".

Column 64,
Line 2, insert -- ( -- before "in-memory data".
Line 5, replace "At" with -- Af --.
Line 16, insert -- . -- following "y".

Column 65,
Line 34, insert -- . -- following "53".
Line 54, replace "$\geqq$" with -- $\geq$ --.

Column 66,
Line 24, insert -- . -- following "53B".
Line 61, replace "$\geqq$" with -- $\geq$ --.

Column 67,
Line 35, replace "$\geqq$" with -- $\geq$ --.
Line 65, replace "588" with -- 58B --.

UNITED STATES PATENT AND TRADEMARK OFFICE
CERTIFICATE OF CORRECTION

PATENT NO. : 6,330,392 B1
DATED : December 11, 2001
INVENTOR(S) : Tokuo Nakatani et al.

It is certified that error appears in the above-identified patent and that said Letters Patent is hereby corrected as shown below:

Column 68,
Line 12, replace "$\geqq$" with -- $\geq$ --.
Line 25, replace "li" with -- n --.

Column 69,
Line 10, replace "$\geqq$" with -- $\geq$ -- (in both instances).
Lines 25 and 36, replace "$\geqq$" with -- $\geq$ --.
Line 25, replace "S65" with -- S85 --.

Column 70,
Line 4, replace "integrated, one" with -- integrated. One --.
Line 61, replace "682" with -- 68E --.

Column 74,
Line 15, insert -- . -- following "length".

Column 77,
Line 35, replace "DVD-RAN" with -- DVD-RAM --.

Column 78,
Line 23, insert -- . -- following "reproduced".

Column 79,
Line 43, replace "*1" with -- #1 --.

Column 80,
Line 27, insert -- . -- following "order".

Column 82,
Line 9, insert -- ) -- following "4-2".
Line 25, insert -- . -- following "26".

Column 83,
Line 24, insert -- . -- following "21".

Column 84,
Line 42, insert -- . -- following "recorded".

UNITED STATES PATENT AND TRADEMARK OFFICE
CERTIFICATE OF CORRECTION

PATENT NO.    : 6,330,392 B1
DATED         : December 11, 2001
INVENTOR(S)   : Tokuo Nakatani et al.

It is certified that error appears in the above-identified patent and that said Letters Patent is hereby corrected as shown below:

Column 86,
Line 1, replace "Use-Defined" with -- User-Defined --.
Line 29, replace "BOB" with -- 80B --.

Column 88
Line 47, replace "multistage" with -- multi-stage --.

Column 90,
Line 1, insert -- . -- following "operations".
Line 19, replace "AS" with -- As --.
Line 56, insert -- . -- following "S209".
Line 67, replace "3215" with -- S215 --.

Column 94,
Line 27, insert -- . -- following "computer".

Column 95,
Line 14, replace "(1 $V_o/V_r$))" with -- (1-$V_oN_r$)) --.

Signed and Sealed this

Fifth Day of April, 2005

JON W. DUDAS
*Director of the United States Patent and Trademark Office*